US012762247B1

(12) United States Patent
Kohli et al.

(10) Patent No.: US 12,762,247 B1
(45) Date of Patent: Oct. 13, 2026

(54) SYSTEMS AND METHODS FOR INTERCONNECTED COMPLIANCE PLATFORM

(71) Applicant: RiskStack Inc., Bayside, NY (US)

(72) Inventors: Rohan Kohli, Bayside, NY (US); Sooah Shin, New York, NY (US)

(73) Assignee: RiskStack Inc., Bayside, NY (US)

( * ) Notice: Subject to any disclaimer, the term of this patent is extended or adjusted under 35 U.S.C. 154(b) by 308 days.

(21) Appl. No.: 18/115,513

(22) Filed: Feb. 28, 2023

Related U.S. Application Data

(60) Provisional application No. 63/315,290, filed on Mar. 1, 2022.

(51) Int. Cl.
*G06F 21/57* (2013.01)

(52) U.S. Cl.
CPC .................................. *G06F 21/577* (2013.01)

(58) Field of Classification Search
CPC .................................................... G06F 21/577
USPC .......................................................... 726/26
See application file for complete search history.

(56) References Cited

U.S. PATENT DOCUMENTS

| | | | | |
|---|---|---|---|---|
| 7,433,829 | B2 * | 10/2008 | Borgia | G06Q 10/0639 705/7.38 |
| 10,339,537 | B2 * | 7/2019 | Kholkar | G06Q 30/018 |
| 11,388,185 | B1 * | 7/2022 | Rothchild | H04L 63/1433 |
| 2002/0049961 | A1 * | 4/2002 | Fang | G06F 8/34 717/127 |
| 2002/0129221 | A1 * | 9/2002 | Borgia | G06Q 10/06311 712/1 |
| 2015/0302420 | A1 * | 10/2015 | Nair | G06Q 30/018 705/317 |
| 2017/0214701 | A1 * | 7/2017 | Hasan | H04L 63/1433 |
| 2018/0137107 | A1 * | 5/2018 | Buccapatnam Tirumala | G06F 16/3346 |
| 2018/0189797 | A1 * | 7/2018 | Ravi | G06Q 30/018 |
| 2019/0327271 | A1 * | 10/2019 | Saxena | G06N 3/0455 |
| 2020/0143432 | A1 * | 5/2020 | Burghardt | G06F 3/04815 |
| 2020/0410583 | A1 * | 12/2020 | Hart | G06Q 20/405 |
| 2023/0013012 | A1 * | 1/2023 | Bond | G06Q 30/018 |
| 2023/0015603 | A1 * | 1/2023 | Smith | H04L 63/1425 |
| 2024/0241966 | A1 * | 7/2024 | Boone | G06F 21/6245 |

* cited by examiner

*Primary Examiner* — Blake I Narramore
(74) *Attorney, Agent, or Firm* — Foley & Lardner LLP

(57) ABSTRACT

Systems and methods for an interconnected regulatory compliance platform are provided. A method includes receiving assessments and tags for various regulations, assigning controls to the regulations, applying the controls and regulations to organizations, aggregating unique assessments for each organization, and providing an assessment drill down graphical user interface (GUI) to a client device.

18 Claims, 112 Drawing Sheets

FIG. 16
RiskStack
Create new password
Resend
Confirm
Cancel

FIG. 40
Safeguarding of Client Assets from Conversion or Inappropriate Use by Advisory Personnel
Cancel comparison

FIG. 47
Safeguarding of Client Assets from Conversion or Inappropriate Use by Advisory Personnel
Link Task

FIG. 48
Control name
Add reviewer

FIG. 66
Issue Management
Deposit Operations
Retail Nondeposit Investment Products
REGULATORY EXAM RATINGS
Satisfactory
Matter Requiring Attention
Matter Requiring Immediate Attention
Regulatory Exam Rating:
Matter Requiring Immediate Attention

FIG. 71
#106 Garnishments of Accounst Containing Federal Benefits Payments
Description
Actions
Action Status On Track
Add Action
Linked Reports, Events, Issues & Actions
Risk theme name
Risk theme name
Risk theme name
Risk theme name
Risk theme name
Master Data

FIG. 107
Leasing and Lendi
Regulation B
Not applicable
Low
Medium
High
Firstname Lastname
RULE
CONTROLS
TASKS
ISSUES
Firstname Lastname
Fair Lending Adverse Action Review
Checklist
Implemented
1.31.2020
Release of Borrower Obligation
Procedure
In Review
3.31.2020
Fair Lending
Risk Assessment
Approved
7.31.2020
Fair Lending Second Review
Procedure
Published
12.31.2020
Link control

FIG. 109
ENTERPRISE
CONSUMER BANKING
Demand Deposits
Checking
12
Savings
Debit Cards
8
Leasing and Lending
Auto Loans and Leases
Credit Cards
Home Loans
8
COMMERCIAL BANKING
INVESTMENT BANKING
INVESTMENT MANAGEMENT
WEALTH MANAGEMENT

FIG. 112
Safeguarding of Client Assets from Conversion or Inappropriate Use by Advisory Personnel
Link Task

SYSTEMS AND METHODS FOR INTERCONNECTED COMPLIANCE PLATFORM

CROSS-REFERENCE TO RELATED PATENT APPLICATION

This application claims the benefit of and priority to U.S. Provisional Patent Application No. 63/315,290, filed Mar. 1, 2022, which is incorporated herein by reference in its entirety.

TECHNICAL FIELD

The present disclosure relates to systems and methods for an interconnected regulatory compliance platform. Aspects of the present disclosure relate to maintaining an organizational structure, receiving assessments and tags for various regulations, assigning controls (e.g., policies, procedures and training) to the regulations, applying the controls and regulations to organizations, aggregating unique assessments for each organization, and providing an assessment drill down graphical user interface (GUI).

BACKGROUND

Managing regulatory compliance requires navigating complex and interrelated rules. But, compliance solutions are unable to identify how the regulatory rules relate to each other, or to a client's activities which prevents the compliance providers from generating accurate and individualized compliance plans to address various regulatory issues. Given the disparate technical platforms that maintain compliance rules and controls, interconnectivity of the platforms is a technical challenge that leads to incomplete compliance rules and controls platforms. Even if connectivity is provided, challenges remain with the integration of the data from the disparate technical platforms. Adversely, these challenges can lead to inadequate compliance rules and controls platforms for various entities.

SUMMARY

One embodiment relates to a compliance computing system. The compliance computing system includes one or more processing circuits comprising one or more memory devices coupled to one or more processors. The one or more memory devices configured to store instructions thereon that, when executed by the one or more processors, cause the one or more processors to acquire regulatory information available through one or more databases of one or more regulatory entities, acquire organization information regarding an organization associated with the compliance computing system, identify rules that are relevant to the organization by evaluating the regulatory information in view of the organization information, determine a regulatory risk assessment associated with each of the rules for the organization, generate a rules inventory graphical user interface for display on a user device of a user associated with the organization where the rules inventory graphical user interface provides a listing of the rules, and provide a visual indication on the rules inventory graphical user interface for each of the rules indicating the regulatory risk assessment associated with each of the rules for the organization. The organization information includes (a) location of operations for the organization and (b) a type of industry associated with the organization or a type of product or service offered by the organization;

Another embodiment relates to a method. The method includes acquiring, by a processing circuit, regulatory information available through one or more databases of one or more regulatory entities; acquiring, by the processing circuit, organization information regarding an organization associated with the compliance computing system, the organization information including (a) location of operations for the organization and (b) a type of industry associated with the organization or a type of product or service offered by the organization; identifying, by the processing circuit, rules that are relevant to the organization by evaluating the regulatory information in view of the organization information; determining, by the processing circuit, a regulatory risk assessment associated with each of the rules for the organization; generating, by the processing circuit, a rules inventory graphical user interface for display on a user device of a user associated with the organization, the rules inventory graphical user interface providing a listing of the rules; and providing, by the processing circuit, a visual indication on the rules inventory graphical user interface for each of the rules indicating the regulatory risk assessment associated with each of the rules for the organization.

Still another embodiment relates to a non-transitory computer-readable medium having computer-executable instructions included therein. The instructions, when executed by one or more processors, cause the one or more processors to perform operations comprising acquiring regulatory information available through one or more databases of one or more regulatory entities; acquiring organization information regarding an organization associated with the compliance computing system, the organization information including (a) location of operations for the organization and (b) a type of industry associated with the organization or a type of product or service offered by the organization; identifying rules that are relevant to the organization by evaluating the regulatory information in view of the organization information; determining a regulatory risk assessment associated with each of the rules for the organization; generating a rules inventory graphical user interface for display on a user device of a user associated with the organization, the rules inventory graphical user interface providing a listing of the rules; and providing a visual indication on the rules inventory graphical user interface for each of the rules indicating the regulatory risk assessment associated with each of the rules for the organization.

DETAILED DESCRIPTION

Figure 1:
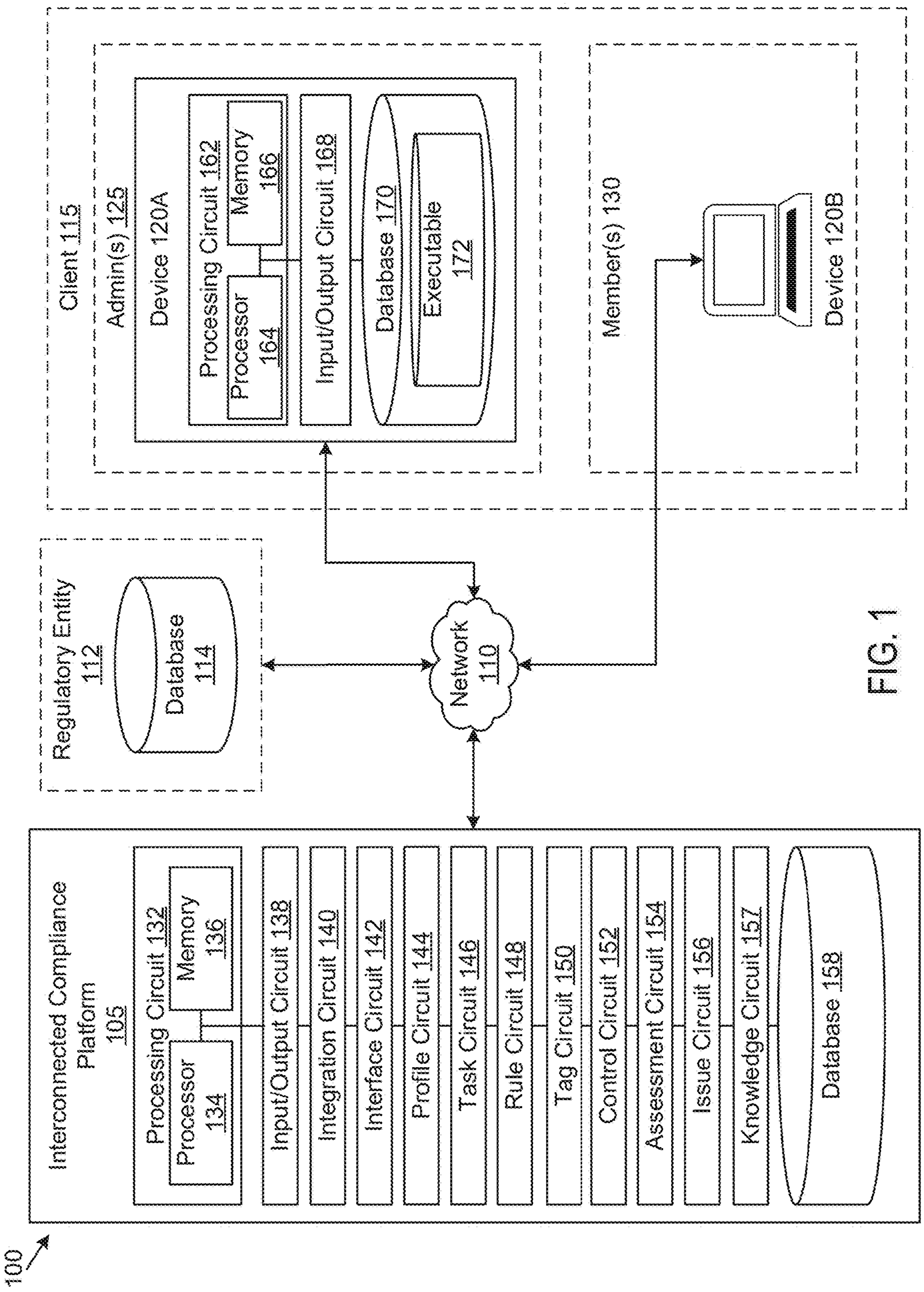
FIG. 1 is a component diagram of a system of a regulatory compliance platform, according to an example implementation.

The present disclosure relates to a computing system and methods of operating the computing system to identify, classify, display, search, and update associations among rules, regulations, controls, issues, risk assessments, tasks, and risk reports for display in a compliance platform provided by the computing system. The compliance platform can be navigated and customized based on inputs from a client. In operation, many compliance rules are logically interconnected and must be individualized. However, complying with an increasing number regulations while maintaining operational transparency is difficult. For example, client with a location A must generate filing B and C but if the client also has a location D then the filing C must be replaced with filing E. As such, the compliance platform can benefit organizations by consolidating and harmonizing their compliance efforts such that the organizations can efficiently comply with various requirements or standards, such as laws, regulations, and regulatory and industry association guidance.

The compliance platform can maintain an organizational structure, receive assessments and tags for regulations, assign controls to the regulations, apply the controlled regulations to organizations, aggregate unique assessments for each entity, and provide an assessment drill down GUI. The present disclosure addresses computational issues associated with data aggregation, such as generating the relevant regulatory logic for each customer and presenting the results in the compliance platform. For example, compliance rules and controls associated with regulatory compliance can be located in disparate regulatory entities that are complex and difficult to navigate. Moreover, it is computationally difficult to identify how the regulatory rules relate to each other without requesting the analysis of a subject matter expert. The compliance platform provided by the computing system can advantageously integrate the data from the regulatory entities. For example, the compliance platform can scrape rules from the regulatory entities and maintain the rules in an inventory. The compliance platform can generate accurate and individualized compliance plans to address various regulatory issues. The compliance platform can maintain an organizational structure of the entity. For example, the compliance platform can maintain a knowledge base. The compliance platform can receive assessments and tags for regulations. The compliance platform can assign controls to the regulations. For example, the compliance platform can maintain the controls in a library. The compliance platform can apply the controlled regulations to organizations. The compliance platform can aggregate unique assessments for each organization. The compliance platform can provide an assessment drill down GUI.

As also described herein, the present disclosure can improve upon the classification of and display of compliance related rules and tasks to improve customer experiences. For example, a large financial institution, a small community bank, fin-techs, and/or other entities can use the compliance platform described herein to manage their regulatory compliance. Beneficially, the compliance platform is not limited to financial services. For example, the compliance platform can be used by clients in the transportation industry, such as car manufacturers managing their compliance with safety standards. In another example, an airplane manufacturer can use the compliance platform to manage their compliance with aviation standards. Accordingly, the compliance platform transforms rules, regulations, controls, issues, risk assessments, tasks, and risk reports into improved GUIs for efficient computer processing and improved client experiences.

Before turning to the figures, which illustrate certain example implementations in detail, it should be understood that the present disclosure is not limited to the details or methodology set forth in the description or illustrated in the figures. It should also be understood that the terminology used herein is for the purpose of description only and should not be regarded as limiting.

FIG. 1 is a block diagram showing a computing system 100 configured to provide an integrated compliance platform, according to an example implementation. The system 100 can include the compliance platform 105 communicatively coupled, via a network 110, to a database 114 of a regulatory entity 112 and the devices 120 of a client 115. In some implementations, the system 100 includes more or fewer components than are shown in FIG. 1. In some implementations, the compliance platform 105 can be part of a larger computing system such as a multi-purpose server or other multi-purpose computing system. In some implementations, the compliance platform 105 can be implemented on a third-party computing device operated by a third-party service provider (e.g., AWS, Azure, GCP, and/or other third party computing services).

In some implementations, the network 110 is configured to communicatively couple to additional computing system(s). For example, the network 110 can facilitate communication of data, information, or messages between the compliance platform 105 and other computing systems associated with a customer of the provider, such as a user device (e.g., a mobile device, smartphone, desktop computer, laptop computer, tablet, or any other computing system). The network 110 can include one or more of a cellular network, the Internet, Wi-Fi, WI-Max, a proprietary provider network, a proprietary retail or service provider network, and/or any other kind of wireless and/or wired network.

The regulatory entity 112 can maintain compliance rules. The regulatory entity 112 can be a regulator, government entity, or professional organization. For example, the regulatory entity 112 can be an entity responsible for generally accepted accounting principles, American Bar Association, state governments, educational institutions, or international organizations (e.g., EU). The regulatory entity 112 can include database 114. The regulatory entity 112 can store or maintain the rules in the database 114. For example, the database 114 can be a server, data storage device, etc. In some implementations, the database 114 is configured to communicate with the compliance platform 105. For example, the database 114 can be configured to provide rules or updates thereof to the compliance platform 105 via the network 110, and the compliance platform 105 is configured to receive the rules and updates thereof via the network 110. In some implementations, the database 114 is not configured to communicate with the compliance platform 105. For example, the compliance platform 105 can access, retrieve, or scrape the rules and updates thereof from the regulatory entity 112 as further described with respect to the integration circuit 140.

The device 120 is a computing device associated with, managed by, controlled by, used by, and/or owned by a client 115. The client 115 (also referred to as customer) can use the compliance related services and tools provided by the compliance platform 105 to manage compliance and assessments. The computing device 120 can be a computing system for use by the client 115. The computing device 120 can include a mobile device (e.g., smartphone, tablet, and so on), a laptop computer, a desktop computer, and the like. The device 120A can be of the administrator 125 of the client 115. The administrator 125 can be a user that manages the compliance platform 105 for the client 115. For example, the administrator 125 can select controls and generate assessments for the client. The device 120B can belong to the member 130 of the client 115. For example, the member 130 can be an employee of the client 115. The member 130 can be the assigned tasks by the administrator 125. For example, the member 130 can be responsible for certain assessments or controls.

The compliance platform 105, also referred to as a compliance computing system, is a computing system associated with, owned by, managed by, controlled by, and/or used by a provider institution or entity. The provider institution or entity can be a provider of compliance related tools. For example, the provider institution or entity can establish communications with regulatory entity 112 such as regulators or governments. The provider institution can be associated with subject matter experts that refine and train the compliance platform 105 to provide compliance related tools. For example, the subject matter experts can generate machine learning models that scrape compliance information from regulatory entity 112. In another example, the subject matter experts can train artificial intelligence models that identify events and notify the client 115.

The compliance platform 105 is shown to include a processing circuit 132. The processing circuit 132 is shown to include a processor 134 and a memory 136. The memory 136 can be one or more devices (e.g., RAM, ROM, Flash memory, hard disk storage) for storing data and/or computer code for completing and/or facilitating the various processes described herein. The memory 136 can be or include non-transient volatile memory, non-volatile memory, and non-transitory computer storage media. The memory 136 can include database components, object code components, script components, or any other type of information structure for supporting the various activities and information structures described herein. The memory 136 can be communicatively coupled to the processor 134 and include computer code or instructions for executing one or more processes described herein. The processor 134 can be implemented as one or more application specific integrated circuits (ASICs), field programmable gate arrays (FPGAs), a group of processing components, or other suitable electronic processing components. In operation, the computing system 105 is configured to host/store and run/execute a variety of application programs and store associated data in a database of the memory 136 (e.g., database 158).

The compliance platform 105 can include an input/output (I/O) circuit 138, an integration circuit 140, an interface circuit 142, a profile circuit 144, a task circuit 146, a rule circuit 148, a tag circuit 150, a control circuit 152, assessment circuit 154, issue circuit 156, a knowledge circuit 157, and a database 158. The processing circuit 132 can be coupled to the aforementioned circuits.

The input/output (I/O) circuit 138 is structured to receive communications from and provide communications to other computing devices, users, and the like associated with the compliance platform 105. The input/output circuit 138 is structured to exchange data, communications, instructions, and the like with an input, output, and/or input/output device of the computing system 105. For example, the I/O circuit can include terminals such as laptops, desktop computers, mobile devices, tablet devices, or any data entry device. In some implementations, the input/output circuit 138 includes communication circuitry for facilitating the exchange of data, values, messages, and the like between the devices 120 and the components of the compliance platform 105. In some implementations, the input/output circuit 138 includes machine-readable media for facilitating the exchange of information between the input/output circuit 138 and the components of the compliance platform 105. In some implementations, the input/output circuit 138 includes any combination of hardware components, communication circuitry, and machine-readable media.

In some implementations, the I/O circuit 138 can include a network interface. The network interface can be used to establish connections with other computing devices by way of the network 110. The network interface can include program logic that facilitates connection of the I/O circuit 138 of the compliance platform 105 to the network 110. In some implementations, the network interface can include any combination of a wireless network transceiver (e.g., a cellular modem, a Bluetooth transceiver, a Wi-Fi transceiver) and/or a wired network transceiver (e.g., an Ethernet transceiver). For example, the I/O circuit 138 can include an Ethernet device such as an Ethernet card and machine-readable media such as an Ethernet driver configured to facilitate connections with the network 110. In some implementations, the network interface includes the hardware and machine-readable media sufficient to support communication over multiple channels of data communication. Further, in some implementations, the network interface includes cryptography capabilities to establish a secure or relatively secure communication session in which data communicated over the session is encrypted.

In some implementations, the I/O circuit 138 includes suitable input/output ports and/or uses an interconnect bus for interconnection with a local display (e.g., a liquid crystal display, a touchscreen display) and/or keyboard/mouse devices (when applicable), or the like, serving as a local user interface for programming and/or data entry, retrieval, or other user interaction purposes. As such, the input/output circuit 138 can enable the user to interact with various applications and/or executables stored on the compliance platform 105. For example, the input/output circuit 138 can include a keyboard, a keypad, a mouse, joystick, a touch screen, a microphone, a biometric device, a virtual reality headset, smart glasses, and the like. As another example, input/output circuit 138, can include, but is not limited to, a television monitor, a computer monitor, a printer, a facsimile, a speaker, and so on.

The integration circuit 140 of the compliance platform 105 can maintain, parse, integrate, or manage compliance related rules from the regulatory entity 112. The integration circuit 140 can ingest policies and procedures from across a multitude of regulatory entity 112 (e.g., sites and areas and locations regions. The integration circuit 140 can receive rules from the databases 114 of the regulatory entities 112.

The integration circuit 140 can parse and analyze the rules from the regulatory entities 112. For example, the integration circuit 140 can apply optical character recognition (OCR) algorithms to the rules. The integration circuit 140 can identify how the rules relate to each other and to electronic or business activity of the client 115. For example, the integration circuit 140 can include machine learning processes/models (e.g., artificial intelligence models) that classify the rules to identify the client 115 to which the rules apply. The integration circuit 140 can curate and group related laws and regulations. For example, the integration circuit 140 can group anti-money laundering laws and regulations. As an example, the integration circuit 140 may use keyword search to identify commonly used terms (e.g., "anti-money laundering laws") and subsequently group or cluster all "hits" that use these commonly used terms into the library.

The integration circuit 140 can retrieve or extract rules from the regulatory entity 112. For example, the integration circuit 140 can include a web scraper for web scraping laws, regulations, and industry association guidance (e.g., via a web-scraping tool employed on the Internet that combs through various random and/or predefined websites). In some implementations, the integration circuit 140 can instantiate the web scraper upon identifying groupings of laws (e.g., money laundering laws). The integration circuit 140 can scrape rules from regulatory entity 112 such as regulators, governments, law enforcement agency websites, and industry websites. For example, the integration circuit 140 may be preprogrammed with websites of interest and then, periodically (e.g., weekly, monthly, etc.), the circuit 140 via the scraper keyword-searches the websites-of-interest for updates. If an update is found, the text is analyzed via OCR and then integrated into the database 158 for subsequent retrieval. As another example, the integration circuit 140 can receive text files of the rules. The integration circuit 140 can retrieve the rules at predetermined intervals (e.g., monthly or annually). The integration circuit 140 can retrieve the rules responsive to a request from the client 115 (e.g., received via the GUIs). The integration circuit 140 can advantageously scale the efficient collection of rules and regulations without relying on costly manual review.

The integration circuit 140 can include machine-learning models (e.g., neural networks, multi-classification models, etc.) to index the rules and regulations and their format. As the integration circuit 140 identifies the rules, the compliance platform 105 can utilize algorithms, models, and/or machine learning models to assign or attach specific keywords to the rules. For example, for money laundering, the compliance platform 105 can assign keywords such as "client identification program" or "client identification verification" to rules within the anti-money laundering grouping. As described in further detail below, these keywords can be known as tags, which the compliance platform 105 can assign to rules to bind or associate these curated groups of rules to various controls. As also described in further detail below, the compliance platform 105 can assign the tags to rules to bind or associate the rules to controls (e.g., policies, procedures, trainings, etc.) to perform a risk assessment to issues/reports/actions for risk reporting. The compliance platform 105 can utilize these associations for the tasks and knowledge base described below.

Figure 3:
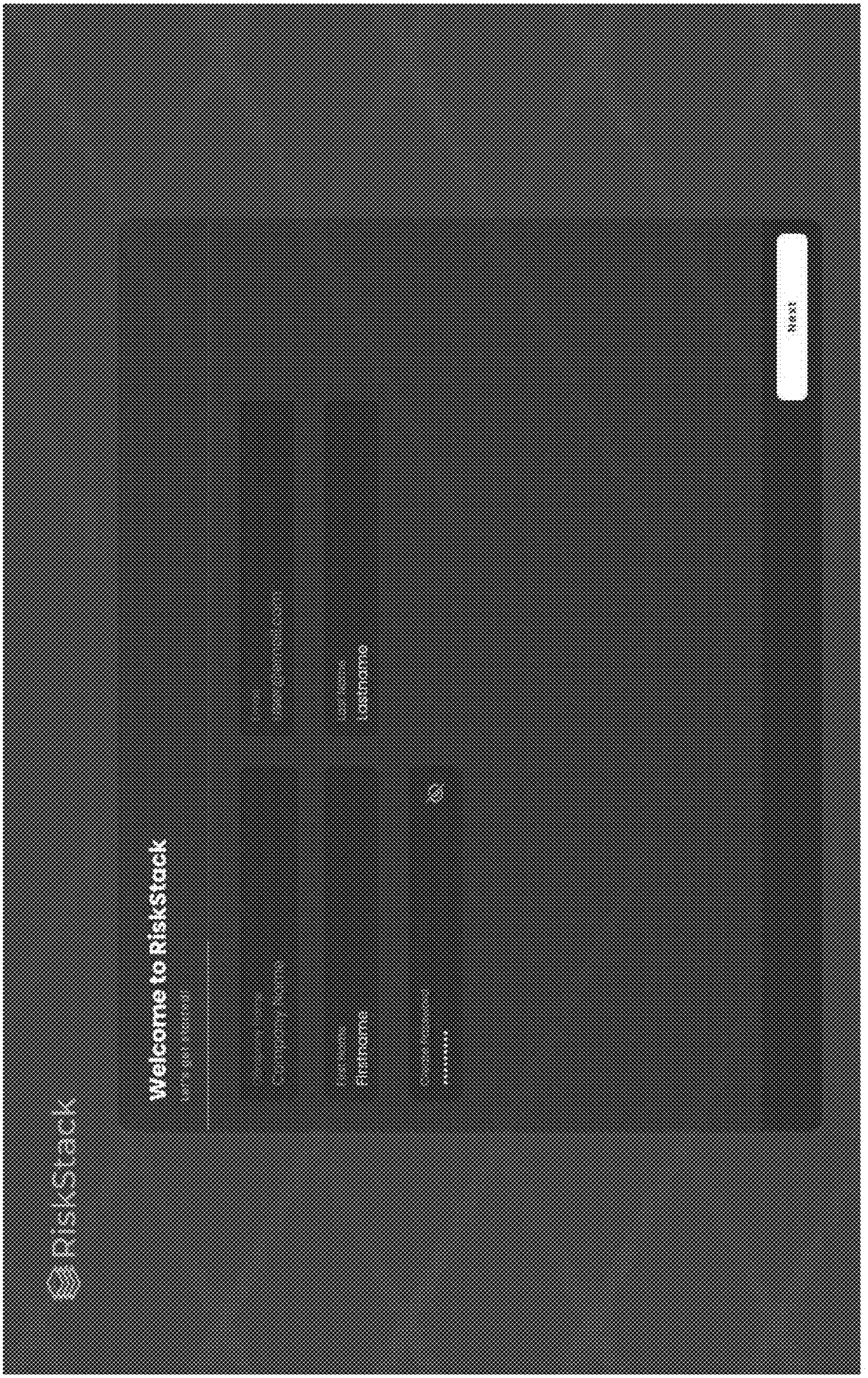
FIGS. 3-13 are GUIs for onboarding a client, according to an example implementation.
Figure 4:
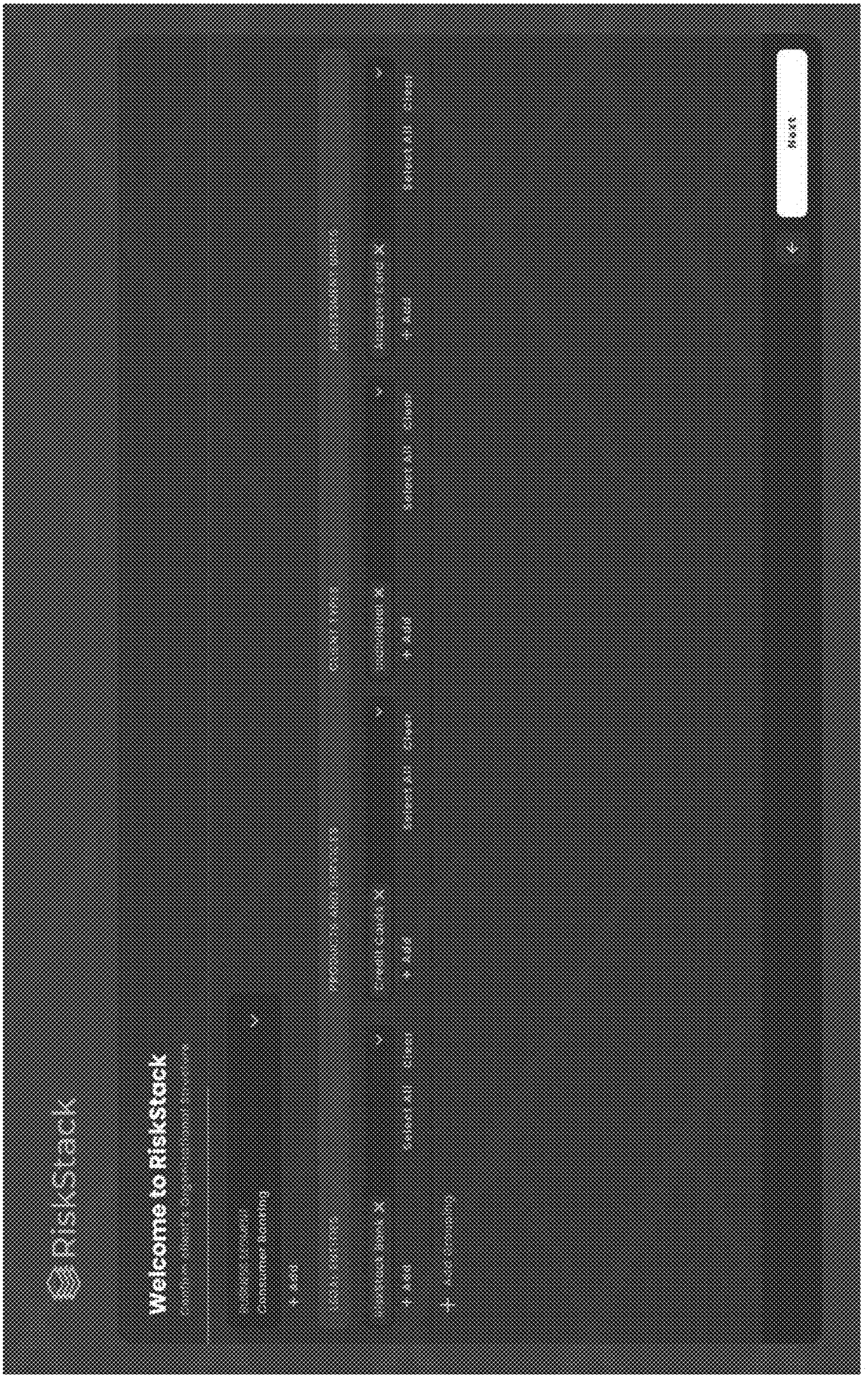
Figure 5:
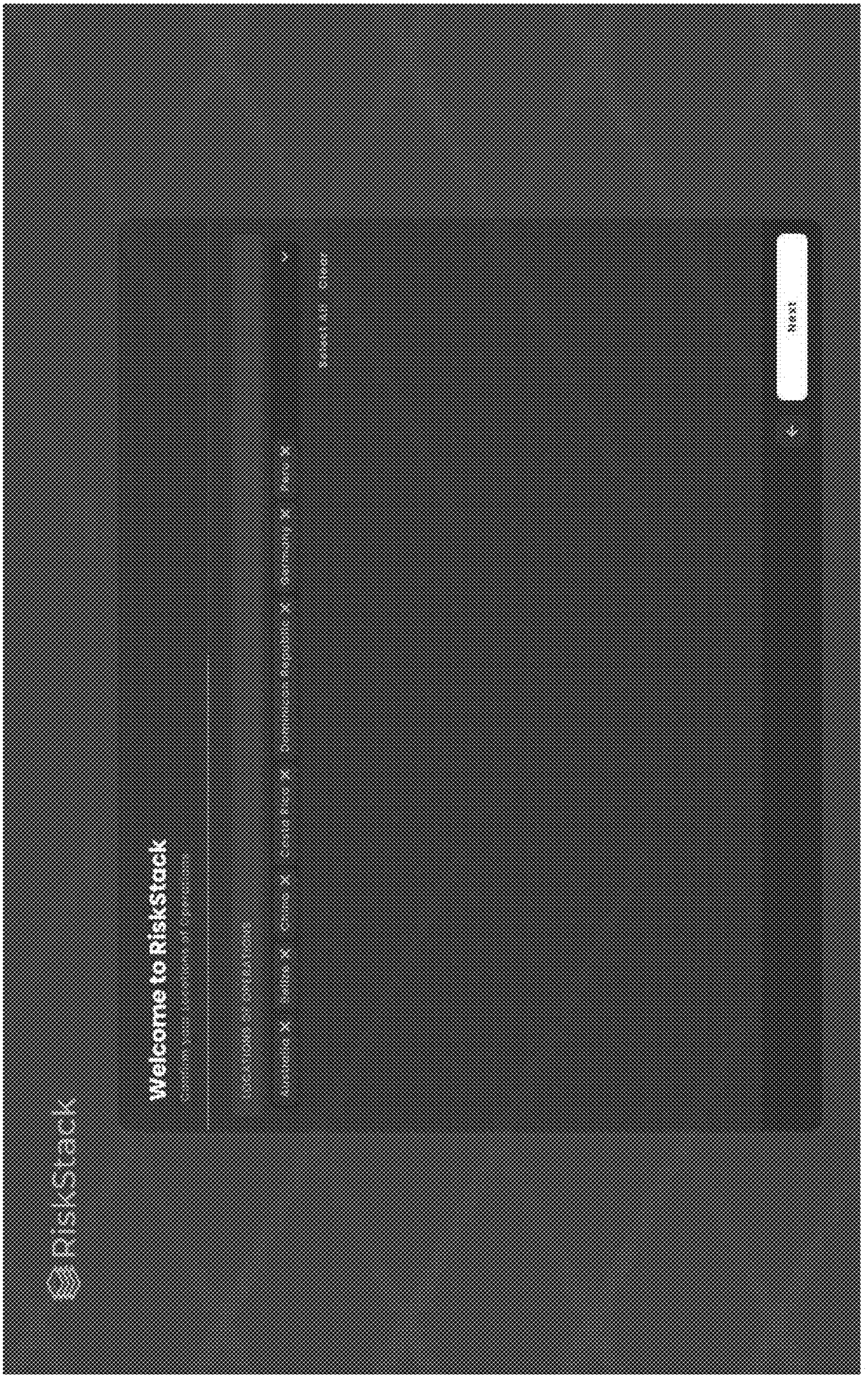
Figure 6:
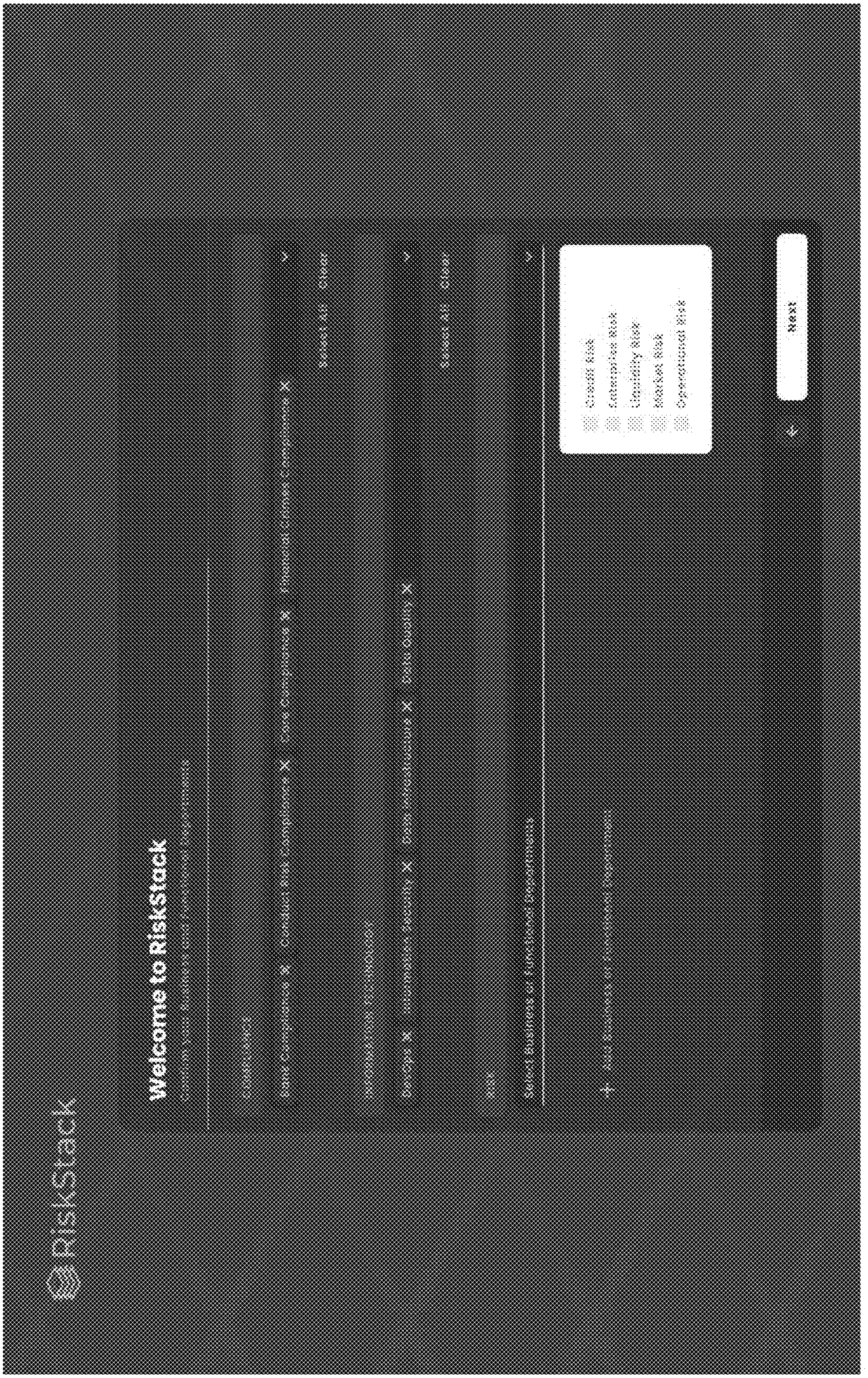
Figure 7:
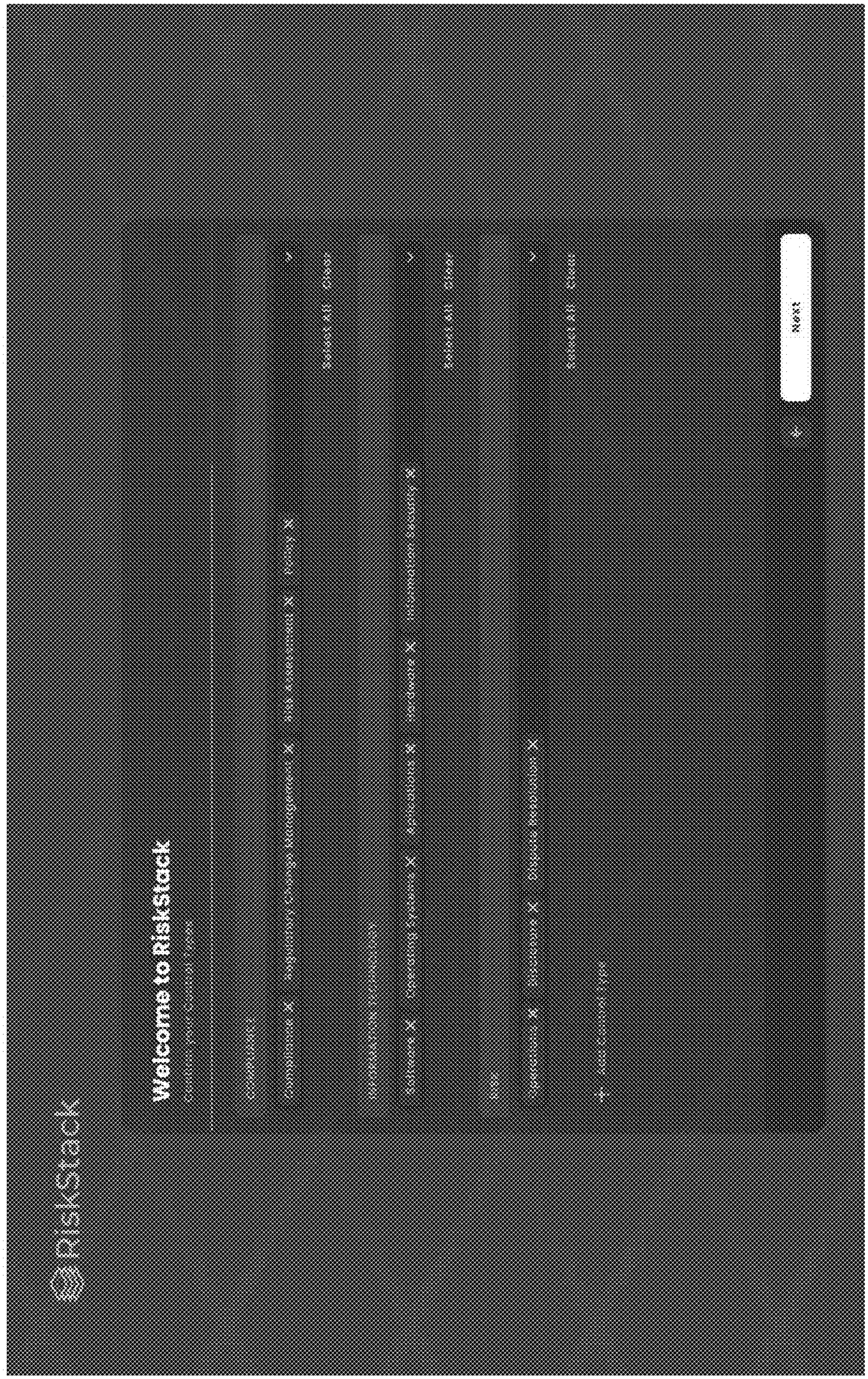
Figure 8:
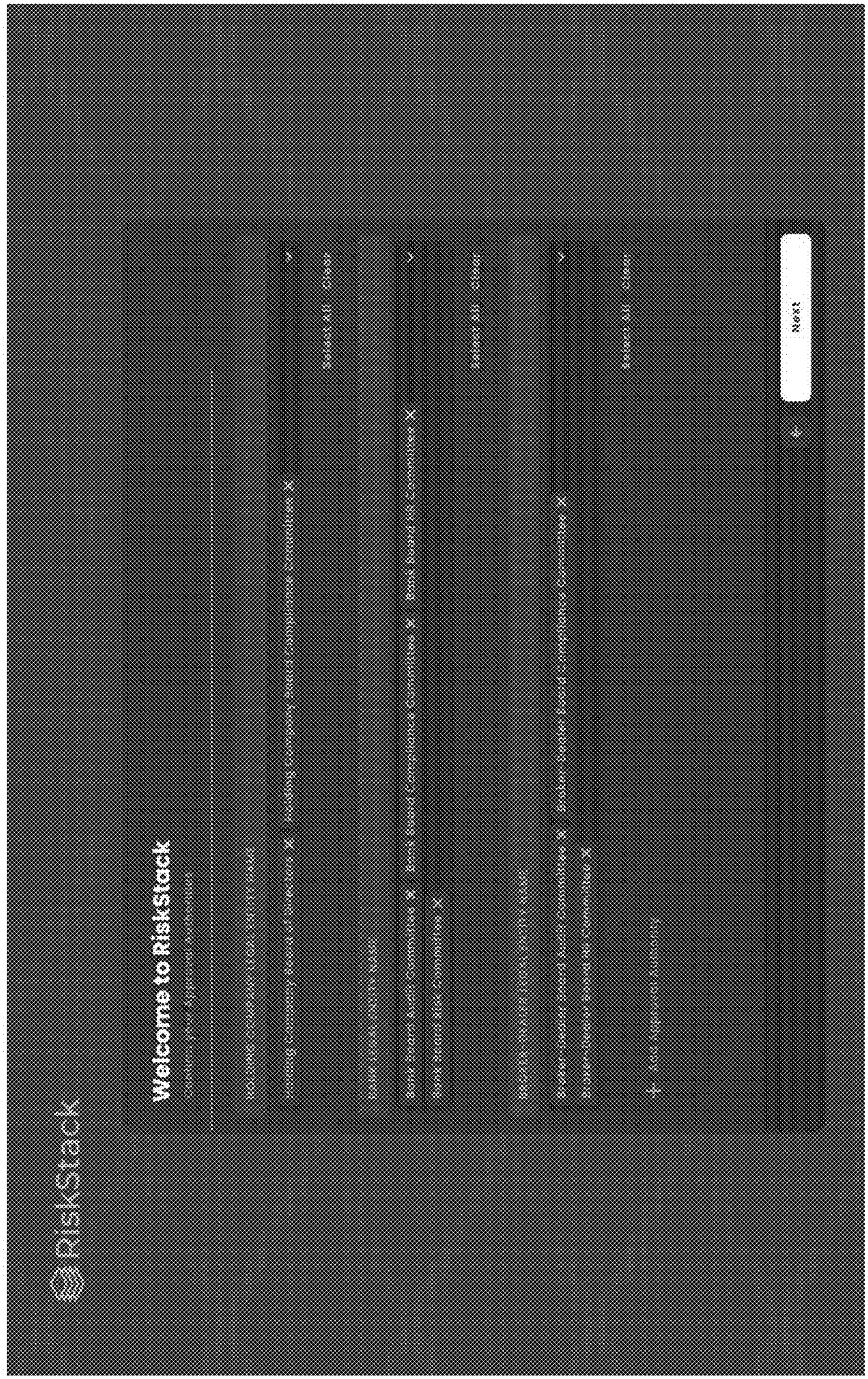
Figure 9:
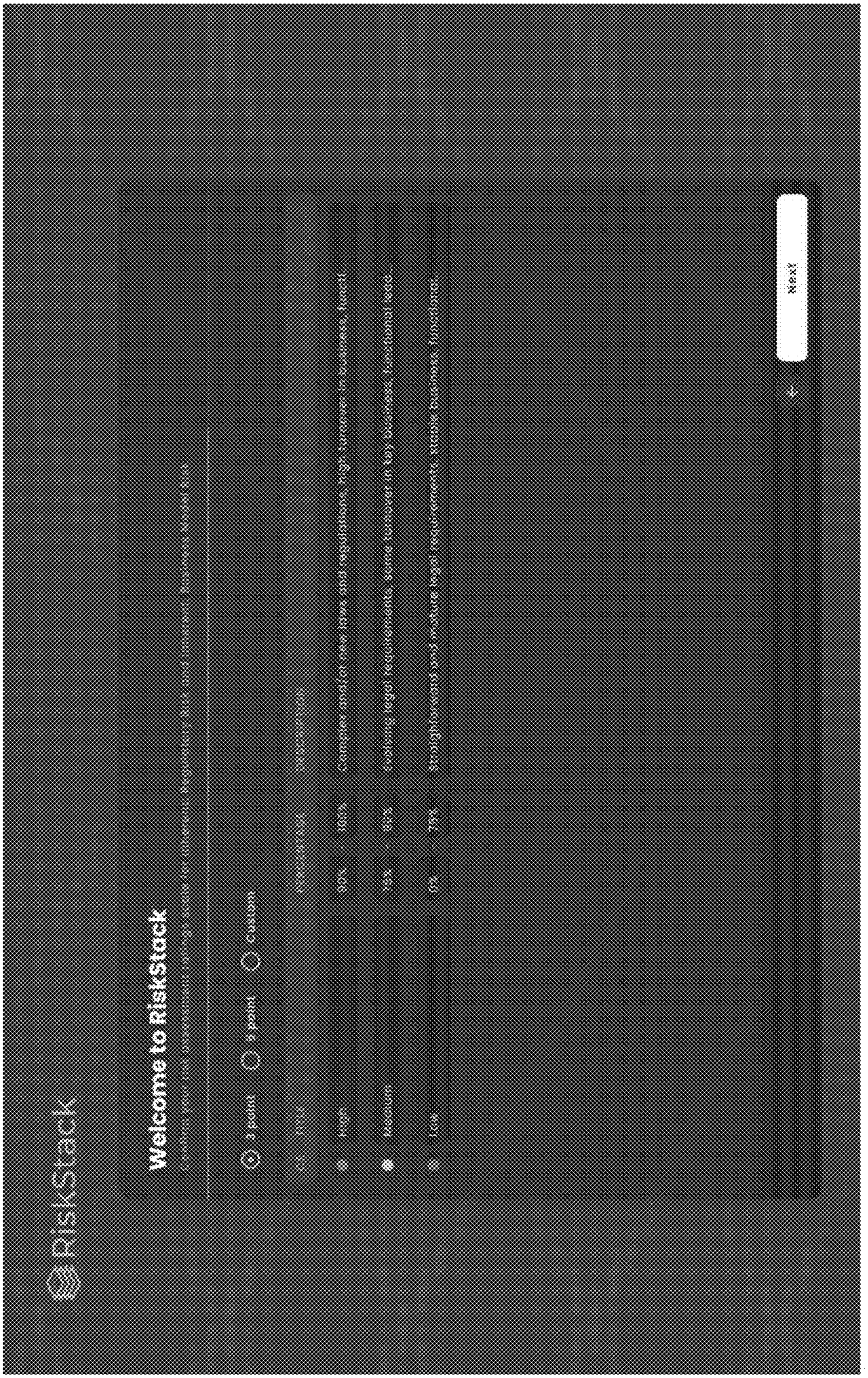
Figure 10:
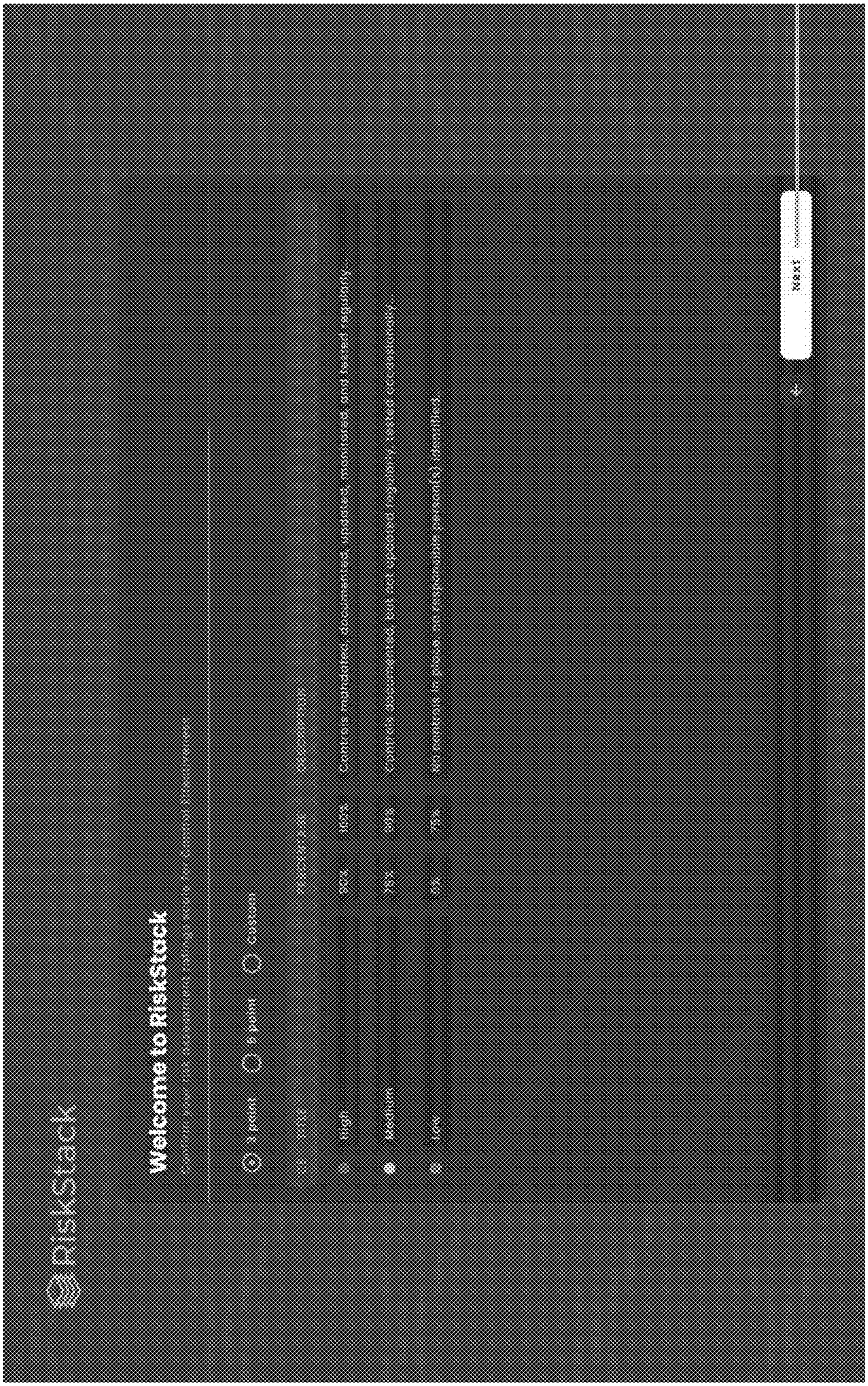
Figure 11:
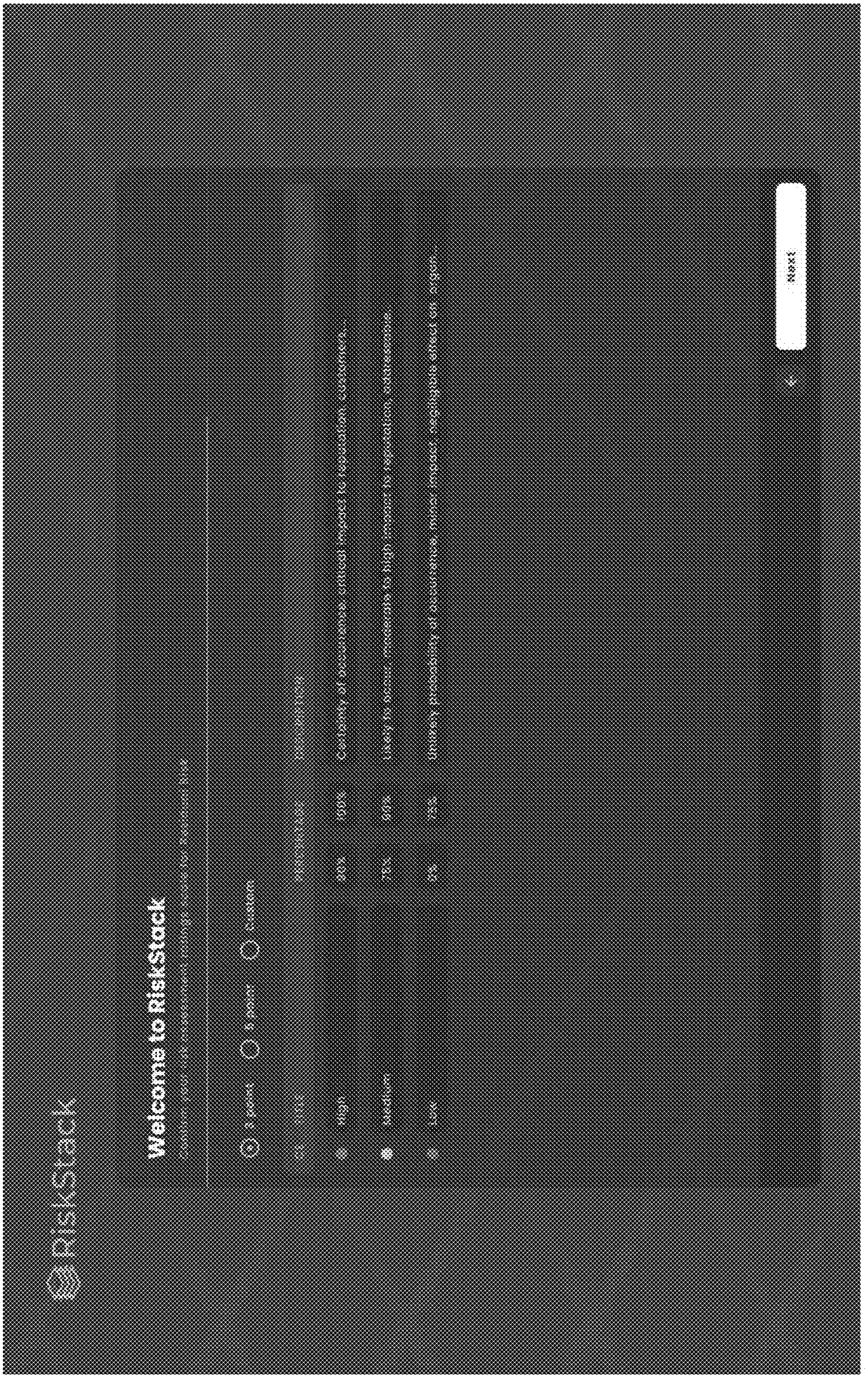
Figure 12:
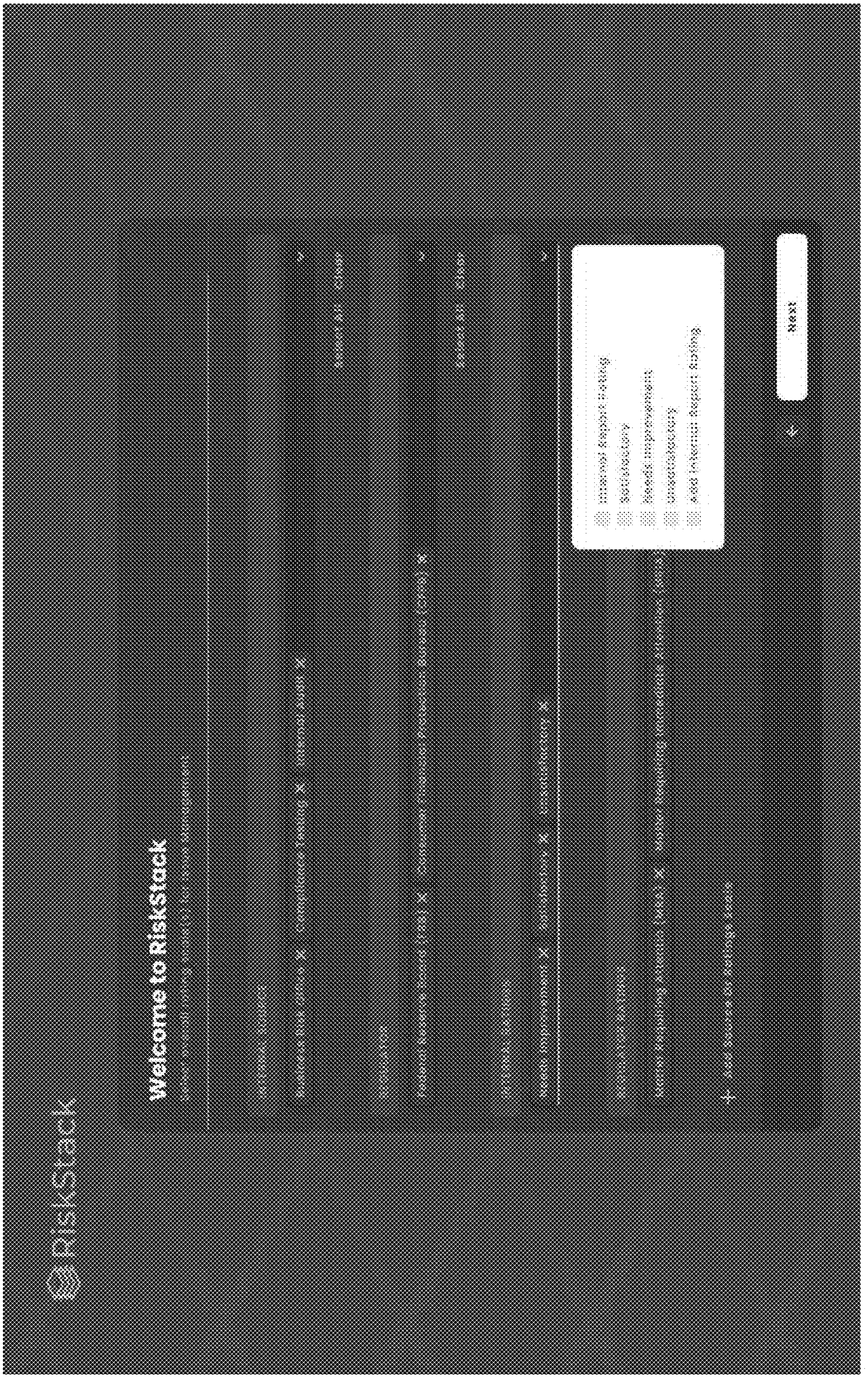
Figure 112:
FIG. 112 is an example GUI for linking tasks in the compliance platform, according to an example implementation.

The interface circuit 142 of the compliance platform 105 can maintain, generate, provide, and cause display of various GUIs (such as those described with respect to FIGS. 3-112). The interface circuit 142 can display interactive GUIs with compliance related information and receive inputs from the client 115 to enable the client 115 to interact with and receive compliance related services from the compliance platform 105. The interface circuit 142 can display the scraped rules from the regulatory entities 112. The interface circuit 142 can display the rules and inventory. The interface circuit 142 can receive modifications of the rules and inventory from the client 115. The interface circuit 142 can display the compliance plans and regulatory issues. The interface circuit 142 can receive the compliance plans and regulatory issues from the client 115. The interface circuit 142 can display the organizational structure of the client 115. The interface circuit 142 can display a knowledge base. The interface circuit 142 can display the assessments and tags for regulations. The interface circuit 142 can receive, from the client 115 via the devices 120, assessments and tags from the client 115. The interface circuit 142 can display controls assigned to the regulations. The interface circuit 142 can receive, from the client 115 via the devices 120, assignments of controls to the regulations. The interface circuit 142 can display a library of controls. The interface circuit 142 can display the controlled regulations of the client 115. The interface circuit 142 can display aggregate unique assessments for each organization. The interface circuit 142 can display the assessment drill down.

The profile circuit 144 of the compliance platform 105 can maintain, generate, store, or manage profiles of the client 115. The profile circuit 144 can manage profiles of clients 115. The profile circuit 144 can receive information from each client 115 during an onboarding stage. The profile circuit 144 can establish an organization hierarchy of the client 115. For example, the profile circuit 144 can maintain the organizational hierarchy for a client 115 that is a holding company of consumer banking, commercial banking, investment banking, or investment management.

The profile circuit 144 can receive onboarding information from the client 115. Onboarding refers to the process of enrolling the client 115 with the compliance platform 105 to receive compliance related services from the compliance platform 105. For example, the profile circuit 144 can generate an invite for the client 115. The profile circuit 144 can generate or maintain the onboarding information for the client 115. The profile circuit 144 can generate sign-up information (e.g., request for legal name) from the client 115 to sign-up to use the compliance platform 105 for managing policies and procedures.

The profile circuit 144 can receive sign-up information from the client 115. The sign-up information can include organization information about the client 115, such as their industry and relevant regulations. The profile circuit 144 can receive selections from the client 115. For example, the profile circuit 144 can receive the organizational structure of the client 115, such as their office locations and practice groups. The profile circuit 144 can generate a profile or any other data record for the client 115. The profile circuit 144 can generate the profile based on the received information (e.g., organization structure) about the client 115. Based on the information of the client 115, the profile circuit 144 can identify the jurisdiction of the client 115 and group their information. For example, the profile circuit 144 can identify the US legal entities of the client 115 subject to US rules, and the EU legal entities subject to EU rules.

The profile circuit 144 can receive or identify selections associated with onboarding the client 115. For example, the profile circuit 144 can receive data from the device 120A of the administrator 125 of the client 115. The profile circuit 144 can receive selections of specifications and identifications of rules to manage. For example, the profile circuit 144 can receive selections of legal entity, bank, brokers, dealers, or insurance companies. The profile circuit 144 can receive the selections at an enterprise level to generate the organizational hierarchy. For example, the profile circuit 144 can request selections of legal entity types and names. The profile circuit 144 can receive the segments or business units of the client 115. For example, the profile circuit 144 can identify that the client 115 has business units such as personal consumer banking, commercial banking, investment banking, or wealth management. The profile circuit 144 can identify or store, for each client 115, products and services client types (e.g., industry or location) associated with the client 115.

The profile circuit 144 can manage access to the compliance platform 105 by the client 115. For example, the profile circuit 144 can store a login and password for the client 115, such as the administrator 125 and members 130 thereof. The profile circuit 144 can receive an access request from the devices 120 for the client 115 to access the compliance platform 105. The profile circuit 144 can receive authentication information via one or more APIs from the devices 120. For example, the authentication information can be a login and password. The profile circuit 144 can validate the authentication. For example, the profile circuit 144 can compare the login and password of the administrator 125 or the members 130 to a stored login and password. Responsive to authenticating the administrator 125 or the members 130, the profile circuit 144 can enable access to the administrator 125 (e.g., chief counsel) or the members 130 (e.g., employees) of the client 115.

The profile circuit 144 can receive selections from the device 120A of the administrator 125 to invite an additional administrator 125 or members 130. For example, the chief privacy officer of the company reports into the general counsel, who has a chief of staff. The profile circuit 144 can receive a request from the device 120A of the administrator 125 to provide the chief of staff with access rights to be the administrator 125. The profile circuit 144 can set a flag in the profile of the chief of staff that the chief of staff is the administrator 125 of the client 115. The profile circuit 144 can receive or store selections of the administrator 125 that control or define access and privileges. The profile circuit 144 advantageously enables the client 115 to manage the roles of various users in its organization.

The profile circuit 144 can generate GUIs of profiles. The profile circuit 144 can generate can enable browsing of the organization hierarchy of the client 115 via the GUI(s). For example, the profile circuit 144 can generate can display an organization hierarchy for an enterprise is a holding company of consumer banking, commercial banking, investment banking, or investment management. The profile circuit 144 can enable browsing of the hierarchy.

The profile circuit 144 can enable browsing of the within the organization hierarchy. For example, the profile circuit 144 can receive selections via a selectable element(s) (e.g., icon, etc.) of the GUI(s) of consumer banking. The profile circuit 144 can receive or maintain details about consumer banking such as demand deposits, leasing, and lending. The profile circuit 144 can identify and display via a GUI associated products such as checking, savings debit cards, auto loans, credit cards, and home loans.

The profile circuit 144 can receive selections via a selectable element(s) (e.g., icon, etc.) of the GUI(s) to filter the organizational hierarchy. For example, the profile circuit 144 can receive a selection to display laws and regulations that apply in the United States for leasing and lending. Responsive to the selection, the profile circuit 144 can identify the rules and their respective assessments. By identifying the assessments, the profile circuit 144 can enable the display of real time assessments.

The profile circuit 144 can maintain metadata, master data, or hierarchical associations. For example, the profile circuit 144 can maintain or generate a policy for the client 115 or for a subsidiary of the client 115. In another example, the profile circuit 144 can identify or maintain leasing and lending policies for a client 115. The profile circuit 144 can identify that the client 115 prefers extensions of credit. The profile circuit 144 can receive hierarchical data for the client 115 via the devices 120. For example, the profile circuit 144 can maintain and use the hierarchical data to generate or maintain organization structure for the parent-child relationship between a parent holding company and their legal entities or subsidiaries or business divisions.

The profile circuit 144 can advantageously enable the ability to customize the display of hierarchical associations. The profile circuit 144 can identify compliance and legal associations in an integrated interface. The profile circuit 144 can identify tags to interrelate and dynamically update the associations over time. The profile circuit 144 enables the client 115 to display their regulations in a user-friendly interface that simplifies the complexity associated with compliance.

The task circuit 146 of the compliance platform 105 can maintain, generate, or assign compliance related tasks. The task circuit 146 can be a workflow tool for the administrator 125 to assign tasks and for the members 130 to be assigned tasks to complete (issue reviews, approvals, assign ownership of tasks, and so on). "Tasks" refer to actions to be taken by the administrator 125 and/or the members 130 for compliance that are associated with controls regarding the regulation or rule. The task circuit 146 can receive, from the members 130 via the devices 120, a selection of the task. Example selectable tasks include comment, consult, send to board, edit, review, assess impact, risk rate, create, review, approve, or revise. The task circuit 146 advantageously links controls to reports, events, tasks, and rules in a comprehensive and holistic way.

The task circuit 146 can generate the tasks. For example, the task circuit 146 can generate or identify tasks assigned to members 130. The task circuit 146 can receive the assignments from the administrator 125 via the devices 120. For example, the task circuit 146 can generate or receive tasks relating to audit compliance testing such as FINRA exams. The task circuit 146 can generate tasks based on the locations and organization structure of the client 115. For example, the task circuit 146 can generate tasks based on US rules for the US offices of the client 115, and tasks based on the EU rules for the EU offices of the client 115.

The task circuit 146 can generate notifications for members 130 to indicate that they have been assigned to a task. The task circuit 146 can generate notifications about new rules or regulations. The task circuit 146 can transmit the notifications via the networks 110 to the devices 120 of the members 130. The devices of the members may have an identifier (e.g., IP address, device serial number, etc.). This information may be stored in the database 158 and, subsequently, used and referenced to send notifications.

The task circuit 146 can advantageously integrate internal audits, controls, compliance testing, or regulatory exams into tasks represented by data records. The task circuit 146 can automatically generate tasks based on the information (e.g., industry) of the client 115 and the received tasks and assignments thereof. For example, the task circuit 146 can generate tasks relating to manufacturing regulations for the client 115 in the manufacturing industry. The task circuit 146 can utilize machine learning to learn over time to predict the tasks. The task circuit 146 advantageously reduces the need for manual entry of tasks by the client 115.

The task circuit 146 can generate and transmit messages or notifications about the tasks to the devices 120 of the members 130. The task circuit 146 can monitor the progress of the assigned task. The task circuit 146 can receive a confirmation from the devices 120 of the members 130 when the tasks are complete. By assigning the tasks and monitoring their progress to completion, the task circuit 146 advantageously reduces utilization of computing resources by sending notifications to relevant members 130 and confirming that those members 130 complete their tasks instead of notifying all the members 130, failing to notify the members 130, or failing to identify completion of the task. The task circuit 146 advantageously provides an all-in-one dashboard for task management such that the task circuit 146 can assign tasks and monitor their progress to completion regardless of the status of devices 120 (e.g., the devices 120 can be in standby mode or asleep) to reduce the utilization of the computing resources of the devices 120 (e.g., fewer fetch requests).

The rule circuit 148 of the compliance platform 105 can generate, maintain, store, and/or otherwise manage compliance related rules. The rule circuit 148 can maintain rules, regulations, pertinent industry guidance, etc. The rules can be laws, regulations, regulatory guidance, or industry best practices for the client 115. The rule circuit 148 can identify or maintain rules curated by jurisdiction, organization, or product (e.g., credit cards). For example, the rules can be associated with financial regulations such as anti-money laundering (AML). The rule circuit 148 can identify the rules for specific jurisdictions, such as AML rules in the US. The rule circuit 148 can identify the rules for organizations associated with the client 115. For example, the rule circuit 148 can identify that rules for the client 115 associated with professional organizations (e.g., generally accepted accounting principles, or American Bar Association), state governments, educational institutions, or international organizations (e.g., EU). The rule circuit 148 can identify the rules for products associated with the client 115. For example, the rule circuit 148 can identify the rules for the client 115 in the e-commerce industry by identifying data protection regulations in the European Union along with any country specific rules.

The rule circuit 148 can generate a controls summary list displayed via one or more GUIs. The rule circuit 148 can generate or maintain controls, policies, or procedures for the client 115. For example, the rule circuit 148 can generate a controls summary list of controls for a wealth management entity. The rule circuit 148 can generate additional details or a drill down associated with the summary list. For example, the rule circuit 148 can generate or retrieve federal rules associated with controls.

The rule circuit 148 can generate a summary GUI to the client 115. The rule circuit 148 can generate a summary GUI that includes high-level compliance information for the client 115. For example, the client 115 can generate a compliance offering for leasing and lending. The rule circuit 148 can generate or maintain the organizational structure of the client 115. The rule circuit 148 can advantageously integrate a client's organizational structure to generate relevant compliance information for the client 115 for their hierarchical organizations, teams, groups, and departments.

The rule circuit 148 can generate or maintain a rules inventory. For example, the rule circuit 148 can maintain rules for global food and beverage organization, airplane manufacturers, transportation companies, or financial services. These clients do not need to understand which regulatory requirements apply to them. The rule circuit 148 can display curated requirements. For example, if the client 115 is an airplane manufacturer, the rule circuit 148 can retrieve US Federal Aviation Agency (FAA) regulations. In another example, if the client 115 is a financial service provider, the rule circuit 148 can retrieve banking regulations. The rule circuit 148 advantageously reduces computational processing to manually retrieve the regulations from the relevant agency, provider, or research service.

The rule circuit 148 can receive, ingest, or parse rules (e.g., laws, policies, and regulations) for various regulated industries and visually display the rules in an organized GUI. The rule circuit 148 can utilize API's and data normal normalization for ingesting into a data warehouse created in the cloud. For example, the rule circuit 148 can generate a specific instance for each client 115 of the rule circuit 148. The rule circuit 148 can ingest the data across assessment themes, geographies, products, and services, to enable clients 115 to use an auto carte menu for customizing the rule circuit 148. The rule circuit 148 can advantageously ingest and classify rules from disparate data sources to enable clients 115 to avoid relying on inefficient manual review of the rules. The rule circuit 148 improves existing data visualization tools by classifying the rules across industries to avoid guesswork and inefficient classification of the rules for compliance.

The rule circuit 148 can generate or maintain individual rule pages. The rule circuit 148 can generate a summary list or the rules inventory associated with laws and regulations. Responsive to receiving a selection from the devices 120, the rule circuit 148 can retrieve the rules or regulations. For example, the rule circuit 148 can receive a request from the devices 120 to retrieve a particular rule. Responsive to the selection, the rule circuit 148 can retrieve the entire text of the rule for review. The rule circuit 148 can retrieve any prior versions or amendments of the rule.

The rule circuit 148 can store, retrieve, or maintain industry regulator manuals (e.g., bank regulatory manuals) with industry guidance. The rule circuit 148 can generate or retrieve any compliance information to inform a client 115 about compliance requirements. For example, the rule circuit 148 can retrieve a current state of the compliance requirements, such as a current law. The rule circuit 148 can identify or retrieve an amended law or a proposed new law that is expected to be approved. For example, the rule circuit 148 can identify a source or a legal citation for the rule.

The tag circuit 150 of the compliance platform 105 can identify, maintain, generate, and/or manage tags associated with the rules to manage the rules for the particular purpose of providing compliance services. The tag circuit 150 can generate tags based on information or metadata of the rules. The tags can refer to an identifier (e.g., keywords, numbers, alphanumeric values, etc.) that is configured to provide a unique identification of each rule. The tag circuit 150 can utilize algorithms, processes, machine learning models, and/or the like to assign or attach specific keywords to the rules (i.e., apply tags to the rules). For example, the tag circuit 150 can generate the tags for the rule and maintain the tags to identify each rule in a database. The tag circuit 150 can assign to rules to bind or associate these curated groups of rules. For example, for money laundering, the integration circuit 140 can assign keywords such as "client identification program" or "client identification verification" to rules within the anti-money laundering grouping. Thus, when "client identification program" is searched, rules tagged with this phrase are retrieved by computing system for quick observation and analysis.

The tag circuit 150 is configured to be used by institutions and regulators for identification and verification of the client 115. For example, the tag circuit 150 can include a machine-learning model to read all or many of the laws and regulations and industry association guidance that the web scraper ingests. The tag circuit 150 can use the machine-learning model to generate a list of items and most common terms that are within the rules.

An example of generating the tags is described as follows. The tag circuit 150 can extract information from the rules. For example, the tag circuit 150 can apply OCR techniques to the text of a rule. The tag circuit 150 can identify key terms or words in the rules. For example, the tag circuit 150 can generate a tags indicative of a compliance due date responsive to identifying the phrase 'within 6 months' in the rule. The tag circuit 150 can extract metadata from the rule. For example, the metadata can be a timestamp indicating when the rule was released or updated, an agency or regulator responsible for the rule. In another example, the tag circuit 150 can maintain a threshold indicative of a frequency of terms in the rule. If the number of terms satisfies the frequency, the tag circuit 150 can generate the tag for the rule. The tag circuit 150 can assign the generated tags to the rules. For example, the tag circuit 150 can generate data structures corresponding to the tags. The tag circuit 150 can associate the data structures of the tags with the rules.

The tag circuit 150 can use machine learning to automate the generation of the tag. The tag circuit 150 can use the tag, such as a metadata tag, to identify associations among controls, reports, and tasks. The tag circuit 150 can use the tag to generate displays of additional details regarding the controls, reports, and tasks. The tag circuit 150 can use the metadata to retrieve rules, controls, reports, events, or tasks associated with a procedure. For example, the tag circuit 150 can identify the metadata tags for various rules, controls, reports, events, and/or tasks. The tag circuit 150 can identify and retrieve the rules, controls, reports, events, and/or tasks with matching metadata.

The tag circuit 150 can then use the derived terms to associate and identify particular rules. For example, the tag circuit 150 can use tags to identify US sanctions, EU sanctions, money laundering rules, anti-corruption rules, or any other financial rules. The tag circuit 150 can use the tags to identify rules relating to certain regulations, such as consumer protection agency for financial institutions (e.g., a state department of financial institutions). The tag circuit 150 can use the machine-learning model to identify the relevant terms to identify the relevant laws for, in this example, the department of financial institutions. For example, the tag circuit 150 can use machine-learning to identify jurisdictional (e.g., Singaporean) consumer protection laws and rights. In another example, the tag circuit 150 can identify Cuban sanctions regulations from Treasury Department. The tag circuit 150 can identify "Cuba" and "sanctions" as a tag to identify that the regulation refers to Cuban sanctions. Based on these tags, such as "Cuba" and "sanctions", additional rules, tasks, etc. may be recalled that share the same or similar tags (e.g., all rules that have "Cuba" as a tag). Beneficially, this avoids computing resources searching for rules/regulations for various situations (e.g., specific to Cuba) thereby improving computing processing speeds.

The tags facilitate the efficient identification and association of the rules. The tag circuit 150 can use the tags to retrieve the rules for relevant policies, checklists, assessments, and controls. For example, the tag circuit 150 can receive a query (e.g., from the client 115 via the devices 120) to retrieve rules. The query can include a search tag, such as a category (e.g., manufacturing) of the rule, a keyword (e.g., Cuba) in the rule, or a date range of when the rule was published. The tag circuit 150 can compare the search tag to the generated tags for the rules. If the search tag matches the tag of one or more rules, the tag circuit 150 can retrieve the one or more rules. The tag circuit 150 can retrieve or identify associated rules. For example, if a first rule has a tag of the regulatory entity 112, then the tag circuit 150 can identify a second rule associated with the first rule responsive to identifying that the second rule has the same tag of the regulatory entity 112. By using the tags to retrieve and associate the rules, the tag circuit 150 enables the efficient display of relevant rules to the client 115 via the GUIs.

The tag circuit 150 advantageously allows a user to search for rules such as disclaimers around unfair or deceptive abusive acts and practices, and then identify the relevant rules without the user having to hire a law firm in Singapore. Moreover, the tag circuit 150 can identify rules in multiple jurisdictions and or for various agencies. For example, the machine-learning can identify rules associated with the EU or the United States. In another example, the machine-learning can identify rules associated with the Federal Trade Commission (FTC) or the Consumer Financial Protection Bureau (CFPB). The tag circuit 150 advantageously removes the need for a client 115 to manually retrieve rules in each jurisdiction such as Singapore, the US, and the EU. The tag circuit 150 can use the derived MDN to assign tags to common terms. The tag circuit 150 can then associate international rules. For example, the tag circuit 150 can identify rules that appear in Singaporean and associate them with US Federal and State rules, or EU rules.

The tag circuit 150 can advantageously provide derived tags. For example, the tag circuit 150 can be used with/as part of a master data management (MDM) tool for managing tags. For example, the MDM tool can be used by banks or other institutions. The tag circuit 150 can manage clients with policies and procedures without derived tags or static tags. For example, tag circuit 150 can extract derived tags from the rules or identify static tags from the rules. The tag circuit 150 can associate the tags (e.g. static or derived) with a variety of items (e.g., board of directors, members 130, etc.). The tag circuit 150 can maintain policies, procedures, or training checklists associated with laws and regulations. For example, a financial services client can operate in many different countries and is thus subject to many laws and regulations. The client 115 can have many members 130 also subject to laws and regulations. The client 115 can also include policies, procedures, or processes stored in various formats such as text documents, spreadsheets, etc. Such documents might not be associated with each other. The tag circuit 150 can advantageously parse these policies and procedures. The tag circuit 150 can assign derived tags to the policies and procedures.

By using machine-learning, the tag circuit 150 can cross-reference the derived tags and the static tags that exists in the rules inventory. For example, the tag circuit 150 can receive a request via the devices 120 of the client 115 (e.g., from a compliance officer or a lawyer of the client 115) to retrieve specific rules for the US, EU, and Singapore. The request can be a search or query that includes keywords or identifiers. The tag circuit 150 can compare the keywords or identifiers to existing tags to identify the relevant rules. The tag circuit 150 can identify the rules, regulations, or industry guidance along with any internal policy procedure checklists of the client 115 that are operationalized in a controlled environment. The tag circuit 150 thus advantageously incorporates requirements, controls, and issues for assessment and assessments in the assessment dashboard, and cross tags them together for assessment management. The tag circuit 150 can provide linkages between the rules to manage the entire compliance lifecycle. The tag circuit 150 can process searches beyond static tags by connecting requirements to controls issues and present the results as an organizational structure and hierarchy.

The control circuit 152 of the compliance platform 105 can maintain, generate, or store controls. "Controls" refer to defined policies, procedures, processes, checklists, trainings, monitoring, testing, quality assurance, reports, etc. that defines an action or plan for the client 115 to implement to comply, attempt to comply, or otherwise attempt to ensure compliance with a requirement (e.g., a rule as described herein). For example, controls can be restrictions on payments or transactions, certification requirements, policy, standard, procedure or management guidance.

The control circuit 152 can use machine learning to organize all or many of the rules. The control circuit 152 can utilize the tags to organize the controls for computationally efficient retrieval of the controls. For example, the control circuit 152 can receive a search for the controls and quickly retrieve the control based on the tags instead of searching each law on the database 114 of the regulatory entity 112.

The control circuit 152 can manage procedures and the operation that controls the procedure. The control circuit 152 can identify or generate a checklist for the complying with the controls. For example, the control circuit 152 can cross-reference the checklist with the derived tags to combine the two and generate a control for the requirement. The control circuit 152 can maintain or display the requirement and appropriate control for that requirement. The control circuit 152 can advantageously map the controls to the checklist. The control circuit 152 can advantageously identify the controls when a simple search is difficult because the rules and regulations are scattered. For example, the policies can be in different documents located on various local drive without tags. The control circuit 152 can advantageously identify the rules by indexing all the policies. For example, the control circuit 152 can identify consumer protection controls for a regulation in Singapore and other controls for regulations in Massachusetts.

The control circuit 152 can provide an improved core compliance experience that includes detailed and organized descriptions of regulations. For example, the client 115 might have one team manage the rules inventory while another team manages the controls library. The issue management team can be different from the team managing the assessment. The client 115 that have separated teams can benefit from the control circuit 152 linking their policies and procedures via the tags. The control circuit 152 can advantageously enables clients to maintain a compliance program that is efficiently linked together via the tags. The control circuit 152 can advantageously provide the organizational hierarchy or rules for the client 115.

The control circuit 152 can establish or maintain API's to receive controls from the devices 120. The control circuit 152 can generate a request for the client 115 to provide controls via one or more APIs. The control circuit 152 can identify dependent actions and dynamic changes from the devices 120 of the client 115. The control circuit 152 can identify the assessments, ranks, or ratings of controls, laws, or regulations. The control circuit 152 can identify or maintain predefined tags and tags received from the devices 120 of the client 115.

The control circuit 152 can receive text documents or spreadsheets via the API's from the devices 120. The control circuit 152 can digitize the controls from the text documents or the spreadsheets. For example, the control circuit 152 can apply OCR to the received documents. The control circuit

152 can generate controls from the documents. For example, the control circuit 152 can identify controls based on the documents. The control circuit 152 can generate a controls library with controls that include operationalized controls. For example, the operationalized controls can be actions to be taken by the client 115 for compliance or to reduce audit related problems. The control circuit 152 can buffer standardized controls for the client 115 to use and customize. For example, the control circuit 152 can generate controls for a particular manufacturing standard relating to a manufacturing process utilized by the client 115. In another example, the control circuit 152 can generate a list of controls that include a logo of the client 115.

The control circuit 152 can generate or maintain control lists. The control circuit 152 can generate a controls library with controls. The control circuit 152 can generate the controls library and controls to include a policy, a procedure, a process flowchart, or a checklist disclosure for the client 115. The control circuit 152 can receive requests from the client 115 to configure, select, manage, or assign the tasks associated with controls for compliance. For example, the control circuit 152 can maintain or store a privacy policy approved by a Board of Directors of the client 115. The control circuit 152 can transmit the policy to the owner (e.g., administrator 125 or members 130) of the policy. For example, the chief privacy officer of the client 115 can report into the general counsel of the client 115. The general counsel can have a chief of staff who will have access rights granted by the profile circuit 144 to be the administrator 125. The chief of staff can be a control manager or administrator 125 registered with the compliance platform 105. The control circuit 152 can receive, from the administrator 125 (e.g., chief of staff), assignments of the policy to members 130 within legal compliance and business via workflow capabilities. In another example, the control circuit 152 can receive a request from the member 130 via the device 120B to be assigned to a policy, and the administrator 125 (e.g., chief of staff) can approve or deny the request via the device 120A communicating with the control circuit 152. For administrator 125 or members 130 with approval authority, the control circuit 152 can receive an approval of an associated policy.

The control circuit 152 can advantageously provide a learning management platform for the client 115 to train the members 130 within their organization. The control circuit 152 can generate widgets for the client 115 to complete on the devices 120. The widgets can request the members 130 to watch videos, complete quizzes, and familiarize themselves with the controls. The control circuit 152 can advantageously integrate the rules of inventory control with library control, mapping, issue management, risk assessment, policy, and governance with the learning platforms.

The control circuit 152 can generate control pages, which can summarize the controls and the related rules. The control circuit 152 can generate the versions of the control along with the tags. The control circuit 152 can generate a comparison of the rules and their changes. For example, the control circuit 152 can generate or identify the different versions of patent laws over time to identify how the patent laws have changed.

The control circuit 152 can receive requests from an external client 115 such as an auditor. For example, the control circuit 152 can identify that a regulation is going to be updated or amended within a predetermined time (e.g., within a 3 months). The control circuit 152 can identify or generate the update and a plan for managing the update or amendment. In some implementations, the control circuit 152 can receive the screen scraped rules from the integration circuit 140 to identify the update. In some implementations, the control circuit 152 can use machine learning to identify rule changes. In some implementations, the control circuit 152 can receive an input from the regulatory entity 112 or the client 115 that indicates the rule change. The interface circuit 142 can display associated public data (e.g., amended rules) with the organizational hierarchy of the client 115 to provide the assessment and the control mapping.

The assessment circuit 154 of the compliance platform 105 can identify, generate, calculate, receive, maintain, or manage assessments for the rules and the controls. The assessments can be based on comparisons of the relative likelihood of events and one or more thresholds, tolerances, or relative impact or importance of the rules and the controls. For example, the assessment circuit 154 can maintain a risk assessment regarding the rules.

The assessment circuit 154 can determine, calculate, and/or otherwise identify an inherent risk assessment associated with the client 115. The inherent risk assessment can be indicative of the business model of the client 115. The assessment circuit 154 can calculate the inherent risk assessment based on an inherent risk assessment of the rules and an inherent risk assessment of the business model attributes of the client 115. For example, the assessment circuit 154 can calculate the inherent risk assessment of the rules and the inherent risk assessment of business model attributes of the client 115.

The assessment circuit 154 can maintain or generate a list of summary rules. The assessment circuit 154 can maintain, receive, or store a threshold for each rule that is used to generate an assessment. The assessment circuit 154 can maintain a selection of the rule and then display the associated assessment for the selected rule. The assessment circuit 154 can maintain the assessments in an array or an index. The assessment circuit 154 can advantageously generate or store the assessments next to the rule so that the user does not have to rely on a different database or tool.

The assessment circuit 154 can generate assessments to differentiate among controls and rules. For example, the assessment circuit 154 can compare the assessments to a threshold. The assessment circuit 154 can identify an importance of relevance of the rules and controls based on the comparison. For example, assessment circuit 154 can identify that a first control is more important to the client 115 than a second control responsive to identifying that the first control has a first assessment greater than the second assessment.

The assessment circuit 154 can identify laws and regulations globally in a curated and filtered format that are specific to the client 115. For example, the assessment circuit 154 can receive assessments of products from auditors, compliance professionals, and product professionals. In another example, the assessment circuit 154 can maintain, for the client 115 (e.g., financial services institution), a segment dedicated to credit cards. The assessment circuit 154 can maintain segments by location such as the US, Canada, or the UK. The assessment circuit 154 can maintain segments by product type such as small business card, retail and direct bank cards, or partner cards. The assessment circuit 154 can maintain segments by teams or functional departments. The assessment circuit 154 can maintain, identify, or receive links among the controls and the segments.

The assessment circuit 154 can generate tasks associated with an assessment. For example, the assessment circuit 154 can generate tasks associated with a financial crime being comprised of AML, economic sanctions, or corruption. The assessment circuit 154 can generate toggles or identify selections among the components of the financial crime. For example, the assessment circuit 154 can receive a request for drill down into the AML. Responsive to receiving the request, the assessment circuit 154 can generate the drill down. The assessment circuit 154 can cause the task circuit 146 to assign the tasks associated with the assessment to the members 130.

The assessment circuit 154 can maintain customization of the assessment methodology that defines and describes the assessments that can be received or assigned to each rule. For example, the assessment circuit 154 can maintain policy governance technology or learning management systems to provide training to members 130 and then assess the efficacy of the training. The assessment circuit 154 can maintain spreadsheets, databases, and other assessment tools.

The assessment circuit 154 can display assessments for individual laws and regulations for the client 115. For example, the assessment circuit 154 can display control mapping for financial services. The assessment circuit 154 can display control mapping based on industry guidance. For example, the assessment circuit 154 can display assessments of the Federal Reserve Board. The assessment circuit 154 can provide regulated institutions with an understanding of their control environment. For example, the assessment circuit 154 can display an analysis of the controls and the assessments, such as a likelihood of an audit based on the controls and the assessments. In another example, the assessment circuit 154 can display alternative assessments or possibilities to manage risk for the controls.

The assessment circuit 154 can receive or maintain, from the client 115, selections of assessments or complaints for the interface circuit 142 to monitor. The assessment circuit 154 can identify or receive the complaints for products of the client 115. For example, the assessment circuit 154 can identify customer complaints of the client 115 to reduce the reliance of the client 115 on operations, compliance, and officers monitoring for customer complaints. The assessment circuit 154 can advantageously monitor or identify the complaints for each product and category to the operations, compliance, and officers of the client 115.

Based on the receive selections of particular products and categories, the assessment circuit 154 can advantageously maintain data structures of the assessments of rules and controls for the client 115. The assessment circuit 154 can generate GUIs for display the data structures of the assessments. The assessment circuit 154 can utilize selectable elements, such as icons, bubbles, buttons, and symbols, to enable retrieval of previously generated assessments and information regarding the assessment. The assessment circuit 154 can maintain the interconnectedness between rules and controls. For example, the assessment circuit 154 can display indicators to indicate that the elements are selectable (e.g., contain a hyperlink).

The assessment circuit 154 can generate and display indicators of assessments. For example, the indicators can be a visually-perceptible element provided on one or more initial or summary GUIs. In one embodiment, the indicator is an icon, such as a dot. The dot may be a color-coded or otherwise include features (e.g., blinking, etc.) to indicate a determination associated with the assessment. For example, red colored dots may indicate that further investigation is required. The dots may be provided on a GUI. In other embodiments, different elements may be used (squares, etc.). The assessment circuit 154 can display the hierarchy in the organization of the client 115. For example, the assessment circuit 154 can display portions for each product or entity of the client 115.

The assessment circuit 154 can generate the indicators to be selectable. The assessment circuit 154 can generate the indicators to include embedded hyperlinks or data pointers to the popups or GUIs. Responsive to receiving the selections of the indicators, the assessment circuit 154 can execute the link or data pointer to open GUIs or popups. The assessment circuit 154 can generate GUIs or popups for display responsive to receiving selections of the indicators. For example, the GUIs or popups can be message bubbles. The GUIs can include detailed information (e.g., drill down) about the assessment. For example, the GUIs can include information to explain the reason for a particular assessment (e.g., red indicator implies high risk of audit). The assessment circuit 154 can generate a selectable popup for displaying a portion of the detailed information. Responsive to selection of the selectable popup, the assessment circuit 154 can generate an expansion GUI that utilizes more pixels or screen space than the popup. The expansion GUI can include additional information about eh assessment, such as recommended mitigation actions. The assessment circuit 154 advantageously enables generation of assessment analysis in a popup and or compact GUI from within the extensive initial or summary GUI in a computationally efficient manner without utilizing extra computational power to present separate GUIs.

The assessment circuit 154 can identify or generate segments associated with particular rules or regulations. The segments may refer to services provided by the client 115 or other categorical classifications that may be used with the rules or regulations. For example, the segments can relate to leasing and lending to enable the client 115 to identify leasing and lending rules in a format customized for the client 115.

The assessment circuit 154 can identify the changes to the rules or procedures in a simplified and in an integrated manner with the other functionalities. For example, the assessment circuit 154 can identify a particular rule or procedure and compare them to prior versions. The assessment circuit 154 can identify deletions, additions, or changes.

The assessment circuit 154 can dynamically modify the assessments of the rules based on uploads, controls, and/or inputs received from the devices 120 of the client 115. For example, if the assessment circuit 154 receives a modification of a control that modifies an assessment, line items, or line items for controls, the assessment circuit 154 can dynamically update the assessment. The assessment circuit 154 can identify controls for the client 115 based on applicable rules stemming from a keyword search for various rules that is received from a client device that is subsequently transmitted to the compliance platform 105 computing system. The assessment circuit 154 can identify one or more controls for the client 115 based on the query in order to comply or attempt to comply with the defined and applicable rules. The assessment circuit 154 can calculate a risk assessment for the identified controls to determine control effectiveness, which evaluates how effective the controls are for various rules (e.g., indicative of whether the client 115 is missing, or has weak or ineffective controls for various rules). The assessment circuit 154 can advantageously identify and manage the interconnected and interdependent aspects of the controls and rules. The assessment circuit 154 can continuously update the associations based on individual updates or actions received form the devices 120 of the client 115 or collectively by all members 130 of the client 115.

The assessment circuit 154 can generate the residual assessments, which are leftover or remainder assessments. The residual risk assessments can be inherent risk assessment plus or minus a control risk. For example, the residual assessments can be residual risk indicative of the risk that remains to the client 115 after identifying and generating assessments for the other types of risk. Based on residual risk results, the assessment circuit 154 can generate or determine the actions for the client 115 (e.g., drafting and communicating a new policy, developing and assigning training on a new law, etc.). The assessment circuit 154 can calculate the residual assessment based on the inherent assessments and control effectiveness. The assessment circuit 154 can utilize a formula to calculate residual risk assessments. For example, the assessment circuit 154 can calculate the residual assessments by subtracting inherent assessments, which are regulatory plus business model assessments, from control effectiveness.

The assessment circuit 154 can maintain, identify, or receive control approval. The assessment circuit 154 can be customized by the client 115 to reduce reliance on developers to engineer the logic or interfaces. For example, the assessment circuit 154 can receive or store customizable assessments for rules or definitions of access rights for members 130 who will be managing the rules. The assessment circuit 154 can receive requests to filter the rules by parameters such as product or geography. For example, the assessment circuit 154 can receive a standardized offering for dealing with consumer complaints about a financial services company. The assessment circuit 154 can receive the customer complaints data. The assessment circuit 154 can store the consumer complaints in a digital format. For example, the assessment circuit 154 can apply OCR techniques to parse the complaints for keywords to determine rules or controls associated with the complaints.

The assessment circuit 154 can receive administration or settings of controls. The assessment circuit 154 can identify or store selections of radio buttons or dots for the administrator of the client 115 to select to turn on and off display of elements in the compliance platform 105. For example, the assessment circuit 154 can receive or store selections to display or remove from display certain elements.

The assessment circuit 154 can receive requests for single sign on integration for internal compliance. The assessment circuit 154 can receive or store appointments or assignments, from the device 120A of the administrator 125 of the client 115, of members 130 (e.g., legal and compliance professionals) within the organization of the client 115. The assessment circuit 154 can authorize the assigned professionals to sign in to the compliance platform 105 to provide or modify the assessments or controls.

The assessment circuit 154 can receive or store regulations and their respective assessments selected via the device 120B by the administrator 125 of the compliance platform 105. The assessment circuit 154 can store the received assessments on a three-point scale or a five-point scale or receive a customization to generate a four-point scale or a seven-point scale. The assessment circuit 154 can store the individual weightings based on the scale, and generate calculations based on the weightings. For example, the compliance platform 105 can advantageously use the weightings to calculate customized risk assessments or probabilities for the client 115.

The assessment circuit 154 can generate or maintain GUIs of control ownership. The assessment circuit 154 can receive assignments of ownership of the rule to members 130 via the single sign on integration. For example, the assessment circuit 154 can receive an assignment of a responsible lawyer or compliance officer to the rule. The assessment circuit 154 can store the assignment.

The assessment circuit 154 can advantageously display or identify the ownership or management of the rules. The assessments can indicate who owns or manages the rules. The assessment circuit 154 can generate assessments associated with laws and regulations. The assessment circuit 154 can generate or maintain a mapping between the owner of the legal and compliance laws and regulations. The assessment circuit 154 can identify, for the client 115 such as financial institutions receiving requests from auditors and regulators, the laws and regulations that apply to the client 115 in within the organization hierarchy instead of an outdated spreadsheet. Moreover, the assessment circuit 154 can advantageously identify or maintain assessments and ownership for the rules and regulations.

The issue circuit 156 of the compliance platform 105 can identify, determine, and/or store compliance related issues. The issue circuit 156 can generate GUIs regarding issue reports. The issue circuit 156 can generate or identify issues, which can be the results of internal audits or compliance related events such as but not limited to a regulation, an audit, a whistleblower report, and so on. The issue circuit 156 can generate GUIs of issues and associated actions. In some implementations, the issues can relate to controls and the issue circuit 156 directly connects controls with issues for ease of tracking (i.e., reduction in computational load in identifying issues associated with certain controls if a master list is already maintained and easily retrieved). The issues can relate to inadequate or ineffective controls, new requirements that require new controls, etc. In some implementations, issues can relate to events. For example, an event can be a whistleblowing report about practices and activities of a client 115. The issue circuit 156 can identify that based on an OCR scan of the report that indicates that a total quantity of negative words exceeds a threshold level to thereby conclude that the report is a negative report. The whistleblower report may be received via web-scraping of sites associated with the topic of the whistleblower report. As a result, the issue circuit 156 can identify issues identified by the OCR of the whistleblower report such that the client 115 can proactively address those issues.

The issue circuit 156 can generate issues associated with regulatory examinations, internal audits, and/or compliance testing. The issue circuit 156 can receive issues from the devices 120 of the client 115 via the APIs. By receiving the issues, the issue circuit 156 can allow the client 115 to upload their audit, compliance, and/or regulatory reports. The issue circuit 156 can maintain and monitor the issues for actions associated with the issues. The issue circuit 156 can identify and maintain progress made by the organization to address the issues. The issue circuit 156 can identify actions that pertains to new controls or enhancements required to existing controls. The issue circuit 156 can generate data structures (e.g., pointers) that associate the controls and the issues to enable tracking for the client 115.

The issue circuit 156 can display audits of the client 115 (e.g., account firm or bank). The issue circuit 156 can identify or generate internal control groups such as reviews for compliance or review for regulators (e.g., FAA or Food and Drug Agency (FDA)). The issue circuit 156 can generate or receive reports from these reviews that indicate whether the client 115 satisfactorily complies with applicable requirements. The issue circuit 156 can classify the issues. For example, the issue circuit 156 can identify field-value pairs that indicate that the issues are good, bad, or medium issues. The issue circuit 156 can maintain or store the issues for the client 115 to address the identified issues in a timely manner to comply with regulators, auditors, and compliance testers.

The issue circuit 156 can generate GUIs of reports. The issue circuit 156 can generate or identify issues based on operations of the client 115 at its locations. The issue circuit 156 can generate associations among rules, controls, and issues. The issue circuit 156 can store or receive issues from the client 115 via the devices 120. The issue circuit 156 can generate associations among the rules, controls, and issues for ease of use. The issue circuit 156 can generate can identify or store the reports and events. The issue circuit 156 can generate or identify filters to select among reports, events, issues, and actions. The issue circuit 156 can receive a request for a drill down. Responsive to the drill down, the issue circuit 156 can generate an individual audit report with associated issues.

The issue circuit 156 can manage changes or issues relating to the entities, rules, and regulations. After the issue circuit 156 can receive the requirements and implements controls, the issue circuit 156 can monitor for updates. For example, the issue circuit 156 can transmit a query or request to the regulatory entity 112 for updates. The issue circuit 156 can monitor the entities, rules, and regulations to infer updates to the issues. For example, the issue circuit 156 can identify that the issue was linked to a particular rule. Responsive to identifying an update to the rule, the issue circuit 156 can identify an update to the issue. The issue circuit 156 can identify issues and generate reports or issue examination reports for events such as internal audits. The issue circuit 156 can generate reports for regulators, compliance testing, or internal control groups. The issue circuit 156 can generate the report based on a planned or unplanned event. For example, the issue circuit 156 can identify an event relating to regulatory calculations (e.g., London Inter-Bank Offered Rate) or a whistleblower report. Based on the event, the issue circuit 156 can generate a compliance report. The report can be an internal audit report. The report can include modifications to address the event or issues. For example, the issue circuit 156 can modify, based on the report, the controls to address the event.

The issue circuit 156 can receive modifications based on the events. For example, the issue circuit 156 can receive assessments for issues such as regulatory examination or audit issues. The issue circuit 156 can manage a prioritization schedule, ownership, and dates. The issue circuit 156 can receive modifications to the report. The issue circuit 156 can manage different versions of the report. The issue circuit 156 can receive an audit report of the issue. The issue circuit 156 can receive an issue and information about the issue entered into data fields. The in issue circuit 156 can associate the issues to actions. The issue circuit 156 can display the issue and identify associated metadata. The issue circuit 156 can receive one or more additional actions to associate with the issue.

The issue circuit 156 can integrate reports and events for the client 115. The issue circuit 156 can identify or maintain the issues underlying the reports and events for the client 115 to manage the actions based on their controls. The issue circuit 156 can advantageously generate reports for sharing and printing. The report can include the issues and relevant actions. For example, the issue circuit 156 can display the report with the issues and then the actions. The issue circuit 156 can provide desired recipients (e.g., regulators) with an assessment.

The issue circuit 156 can identify an updated assessment based on the issues identified in the report. The issue circuit 156 can generate the report and a recommendation for the client 115 to analyze its practices (e.g., for a financial services company, its practices may relate to wealth management and retirement business practices). The issue circuit 156 can identify the recommendation generated based on the controls and rules associated with the client 115. The issue circuit 156 can identify the mitigations received from the regulatory entity 112, the administrator 125, or the members 130. The issue circuit 156 advantageously enables the client 115 to reduce their reliance on outside counsel or consultants to identify the issues and how to mitigate the issues. The issue circuit 156 can identify can advantageously identify the issues and mitigations to share with external entities (e.g., consulting companies or governments).

The issue circuit 156 can generate a report summary. The issue circuit 156 can generate, maintain, or identify numbers of identifiers of the issues. The issue circuit 156 can identify issues associated with assessment. The issue circuit 156 can identify issues that have assessments. The issue circuit 156 can receive a request for a drill down within the report. Responsive to receiving the request, the issue circuit 156 can identify the issues and management's action plans associated with addressing those issues. The issue circuit 156 can generate the action plan that is individually numbered and aligned to the particular issue or issues. The issue circuit 156 can identify the tags for the issues to enable additional drill down.

The issue circuit 156 can identify or generate a report of events. The events can be associated with issues present in the organization of the client 115 and possible mitigating actions for the client 115. Whereas issues can be reactive from internal audits, compliance test, and/or regulatory exams, the events can be self-imposed proactive reviews. The issue circuit 156 can utilize both the issues and events to generate actions. Events can be reviews identified by the issue circuit 156 for the client 115 to take to proactively mitigate risks. For example, the issue can be that the client 115 engages in activities that can be associated with financial crimes. In another example, during a regulatory investigation of organizations, similar organizations may want to proactively determine if they would be subject to a similar investigation. The events can be a proactive determination, which can also be known as a lessons learned exercise. The issue circuit 156 can generate issues for action based on the events such as the results of the lessons learned.

The report can include compliance related rules for the client 115. For example, report can include rules associated with AML sanctions, anti-corruption, and categorized by the organizational structure of the client 115. The issue circuit 156 can generate the report to include composite assessments as a summary risk view. The report can include inherent assessments utilized for the assessments. The report can display inherent assessments comprised of residual risk based on the rules inventory. The report can include business model assessments, control effectiveness, residual assessments, and leftover assessments. The issue circuit 156 can advantageously provide the reports within an integrated system while reducing the use of externals tools. For example, the issue circuit 156 can be computationally efficient by reducing the need for the client 115 to log out of an existing system, obtain access to another system, compare the systems, and then attempt to calculate the assessments.

The issue circuit 156 can generate GUIs of assessments. The issue circuit 156 can generate selectable options to modify the view. For example, within business model assessment, the issue circuit 156 can generate selectable options to expand or collapse views by receiving selections of expansion and collapsing arrows. Responsive to the detecting the selections, the issue circuit 156 can generate the expanded or collapsed views.

The issue circuit 156 can generate assessments for activities of the client 115. For example, the assessment can be in regard to a potential financial crimes related to AML rules. The issue circuit 156 can provide navigation among the organizational hierarchy. For example, the issue circuit 156 can provide navigation among inherent assessment, regulatory assessment, business model assessment, which can include tabs for control effectiveness to see control environment or residual assessment in columns.

The issue circuit 156 can generate an assessment for predefined rules or regulations included in each organization category of the client 115. For example, the issue circuit 156 can generate assessments for enterprises, consumer banking, demand deposits, or checking. The issue circuit 156 can generate the assessments on a scale. For example, different clients 115 might receive different inputs of assessments for different rules based on how those clients 115 approach assessment.

The issue circuit 156 can generate an assessment. The assessment may be provided periodically (e.g., monthly, quarterly, etc.), on-demand based on a request from a client, and/or some combination thereof. Issue management can be a reactionary activity as a client 115 reacts to regulatory or auditory assessments. Assessments can be more proactive. For example, an assessment can identify compliance issues in advance and to enhance controls proactively.

The issue circuit 156 can generate a custom assessment plan for the client 115. For example, an initial assessment plan might be on a predefined value scale (e.g., three to five point scale). The issue circuit 156 can maintain any other scale received via the devices 120, such as, with reference to the example above, a four-point scale or a seven-point scale. The issue circuit 156 can calculate or identify regulatory risk (RR), business model risk (BM), control effectiveness (CE), and residual risk (RE). The issue circuit 156 can generate, maintain, or identify internal rules for reviewing the control environment as well as for regulators to provide assessments and methodologies.

The issue circuit 156 can generate the derived tags associated with the rule. Responsive to a selection of the derived tag, the issue circuit 156 can generate rules associated with that tag. For example, if the interface circuit 142 receives a selection via the devices 120 of an icon associated with a particular jurisdiction (e.g., Singapore), the issue circuit 156 can generate, maintain, or identify the rules of that selected jurisdiction. In another example, if the issue circuit 156 receives a selection via the devices 120 of an icon associated with a particular category (e.g., consumer protection), the issue circuit 156 can generate, maintain, or identify the rules for that category. The issue circuit 156 can advantageously generate the derived tag to the user to enable browsing of identification of associated rules.

The issue circuit 156 can receive, via the devices 120, a selection of a line item to display the rules inventory. The rules inventory can include results of the rules and regulations that are underlying the rules or column along with a hierarchy. The issue circuit 156 can generate selectable elements associated with the rules and regulations. The selectable elements can be linked to additional information about the rules and regulations. For example, the issue circuit 156 can receive, via the devices 120, a selection of the selectable element to drill down into, for example, savings. Responsive to selection of the selectable element, the issue circuit 156 can generate the rules inventory page that indicates laws, regulations, or industry guidance underlying the selectable element. In another example, the issue circuit 156 can receive a selection for business model assessment. The issue circuit 156 can generate or maintain regulations for regulatory assessment along with a breakdown. The issue circuit 156 can generate or maintain the regulations based on and in context to the rules inventory.

The issue circuit 156 can receive or store feedback associated with the client 115. In some implementations, the feedback is negative such as complaints. In another implementation, the feedback is positive. The issue circuit 156 can receive or store the feedback received from users or customer of the client 115. The issue circuit 156 can generate a pre-fabricated menu of choices associated with various types of ways for customers to complain in a consumer-banking context. For example, the issue circuit 156 can generate display icons that the users have been selecting to input their feedback. The issue circuit 156 can generate customer complaints received via the APIs from internal systems or external systems. For example, the feedback can be adverse actions such as those caused by the client 115 declining a loan or negative advertising, marketing, or reviews. For example, the issue circuit 156 can advantageously store and organize customer complaints of the client 115.

For example, the issue circuit 156 can generate regulatory assessments of the client 115 to enable the client 115 to manage their assessments. The issue circuit 156 can generate a selection to display a drill down of rules and regulations that define the assessments. For example, the issue circuit 156 can generate a drill down view of business model assessments. Responsive to a selection of the business model for the assessments, the issue circuit 156 can generate or retrieve the rationale within a textbox, display a drop-down menu, or display a textbox to display the control effectiveness.

The issue circuit 156 can identify the controls associated with the assessments. The issue circuit 156 can identify the associated controls responsive to receiving a selection of the assessment (e.g., selection of the dot) via the devices 120. For example, the issue circuit 156 can identify the associated controls in a popup. The issue circuit 156 can generate, responsive to a selection, a drill down of the controls that define the assessments.

The issue circuit 156 can generate changes in the rules inventory and identify the changes in the rules inventory. The issue circuit 156 can generate regulatory actions associated with the rules inventory. Responsive to receiving selections of the rules inventory, the issue circuit 156 can generate or maintain the rules inventory. For example, to display business model assessment, the issue circuit 156 can generate various components of business model assessment. The issue circuit 156 can generate subcategories in either regulation. The issue circuit 156 can advantageously generate business model assessments throughout the compliance platform 105. The issue circuit 156 can generate customizations of the regulations for the client 115.

The issue circuit 156 can generate, maintain, or identify the underlying subcategories that comprise the business model assessment that then in the composite assessment. The issue circuit 156 can receive selections to change the assessment. For example, if the issue circuit 156 can receive a modification of the assessment, then the issue circuit 156 can generate, maintain, or identify the assessment (e.g., rating would pop up).

The issue circuit 156 can generate or identify the control effectiveness. For example, responsive to receiving a selection of the control, the issue circuit 156 can generate the controls library summary list. The issue circuit 156 can generate the controls that are underlying a particular dot. For example, the administrator 125 or the members 130 (e.g., a designated AML officer) can input a staffing plan to show evidence of people in a department addressing compliance issues. The issue circuit 156 can receive, via the devices 120 of the client 115 (e.g., the AML officer), inputs to their staffing plan via the issue circuit 156 as part of their duties as a chief compliance officer. The issue circuit 156 can generate or maintain the controls library to work with the assessment and to be cross-referenced by the master data management that is static and derived.

The issue circuit 156 can generate assessments integrated with the control library. The issue circuit 156 can generate customized assessments. The issue circuit 156 can generate issues or events, or events that are associated with a particular control. The issue circuit 156 can generate a shareable risk assessment. The issue circuit 156 can identify changes to the assessments. The issue circuit 156 can advantageously provide an all-in-one solution to reduce reliance on separate systems.

The issue circuit 156 can generate a GUI that includes residual assessment. The issue circuit 156 can generate the interface that combines inherent assessment plus or minus control effectiveness. For example, if the controls are perfect, then the issue circuit 156 can identify display low inherent assessment. In another example, if the controls are not perfect or a client 115 has an ineffective control environment, then the issue circuit 156 can identify that there is an increased assessment of noncompliance. The issue circuit 156 can analogize regulatory assessment and business model assessment and inherent assessment based on a business model of the client 115.

The issue circuit 156 can generate calculations that, absent a controlled environment for assessment, are based on the products and services provided by the client 115 or the geography (e.g., Singapore EU or Columbia). The issue circuit 156 can generate calculations associated with a business model assessment plus or minus control assessment that equals residual assessment. Responsive to receiving a selection, the issue circuit 156 can generate a summary interface. Responsive to receiving a selection of a selectable element for residual assessment medium, the issue circuit 156 can generate specific assessment units. For example, the issue circuit 156 can generate a summary page that indicates the rules for a particular selectable element, the controls, and issues associated with that control. For example, the issue circuit 156 can receive, from the regulatory entity 112 associated with an assessment professional (e.g., an auditor, regulator, compliance officer, assessment officer, or a general counsel) a selection of the selectable element. Responsive to the selection, the issue circuit 156 can generate, maintain, or identify the underlying data associated with the selectable element.

The issue circuit 156 can receive, from the client 115, control types for assessment, management, approval authorities that denote governance, and the components of their assessments. The issue circuit 156 can receive, from the client 115, rules and inherent assessment based on the applicable rules, business model, and their control effectiveness. The issue circuit 156 can identify residual risk leftover from the inherent risk and subtract control effectiveness and issue management structure. For example, when the client 115 has a problem and auditors or regulators investigate or do reviews, the results of those reviews can be issues. The issue circuit 156 can identify such issues. The issue circuit 156 can identify a taxonomy based on the internal review groups as well as the regulators that regulate the client 115.

The issue circuit 156 can identify a lifecycle for compliance management in industries such as professional services. For example, the issue circuit 156 can identify applicable requirements, laws, or regulations for the industries. The issue circuit 156 can identify the applicable requirements, laws, or regulations in the rules inventory.

Instead of separately displaying display laws and regulations in one tab and unconnected controls or policies and procedures in a different document format, the issue circuit 156 can generate, maintain, or identify requirements for controls. The issue circuit 156 can identify selections of the controls via the device 120. For example, the issue circuit 156 can identify a selection of an arrow. The arrow can get turned upside down in expanded versus the collapsed view. Responsive to the selections, the issue circuit 156 can identify the related controls for display to the client 115.

The issue circuit 156 can calculate user experience by allowing the client 115 to individually provide assessments. The issue circuit 156 can receive, from the client 115, assessments of the controls. The issue circuit 156 can identify the assessments from the summary list. For example, the issue circuit 156 can generate, for users of the client 115 with access, the rules inventory via which to receive assessments for the rule. In another example, the issue circuit 156 can generate, for the users of the client 115 with access, a detailed interface with the controls and receive assessments for the rule.

The issue circuit 156 can generate predefined assessment for the client 115 to select. For example, the issue circuit 156 can maintain a standardized 3.5-point scale. The issue circuit 156 can maintain the standardized scales so that client 115 can quickly setup their controls. For example, smaller players such as fin-techs, community banks, or smaller broker dealers can use the standardized scales for efficiently setup of the compliance platform 105.

The issue circuit 156 can generate custom assessments from the client 115 to define the assessments. For example, the issue circuit 156 can receive a selection for a three-point scale or a five-point scale. The issue circuit 156 can identify selections of the colors for the assessments. For example, the issue circuit 156 can identify selections of various color hues such as red, yellow, or green. The issue circuit 156 can maintain or identify categories such as medium to moderate. The issue circuit 156 can generate, maintain, or identify percentage ranges such as 5-25%.

The issue circuit 156 can identify control owners appointed by the client 115. For example, the issue circuit 156 can identify the control owners that are senior level officers of the client 115 or control managers delegated to those senior officers that are in charge of those controls on a day-to-day basis. The issue circuit 156 can identify the identity of the owner and the manager of the rule. The issue circuit 156 can advantageously identify the identity alongside the controls without requiring a lookup, separate interface, system, or platform.

The issue circuit 156 can generate or identify associations between the controls of the client 115 and the rules of the personnel, regulators, and auditors associated with the regulatory entity 112. The issue circuit 156 can generate or identify the associations by identifying the rules that apply to the client 115 and the controls put in place by the client 115 to comply with those rules. The issue circuit 156 can use the tags to identify rules that apply to the client 115. The issue circuit 156 can identify rules with tags associated with the client 115. For example, the issue circuit 156 can identify that the client 115 is a manufacturer of batteries, and cause the tag circuit 150 to identify the rules with tags corresponding to manufacturer of batteries. The tag circuit 150 can query terms such as "battery manufacturer" to identify matching tags associated with the rules for the client 115. The issue circuit 156 can identify the controls assigned to the identified rules. The issue circuit 156 can identify data structures corresponding to the controls received from the device 120 of the client 115. For example, the issue circuit 156 can identify the client 115 that generated of the controls. The issue circuit 156 can identify the client 115 by extracting the field-value pair from the data structure corresponding to the controls. The issue circuit 156 can parse the data structures to identify the field-value pairs of the rules for which the controls were generated. By identifying the rules for which the controls were generated, the issue circuit 156 can identify the associations between the rules and the controls.

The issue circuit 156 can generate the assessments based on rule changes identified via the web scraping. The issue circuit 156 can generate a request from the client 115 to flag a rule for changes. For example, the issue circuit 156 can receive the flag for the rule from an administrator of the client 115. For example, the issue circuit 156 can utilize the web scraper to identify that that the flagged rule has changed or there is a new bill before Congress to change the flagged rule. Responsive to the identification, the issue circuit 156 can generate or transmit to the devices 120, a notification that the flagged rule changed or might change.

The issue circuit 156 can generate or identify rules that can benefit from assessments or re-assessments. For example, the issue circuit 156 can generate or identify regulatory exam results. The issue circuit 156 can identify that the regulatory exams are focusing on a particular control. For example, the issue circuit 156 can identify that a number of regulatory exams focusing on the particular control exceeds a predetermined threshold. Based on the focus, the issue circuit 156 can identify that the assessment of the control should be updated. For example, the issue circuit 156 can calculate or identify a regression analysis of forecasts of compliance will be like in the future. For example, if the last 10 audits were positive for the client 115, then the issue circuit 156 can identify a forecast that the next audit will likely be positive.

The issue circuit 156 can generate comparisons of assessments from the client 115 to assessments by other clients 115 in the same industry. For example, the issue circuit 156 can identify that the client 115 provided a low assessment of a rule. The issue circuit 156 can identify that other clients in the industry provided a high assessment. Based on the difference, the issue circuit 156 can generate a request for confirmation of the low assessment from the client 115. The issue circuit 156 can transmit the request to the devices 120 of the client 115. For example, the issue circuit 156 can generate that most recent audits have focused on the control that the client 115 rated as low. In another example, the issue circuit 156 can generate a difference between previous assessments provided by the client 115 and the current assessment. For example, the issue circuit 156 can identify that the client 115 previously only provided high assessments and has now provided a low assessment. Based on the difference, the issue circuit 156 can generate a request for a confirmation of the low assessment from the client 115. The issue circuit 156 can transmit the request to the devices 120 of the client 115. The issue circuit 156 can generate a note explaining the assessment.

The issue circuit 156 can generate display information for the client 115 to make decisions about rules. The issue circuit 156 can generate the reports, the issues, and the tasks for the client 115 to assess. The issue circuit 156 can identify the controls or tasks assigned to the representative of the client 115. The issue circuit 156 can identify or maintain notes or explanations previously received from the client 115. The issue circuit 156 can advantageously provide this information to the devices 120 the client 115 as a compliance service.

The issue circuit 156 can generate selectable toggles to select among related rules, controls, and reports. For example, the issue circuit 156 can receive a selection to display rules about safeguarding client 115 assets to comply with federal laws. The issue circuit 156 can generate or identify the selected rule and any associated or linked rules such as federal rules. The issue circuit 156 can identify a selection to display controls. Responsive to the selection, the issue circuit 156 can identify controls related to safeguarding client 115 assets. The issue circuit 156 can generate a drop-down menu to indicate controls that can be selected for display. The issue circuit 156 can generate a drop-down of reports and events to indicate reports and events selectable for display.

The issue circuit 156 can generate assessment dashboards. The assessment dashboard can be a data visualization tool. The assessment dashboard can include compliance risk information, sales data, widgets, or operational metrics. For example, a financial services company that caters towards wealthy individuals in a wealth management business can issue credit cards. By issuing the credit cards, the financial services company will service the cards and receive complaints. For example, the complaints can be about merchants or transactions. The issue circuit 156 can generate performance indicators or assessment indicators for each complaint. For example, the issue circuit 156 can generate or identify display time-based segmentation of the complaints into timeframes. The time segments can show a client 115 when to acknowledge receipt of the complaint, when to investigate and try to resolve the complaint, and when to provide notice to the customer as to the resolution of the complaint. The issue circuit 156 can generate or identify filtered complaints by region or relevant regulator. The issue circuit 156 can advantageously identify, generate, or maintain visualized data for the client 115 to reduce reliance on internal analysis.

The issue circuit 156 can generate the assessments in the dashboard based on the information aggregated and received via the API. The issue circuit 156 can generate the information to display in respective segments. For example, the issue circuit 156 can generate or identify curated laws and regulations in one segment and consumer protection in another segment. For example, the issue circuit 156 can generate a segment directed to a consumer-banking unit of the client 115. The segment can include pre-populated assessments associated with consumer protection or compliance assessments.

The issue circuit 156 can maintain various user access rights defining access to the assessment dashboard. For example, the administrators can have wide access rights while individual users might not have access rights. The issue circuit 156 can generate or identify customization or filtration of consumer complaints or assessments to identify the relevant complaints and assessments.

The knowledge circuit 157 can maintain a knowledge base for clients 115 to use to proactively review of materials relevant to the client 115. The knowledge circuit 157 can generate data tables or GUIs of the materials such as by job function or roles and responsibilities. The knowledge circuit 157 can store tasks, such as for policy governance and learning management system tools. For example, boards of directors and corporate secretaries can access the knowledge base for legal and compliance functions used to manage policies.

The knowledge circuit 157 can maintain the controls for a client 115. The knowledge circuit 157 can maintain access rights to display portions of the knowledge base accessible to members 130 with certain access rights. The knowledge circuit 157 can maintain the access rights in a data structure. Responsive to receiving a request from the devices 120 of the member 130 to access the knowledge base, the knowledge circuit 157 can query the data structure to determine whether the access is allowed for various members 130. The knowledge circuit 157 can maintain the knowledge base without the assessments because the assessments can be unnecessary when displaying a reference library. The knowledge circuit 157 can maintain the assessments at the policy level because policies are typically at the highest level of hierarchy within a control environment. The knowledge circuit 157 can maintain the related controls.

The knowledge circuit 157 can generate a GUI for organizing and displaying the information described herein for the client 115. The knowledge circuit 157 can receive, from the devices 120 of the client 115, a query to display information about a particular industry or regulation. As a specific example, the knowledge circuit 157 can maintain rules for AML. The knowledge circuit 157 can generate a table with horizontal rows for the rules and assessments on another side with the controls. For example, the knowledge circuit 157 can maintain the hierarchy of the client 115 while displaying the assessments. In another example, the knowledge circuit 157 can maintain the metadata on one side of the interface and the hierarchy on the other side of the interface. The knowledge circuit 157 can maintain additional information such as the assessment and customization options.

The knowledge circuit 157 can maintain an intranet for members 130 of the organization to browse. The knowledge circuit 157 can generate or maintain policies and procedures for the members 130. The knowledge circuit 157 can maintain restrictions to restrict access to the assessment from certain members 130. The knowledge circuit 157 can maintain the controls. The knowledge circuit 157 can maintain policies and associated controls. For example, the knowledge circuit 157 can maintain the controls associated with policies for training purposes. In another example, the knowledge circuit 157 can maintain the policies to be reviewed and acknowledged by the members 130. The knowledge circuit 157 can maintain the policies as pictures, slides, or embedded videos. The knowledge circuit 157 can advantageously enable the client 115 to use the knowledge circuit 157 to provide training to its members 130.

The knowledge circuit 157 can maintain or include policies and procedures for the training or governance. The knowledge circuit 157 can enable the client 115 to draft and finalize training and policies. The knowledge circuit 157 can advantageously integrate governance with policies and training. The knowledge circuit 157 can identify, receive, or track acknowledgments from the members 130.

The knowledge circuit 157 can maintain the tasks and the knowledge base. For example, clients 115 can provide training to their members 130 or gather acknowledgments to identify participation percentage rates. The knowledge circuit 157 can advantageously provide tests for the members 130 of the client 115 to confirm that the members 130 have retained and learned the content in the training.

The database 158 is structured to retrievably store data associated with the compliance platform 105 and/or any other component of the system 100. The database 158 may be structured as any type of database with programmable rules or logic configured to enable the retrievable storage of data, information, etc. The database 158 may also include security protocols, such as encryption logic and the like, that is configured to enable secure storage of the information contained in the database 158. In operation, the data/information stored in the database 158 can include information associated with each of the components of the system 100. Thus, the database 158 is configured to store the rules, controls, or assessments as described herein.

The database 158 can be configured to store one or more applications and/or executables to facilitate operations described herein. In some implementations, the applications and/or executables can be incorporated with an existing application in use by the compliance platform 105. In some implementations, the applications and/or executables are separate software applications implemented on the compliance platform 105. The applications and/or executables can be downloaded by the compliance platform 105 prior to its usage, hard coded into the memory 136 of the processing circuit 132, or be a network-based or web-based interface application such that the compliance platform 105 can provide a web browser to access the application, which can be executed remotely from the compliance platform 105 (e.g., by a user device). Accordingly, the compliance platform 105 can include software and/or hardware capable of implementing a network-based or web-based application. For example, in some instances, the applications and/or executables include software such as HTML, XML, WML, SGML, PHP (Hypertext Preprocessor), CGI, and like languages.

A user (e.g., administrator 125, member 130, or employee) can log onto or access the web-based interface before usage of the applications and/or executables. For example, the compliance platform can store a web application and provide the web application via the network 110 to the user for presentation in a browser interface. In this regard, the applications and/or executables can be supported by a separate computing system including one or more servers, processors, network interface, and so on, that transmit applications for use to the compliance platform 105.

The database 170 includes one or more executables 172 for providing a provider application on the device(s) 120. In some implementations, the executables includes an application such as a mobile application, a computer application, and the like. In some implementations, the executables includes a web-based application such that the device(s) 120 can access the application via the network 110. The executables include instructions (e.g., logic, modules, etc.) to facilitate operations described herein. For example, the executables can include instructions for generating or displaying the GUIs (such as those described with respect to FIGS. 3-112). In some implementations, the executable 172 includes instructions for any other operation associated with the provider device(s) 120 described herein. For example, the executable 172 can include executable code or be an executable file or executable program that causes the devices

120 to perform encoded tasks. In one example, a version of the executable can be provided by the compliance platform 105 to the database 170 for execution by the devices 120 to establish communications with the compliance platform 105. In another example, a version of the executable can be provided to the device 120 for execution to display an application (e.g., web application) in from which the client 115 can receive compliance related services.

In some implementations, the compliance platform 105 includes hardware, software, or any combination of hardware and software structured to facilitate certain operations of the components of the system 100. The specialized circuits of the compliance platform 105 described herein can include any combination of hardware and software to implement the compliance tools and functionality thereof described herein. In some implementations, the compliance platform 105 can include any combination of hardware and software including specialized processing circuits, applications, executables, and the like for controlling, managing, or facilitating the operation of the other computing systems of the system 100. For example, the compliance platform 105 can include additional processing circuits and associated software for controlling the operation of components of the system 100. The additional specialized circuits can be substantially similar to the specialized processing circuits described herein below.

The device(s) 120 (e.g., device 120A or device 120B) shown can include a processing circuit 162, an I/O circuit 168, and a database 170. In some implementations, the processing circuit 162, the I/O circuit 168, and the database 170 are the same or substantially similar to the processing circuit 132, the I/O circuit 138, and the database 158 of the compliance platform 105. For example, the processing circuit 162 can include a processor, shown as processor 164, and memory, shown as memory 166, that is the same as or substantially similar to the processor 134 and memory 136.

Regulatory entity 112 such as regulators or governments. The provider institution can be associated with subject matter experts that refine and train the compliance platform 105 to provide compliance related tools. For example, the subject matter experts can generate machine learning models that scrape compliance information from regulatory entity 112.

In some implementations, the database 168 stores an executable 172 such that the user device(s) 120 is operable to execute the executables of the provider. For example, the device(s) 120 can execute the executable 172 to generate and/or display the user interfaces as described with respect to FIGS. 3-112. The executable 172 includes one or more sets of instructions for providing a provider application on the device(s) 120. In some implementations, the executable 172 includes an application such as a mobile application, a computer application, and the like. In some implementations, the executable 172 includes a web-based application such that the device(s) 120 can access the application via the network 110. The executable 172 includes instructions to facilitate operations such as utilizing the interface circuit 142 described herein. For example, the executable 172 can include instructions for generating an improved user interface (described herein, below, with respect to FIGS. 3-112). In some implementations, the executable 172 includes instructions for any other operation associated with the device(s) 120 described herein.

Components of the system 100 (e.g., compliance platform 105, regulatory entity 112, or device 120) can includes a bus or other communication component for communicating information and a processor coupled to the bus for processing information. The computing system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The computing system can further include a read only memory (ROM) or other static storage device coupled to the bus for storing static information and instructions for the processor. A storage device, such as a solid state device, magnetic disk or optical disk, is coupled to the bus for persistently storing information and instructions.

The computing system can be coupled via the bus to a display, such as a liquid crystal display, or active matrix display, for displaying information to a user. An input device, such as a keyboard including alphanumeric and other keys, can be coupled to the bus for communicating information, and command selections to the processor. In another implementation, the input device has a touch screen display. The input device can include any type of biometric sensor, a cursor control, such as a mouse, a trackball, or cursor direction keys, for communicating direction information and command selections to the processor and for controlling cursor movement on the display.

In some implementations, the computing system can include a communications adapter, such as a networking adapter. The communications adapter can be coupled to bus and can be configured to enable communications with a computing or communications network and/or other computing systems. In various illustrative implementations, any type of networking configuration can be achieved using the communications adapter, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes that effectuate illustrative implementations that are described herein can be achieved by the computing system in response to the processor executing an implementation of instructions contained in main memory. Such instructions can be read into main memory from another computer-readable medium, such as the storage device. Execution of the implementation of instructions contained in main memory causes the computing system to perform the illustrative processes described herein. One or more processors in a multi-processing implementation can also be employed to execute the instructions contained in main memory. In alternative implementations, hard-wired circuitry can be used in place of or in combination with software instructions to implement illustrative implementations. Thus, implementations are not limited to any specific combination of hardware circuitry and software.

Various graphical user interfaces are shown and introduced to aid explanation of the method 200. Beneficially, the graphical user interfaces may enable various customizable views: by enterprise-wide, by legal entities, by client types, by issue owner, by business segment, by products and/or services, by assessment units, by action owner, etc. Beneficially, the customizable and adaptable graphical user interfaces enable relatively quick drill-down possibilities that conserve computing power by reducing a need for a user to search a network for various rules, cross-check a database to identify owners assigned those rules, aggregate the information for action, and so on. Rather, the compliance computing platform 105 that generates and provides the graphical user interface may substantially reduce a computing load, which increases a speed of a computer and improves an overall customer experience.

Figure 2:
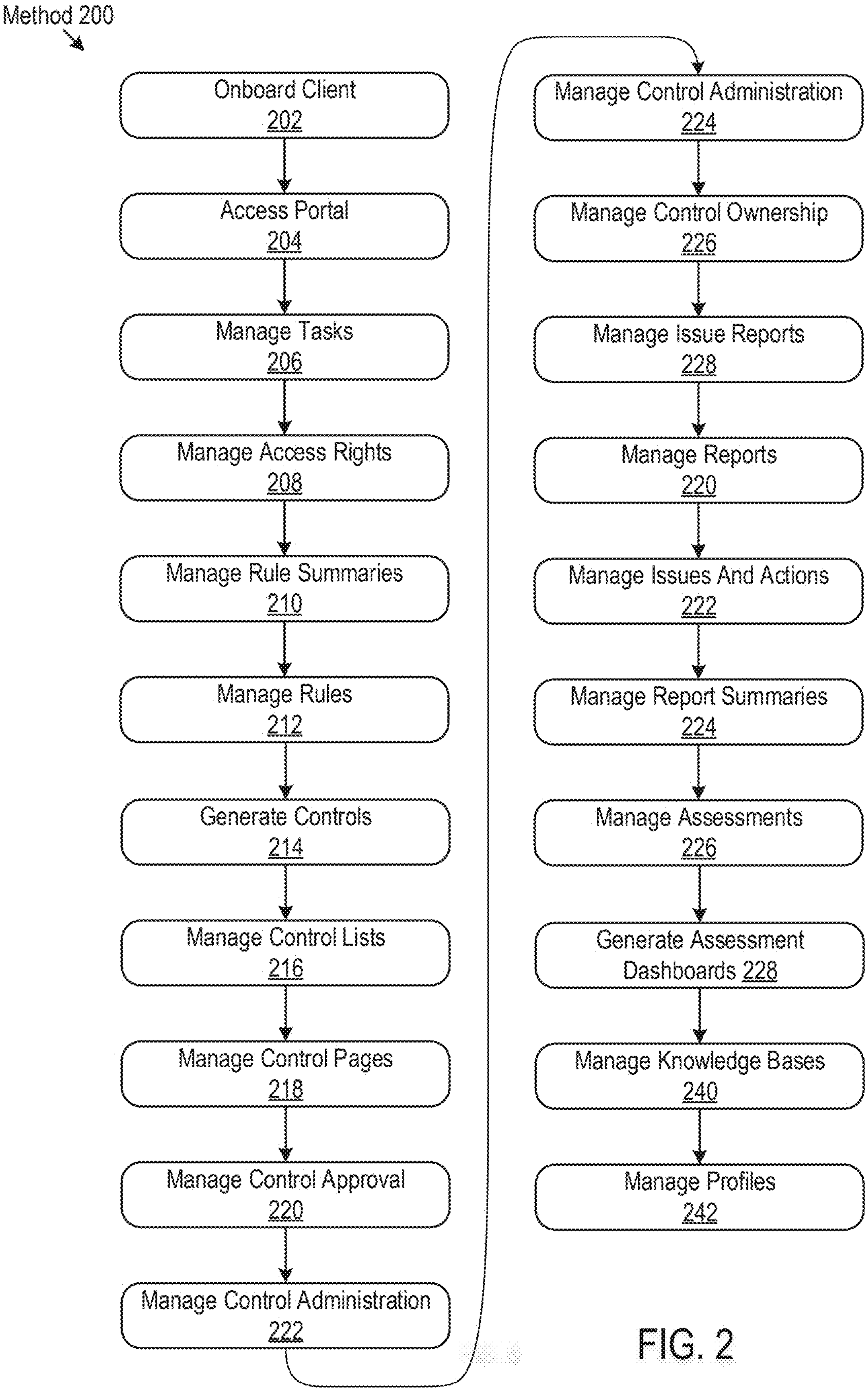
FIG. 2 is a flow chart of a method of using the regulatory compliance platform, according to an example implementation.

Referring now to FIG. 2, a flow diagram of a method 200 of providing compliance related services of classifications by the compliance platform 105 of FIG. 1, according to an example implementation. In some implementations, one or more of the computing systems of the system 100 can be configured to perform method 200. For example, the compliance platform 105 and/or the device 120 can be structured to perform the method 200. In some implementations, the method 200 can include user inputs from a user (e.g., administrator 125 or member 130), devices 120 (such as devices of the user), another computing device on the network 110, and the like. In some implementations, the steps of the method 200 can be performed in a different order than is shown in FIG. 2. For example, step 214 can be performed before step 206. In some implementations, the method 200 can include more or fewer steps than is shown in FIG. 2.

Now referring to step 202 of FIG. 2 in conjunction with FIGS. 3-13, the compliance platform 105 can generate and provide/display GUIs for onboarding the client 115. Onboarding refers to the process of enrolling the client 115 with the compliance platform 105 to receive compliance related services from the compliance platform 105. The compliance platform 105 can generate and display onboarding GUIs. The compliance platform 105 can display steps to onboard a new client 115 to provide a customized experience. For example, the compliance platform 105 can transmit an invite to the client 115 and then display the onboarding to the client 115. The compliance platform 105 can receive sign-up information from the client 115 to sign-up to use the compliance platform 105 for managing policies and procedures.

The compliance platform 105 can request information from the client 115 about their organization or industry. The compliance platform 105 can receive sign-up information from the client 115. The compliance platform 105 can receive selections from the client 115. For example, the compliance platform 105 can receive touch selections, key presses, or commands to zoom in and zoom out. The sign-up information can include organization information about the client 115, such as their industry and relevant regulations. For example, the compliance platform 105 can receive, from the client 115, organizational attributes such as those relating to legal entities. For example, the compliance platform 105 can receive the organizational structure of the client 115, such as their office locations and practice groups.

The compliance platform 105 can onboard the client 115 by generating a profile or any other data record for the client 115. Based on the information of the client 115, the compliance platform 105 can identify the jurisdiction of the client 115 and group their information. For example, the compliance platform 105 can identify the US offices of the client 115 subject to US rules, and the EU offices subject to EU rules.

The compliance platform 105 can receive selections to manage the onboarding of the client 115. For example, the compliance platform 105 can receive data from the device 120A of the administrator 125 of the client 115. The compliance platform 105 can receive selections of specifications and identifications of rules to manage. For example, the compliance platform 105 can receive selections of legal entities, bank, brokers, dealers, or insurance companies. The compliance platform 105 can receive the selections at an enterprise level to generate the organizational hierarchy. For example, the compliance platform 105 can request selections of legal entity types and names. The compliance platform 105 can display the segments and/or business units for the client 115. For example, the compliance platform 105 can display between business units, such as personal consumer banking, commercial banking, investment banking, or wealth management. The compliance platform 105 can receive selections of products and services, client types, or individual clients.

Figure 13:
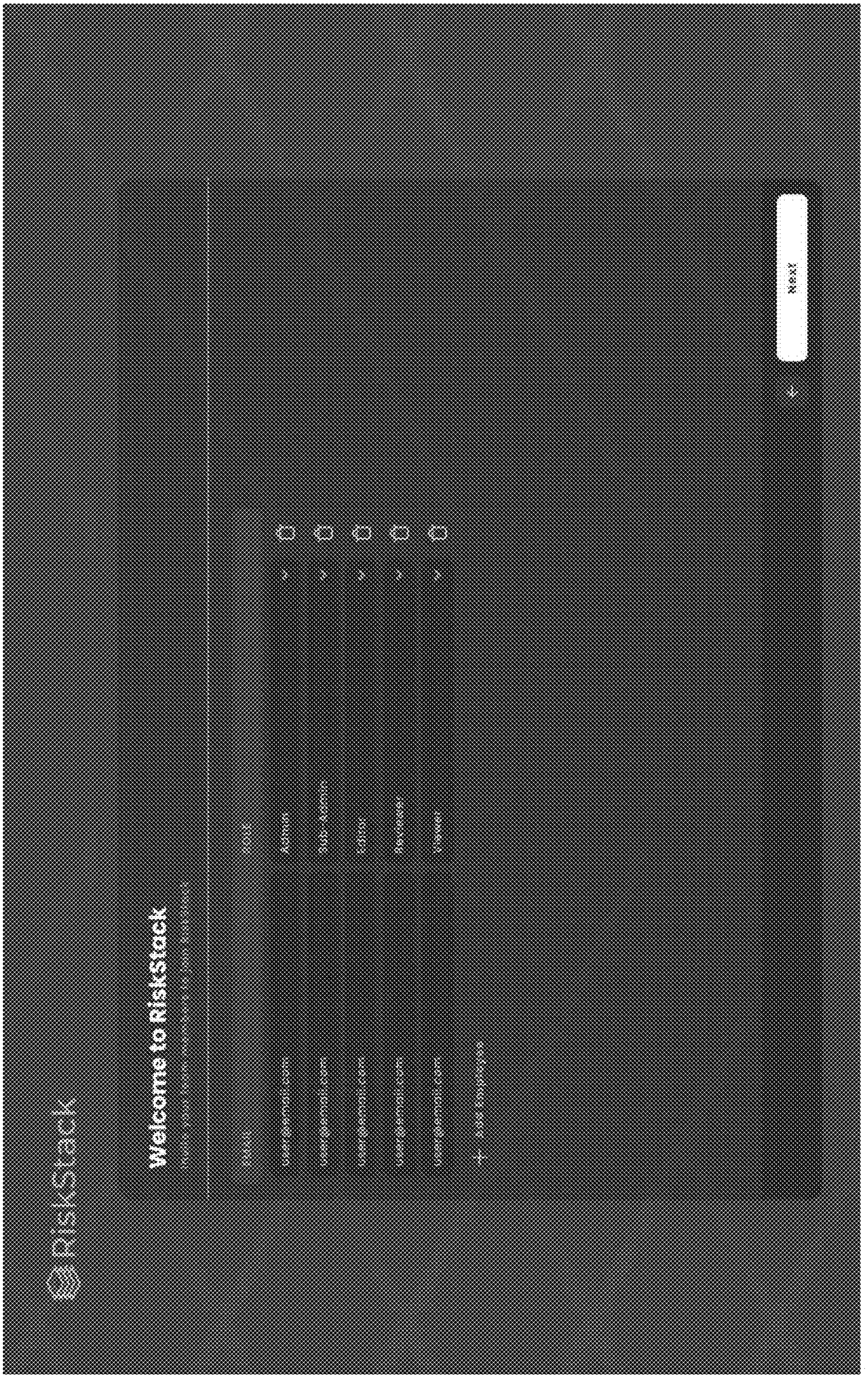
Figure 14:
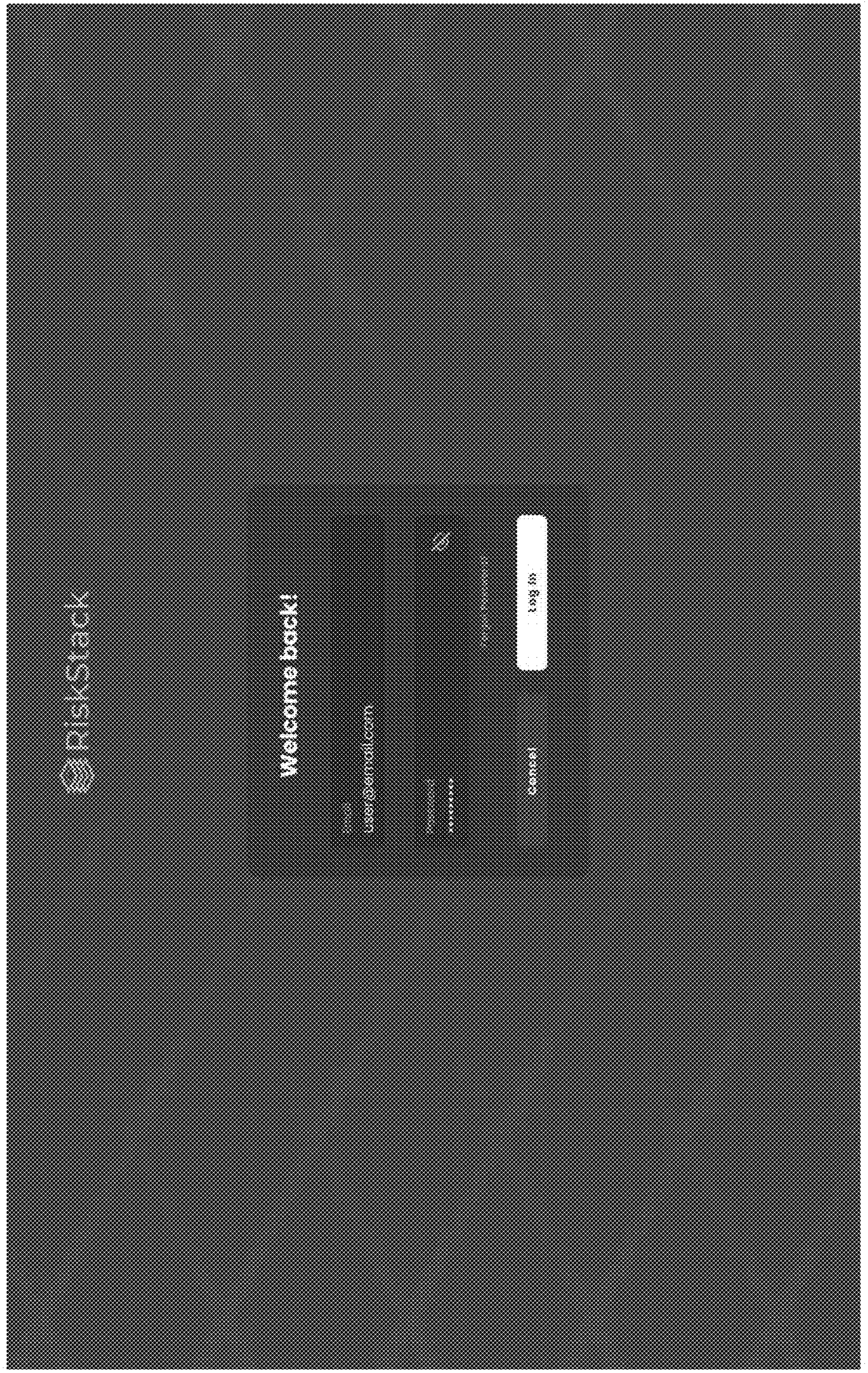
FIGS. 14-17 are GUIs for accessing the compliance platform, according to an example implementation.
Figure 15:
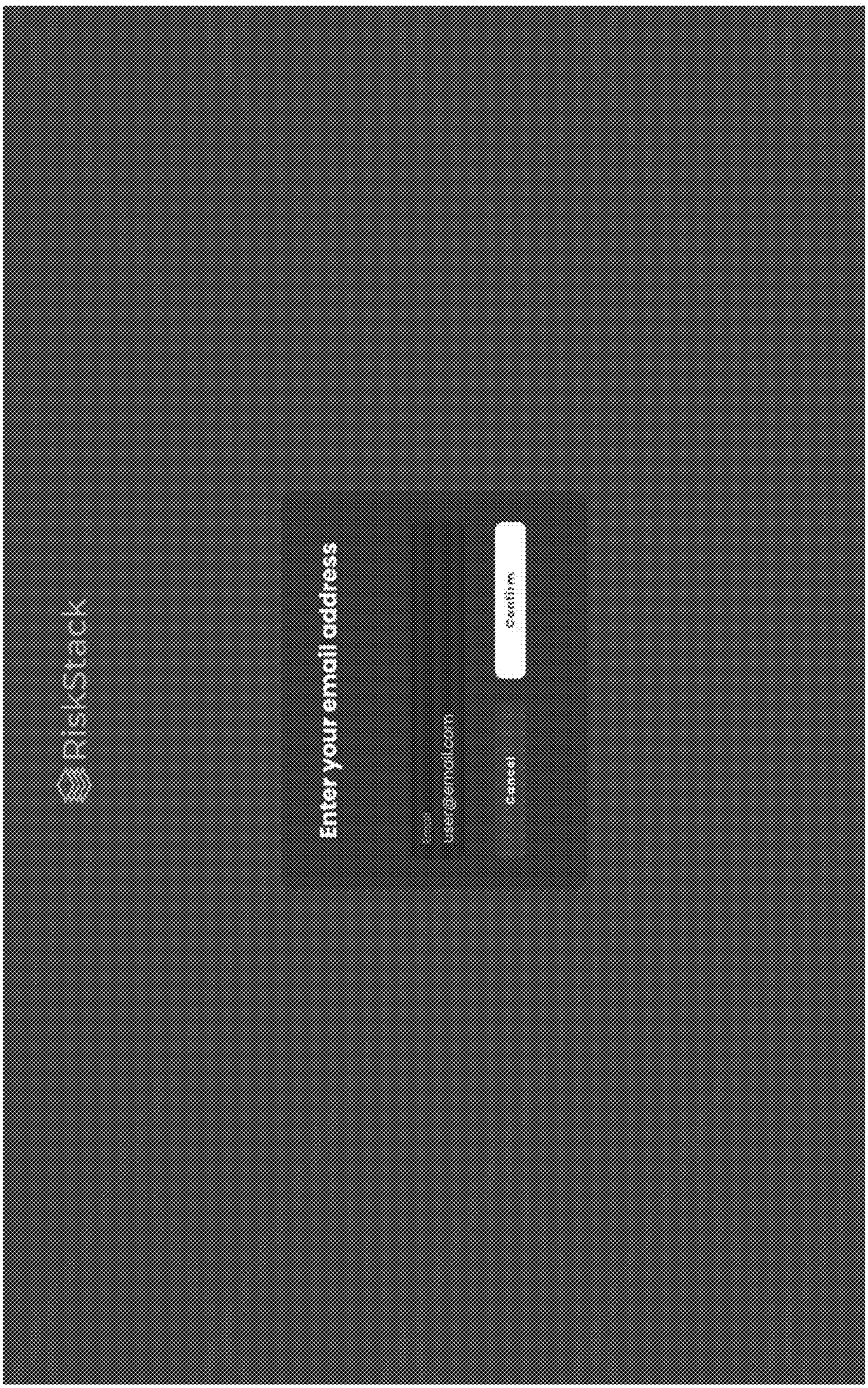
Figure 16:
Figure 17:
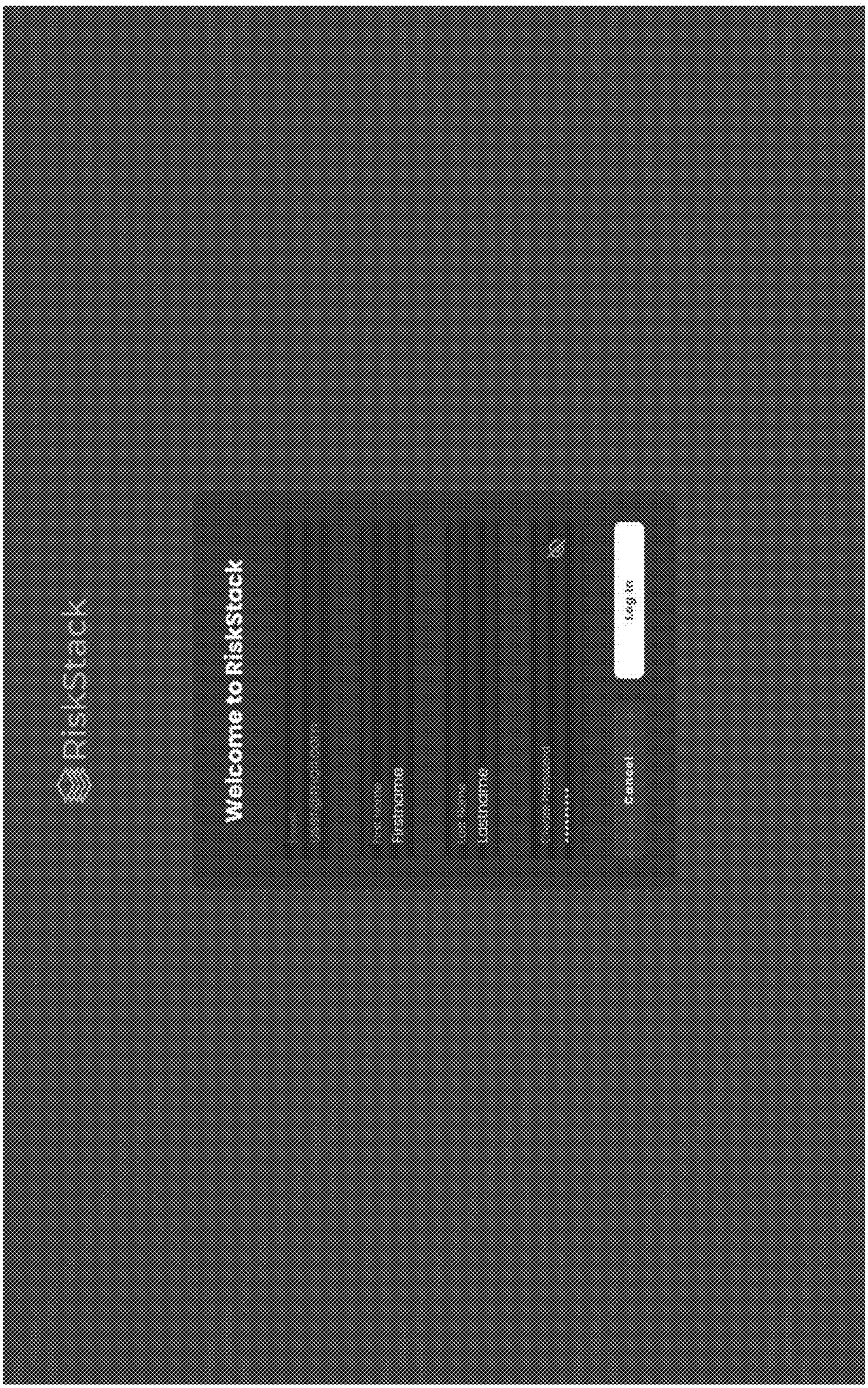

As shown in FIG. 13, the compliance platform 105 can display selections for the administrator 125 to invite an additional administrator 125 or members 130. For example, the chief privacy officer of the company reports into the general counsel, who has a chief of staff. The compliance platform 105 can receive a request to provide the chief of staff with access rights to be the administrator 125. The compliance platform 105 can display selections for administrator 125 to control or define access and privileges. The compliance platform 105 can advantageously enable the client 115 to manage the roles of various users in its organization.

Now referring to step 204 of FIG. 2 in conjunction with FIGS. 14-17, the compliance platform 105 can display GUIs for accessing the compliance platform 105. The compliance platform 105 can receive an access request from the devices 120 for the client 115 to access the compliance platform 105. The compliance platform can receive authentication information via one or more APIs from the devices 120. For example, the authentication information can be a login and password. The compliance platform 105 can validate the authentication. For example, the compliance platform 105 can compare the login and password of the administrator 125 or the members 130 to a stored login and password. Responsive to authenticating the administrator 125 or the members 130, the compliance platform 105 can provide access to the administrator 125 (e.g., chief counsel, etc.) or the members 130 (e.g., employees) of the client 115.

Figure 18:
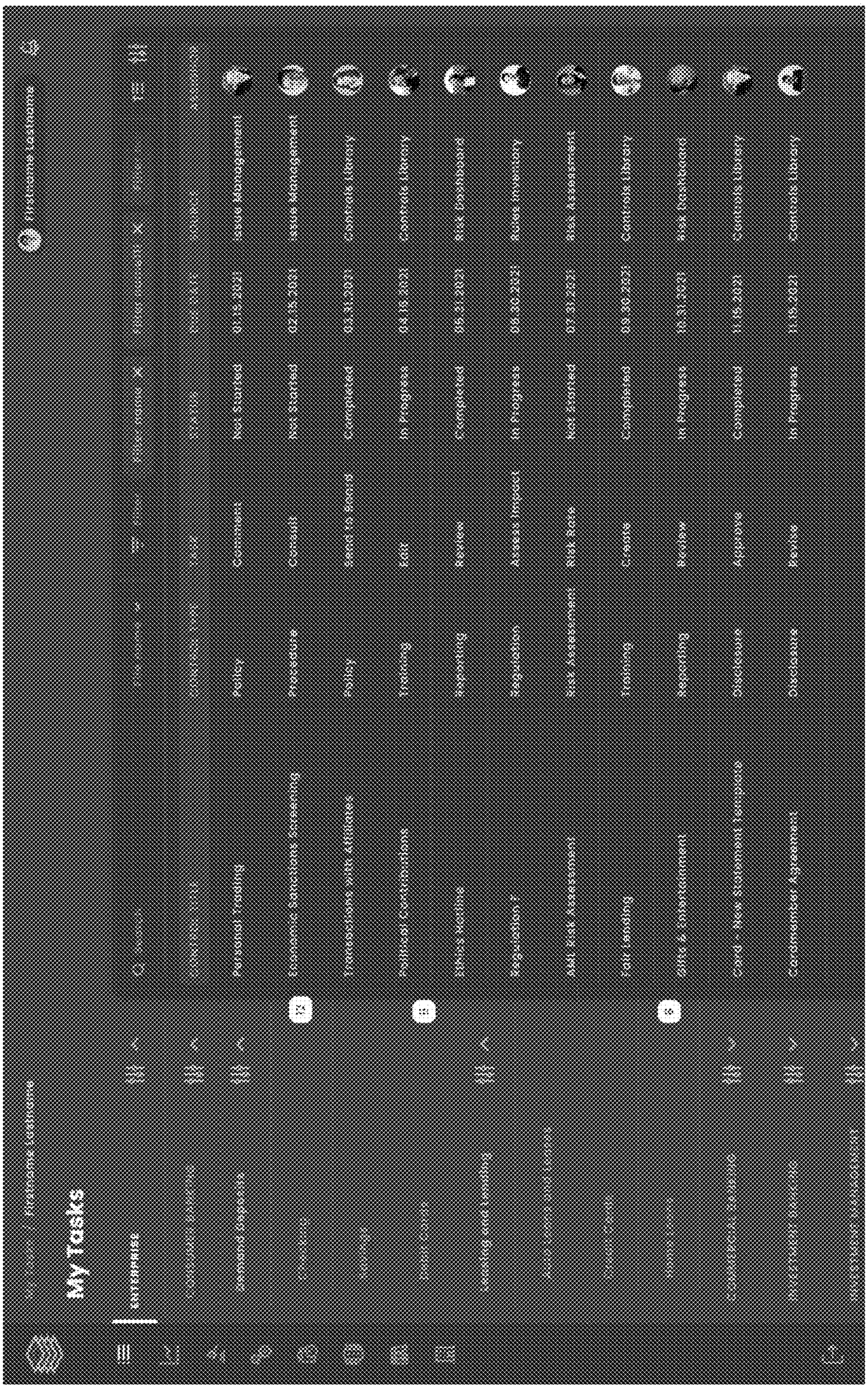
FIGS. 18-20 are GUIs for managing tasks, according to an example implementation.
Figure 19:
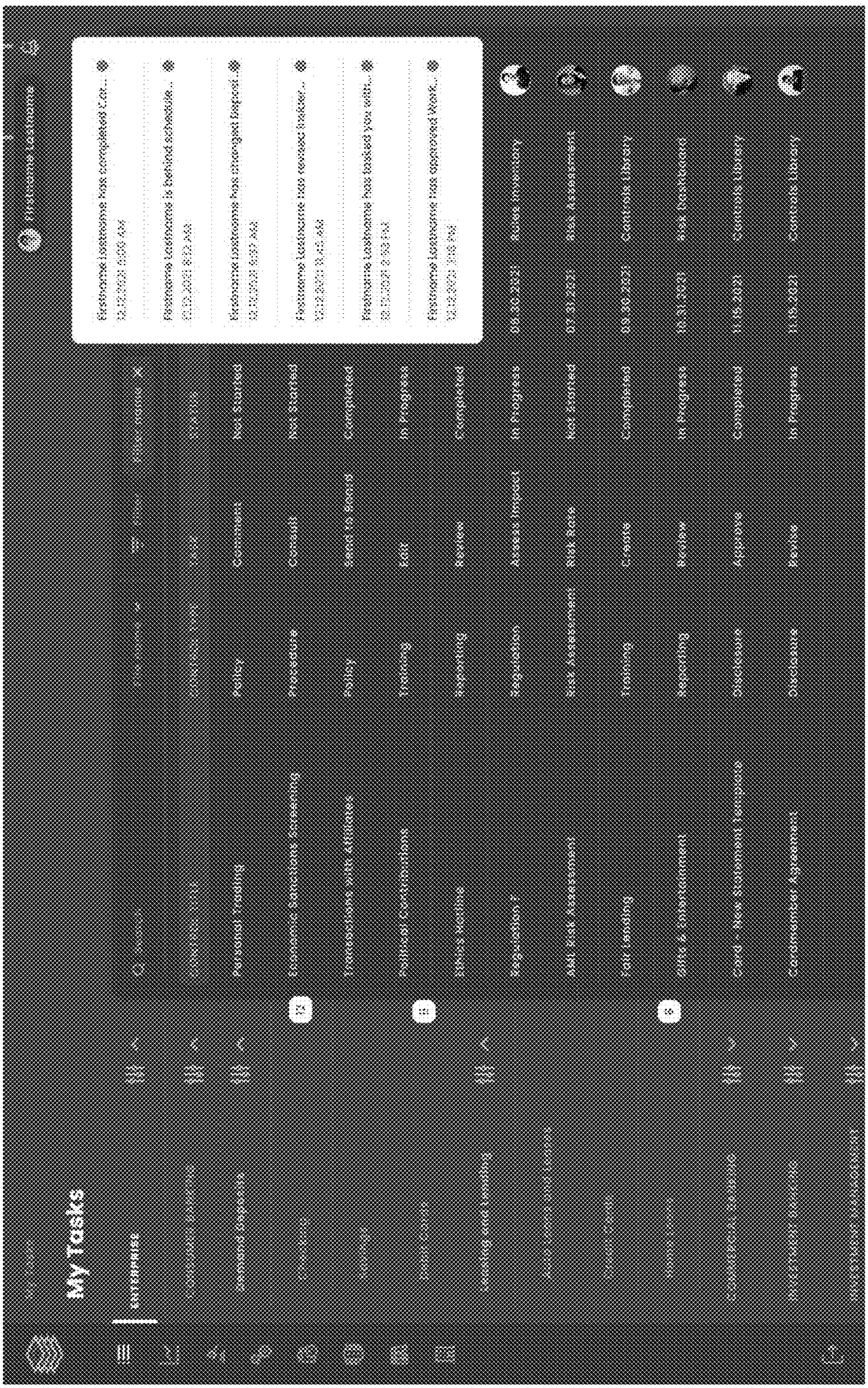
Figure 20:
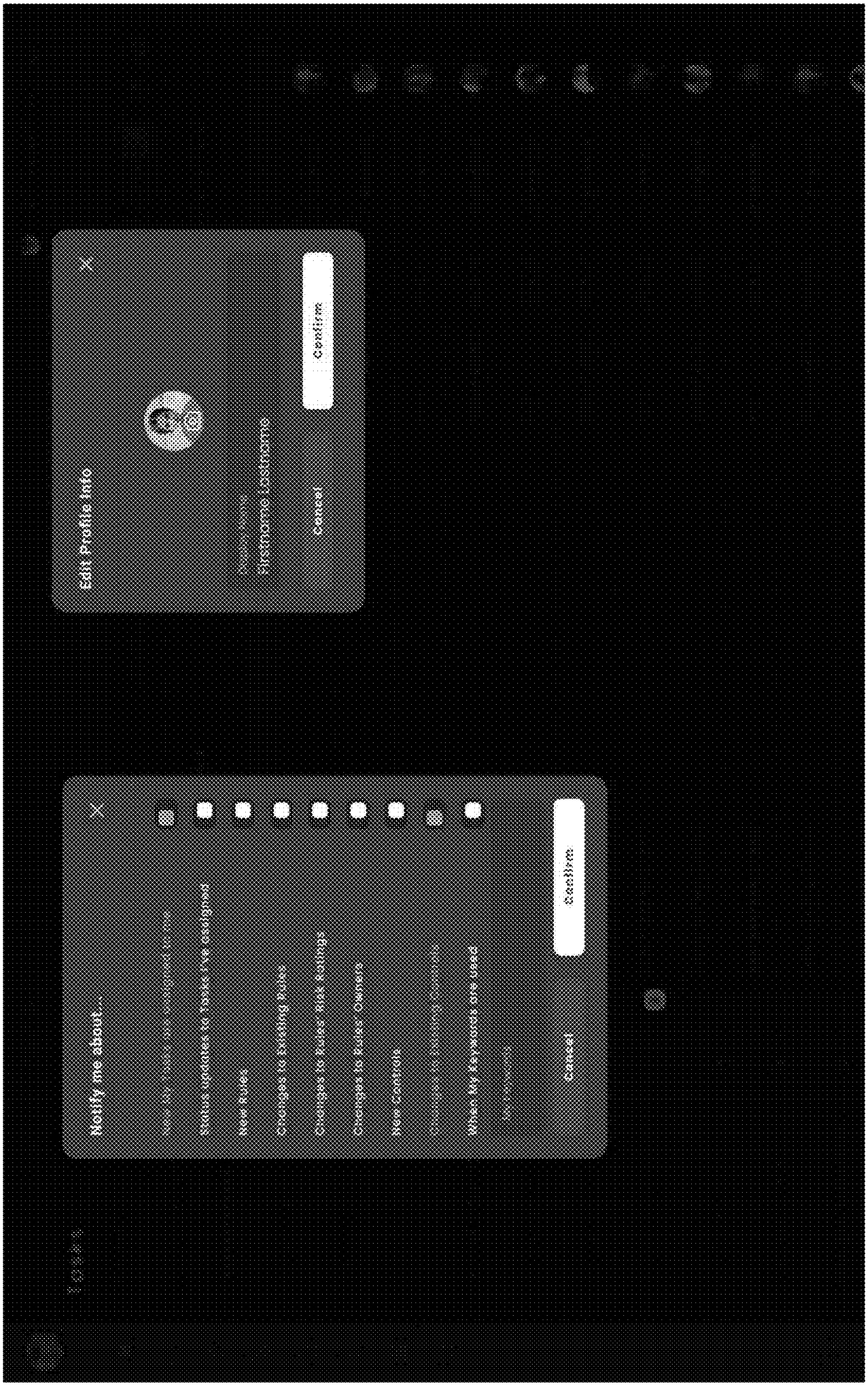

Now referring to step 206 of FIG. 2 in conjunction with FIGS. 18-20, the compliance platform 105 can display GUIs for managing tasks. The compliance platform 105 can be used as, at least in part, a workflow tool for the administrator 125 to assign tasks and for the members 130 to complete. "Tasks" refer to actions to be taken by the administrator 125 and the members 130 for compliance are associated with controls. The compliance platform 105 can receive, from the devices 120 of the members 130, categories relating to the task. The categories can refer to a comment, consult, board meeting, edit, review, assess impact, risk rate, create, review, approve, or revise. The compliance platform 105 can advantageously link controls to reports, events, tasks, and rules in a comprehensive and holistic way. The compliance platform 105 can generate tasks based on the locations and organization structure of the client 115. For example, the compliance platform 105 can generate tasks based on US rules for the US offices of the client 115, and tasks based on the EU rules for the EU offices of the client 115.

As shown in FIG. 18, the compliance platform 105 can display the tasks. For example, the compliance platform 105 can display a "My Tasks" section to indicate tasks assigned to the members 130. The compliance platform 105 can display identifications of members 130 assigned to tasks. For example, the compliance platform 105 can display audit compliance testing such as FINRA exams. As shown in FIG. 19, the compliance platform 105 can display tasks that have been assigned to various members 130 of the client 115. The compliance platform 105 can receive the assignments from the administrator 125 via the devices 120.

The compliance platform 105 can automatically generate tasks based on the information (e.g., industry) of the client 115 and the received tasks and assignments thereof. For example, the compliance platform 105 can display tasks relating to manufacturing regulations for the client 115 in the manufacturing industry. The compliance platform 105 can advantageously reduce the need for manual entry of tasks by the client 115.

As shown in FIG. 20, the compliance platform 105 can display notifications to members 130 that they have been assigned to a task. The notifications can be about new rules or regulations. The compliance platform 105 can advantageously integrate internal audits, controls, compliance testing, and regulatory exams.

Figure 21:
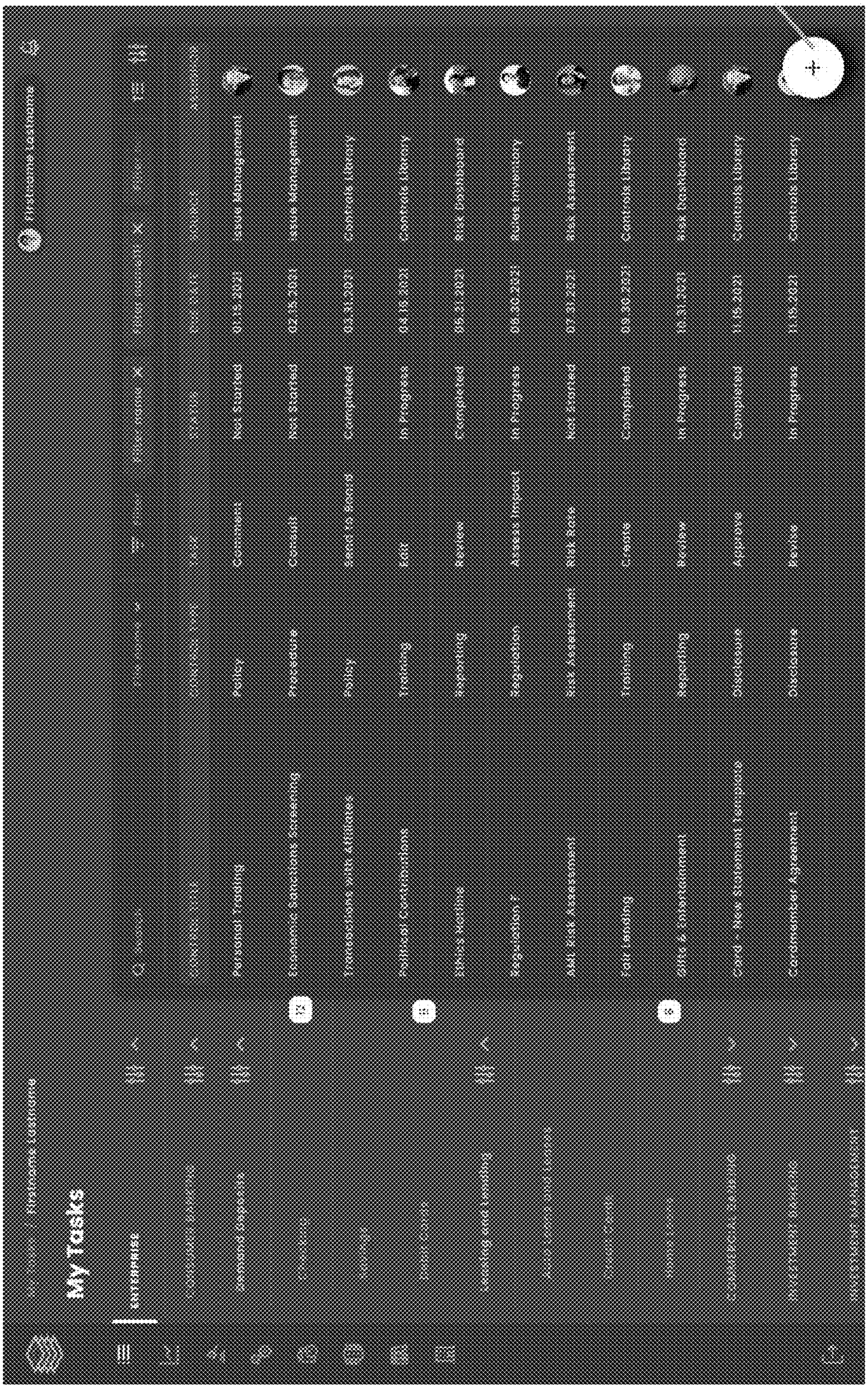
FIGS. 21-23 are GUIs for administrators with access rights to assign tasks, according to an example implementation.
Figure 22:
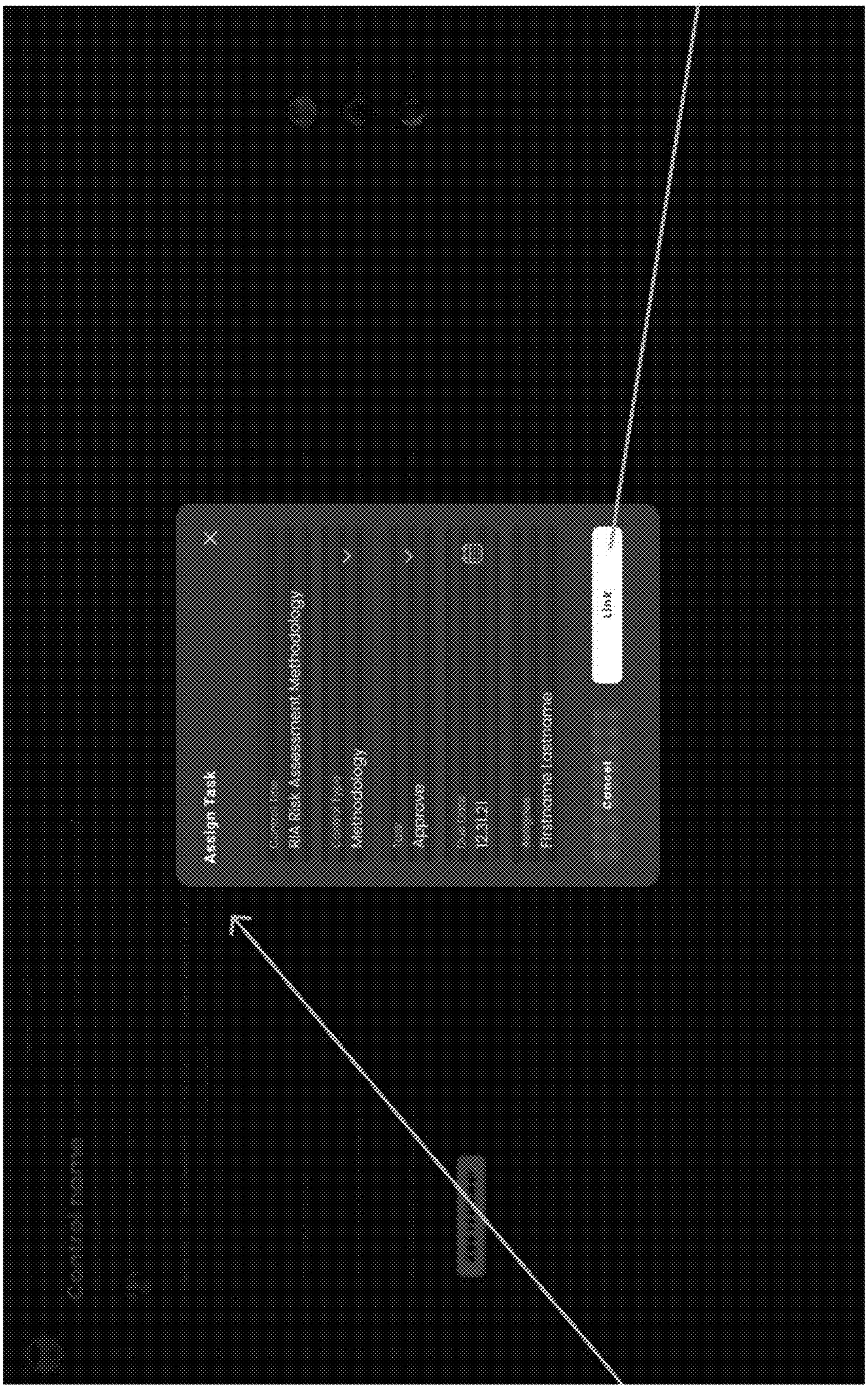
Figure 23:
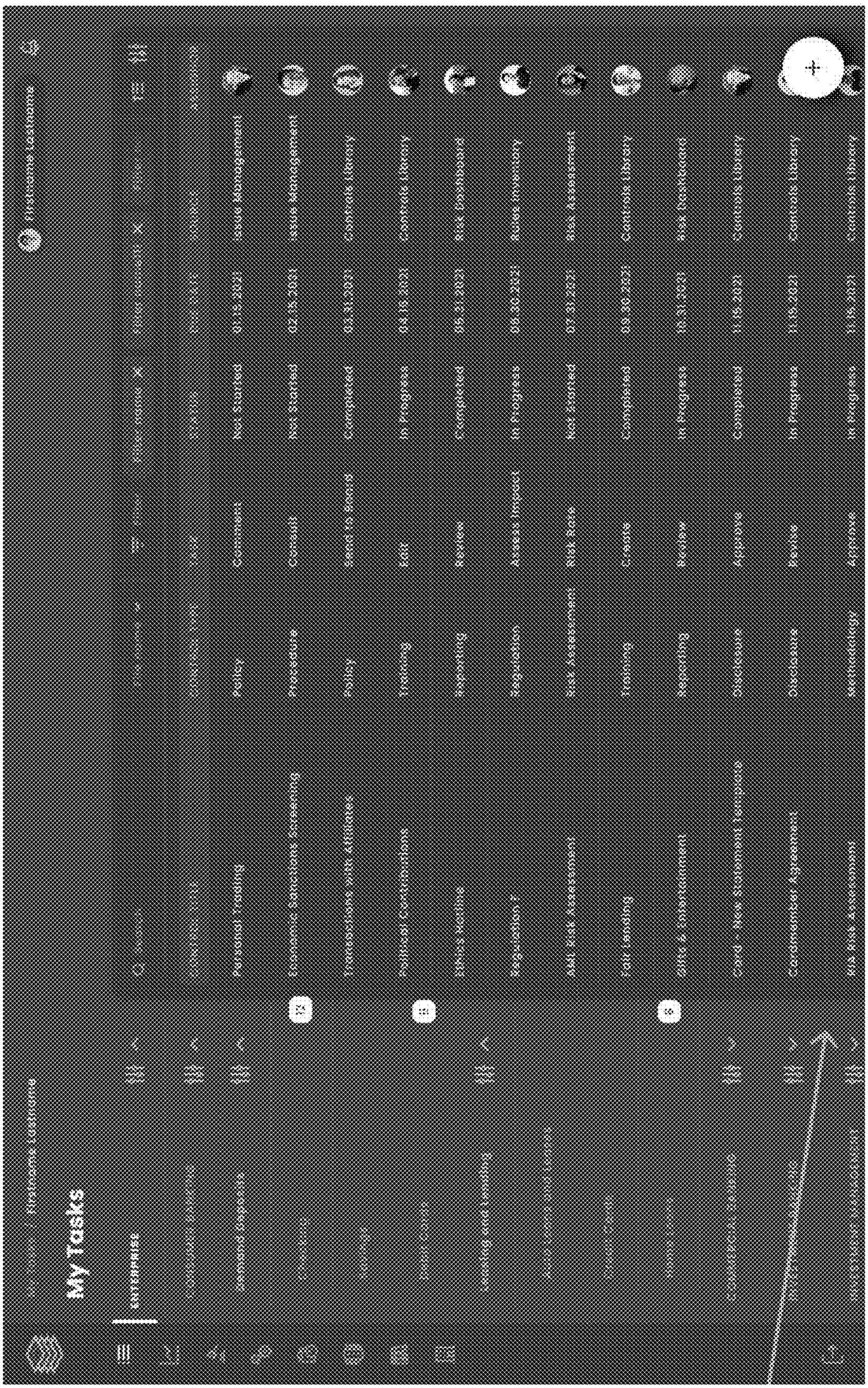

Now referring to step 208 of FIG. 2 in conjunction with FIGS. 21-23, the compliance platform 105 can display GUIs for the administrator 125 with the predefined access rights to assign tasks. The user interface of FIG. 21 may allow assignment of control reviews, approvals, and ownership to certain staff via a single sign-on integration. Access rights refer to permissions provided to the administrator 125 and the members 130 to read, assign, modify, delete or otherwise access tasks assigned to the administrator 125 and the members 130. The compliance platform 105 can receive, from the devices 120 of the administrator 125 (e.g., chief of staff), assignments of the policy or tasks assigned to members 130. For example, the tasks can be workflows for legal compliance and business.

Now referring to step 210 of FIG. 2 in conjunction with FIGS. 24-29, the compliance platform 105 can generate and display GUIs depicting a rule summary list. The compliance platform 105 can display rules, regulations, and pertinent industry guidance. The rules can be standards, policies, laws, or regulations for the client 115. The compliance platform 105 can provide rules curated by jurisdiction, organization, or product. For example, the rules can be associated with financial regulations/laws, such as anti-money laundering (AML). The compliance platform 105 can identify the rules for specific jurisdictions, such as AML rules in the US. The compliance platform 105 can identify the rules for organizations associated with the client 115. For example, the compliance platform 105 can identify that rules for the client 115 associated with professional organizations (e.g., generally accepted accounting principles, or American Bar Association), state governments, educational institutions, or international organizations (e.g., EU). The rules are curated to include laws, regulations, industry association guidance, regulatory exam manuals and guidance, etc. The rules may be curated by jurisdiction, risk (e.g., AML), product (e.g., credit cards, securities, etc.). As described herein, the GUI may be dynamically updated with notifications provided via web scraping and machine learning models to track changes to requirements or and newly promulgated requirements, depict a risk rate each requirement for inherent risk via standardized or custom risk assessment methodologies, depict workflows to assign requirement reviews and ownership to legal and compliance staff via single sign-on integration to evidence appropriate governance, map each requirement to commensurate controls via proprietary reference data, and be integrated with controls, issues and risk assessment.

Figure 24:
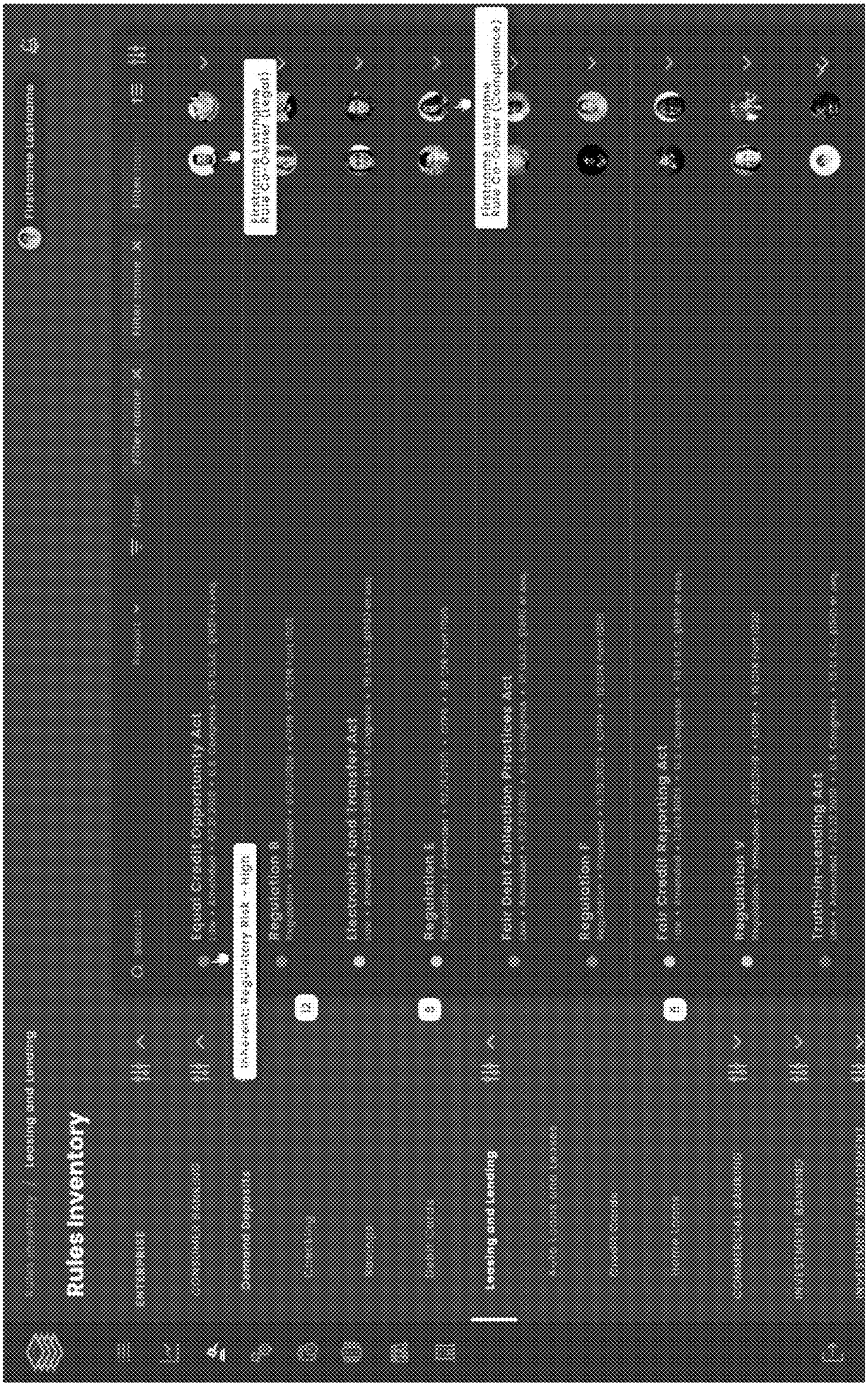
FIGS. 24-29 are GUIs of rule summary lists, according to an example implementation.
Figure 25:
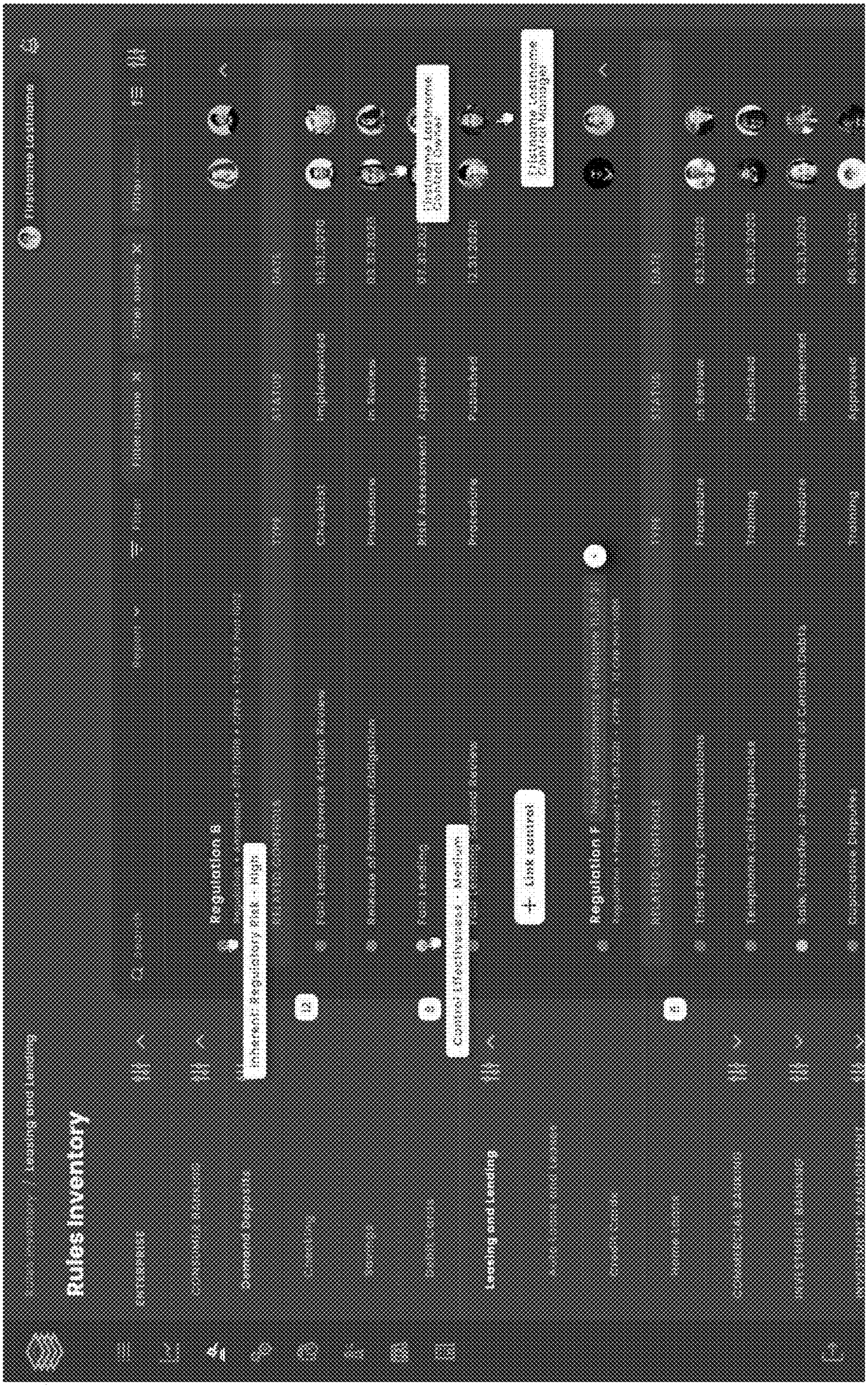
Figure 26:
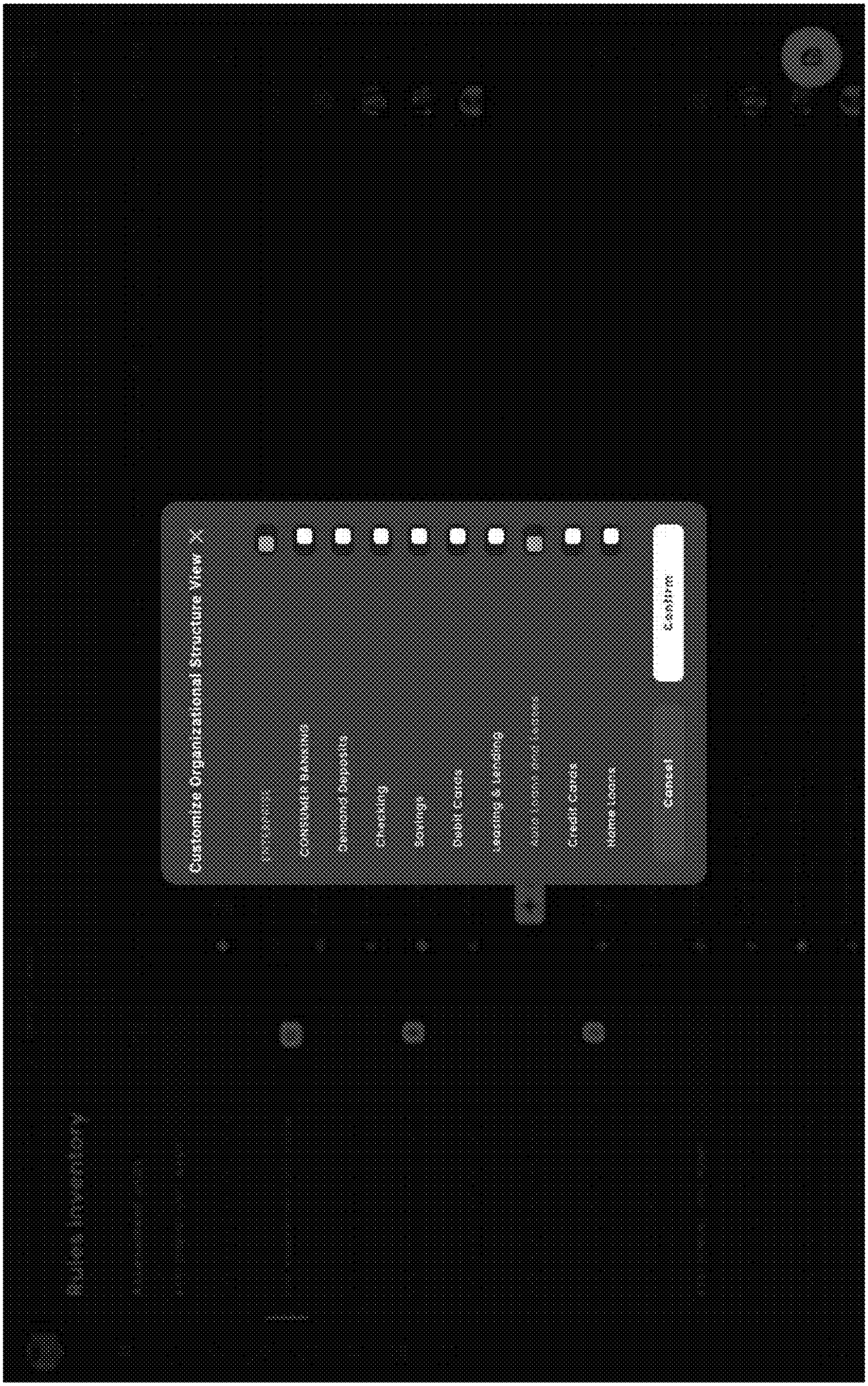
Figure 27:
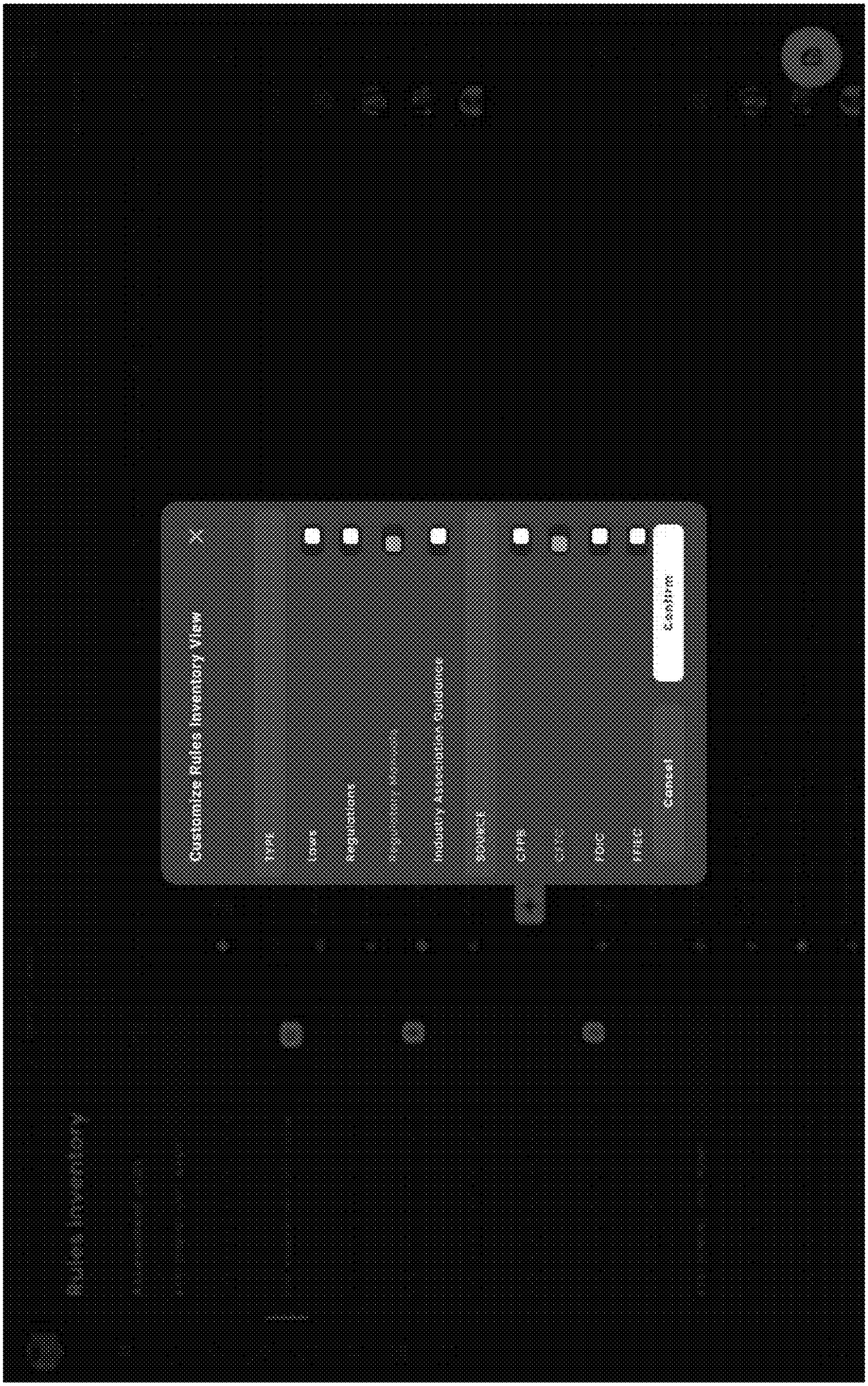
Figure 28:
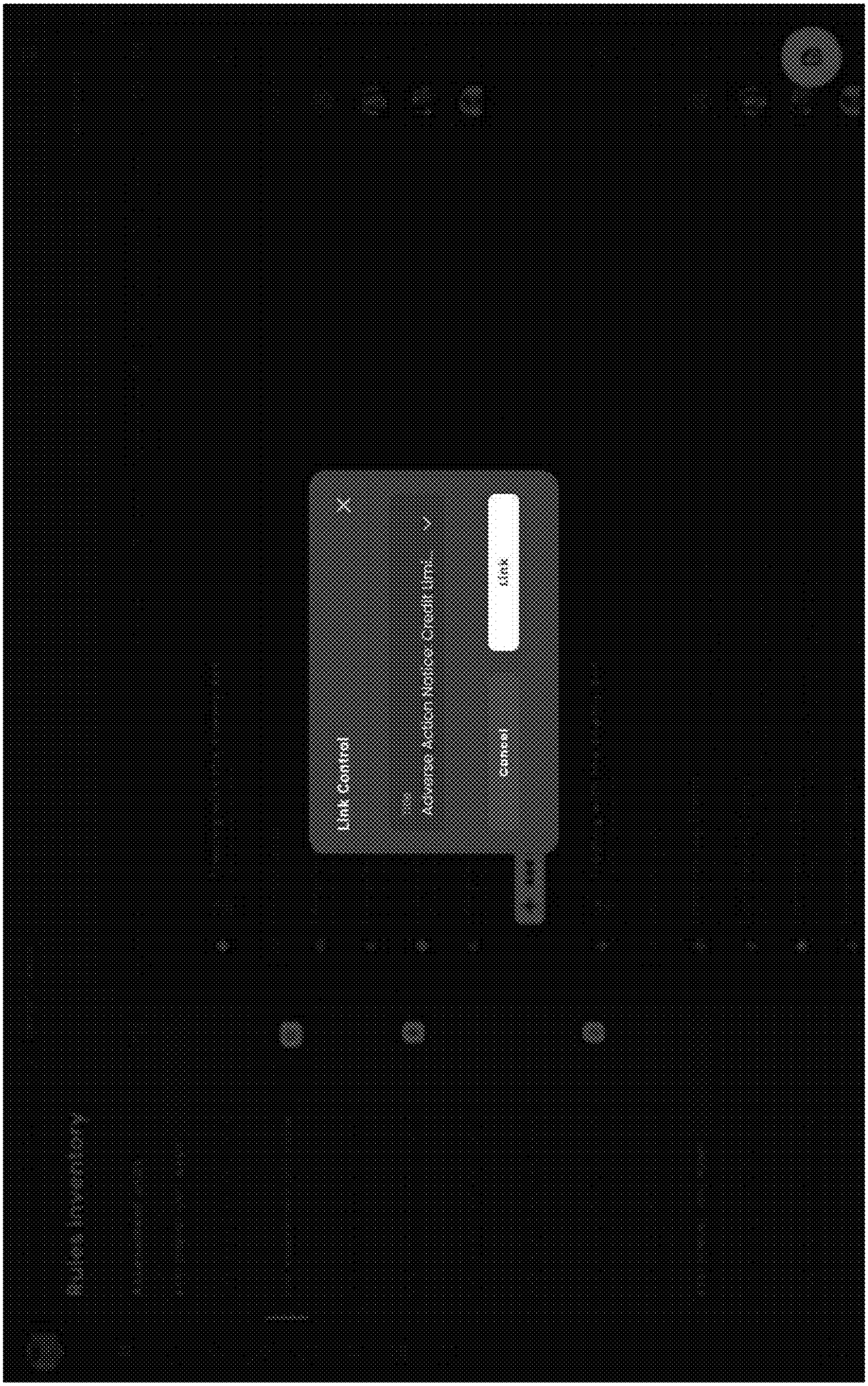
Figure 29:
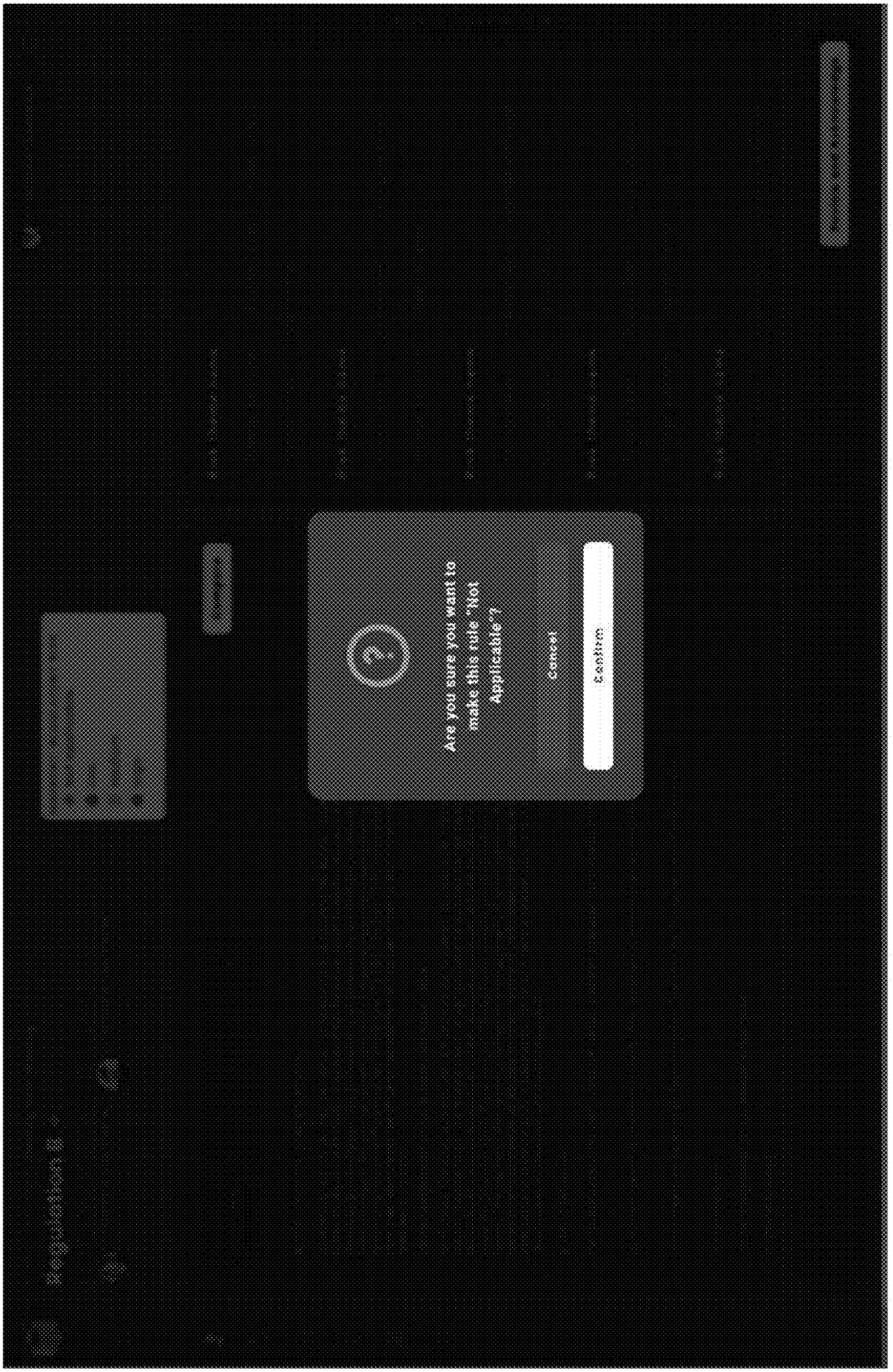
Figure 30:
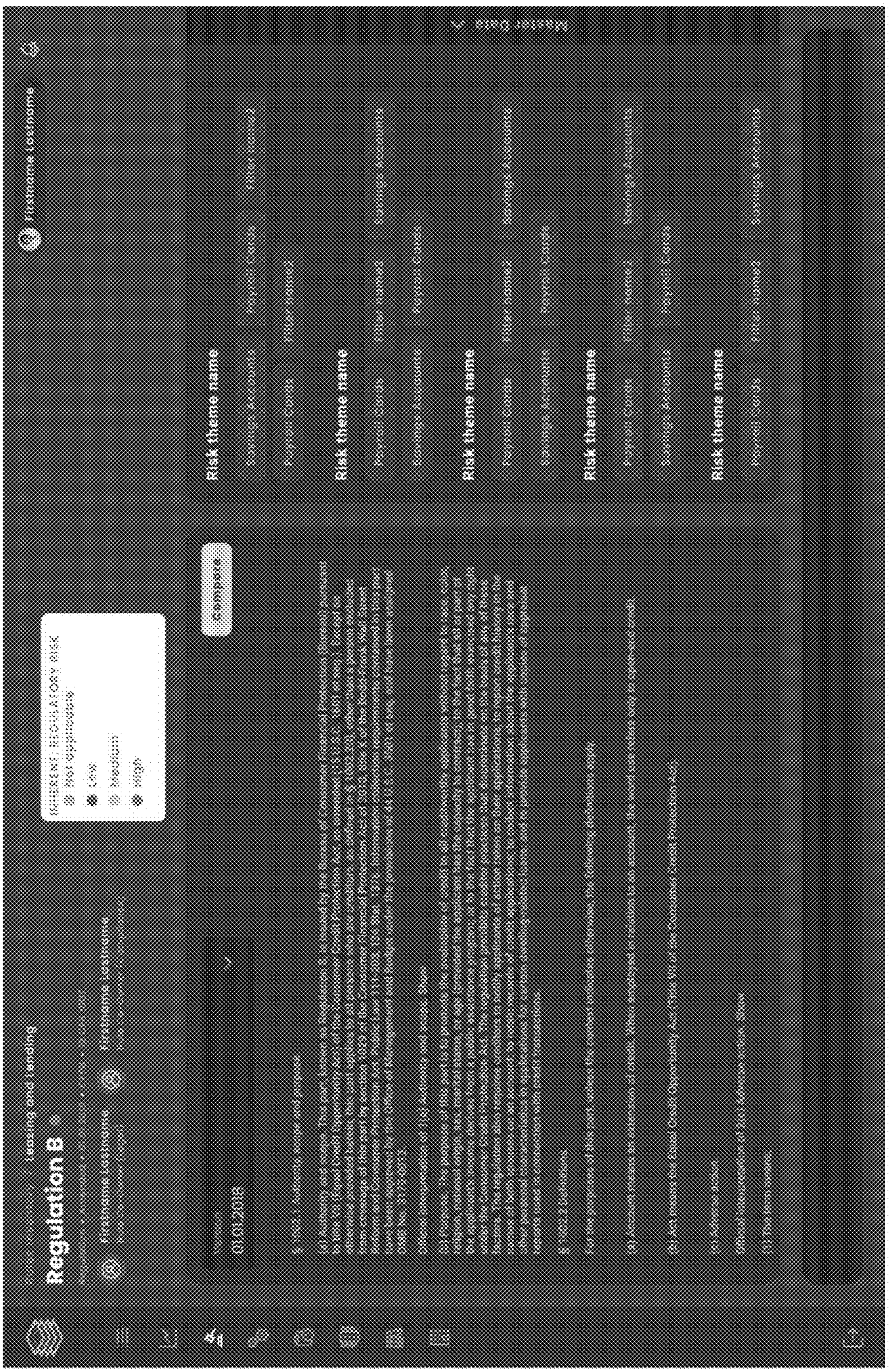
FIGS. 30-33 are GUIs showing individual rule pages, according to an example implementation.
Figure 31:
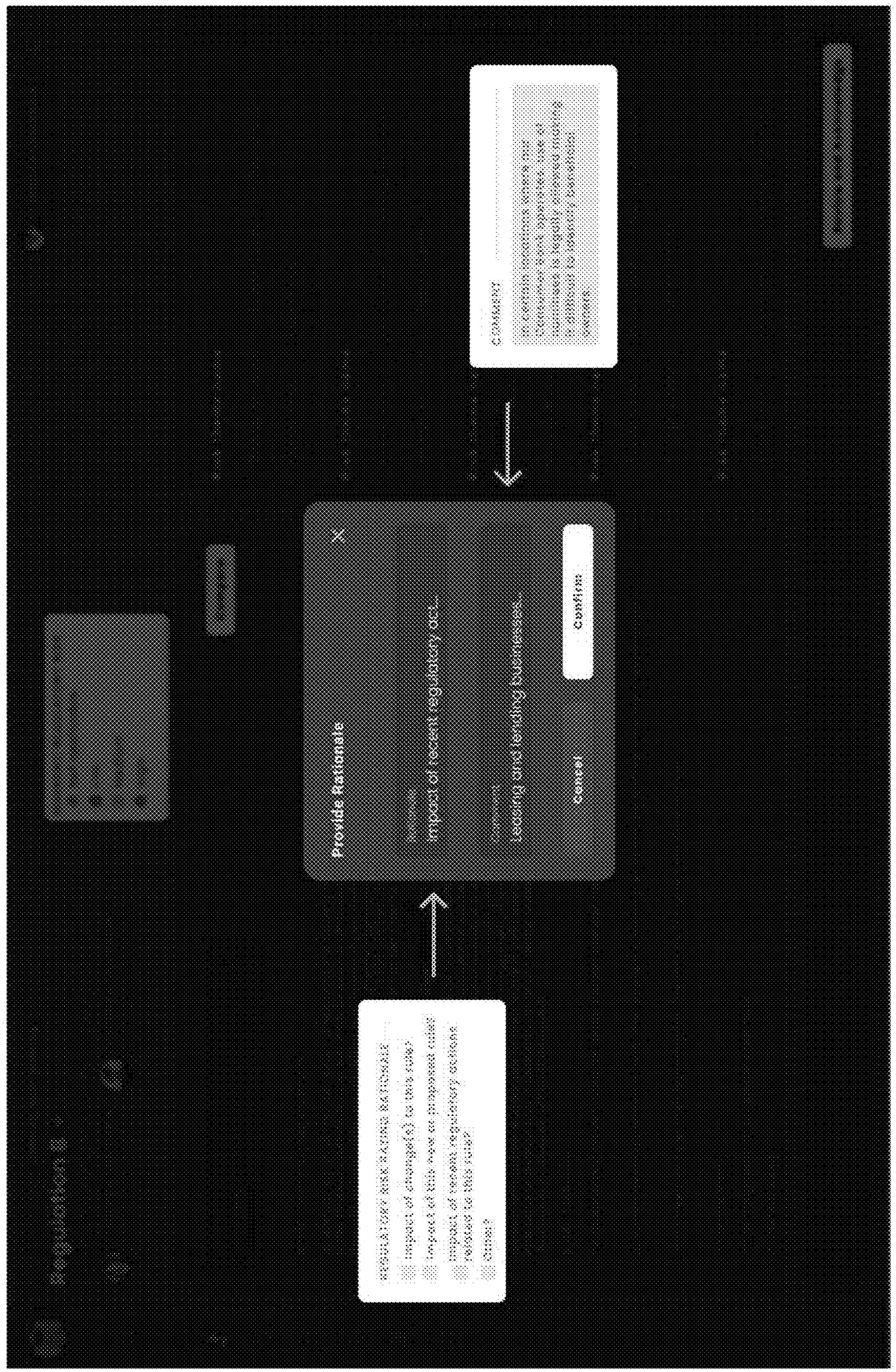
Figure 32:
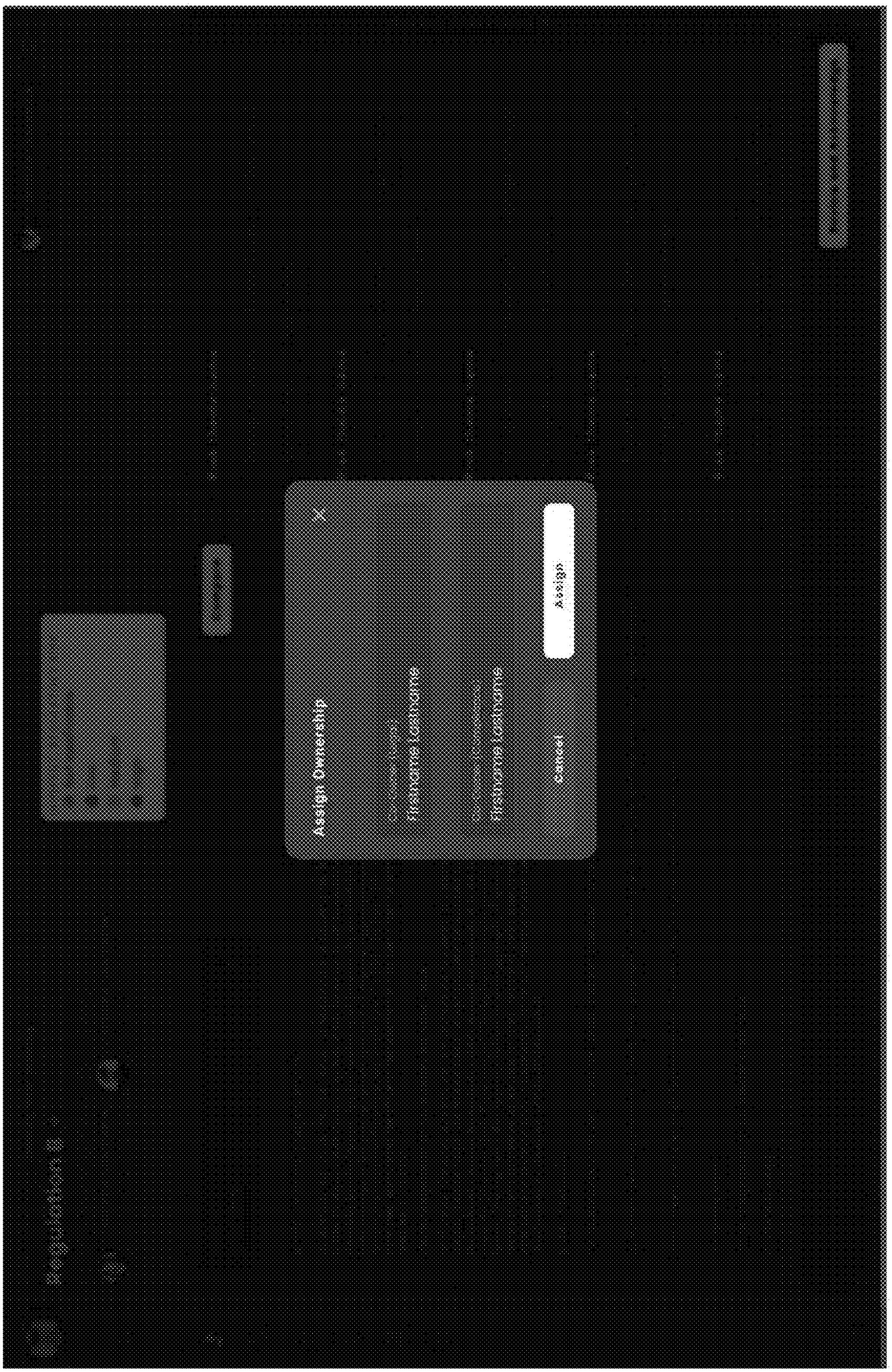
Figure 33:
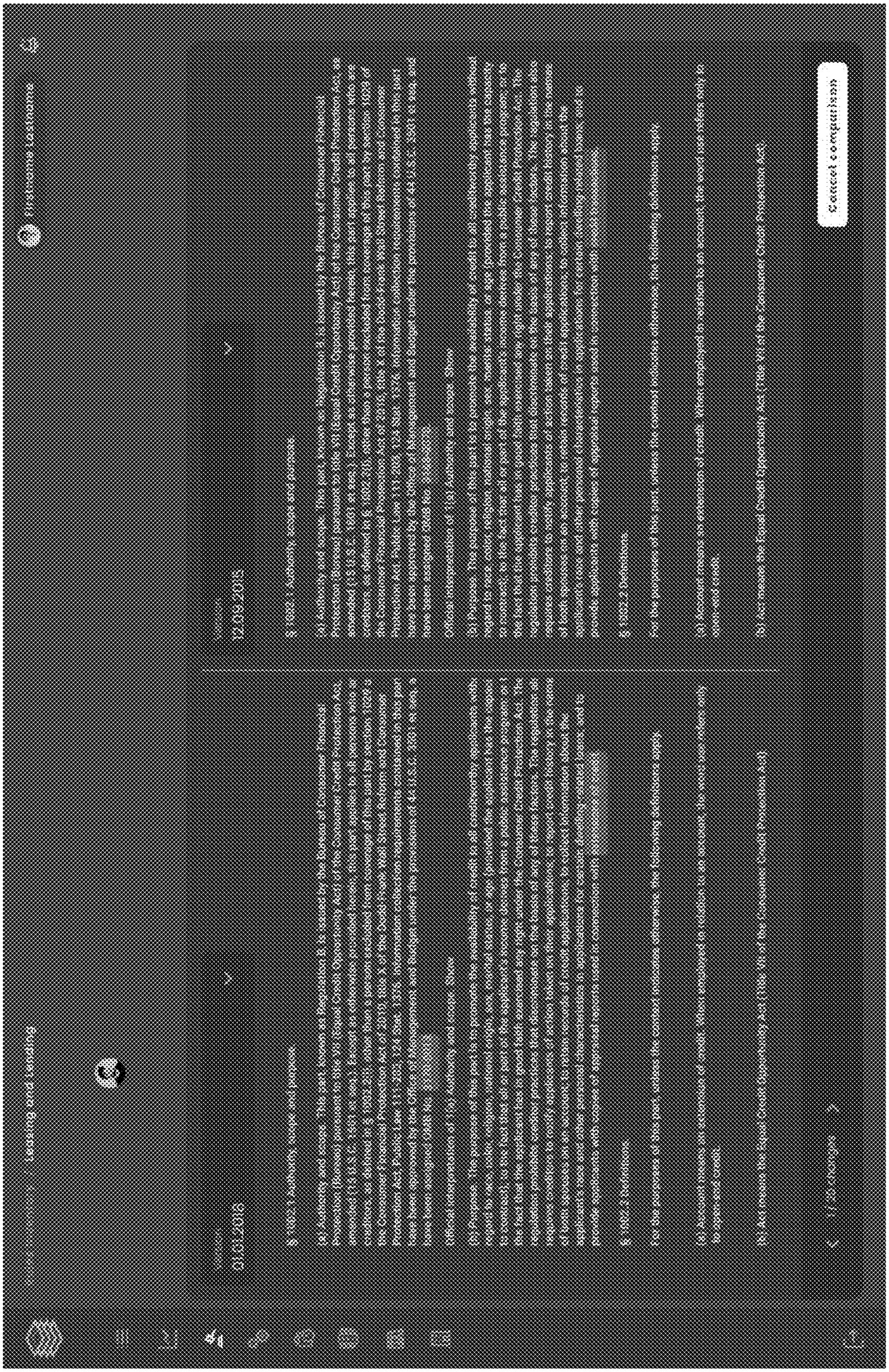

The compliance platform 105 can identify the rules for products associated with the client 115. For example, the compliance platform 105 can identify the rules for the client 115 in the e-commerce industry by identifying data protection regulations in the European Union along with any country specific rules. As shown in FIG. 24, the GUI enables a drill-down/customized view based on, for example, legal entities of interest, client types, business segments, compliance rule owners, products and services, etc.

The compliance platform 105 can display a controls summary list. For example, the compliance platform 105 can display a controls summary list for a wealth management entity. The compliance platform 105 can display controls, policies, or procedures for the wealth management entity. Responsive to a selection, the compliance platform 105 can display additional details or a drill down. For example, responsive to selection of a procedure, the compliance platform 105 can display federal rules associated with that procedure.

The compliance platform 105 can display a summary GUI to the client 115. The summary GUI can include high-level compliance information for the client 115. For example, the client 115 can display a compliance offering for leasing and lending. The compliance platform 105 can display a client's organizational structure. The compliance platform 105 can advantageously integrate the organizational structure of the client 115 and display relevant compliance information to the client 115 for their hierarchical organizations, teams, groups, and departments.

The compliance platform 105 can display policies, procedures, controls, regulatory relations, or regulatory rules. The compliance platform 105 can display a rules inventory. For example, the compliance platform 105 can display rules for global food and beverage organization, airplane manufacturers, transportation companies, or financial services. These clients do not need to understand which regulatory requirements apply to them. The compliance platform 105 can display curated requirements. For example, if the client 115 is an airplane manufacturer, the compliance platform 105 can display US Federal Aviation Agency (FAA) regulations. In another example, if the client 115 is a financial service provider, the compliance platform 105 can display banking regulations. The compliance platform 105 can advantageously reduce computational processing to manually retrieve the regulations from the relevant agency, provider, or research service.

Now referring to step 212 of FIG. 2 in conjunction with FIGS. 30-33, the compliance platform 105 can display GUIs of individual rule pages. The compliance platform 105 can display a summary list or the rules inventory with laws and regulations. Responsive to receiving a selection, the compliance platform 105 can display the rules or regulations. The compliance platform 105 can receive a selection of a particular rule. Responsive to the selection, the compliance platform 105 can display the entire text of the rule for review. The compliance platform 105 can also display any prior versions or amendments of the rule.

The compliance platform 105 can display industry regulator manuals (e.g., bank regulatory manuals, etc.) with industry guidance. The compliance platform 105 can display any compliance information to inform the client 115 about compliance requirements. For example, the compliance platform 105 can display a current state of the compliance requirements, such as a current law. The compliance platform 105 can display the amended law or a proposed new law that is expected to be approved. For example, the compliance platform 105 can display a source or a legal citation for the rule.

Figure 34:
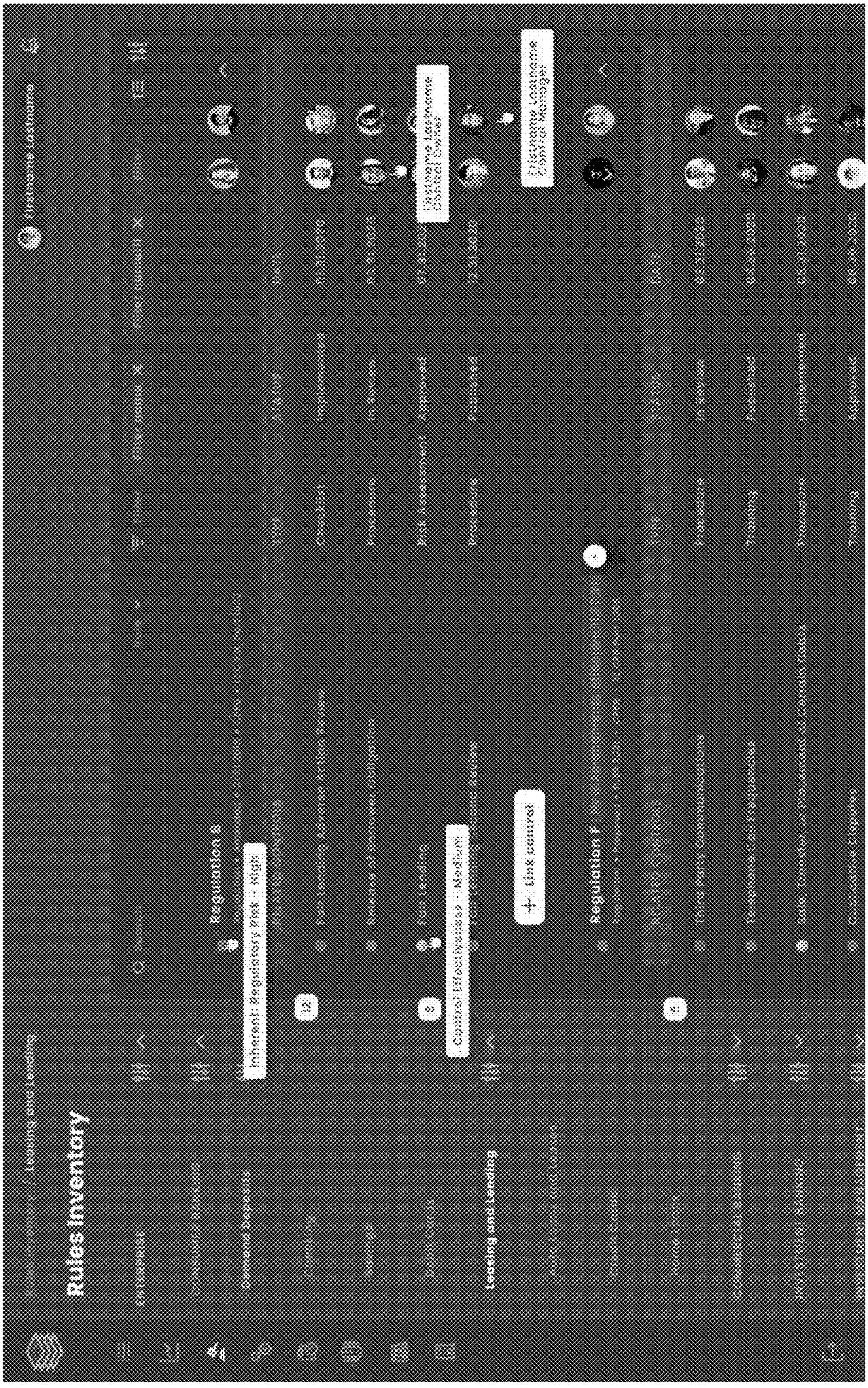
FIGS. 34 and 35 are GUIs for adding controls to a compliance platform, according to an example implementation.
Figure 35:
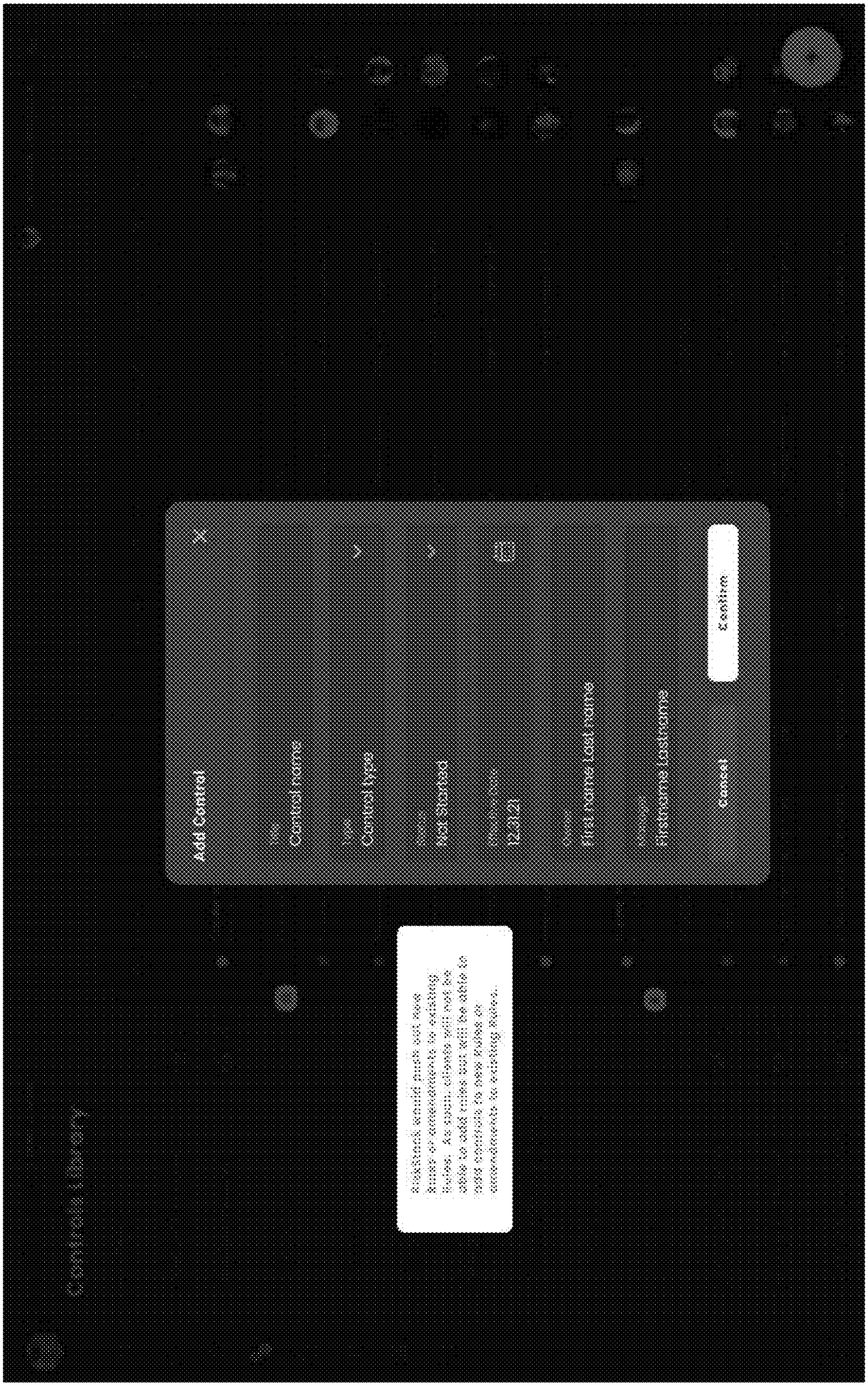

Now referring to step 214 of FIG. 2 in conjunction with FIGS. 34 and 35, the compliance platform 105 can display GUIs for adding controls. The controls can be digitized controls. The compliance platform 105 can display the control received from the devices 120 of the client 115 via the API's. The compliance platform 105 can display a request for the client 115 to provide controls via one or more APIs. The compliance platform 105 can display or receive dependent actions and dynamic changes from the devices 120 of the client 115. The compliance platform 105 can display the assessments, ranks, or ratings of controls, laws, or regulations. The compliance platform 105 can display predefined tags and tags received from the client 115.

The compliance platform 105 can display a controls library with controls that include operationalized controls. For example, the operationalized controls can be actions to be taken by the client 115 for compliance or to reduce audit related problems. The compliance platform 105 can display standardized controls for the client 115 to use and customize. For example, the compliance platform 105 can display controls for a particular manufacturing standard relating to a manufacturing process utilized by the client 115. In another example, the compliance platform 105 can display a list of controls that include a logo of the client 115.

Figure 36:
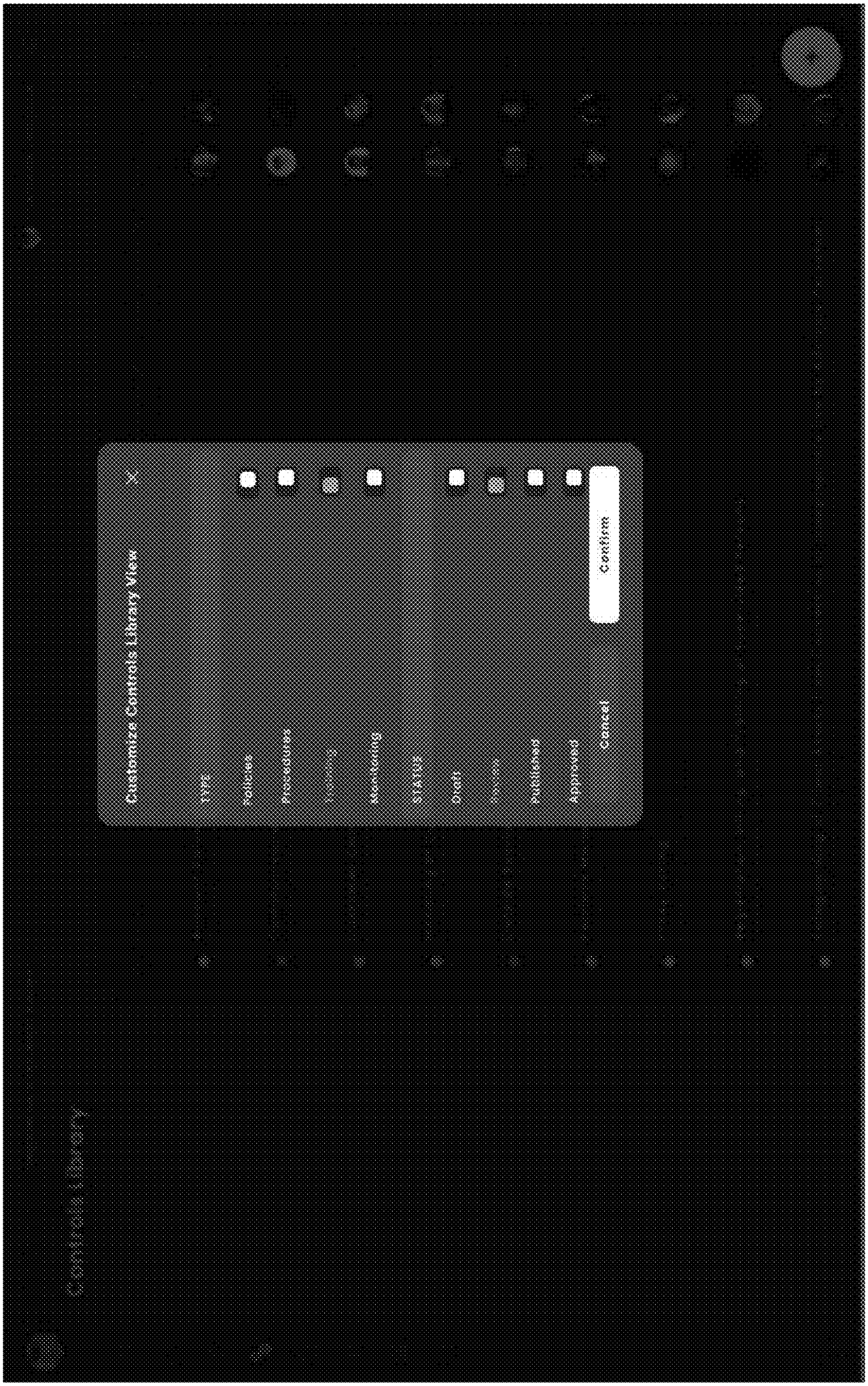
FIGS. 36-38 are GUIs of managing control lists in a controls library of the compliance platform, according to an example implementation.
Figure 37:
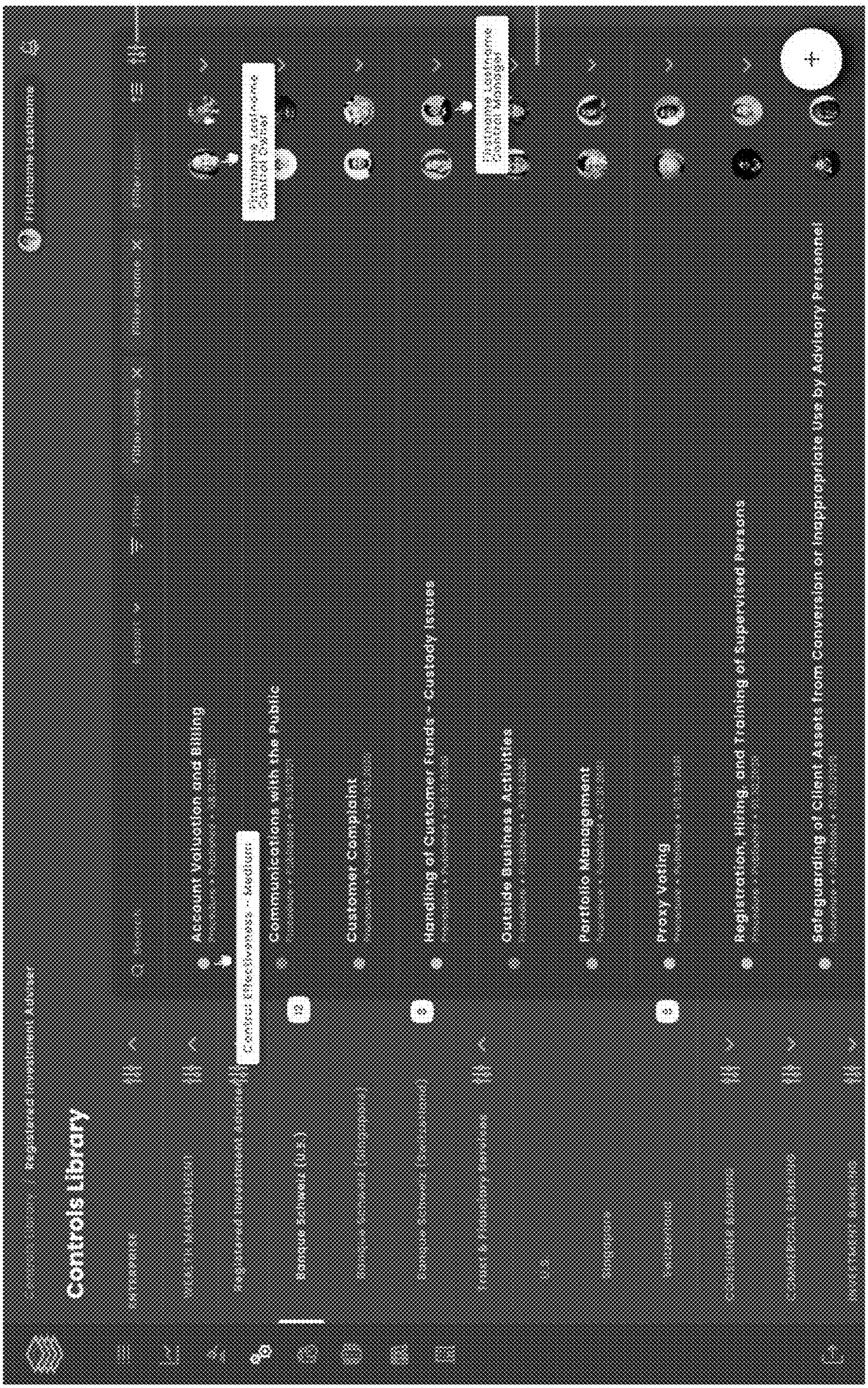
Figure 38:
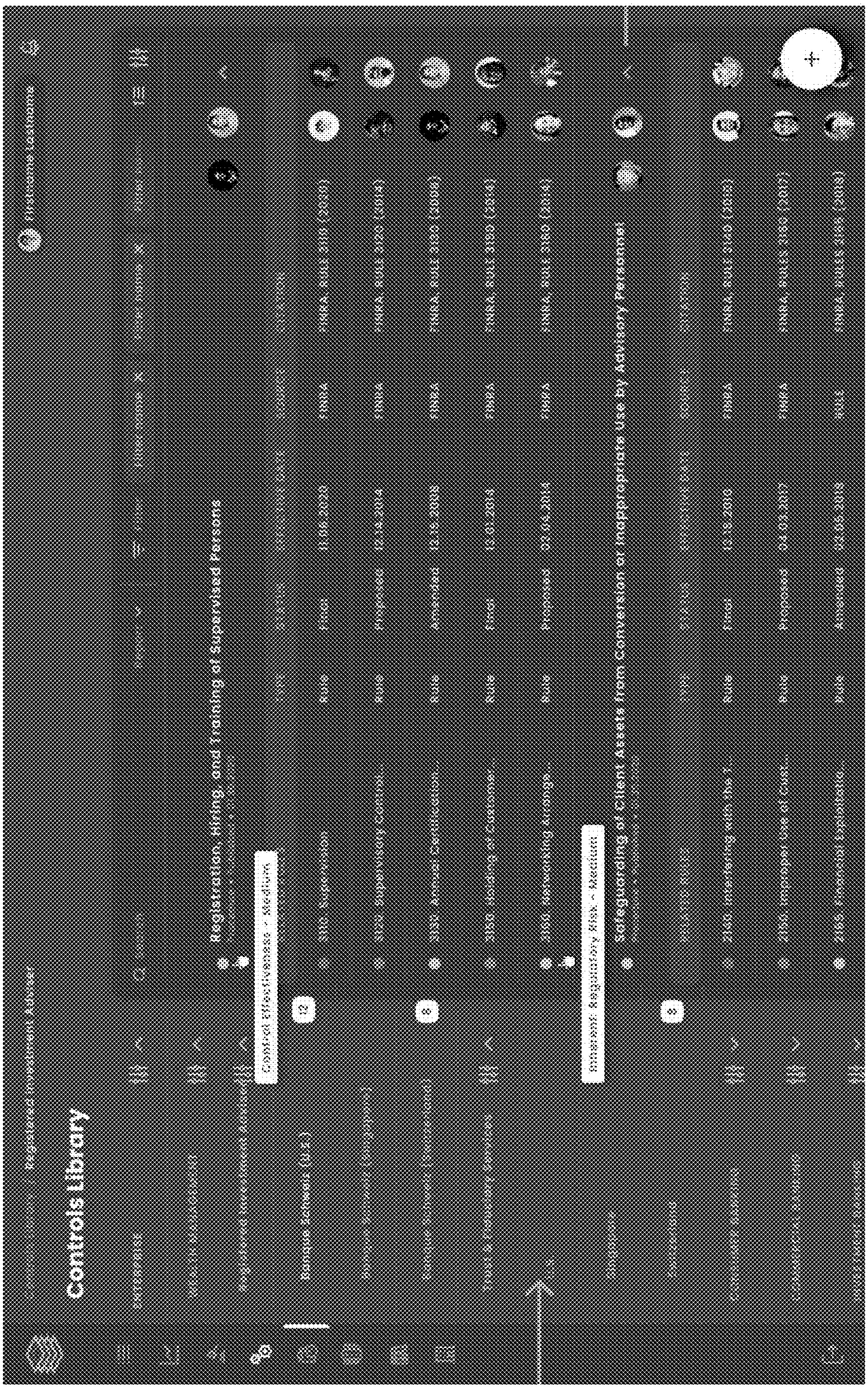
Figure 39:
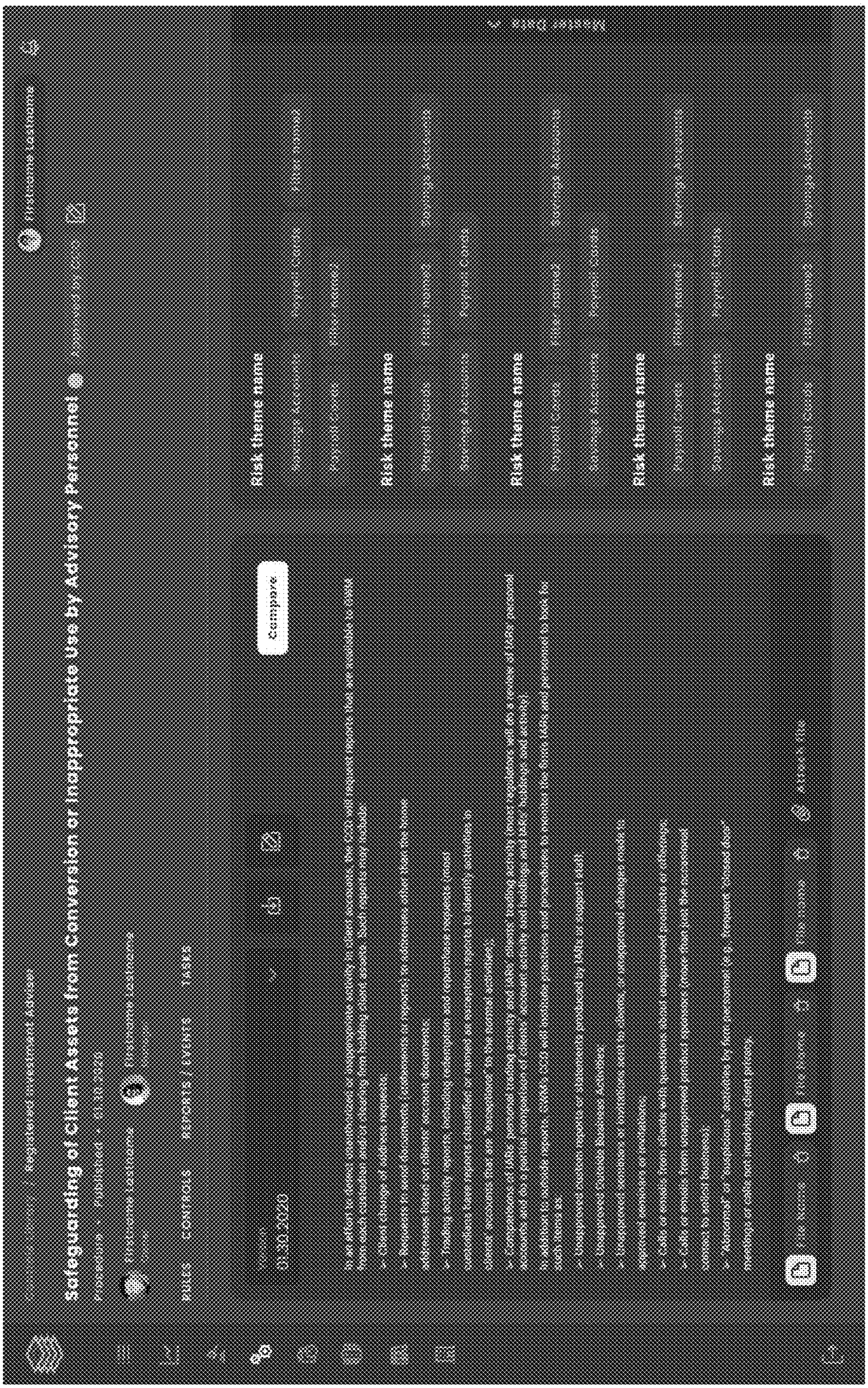
FIGS. 39-48 are GUIs of control pages for managing controls of compliance platform, according to an example implementation.
Figure 40:
Figure 41:
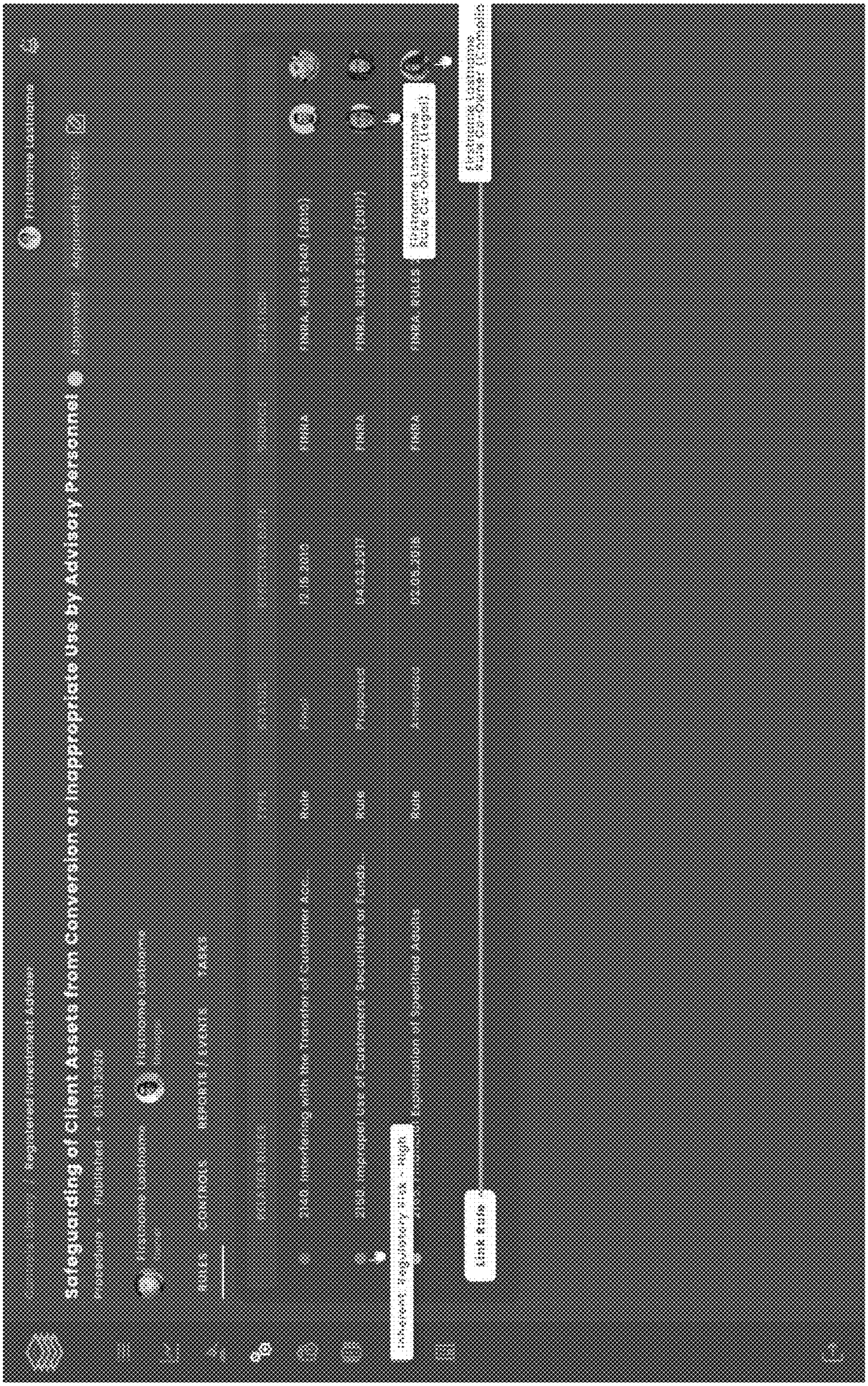
Figure 42:
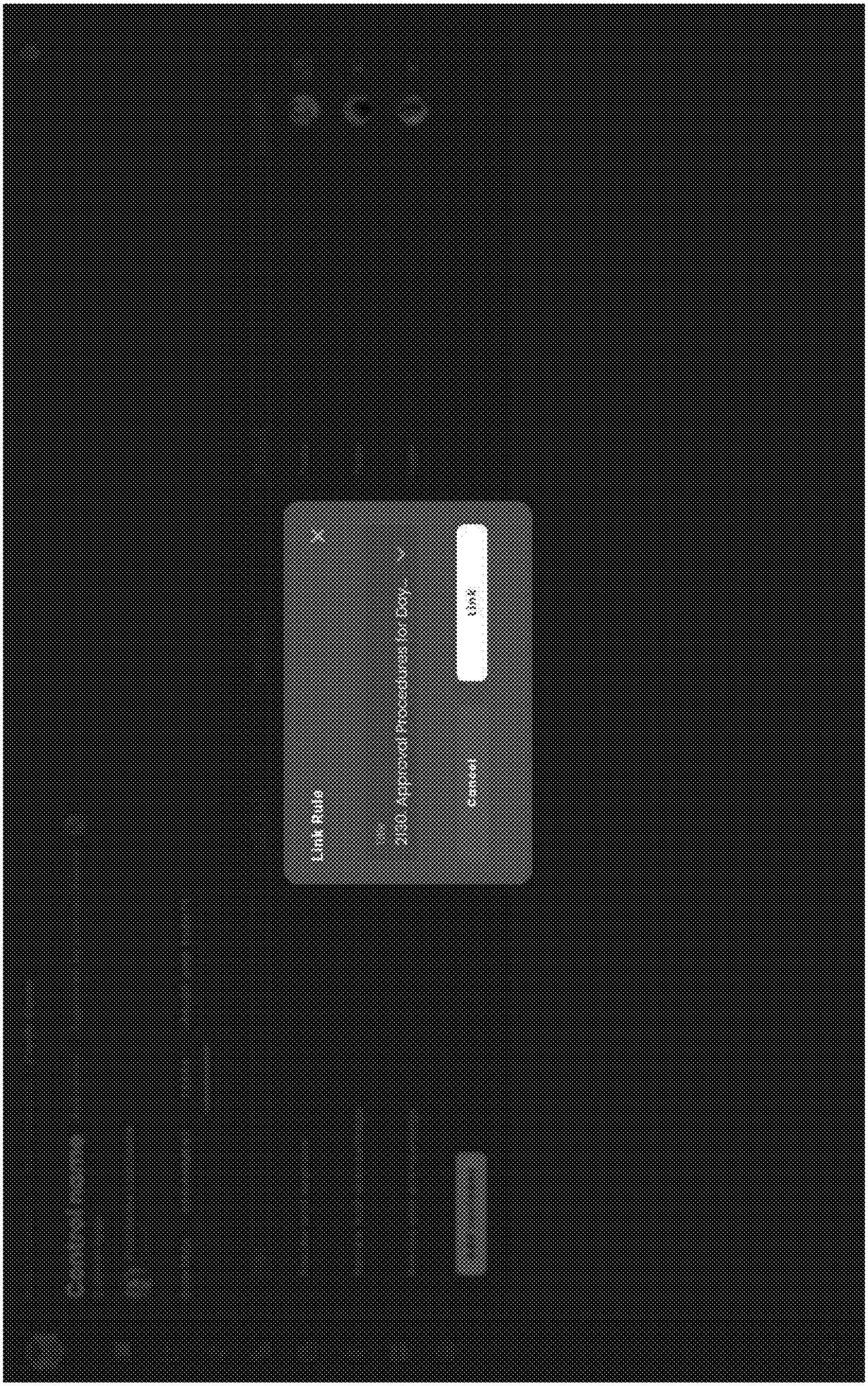
Figure 43:
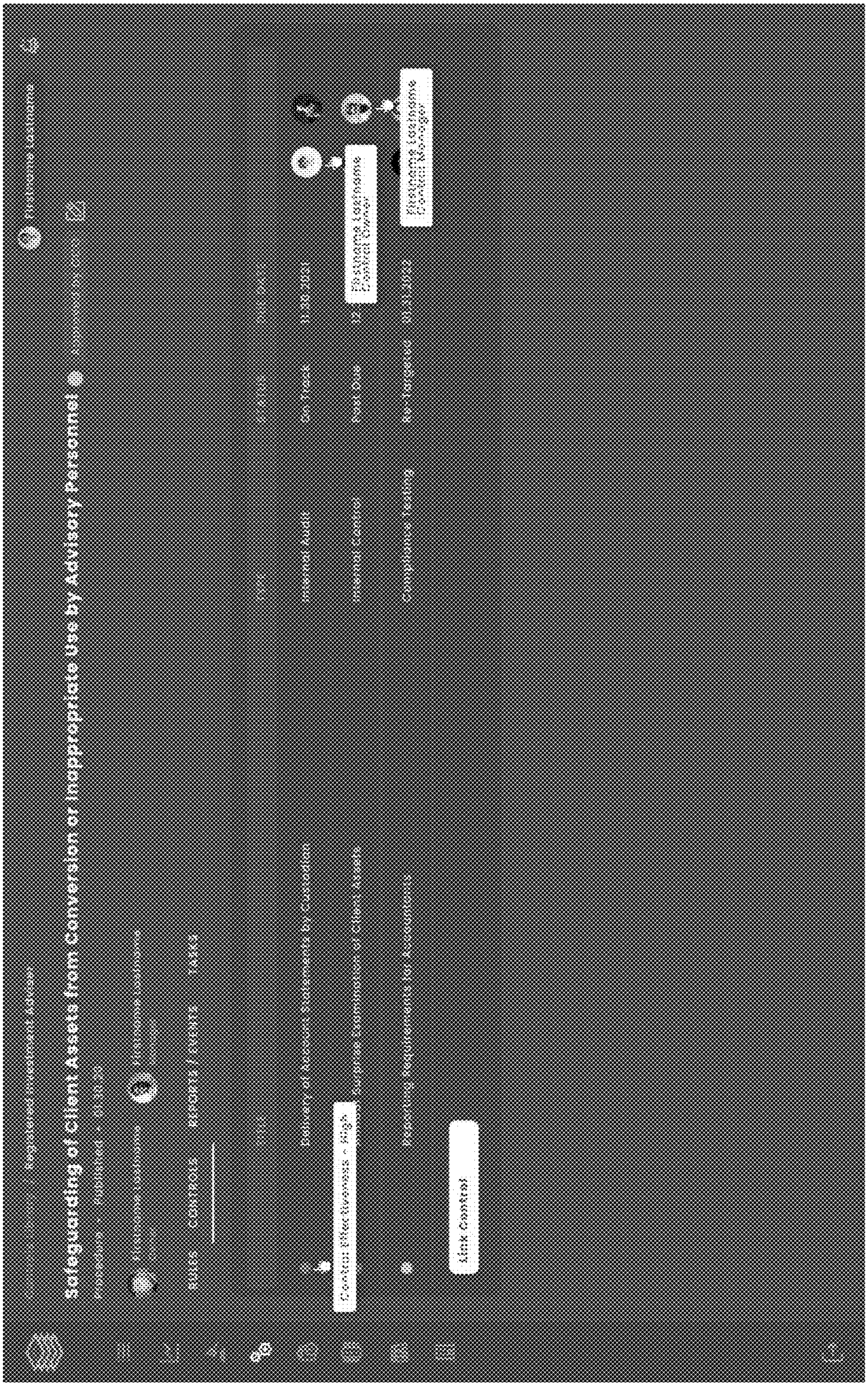
Figure 44:
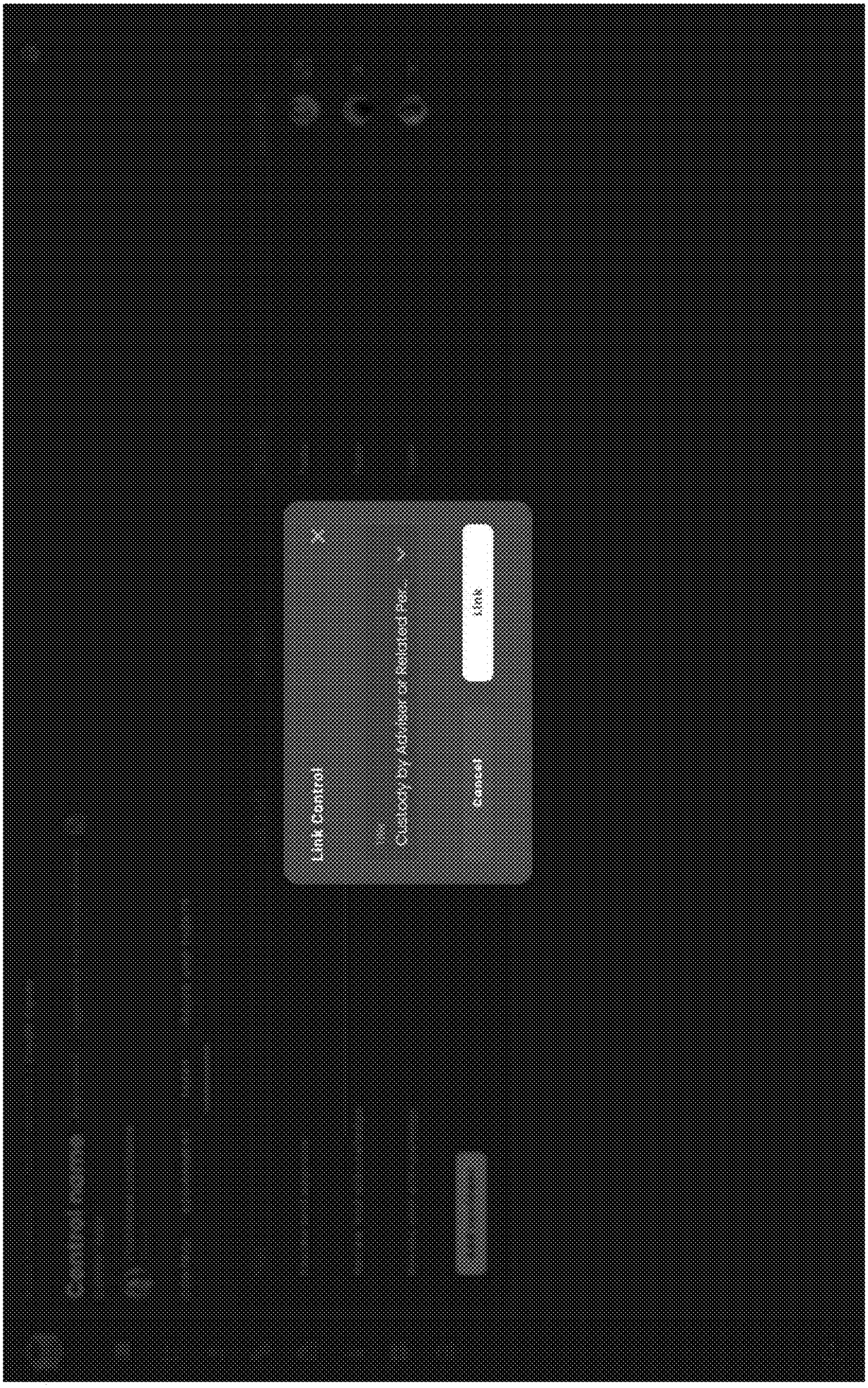
Figure 45:
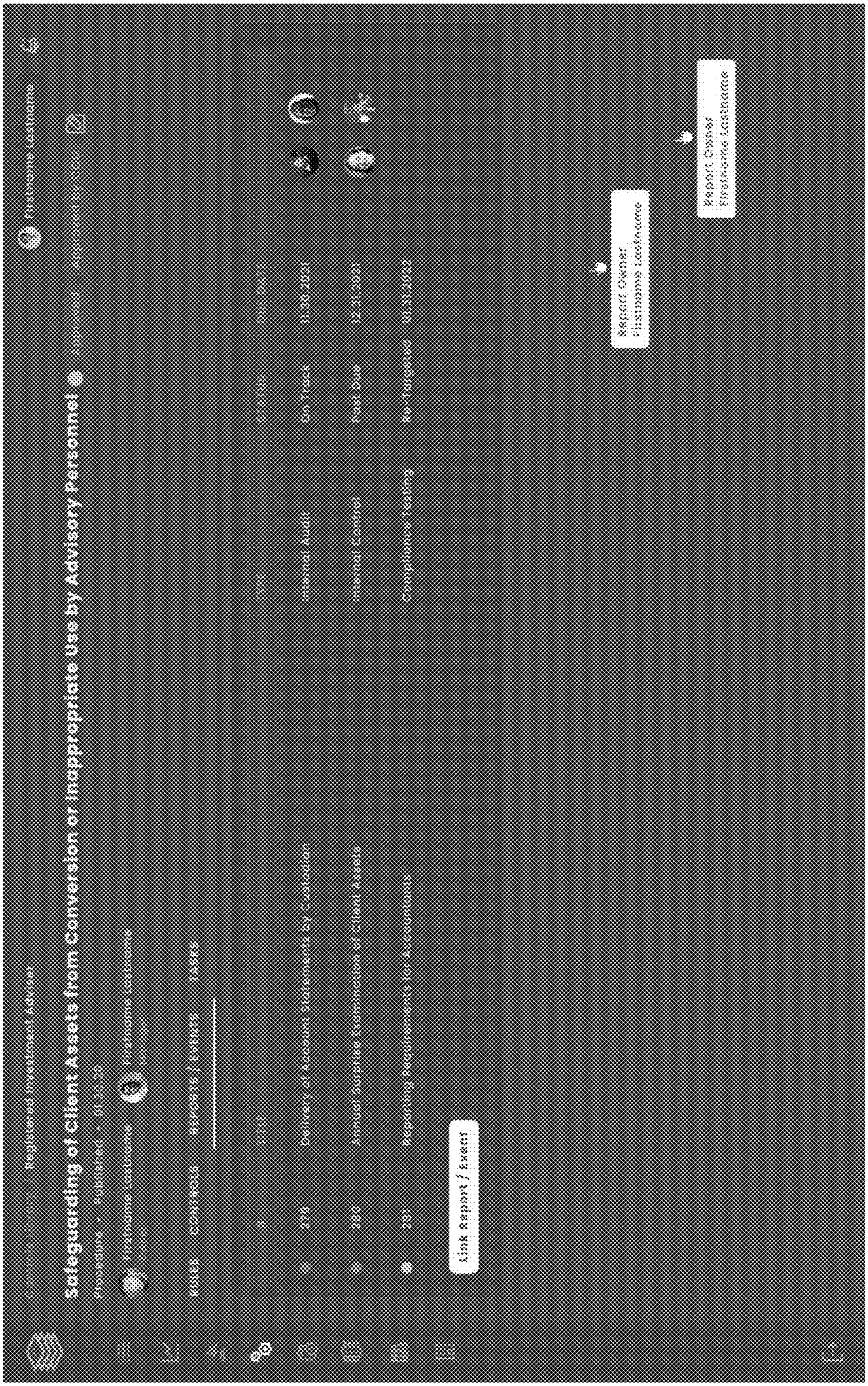
Figure 46:
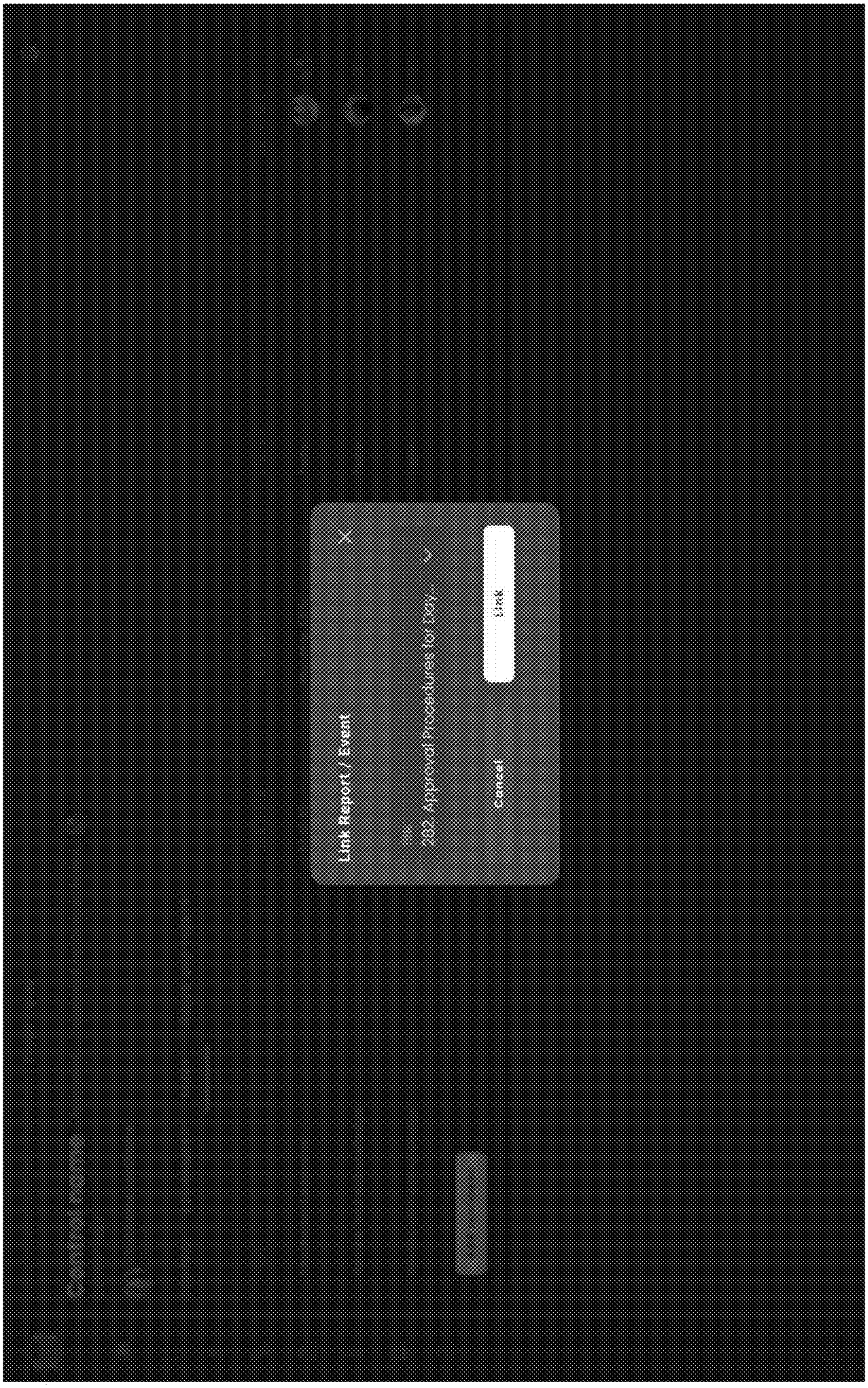
Figure 47:
Figure 48:

Now referring to step 216 of FIG. 2 in conjunction with FIGS. 36-38, the compliance platform 105 can display GUIs of control lists. The compliance platform 105 can display the controls library with controls. The compliance platform 105 can display the controls library and controls with a policy, a procedure, a process flowchart, or a checklist disclosure for the client 115. The compliance platform 105 can display selections that enable the client 115 to configure, select, manage, or assign the tasks associated with controls for compliance. For example, the compliance platform 105 can display a privacy policy approved by a Board of Directors of the client 115. The compliance platform 105 can display the policy to the owner of the policy. For example, the chief privacy officer of the company reports into the general counsel. The general counsel can have the chief of staff who will have access rights to be granted by the compliance platform 105 to be the administrator 125. The chief of staff can be a control manager or administrator 125 registered with the compliance platform 105. The compliance platform 105 can receive, from the administrator 125 (e.g., chief of staff), selections of assignments of the policy to members 130 within legal compliance and business via workflow capabilities. In another example, the compliance platform 105 can receive selections from the member 130 via the device 120B to be assigned to a policy, and the administrator 125 (e.g., chief of staff) can approve or deny the request via the device 120A communicating with the compliance platform 105. For administrator 125 or members 130 with approval authority, the compliance platform 105 can receive selections of an approval of an associated policy.

The controls may be curated by the compliance platform 105 or via the client where the client uploads their own controls (e.g., via one or more APIs). Dynamic updates with notifications provided via machine learning models so as requirements change or new requirements become effective, relevant sections of controls are updated to reflect new requirements via the GUI. Risk rates for each control for control effectiveness via standardized or custom risk assessment methodologies may be depicted. Workflows to assign control reviews, approvals, and ownership to staff via single sign-on integration to evidence appropriate governance may also be provided via the GUI. The compliance platform 105 may map each control to commensurate requirements via proprietary reference data, integrate the controls with requirements, issues and risk assessments, and provide customized views via one or more GUIs.

Now referring to step 218 of FIG. 2 in conjunction with FIGS. 39-48, the compliance platform 105 can display GUIs regarding control pages. The compliance platform 105 can display the GUIs to display the controls and the related rules. The compliance platform 105 can display the versions of the control along with the tag. The compliance platform 105 can display a comparison of the rules and their changes. For example, the compliance platform 105 can display the different versions of patent laws over time to identify how the patent laws have changed.

The compliance platform 105 can display requests from an external client 115 such as an auditor. For example, the compliance platform 105 can display that a regulation is going to be updated or amended within a predetermined time (e.g., within a 3 months). The compliance platform 105 can display the update and a plan for managing the update or amendment. The compliance platform 105 can display associated public data (e.g., amended rules) with the organizational hierarchy of the client 115 to provide the assessment and the control mapping.

The compliance platform 105 can display assessments differentiate among products. The compliance platform 105 can display laws and regulations globally in a curated and filtered format to the client 115. For example, the compliance platform 105 can receive assessments of products from auditors, compliance professionals, and product professionals. In another example, the client 115 (e.g., financial services institution) can have a segment dedicated to credit cards. The compliance platform 105 can display segments by location such as the US, Canada, or the UK. The compliance platform 105 can display segments by product type such as small business card, retail and direct bank cards, or partner cards. The compliance platform 105 can display segments by teams or functional departments. The compliance platform 105 can display selectable options to link the controls to the displayed segments.

The compliance platform 105 can display a list of summary rules. The compliance platform 105 can display an assessment for each rule. The assessment for each rule refers to its compliance threshold, likelihood of occurring, or a risk assessment. For example, the compliance platform 105 can display a risk assessment inherent to the rule. For example, the compliance platform 105 can receive a selection of the rule and then display the associated assessment for the selected rule. The compliance platform 105 can display the assessments in an array or an index. The compliance platform 105 can advantageously display the assessments next to the rule so that the user does not have to rely on a different database or tool.

The compliance platform 105 can display tasks associated with an assessment. For example, the compliance platform 105 can display tasks associated with a financial crime being comprised of AML, economic sanctions, or corruption. The compliance platform 105 can display toggles or selections among the components of the financial crime. For example, the compliance platform 105 can display the drill down into the AML.

The compliance platform 105 can display customization of the assessment methodology that defines and describes the assessments that can be received or assigned to each rule. For example, the compliance platform 105 can display policy governance technology or learning management systems to provide training to members 130 and then assess the efficacy of the training. The compliance platform 105 can display spreadsheets, databases, and other assessment tools.

The compliance platform 105 can display assessments for individual laws and regulations for the client 115. For example, the compliance platform 105 can display control mapping for financial services. The compliance platform

105 can display control mapping based on industry guidance. For example, the compliance platform 105 can display an assessment system of the Federal Reserve Board. The assessments can indicate to regulated institutions an understanding of their control environment. For example, the compliance platform 105 can display an analysis of the controls and the assessments, such as a likelihood of an audit based on the controls and the assessments. In another example, the compliance platform 105 can display alternative assessments or possibilities to manage a weakness likelihood for the controls.

The compliance platform 105 can enable the client 115 to display to a regulator, auditor, internal personnel, etc. (e.g., for internal reviews) the actions that the client 115 is taking to comply with various regulations as well as their associated assessments of these regulations. Unlike implementations that require manual input, the compliance platform 105 can display the laws and regulations, and any changes thereof, alongside assessments.

The compliance platform 105 can receive, from the client 115, selections of assessments or complaints for the compliance platform 105 to monitor. The compliance platform 105 can advantageously display the complaints for the selected products. For example, the compliance platform 105 can display customer complaints of the client 115 to reduce the reliance of the client 115 on operations, compliance, and officers monitoring for customer complaints. The compliance platform 105 can advantageously display the complaints for each product and category to the operations, compliance, and officers of the client 115.

By receiving selections of particular products and categories, the compliance platform 105 can advantageously enable the client 115 to customize the display and management of their assessments. The compliance platform 105 can display selectable elements, such as icons, buttons, and symbols. The compliance platform 105 can advantageously display the interconnectedness between rules and controls. For example, the compliance platform 105 can display indicators to indicate that the elements are selectable (e.g., contain a hyperlink). The compliance platform 105 can enable display of assessment indicators associated with roles, controls, or issues. For example, the assessment indicators can be, but is not limited to, a symbol, circle, or dot of various sizes or colors in various positions of the GUI. In another example, the indicators can be color coded (e.g., blinking indicators or changes to color depending on updates). In another example, the indicators can have different shapes, such as but is not limited to squares, triangles, or circles. The compliance platform 105 can display the hierarchy in the organization of the client 115. For example, the compliance platform 105 can display portions for each product or entity of the client 115.

The compliance platform 105 can display business segments associated with particular rules or regulations. The segments refer to products and services provided by the client 115, and organized by business or sub-business lines. For example, the segments can relate to leasing and lending to enable the client 115 to identify leasing and lending rules in a format customized for the client 115.

The compliance platform 105 can display the changes to the rules or procedures in a simplified and integrated manner with the other functionalities. For example, the compliance platform 105 can display a particular rule or procedure and compare them to prior versions. The compliance platform 105 can display deletions in a first color (e.g., red) and additions or changes in a second color (e.g., green). In another example, the compliance platform 105 can display modifications or amendments with bolding, underlines, or strikethroughs.

The compliance platform 105 can display modified assessments of the rules based on uploads, controls, and dynamic changes received from the client 115. For example, if the compliance platform 105 receives a modification of a control that modifies an assessment, line items, or line items for controls, the compliance platform 105 can display the assessment. The compliance platform 105 can advantageously display the interconnected and interdependent aspects of the controls and rules. The compliance platform 105 can continuously display updates of the associations based on individual updates or actions received form the devices 120 of the client 115 or collectively by all members 130 of the client 115.

Figure 49:
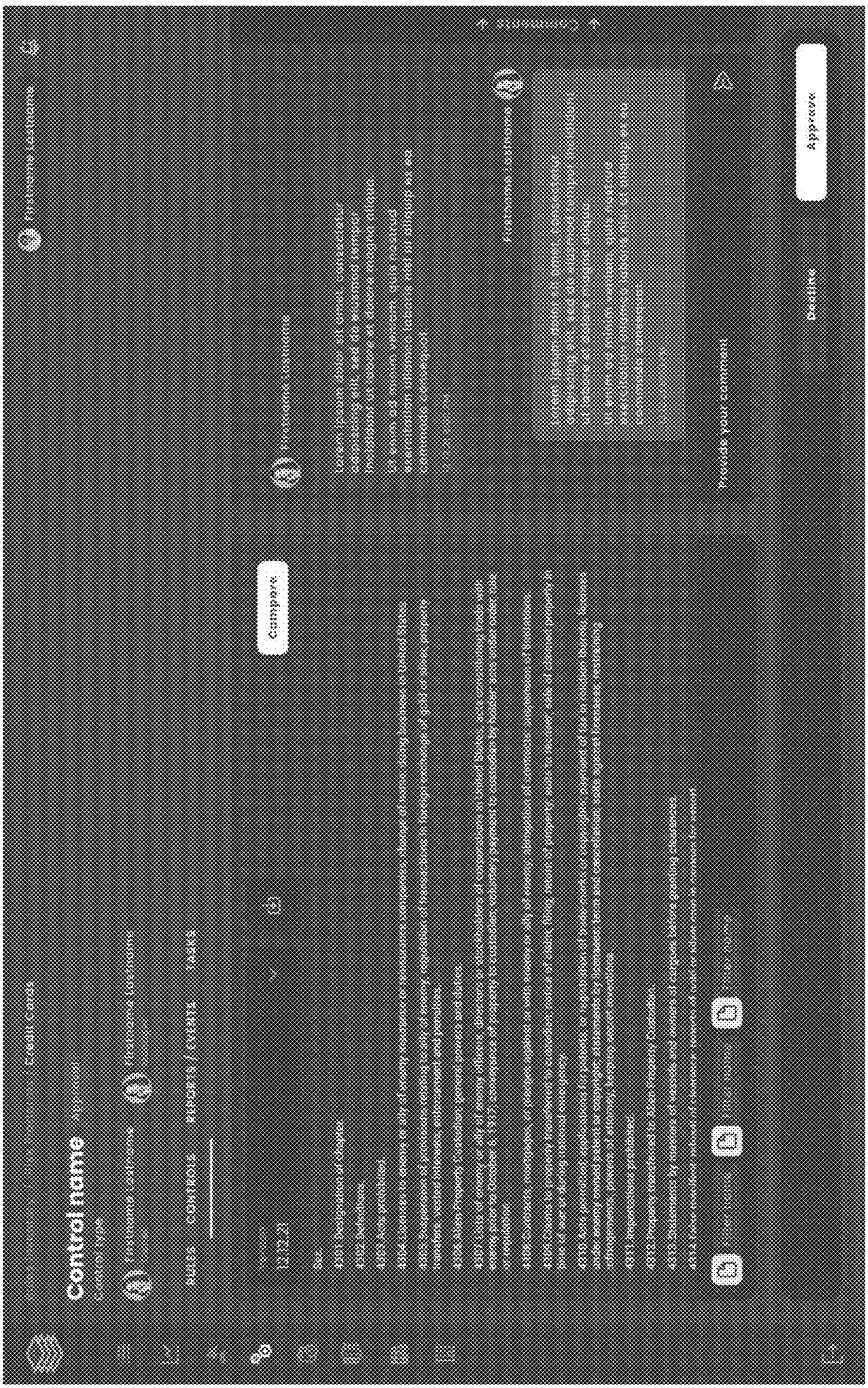
FIGS. 49-51 are GUIs of control approval for approving controls of the compliance platform, according to an example implementation.
Figure 50:
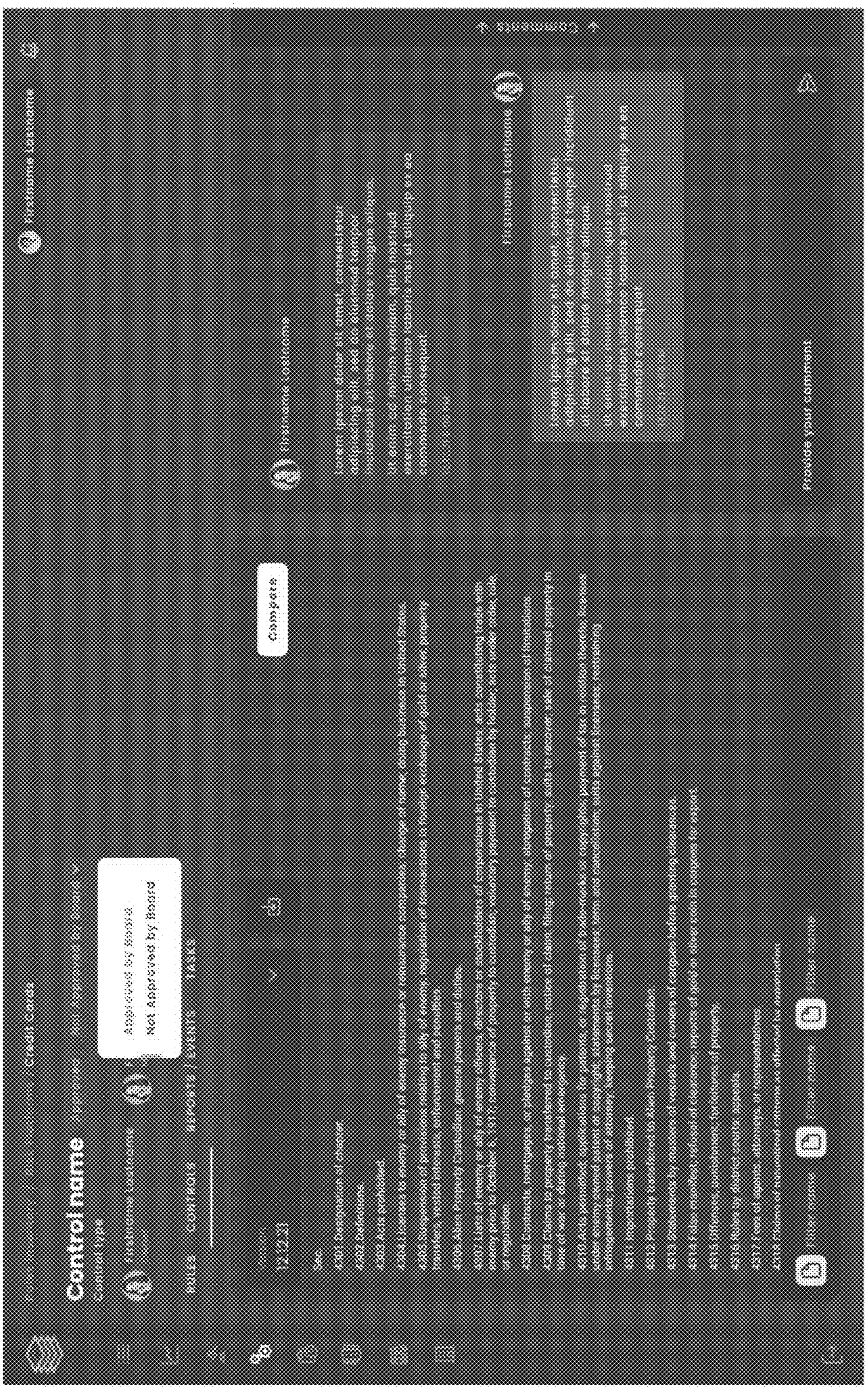
Figure 51:
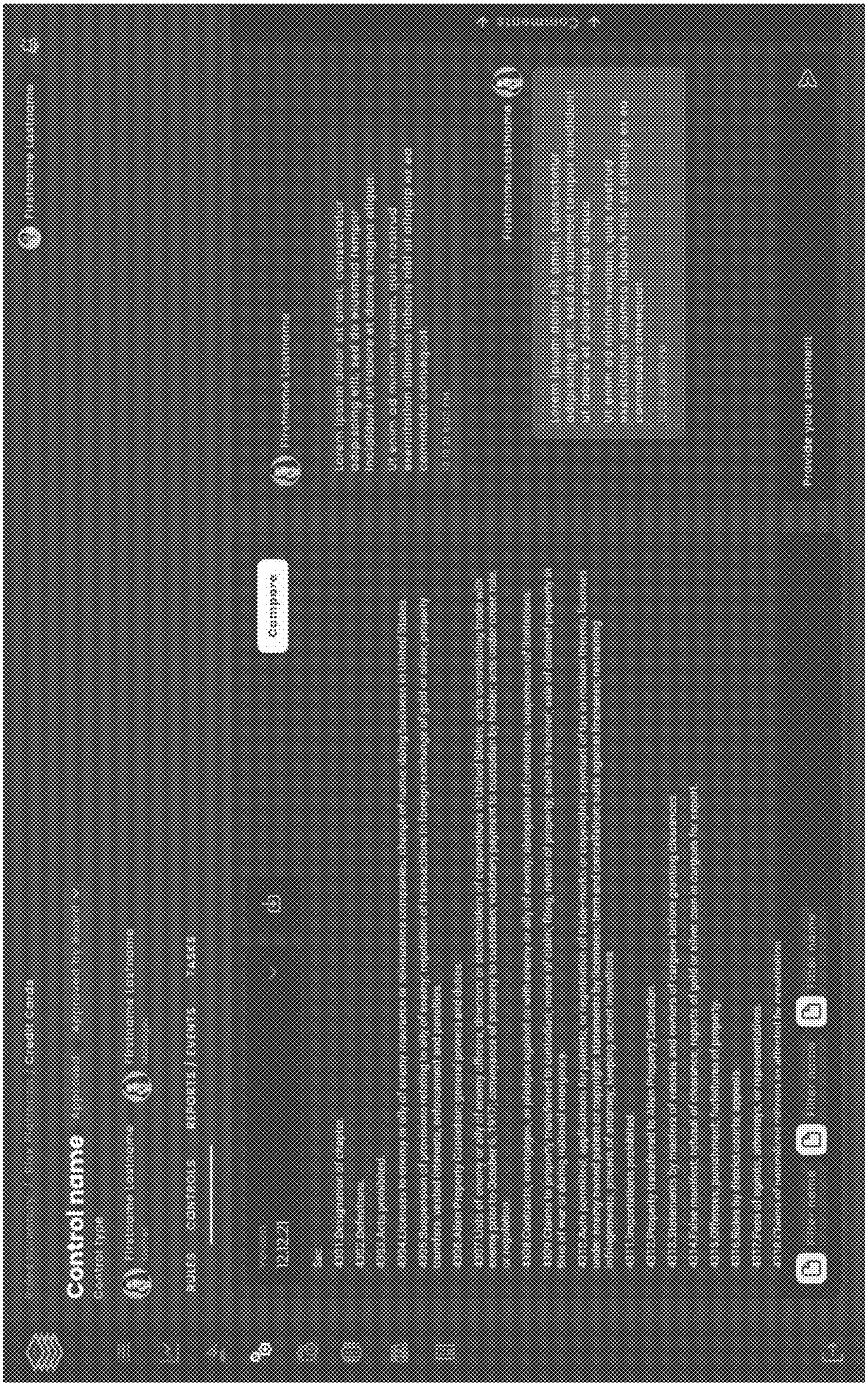

Now referring to step 220 of FIG. 2 in conjunction with FIGS. 49-51, the compliance platform 105 can display GUIs of control approval. The compliance platform 105 can receive customizable assessments for rules or definitions of access rights for members 130 who will be managing the rules. The compliance platform 105 can receive requests to filter the rules by parameters such as product or geography. For example, the compliance platform 105 can display a standardized offering for dealing with consumer complaints about a financial services company. The compliance platform 105 can receive the customer complaints. The compliance platform 105 can display the complaints. The compliance platform 105 can display the complaints in categories or with keywords.

Figure 52:
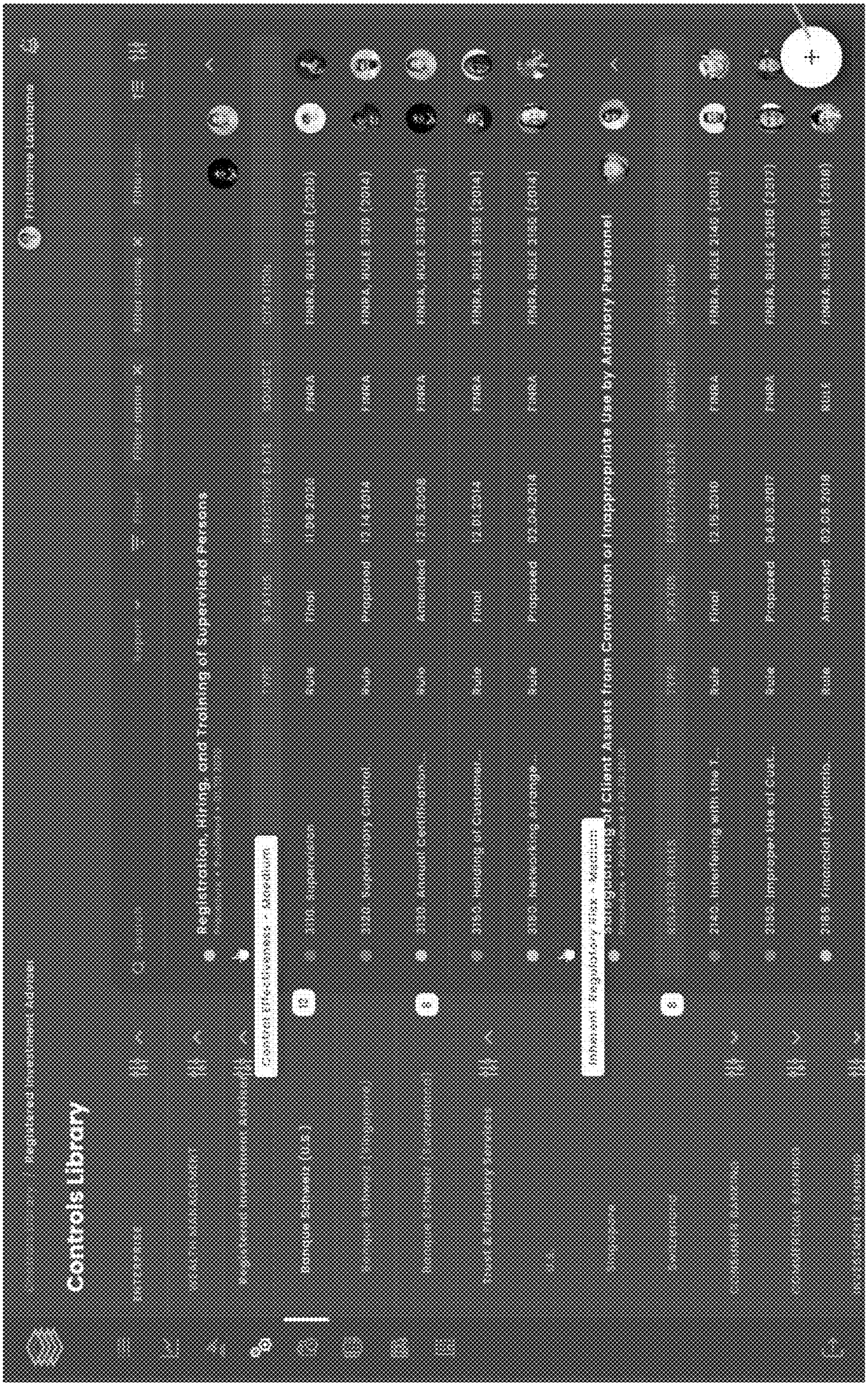
FIGS. 52-54 are GUIs of control administration in a controls library of the compliance platform, according to an example implementation.
Figure 53:
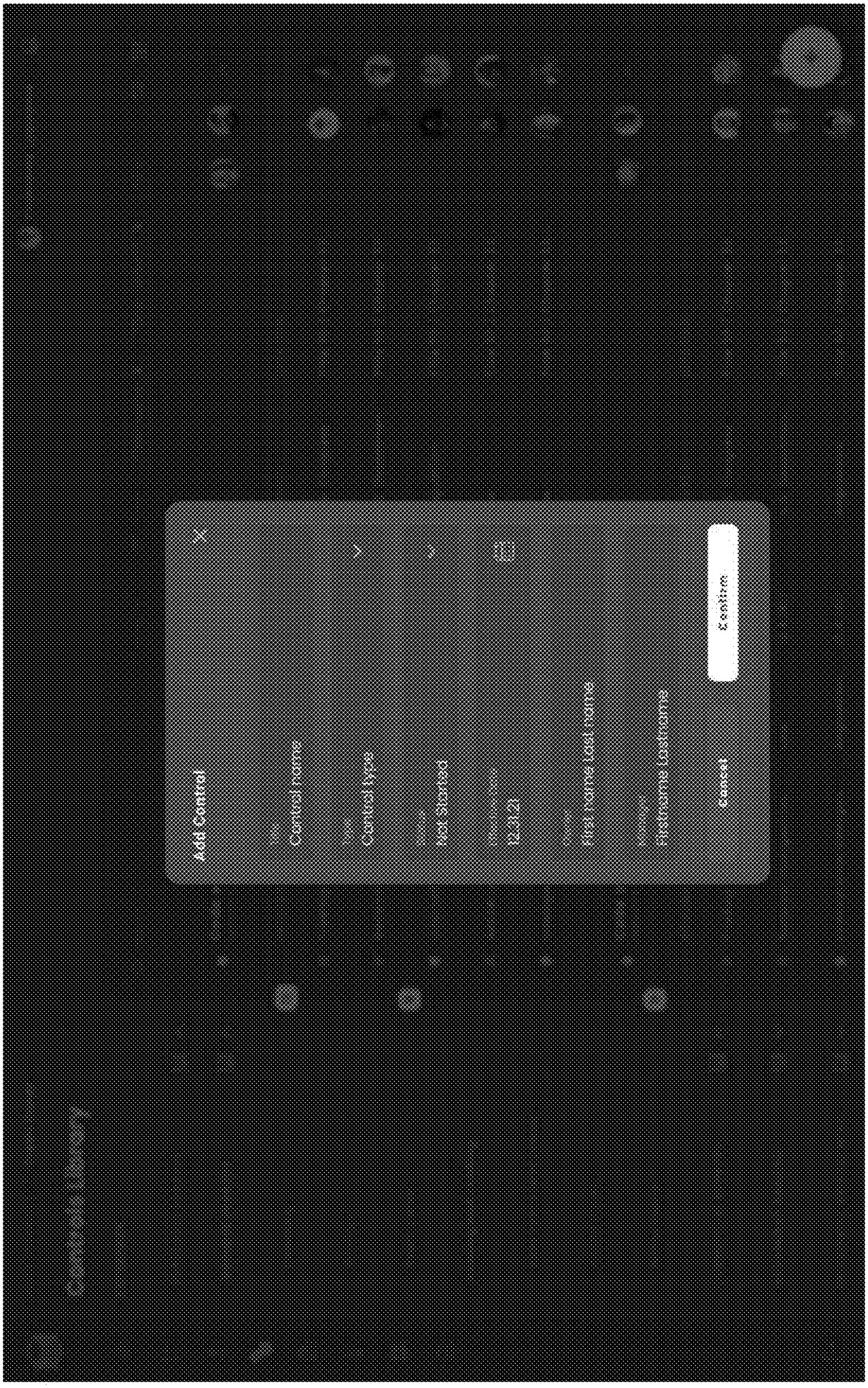
Figure 54:
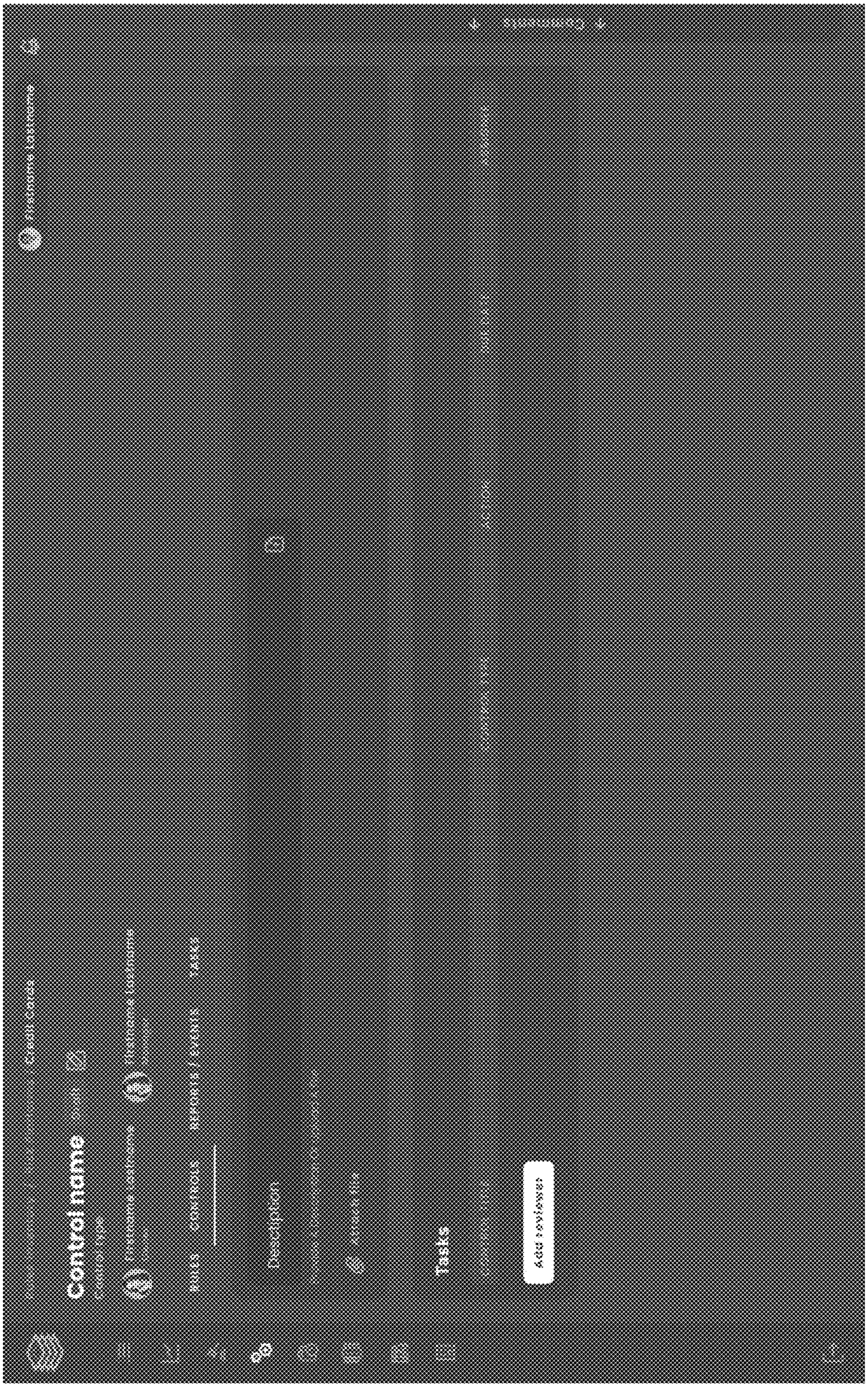
Figure 55:
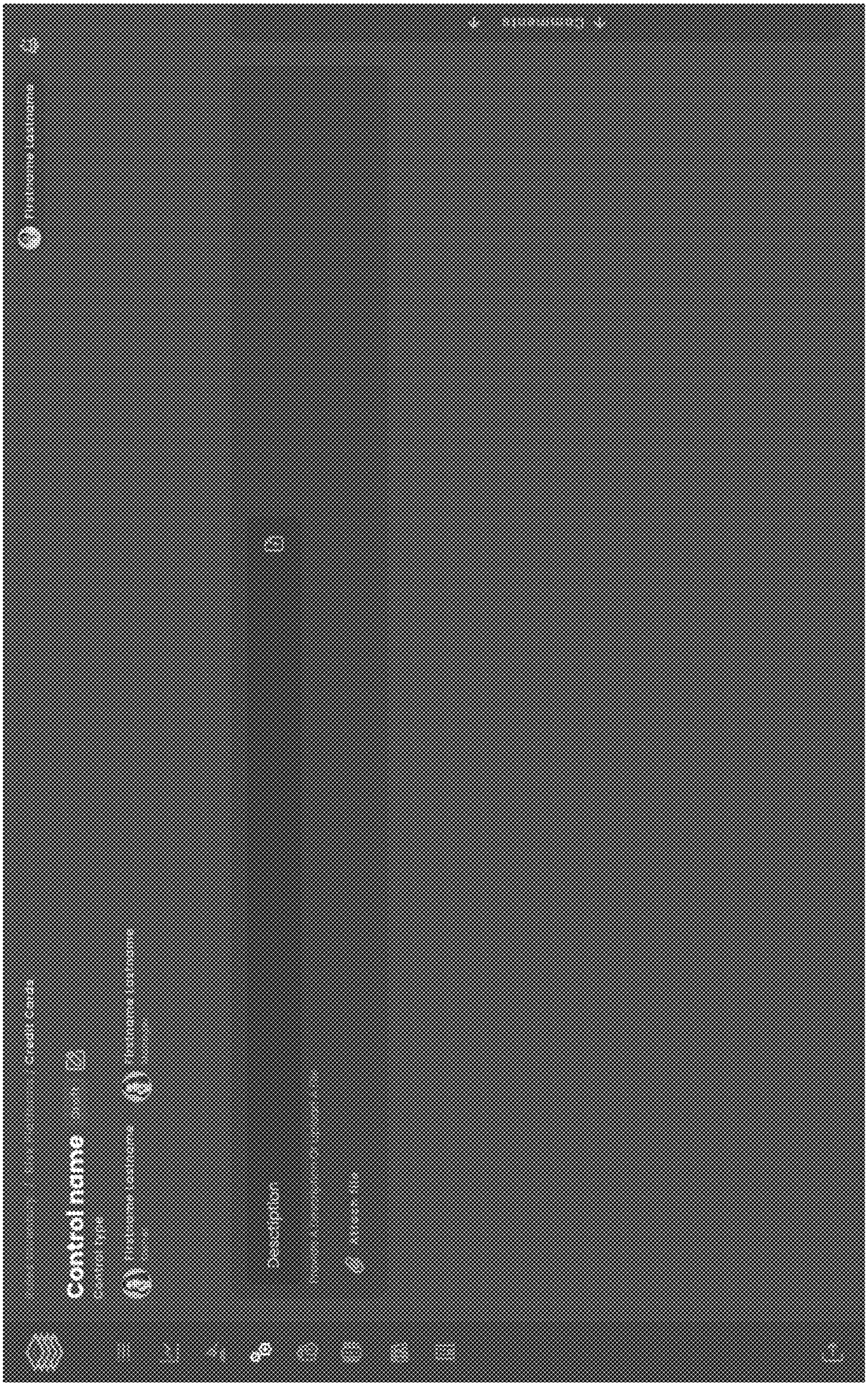
FIGS. 55-64 are GUIs of control ownership to manage controls of the compliance platform, according to an example implementation.
Figure 56:
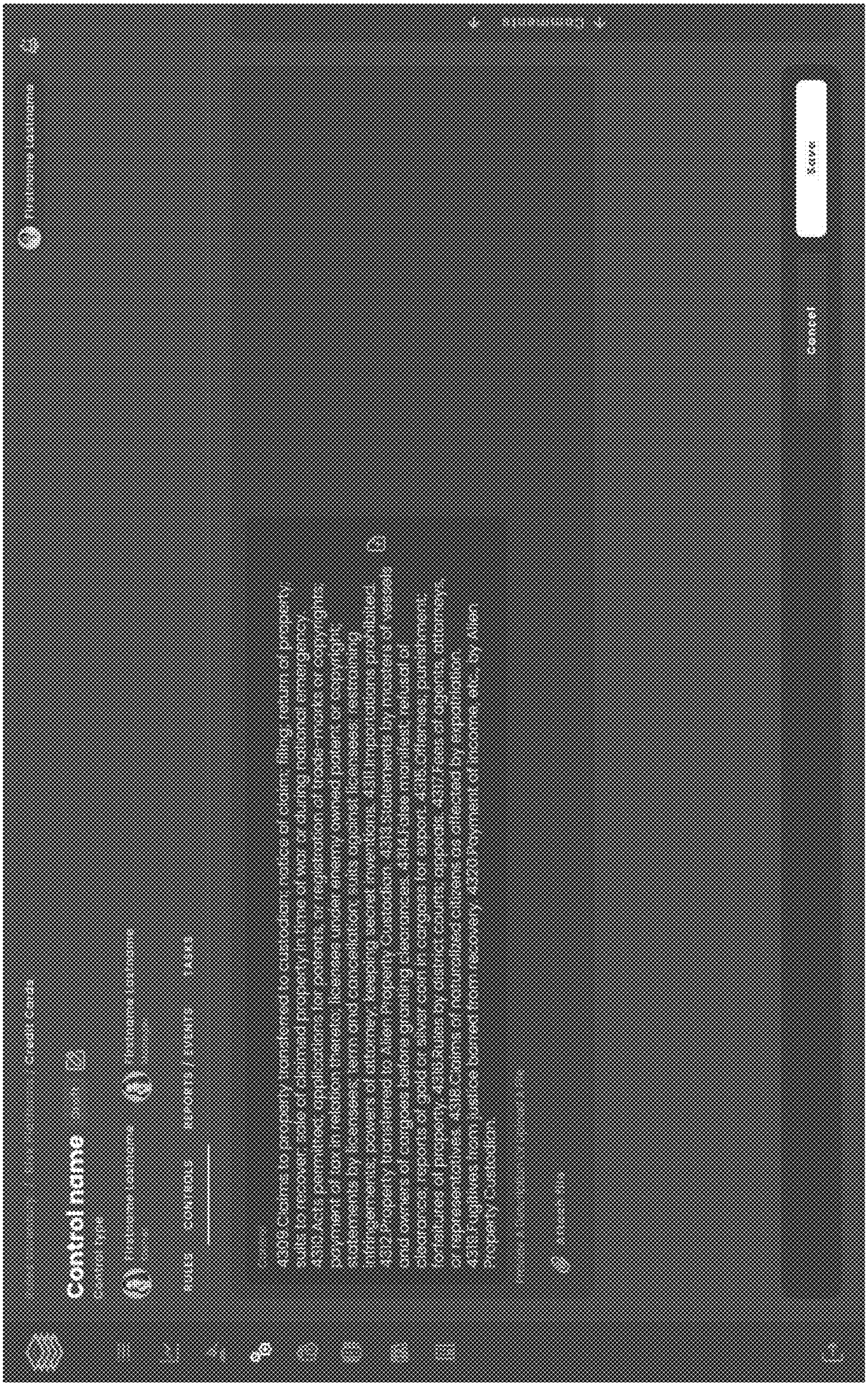
Figure 57:
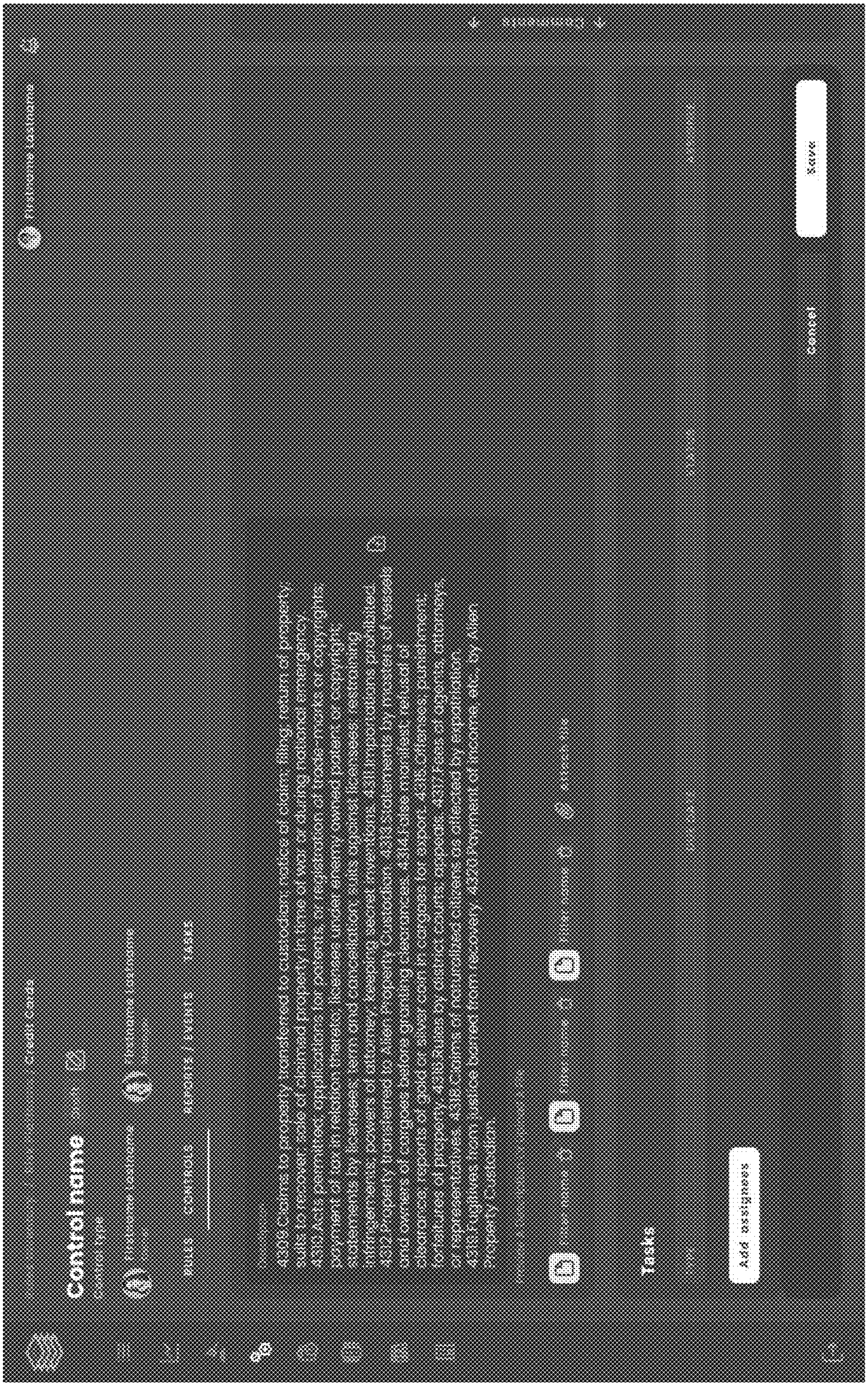
Figure 58:
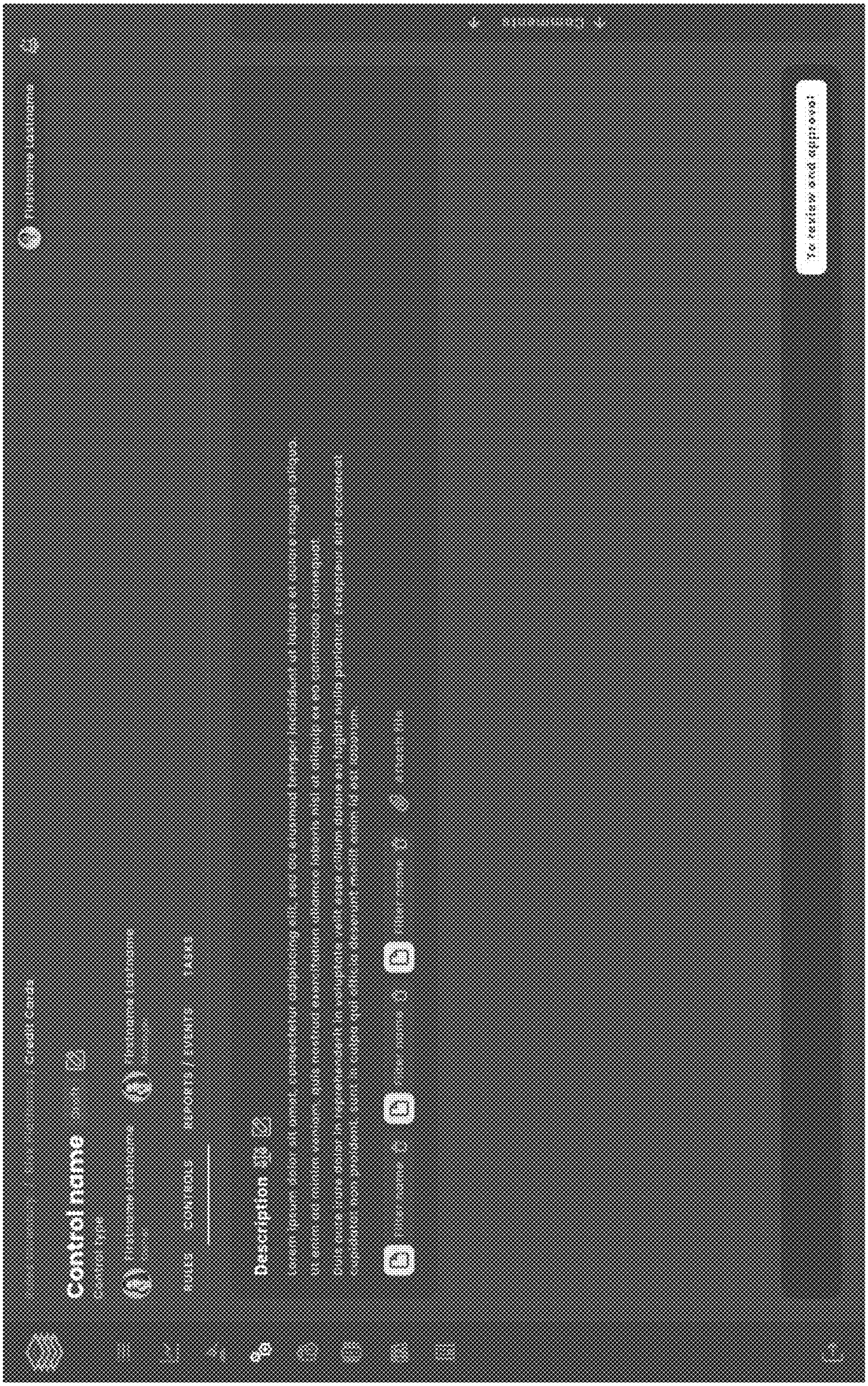
Figure 59:
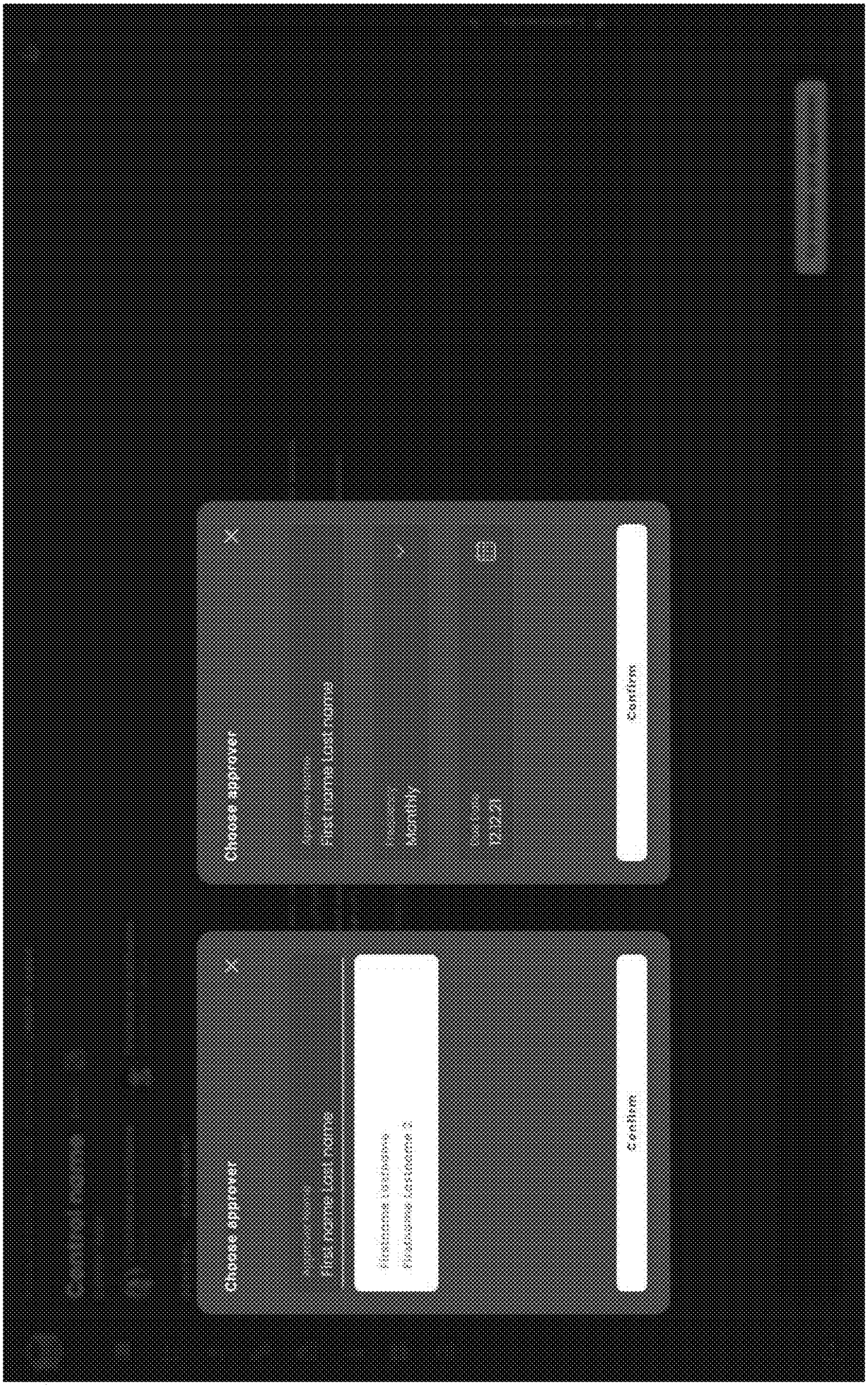
Figure 60:
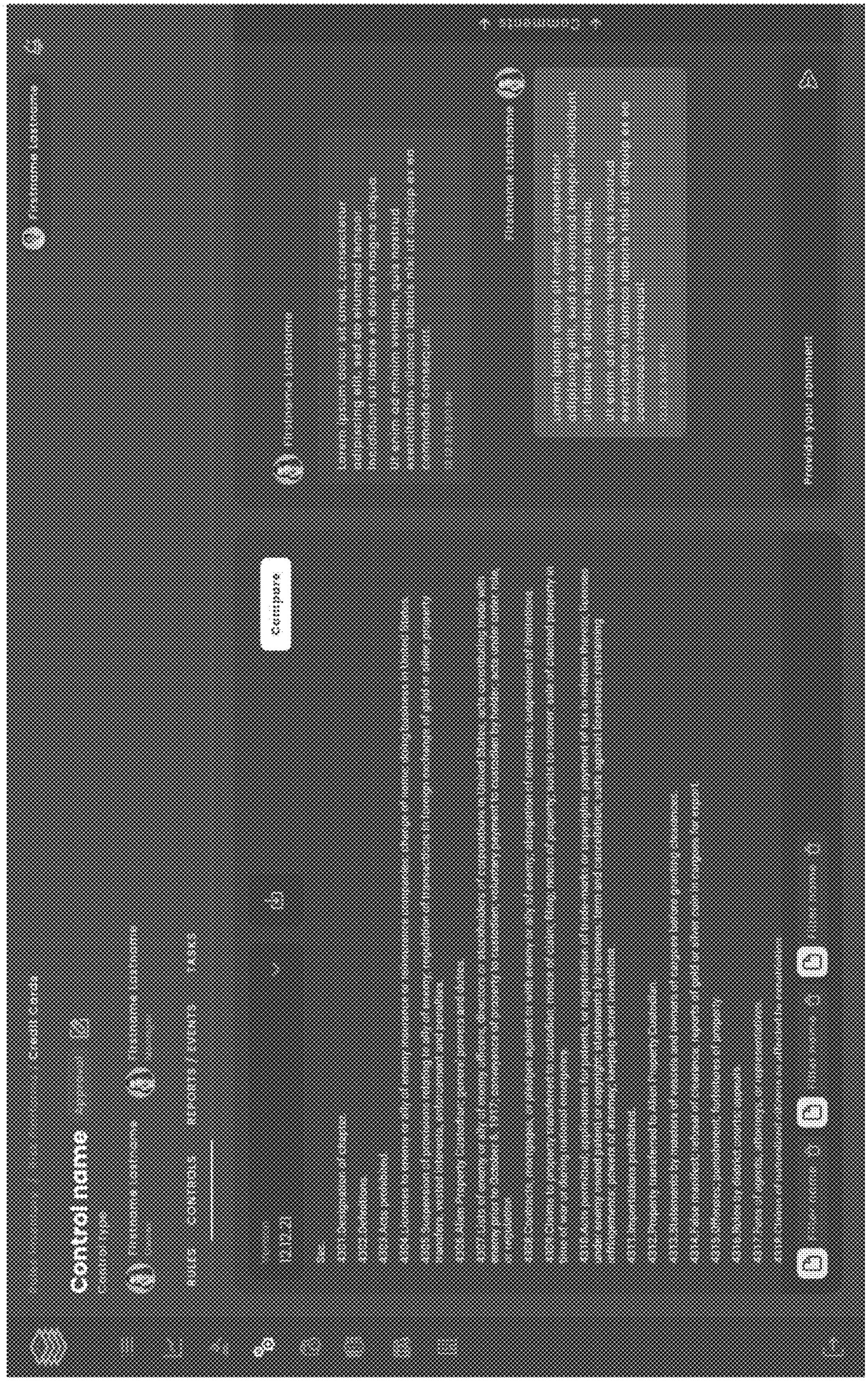
Figure 61:
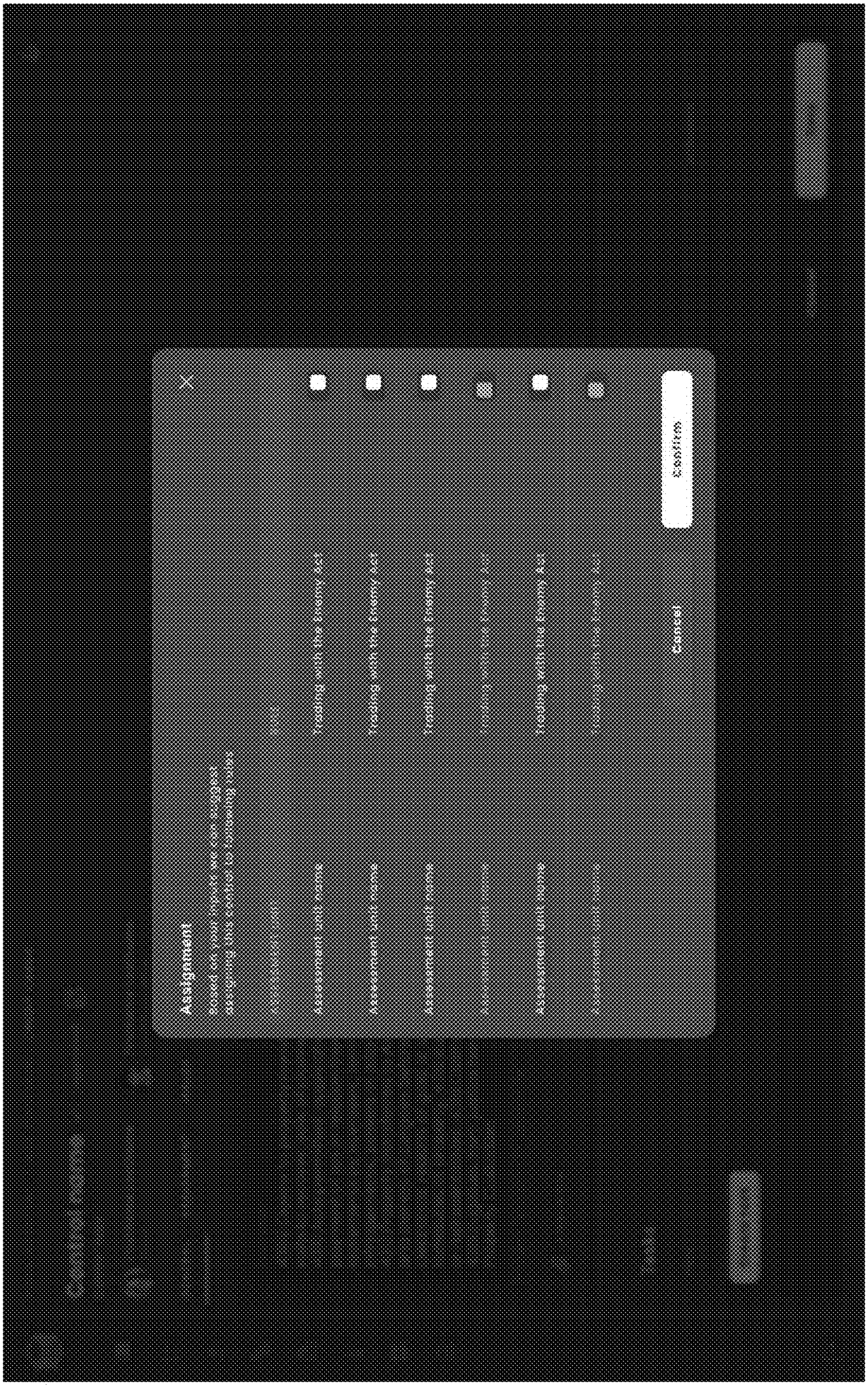
Figure 62:
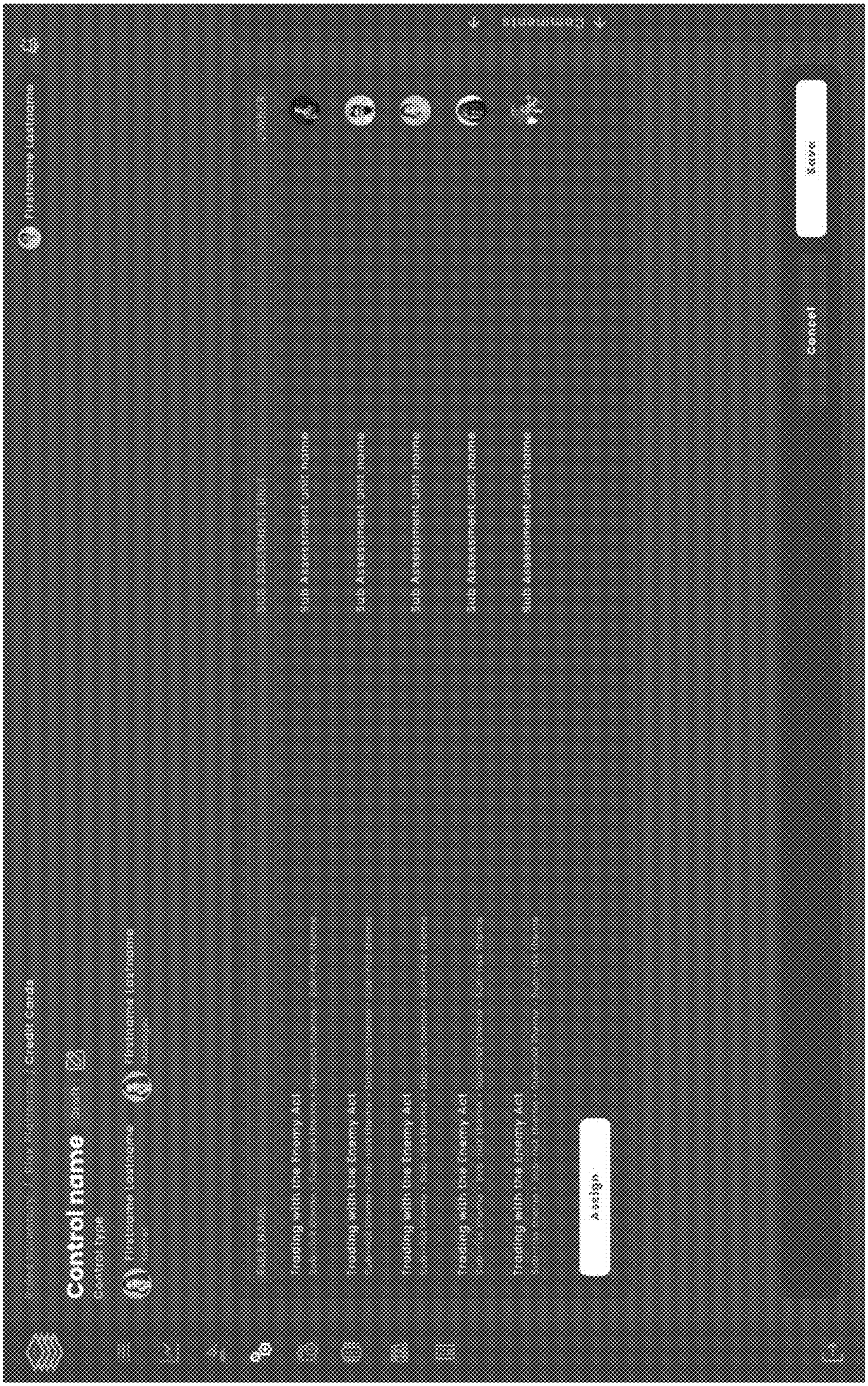
Figure 63:
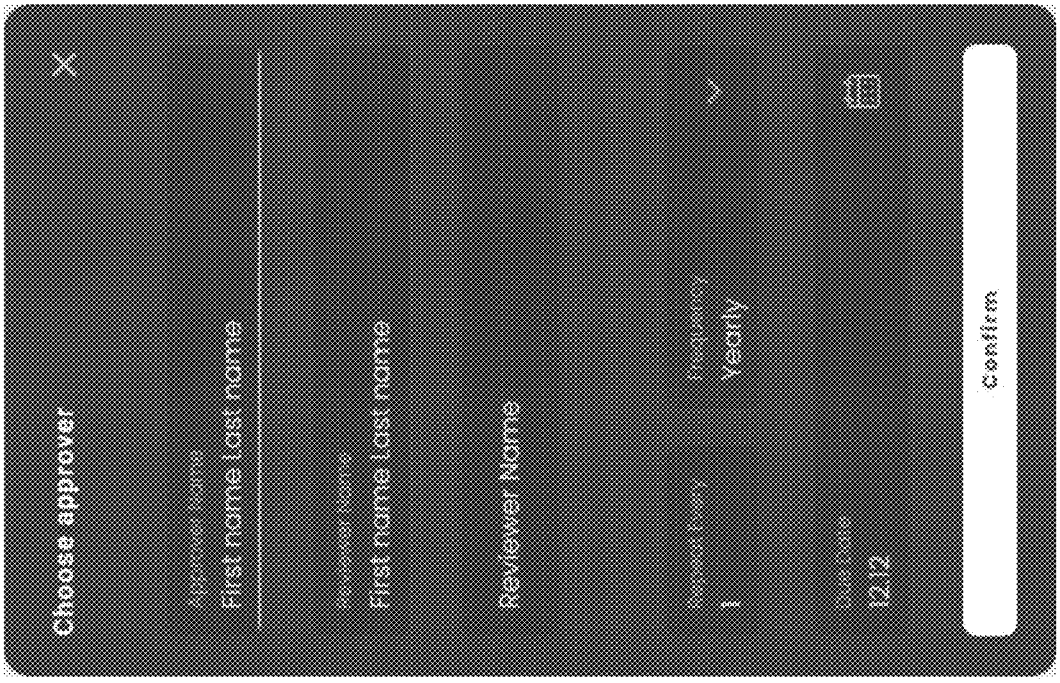
Figure 63:
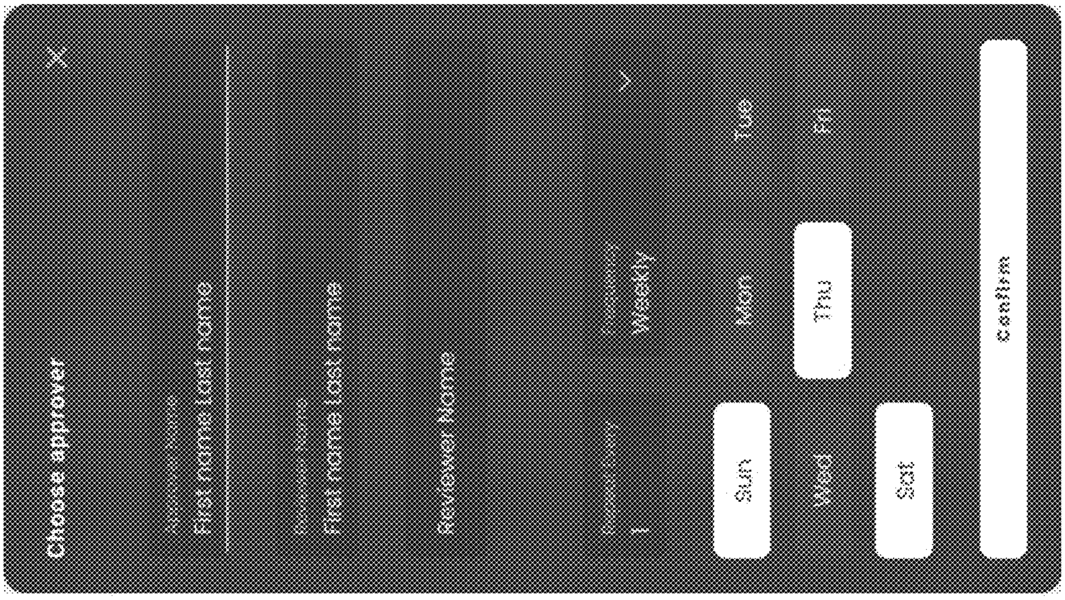
Figure 64:
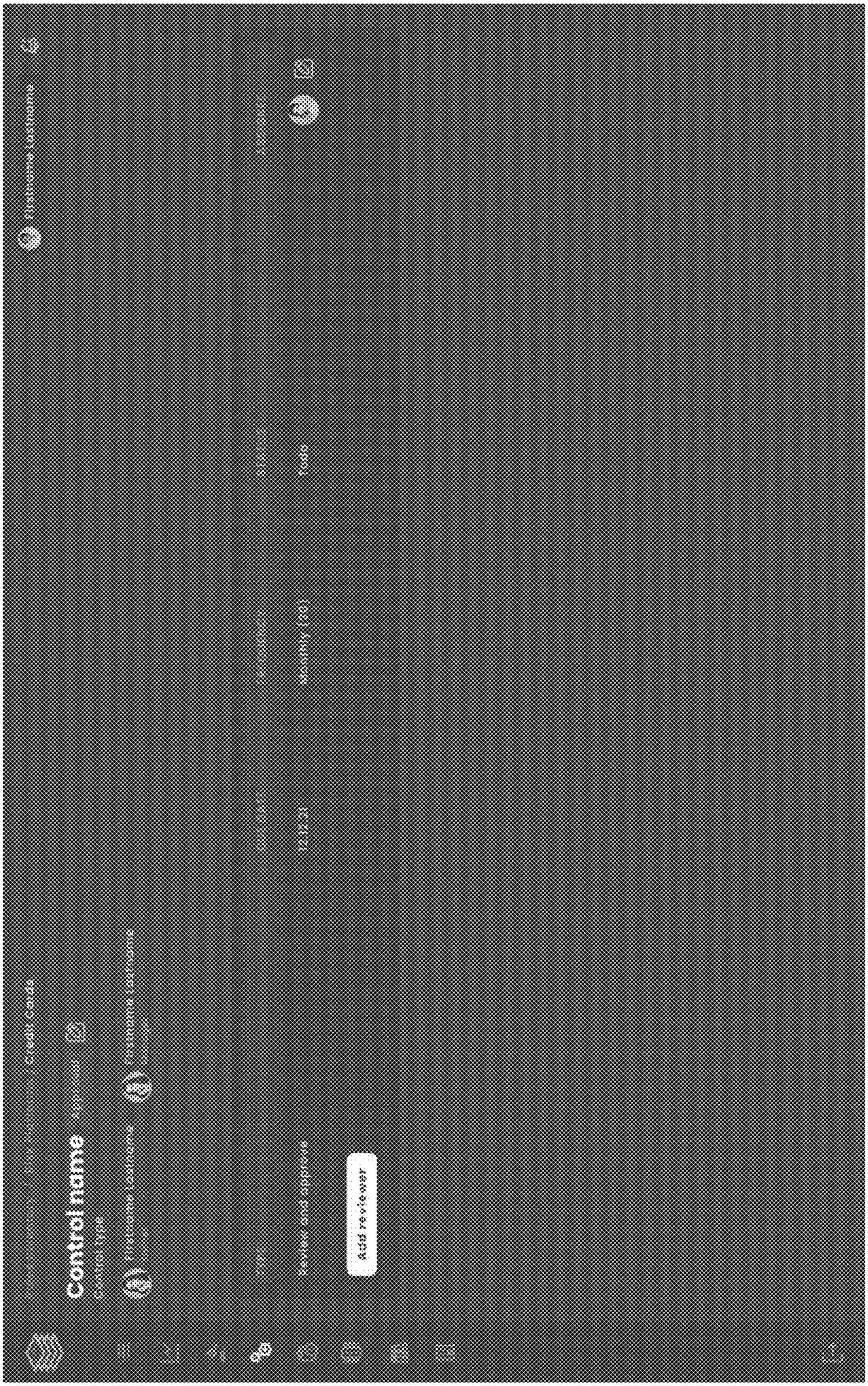

Now referring to step 224 of FIG. 2 in conjunction with FIGS. 52-54, the compliance platform 105 can display GUIs for control administration. The compliance platform 105 can display radio buttons or dots for the administrator 125 of the client 115 to select to turn on and off display of elements in the compliance platform 105. For example, the compliance platform 105 can receive selections to display or remove from display certain elements.

The compliance platform 105 can display appointments or assignments of members 130 (e.g., legal and compliance professionals) within the organization of the client 115. The compliance platform 105 can display a sign in screen for the assigned professionals to sign in to the compliance platform 105 to provide or modify the assessments or controls.

The compliance platform 105 can display regulations and their respective assessments selected via the device 120B by the administrator 125 of the compliance platform 105. The compliance platform 105 can display assessments on a three-point scale or a five-point scale or receive a customization to generate a four-point scale or a seven-point scale. Each point on the scale can correspond to a color. For example, three-point scale can include green, yellow, and red. The compliance platform 105 can receive the individual weightings based on the scale, and display calculations based on the weightings. The compliance platform 105 can advantageously use the weightings to customize display.

Now referring to step 226 of FIG. 2 in conjunction with FIGS. 55-64, the compliance platform 105 can display GUIs of control ownership. The compliance platform 105 can receive assignments of ownership of the rule via the single sign on integration. For example, the compliance platform 105 can receive an assignment of a responsible lawyer or compliance officer to the rule. The compliance platform 105 can display the assignment.

The compliance platform 105 can advantageously display or identify the members 130 with ownership or management of the rules. The assessments can indicate who owns or manages the rules. The compliance platform 105 can enable a dynamic ability to visualize assessments associated with laws and regulations. The compliance platform 105 can display a mapping between the owner of the legal and compliance laws and regulations. The compliance platform 105 can display, for the client 115 such as financial institutions receiving requests from auditors and regulators, the laws and regulations that apply to the client 115 within the organization hierarchy instead of an outdated spreadsheet. Moreover, the compliance platform 105 can advantageously display assessments and ownership for the rules and regulations.

Figure 65:
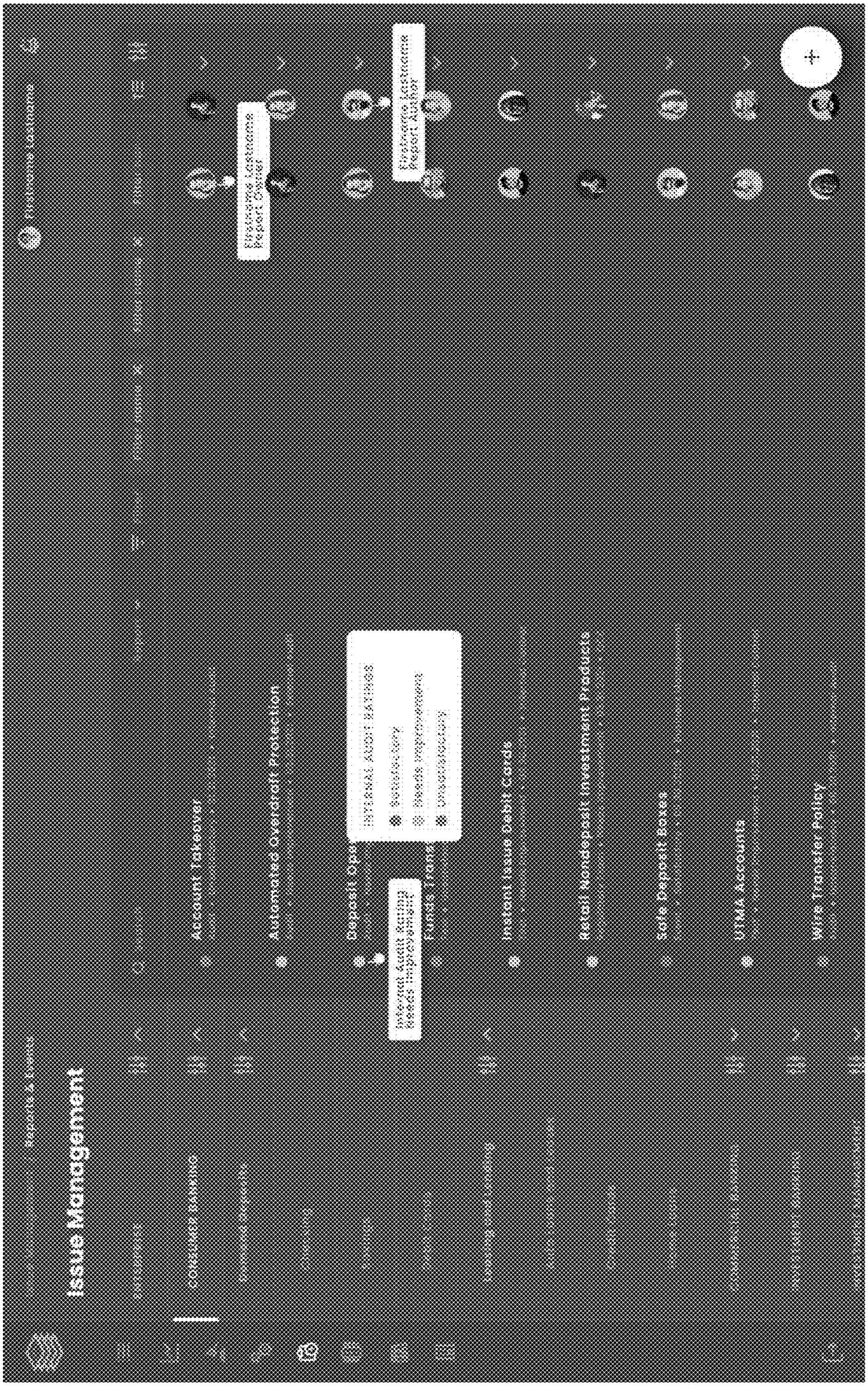
FIGS. 65-67 are GUIs of issue reports of compliance activities in compliance platform, according to an example implementation.
Figure 66:
Figure 67:
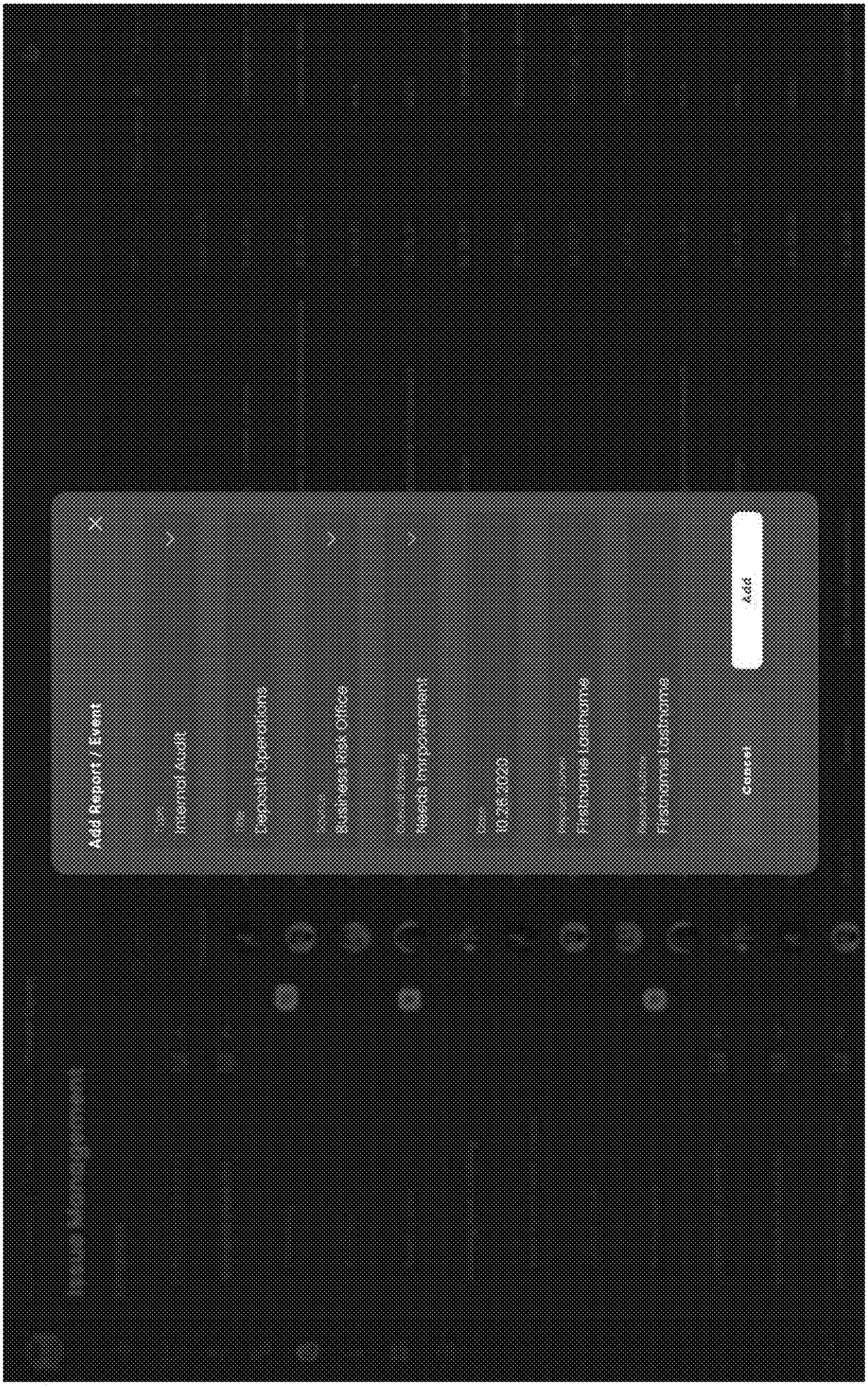

Now referring to step 228 of FIG. 2 in conjunction with FIGS. 65-67, the compliance platform 105 can display GUIs of issue reports. The compliance platform 105 can display issues, which can be compliance related events such as but not limited to an anticipated audit or whistleblower report. The compliance platform 105 can display issues associated with regulatory examinations, internal audits, or compliance testing. The compliance platform 105 can display issues received from the devices 120 via the APIs. The compliance platform 105 can display audits of the client 115 (e.g., account firm or bank). The compliance platform 105 can display internal control groups such as reviews for compliance or review for regulators (e.g., FAA or Food and Drug Agency (FDA)). The compliance platform 105 can display reports from these reviews that indicate whether the client 115 satisfactorily complies with applicable requirements. The compliance platform 105 can display issues such as good, bad, or medium issues. The compliance platform 105 can display the issues for the client 115 to address the identified issues in a timely manner to comply with regulators, auditors, and compliance testers.

Figure 68:
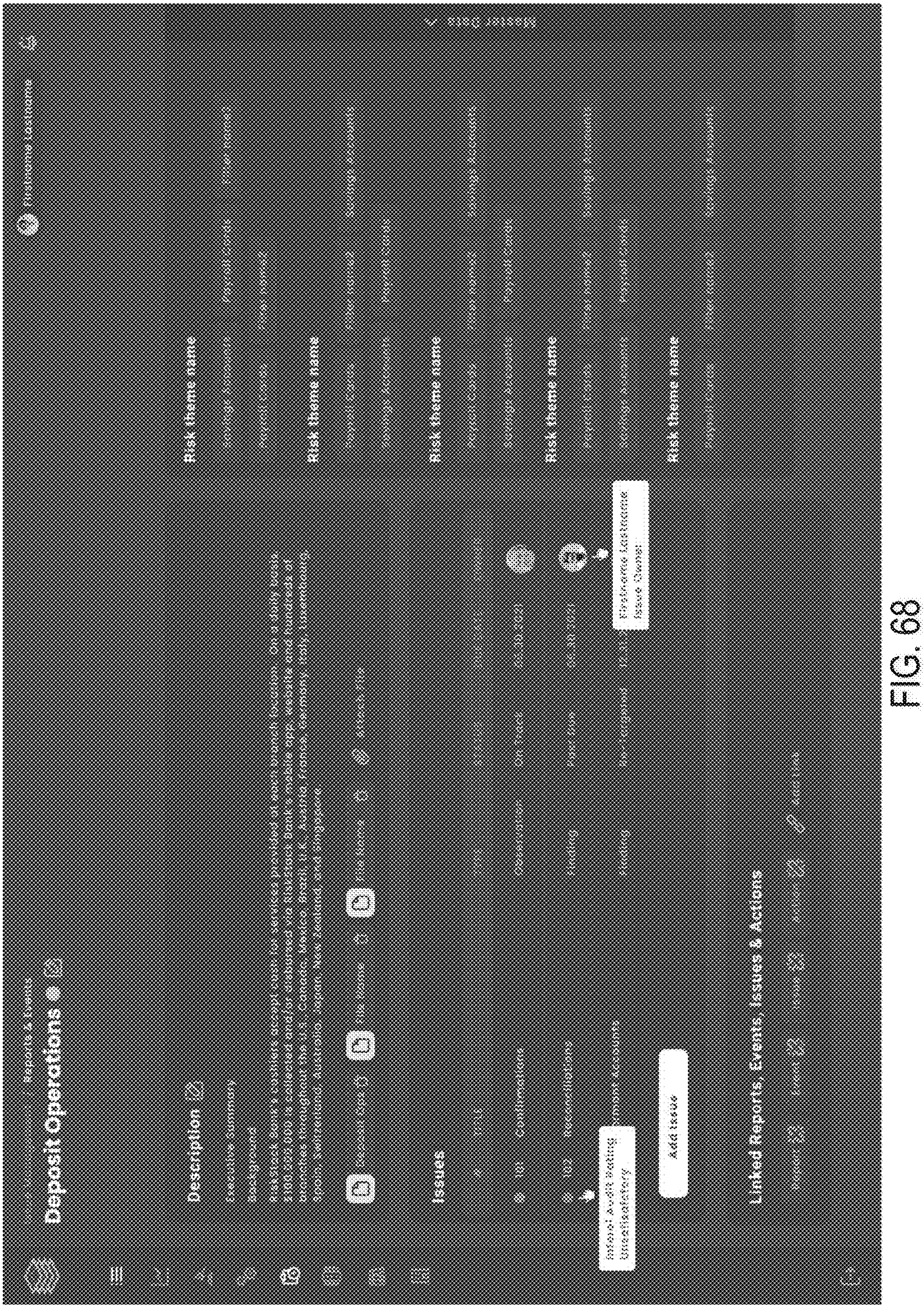
FIGS. 68-70 are GUIs of reports to provide information about reports and events in the compliance platform, according to an example implementation.
Figure 69:
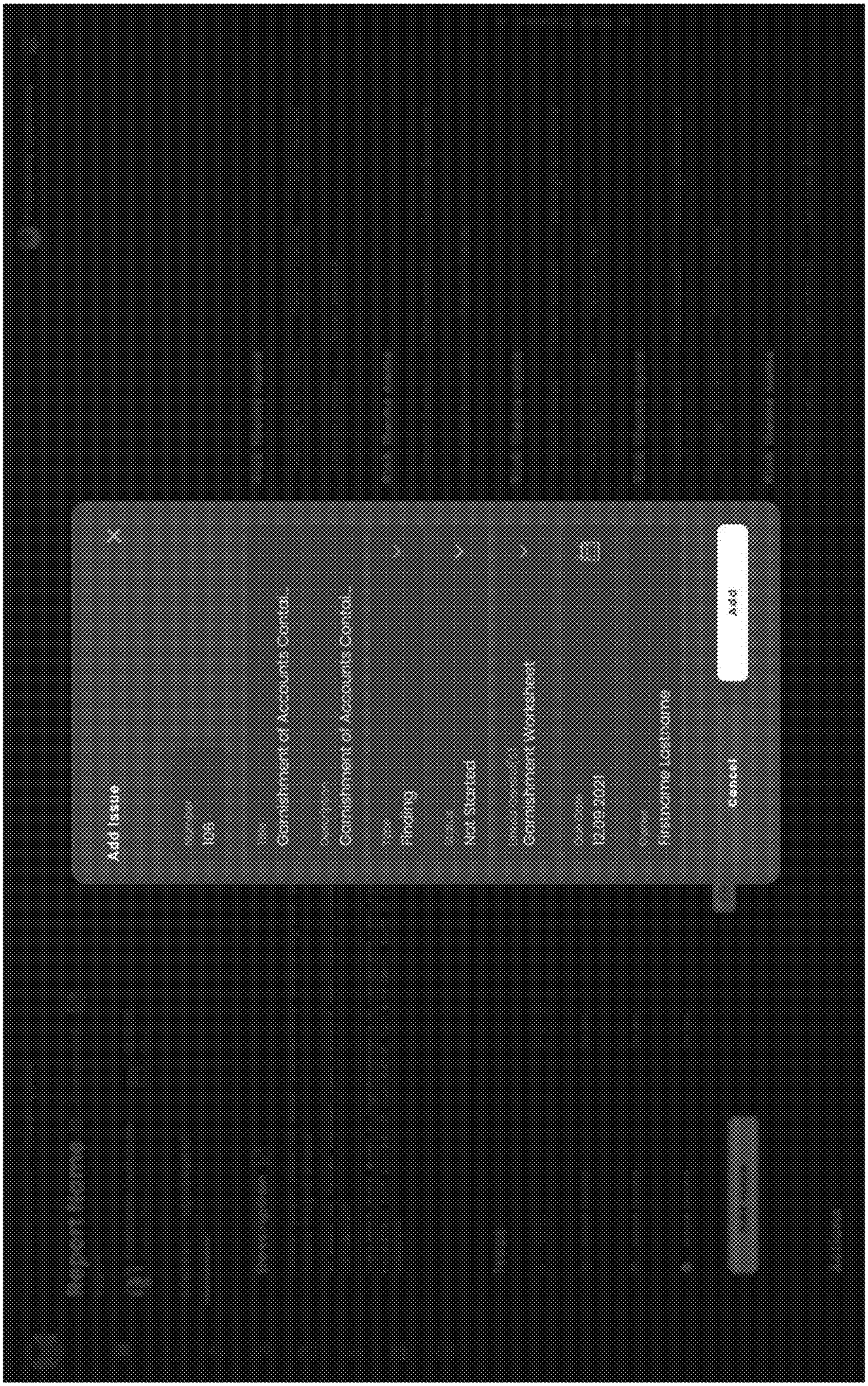
Figure 70:
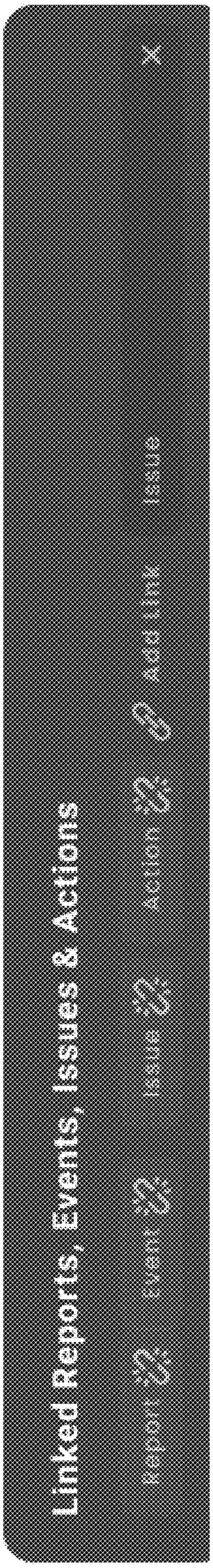

Now referring to step 230 of FIG. 2 in conjunction with FIGS. 68-70, the compliance platform 105 can display GUIs of reports. As shown in FIG. 68, the compliance platform 105 can display issues based on operations of the client 115 at its locations. The compliance platform 105 can display and traverse among rules, controls, and issues. As shown in FIG. 69, the compliance platform 105 can display selectable options for the client 115 to add an issue. The compliance platform 105 can display associations among the rules, controls, and issues for ease of use. The compliance platform 105 can display the reports and events. As shown in FIG. 70, the compliance platform 105 can display selectable filters for the client 115 to select among reports, events, issues, and actions. The compliance platform 105 can receive a request for a drill down. Responsive to the drill down, the compliance platform 105 can display an individual audit report with associated issues. Thus, the compliance platform 105 may provide a central repository of internal audit reports, compliance testing reports, regulatory exam reports, (uploaded via APIs) or address lessons learned from internal events or external events; link and track issues (via machine learning models and proprietary reference data) to commensurate controls so as control related corrective action is completed, residual risk is continuously updated; provide workflows to assign issue reviews, approvals, and ownership to certain staff via single sign-on integration to evidence appropriate governance; integrate with requirements, controls and risk assessment; and provide various customized GUIs to depict desired information.

The compliance platform 105 can display changes or issues relating to the entities, rules, and regulations. The compliance platform 105 can display that the issue was linked to a particular rule. Responsive to identifying an update to the rule, the compliance platform can display an update to the issue. The compliance platform 105 can display issues and generate reports or issue examination reports for events such as internal audits. The compliance platform 105 can display reports for regulators, compliance testing, or internal control groups. The compliance platform 105 can display the report based on a planned or unplanned event. For example, the compliance platform 105 can display an event relating to LIBOR or a whistleblower. Based on the event, the compliance platform 105 can display a compliance report. The report can be an internal audit report. The report can include modifications to address the event or issues. For example, the compliance platform 105 can display modifications to the controls made based on the report to address the event.

The compliance platform 105 can display modifications based on the events. For example, the compliance platform 105 can receive assessments for issues such as regulatory exam issues. The compliance platform 105 can display a prioritization schedule, ownership, and dates. The compliance platform 105 can display modifications to the report. The compliance platform 105 can display different versions of the report. The compliance platform 105 can display an audit report of the issue. The compliance platform 105 can display an issue and information about the issue entered into data fields. The compliance platform 105 can display issues associated with actions. The compliance platform 105 can display the issue associated with identified metadata. The compliance platform 105 can display one or more additional actions to associate with the issue.

The compliance platform 105 can integrate reports and events for the client 115. The compliance platform 105 can display the issues underlying the reports and events for the client 115 to manage the actions based on their controls. The compliance platform 105 can advantageously generate reports for sharing and printing. The report can include the issues and relevant actions. For example, the compliance platform 105 can display the report with the issues and then the actions. The compliance platform 105 can display the report and assessment to desired recipients (e.g., regulators).

Figure 71:
FIGS. 71-73 are GUIs of issues and actions relating to the issues and events in the compliance platform, according to an example implementation.
Figure 72:
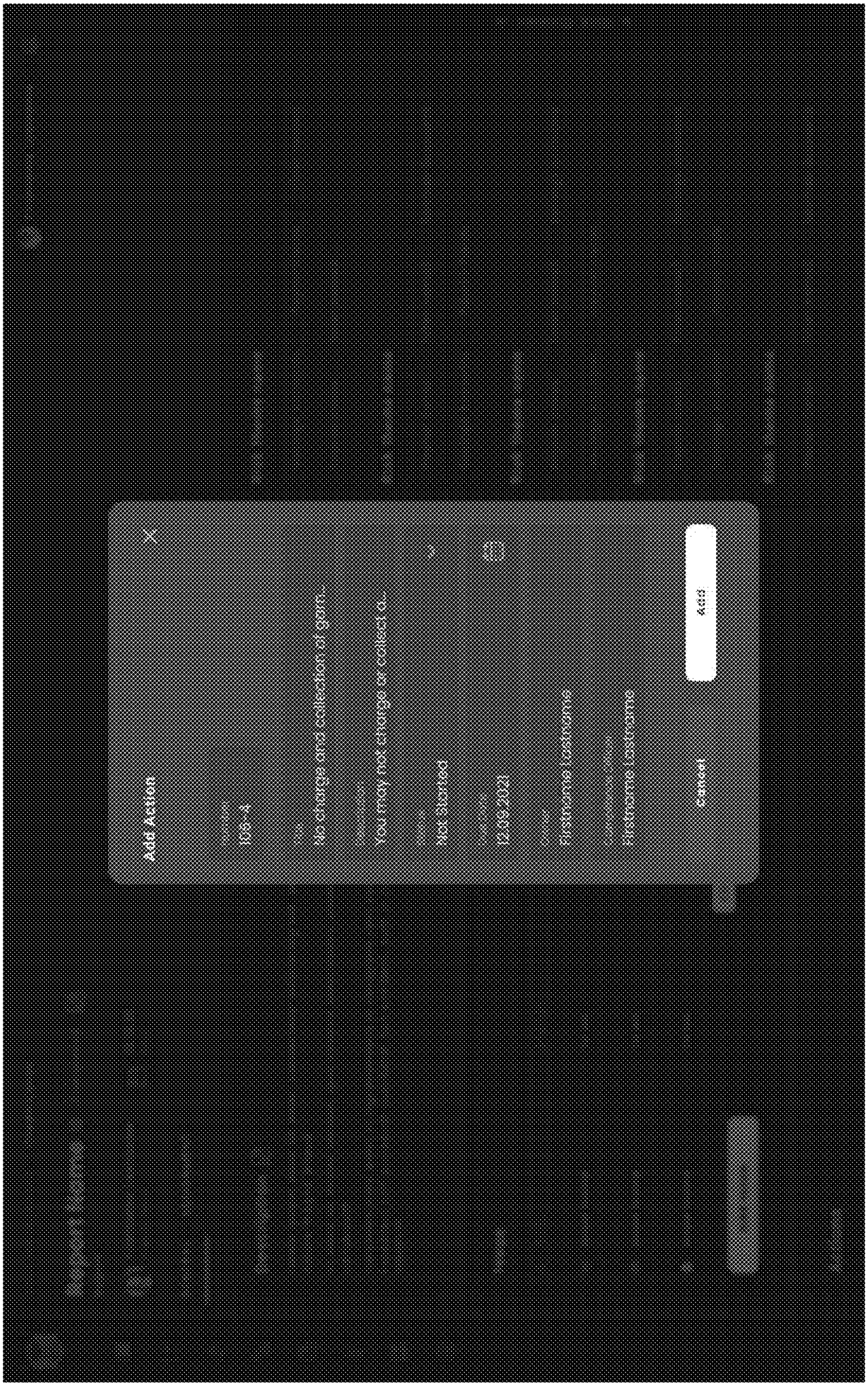
Figure 73:
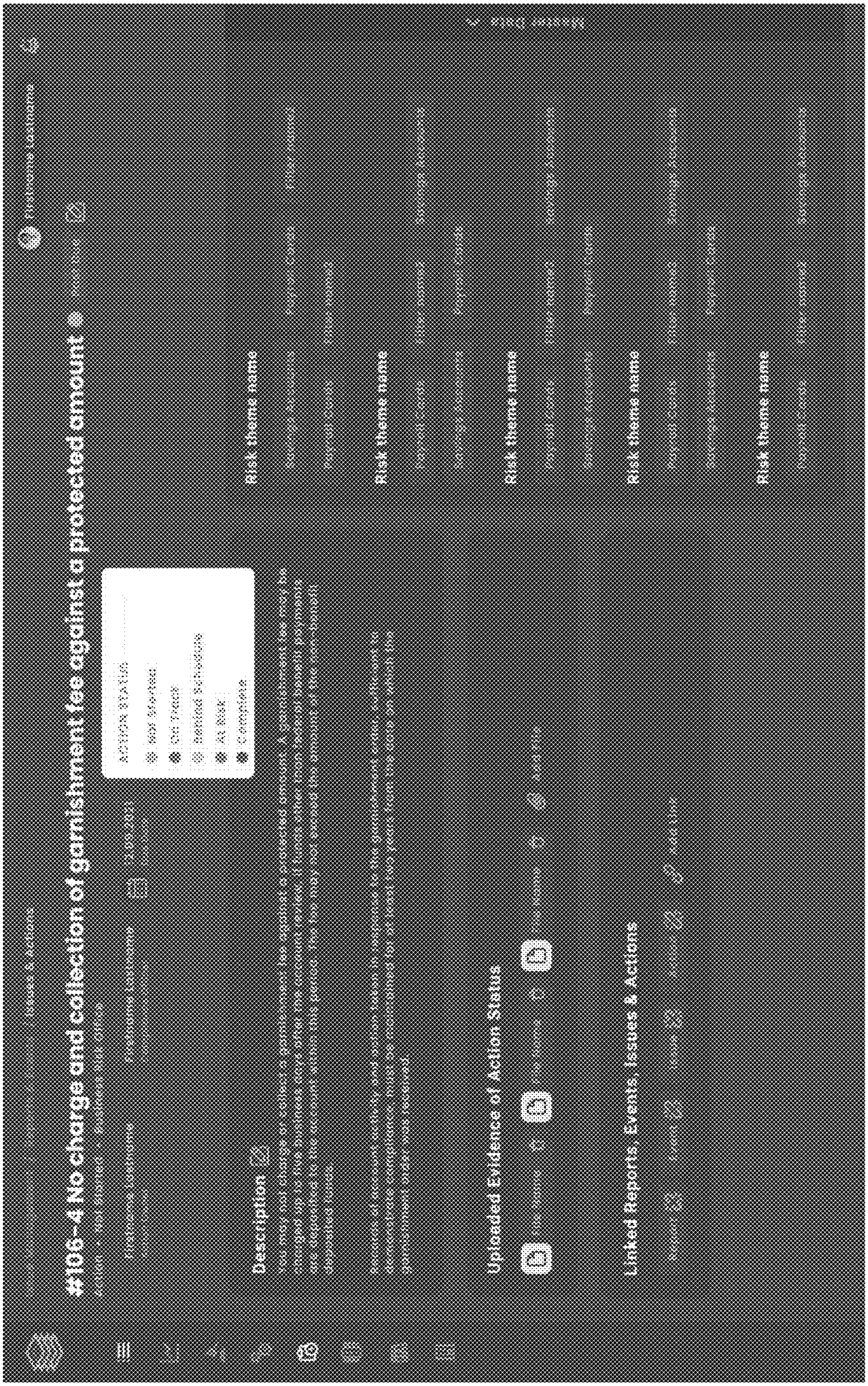

Now referring to step 232 of FIG. 2 in conjunction with FIGS. 71-73, the compliance platform 105 can display GUIs of issues and actions. Issues refer to compliance related events such as but not limited to an anticipated audit or whistleblower report, while actions refer to mitigations for the client 115 to resolve the issues. In some implementations, issues can relate to controls. The issues can relate to inadequate or ineffective controls, or new requirements that require new controls. In some implementations, issues can relate to events. For example, an event can be a scathing whistleblowing report about practices and activities of a client 115. The compliance platform 105 can display that based on an OCR scan of the report, a total quantity of negative words is above a threshold level, which indicates a negative report. As a result, the compliance platform 105 can display issues identified by the OCR of the whistleblower report such that the client 115 can proactively address those issues. The compliance platform 105 can display an updated assessment based on the issues identified in the report. The compliance platform 105 can display the report and a recommendation for the client 115 to analyze its practices (e.g., for a financial services company, its practices may relate to wealth management and retirement business practices). The compliance platform 105 can display the recommendation generated based on the controls and rules associated with the client 115. The compliance platform 105 can display the mitigations received from the regulatory entity 112, the administrator 125, or the members 130. The compliance platform 105 can advantageously enable the client 115 to reduce their reliance on outside counsel or consultants to identify the issues and how to mitigate the issues. The compliance platform 105 can advantageously display the issues and mitigations to share with external entities (e.g., auditors or regulators).

Figure 74:
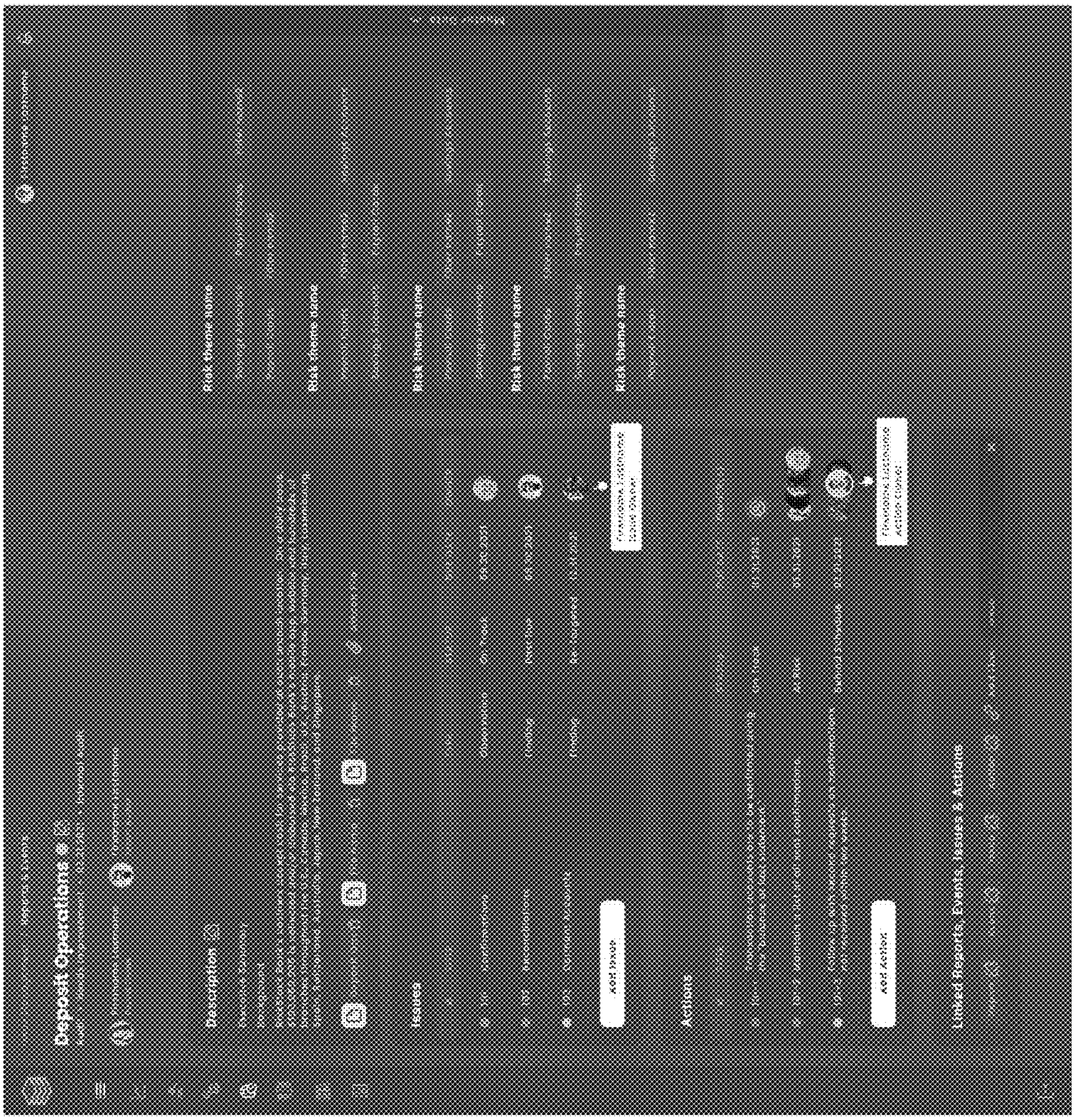
FIG. 74 is a GUI of a report summary of issues and actions in the compliance platform, according to an example implementation.
Figure 75:
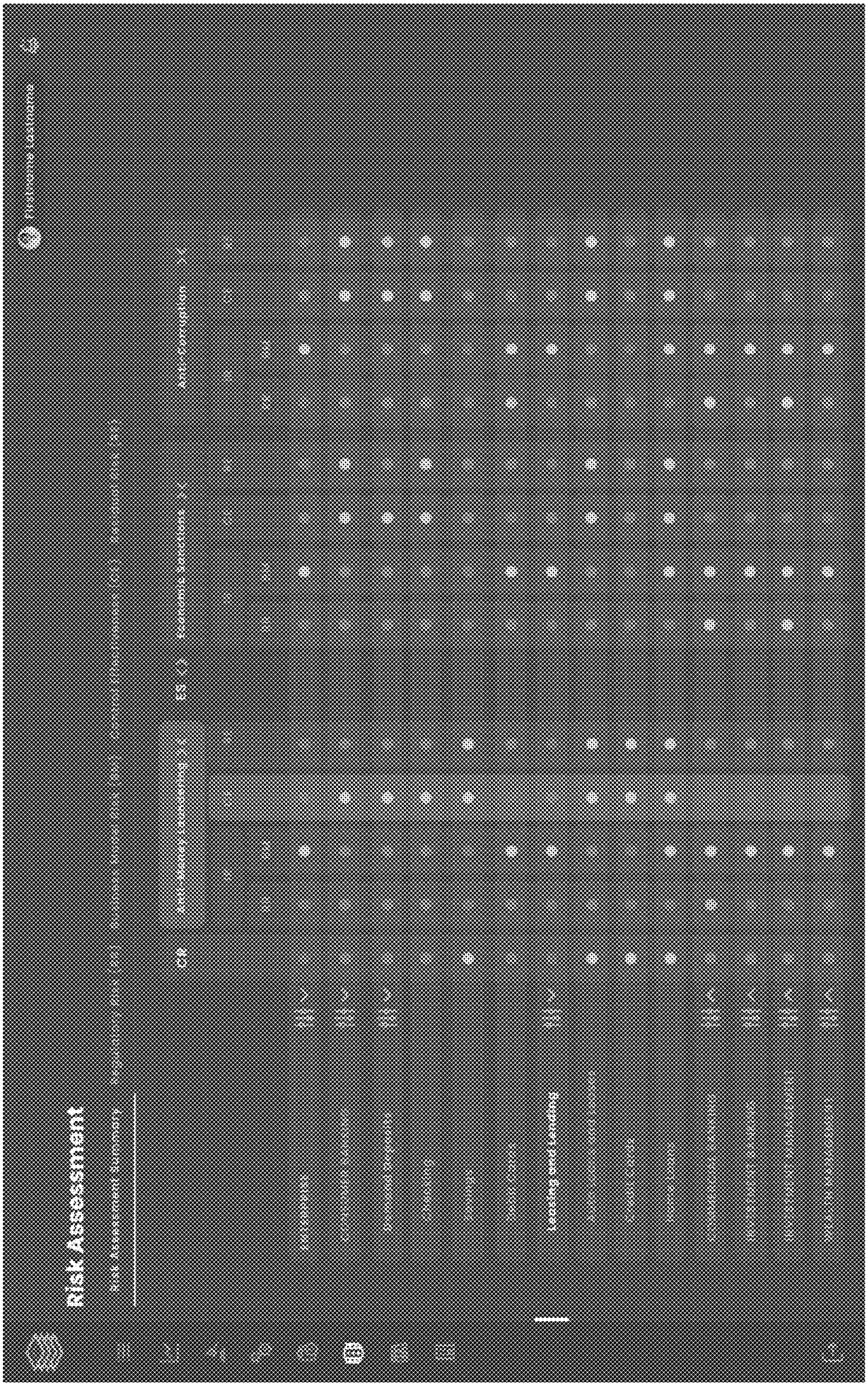
FIGS. 75-84 are GUIs of risk assessments of products and divisions in the compliance platform, according to an example implementation.
Figure 76:
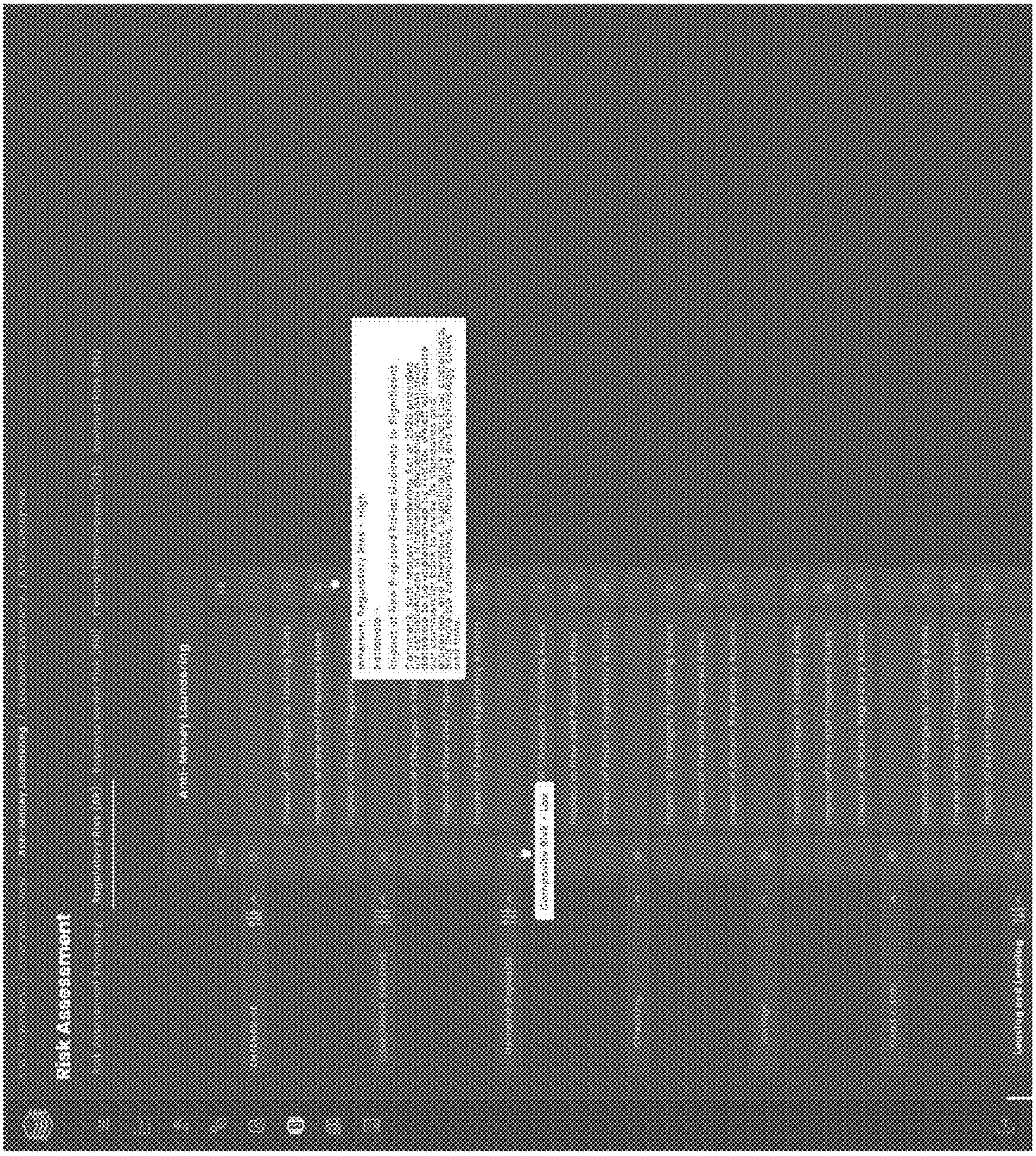
Figure 77:
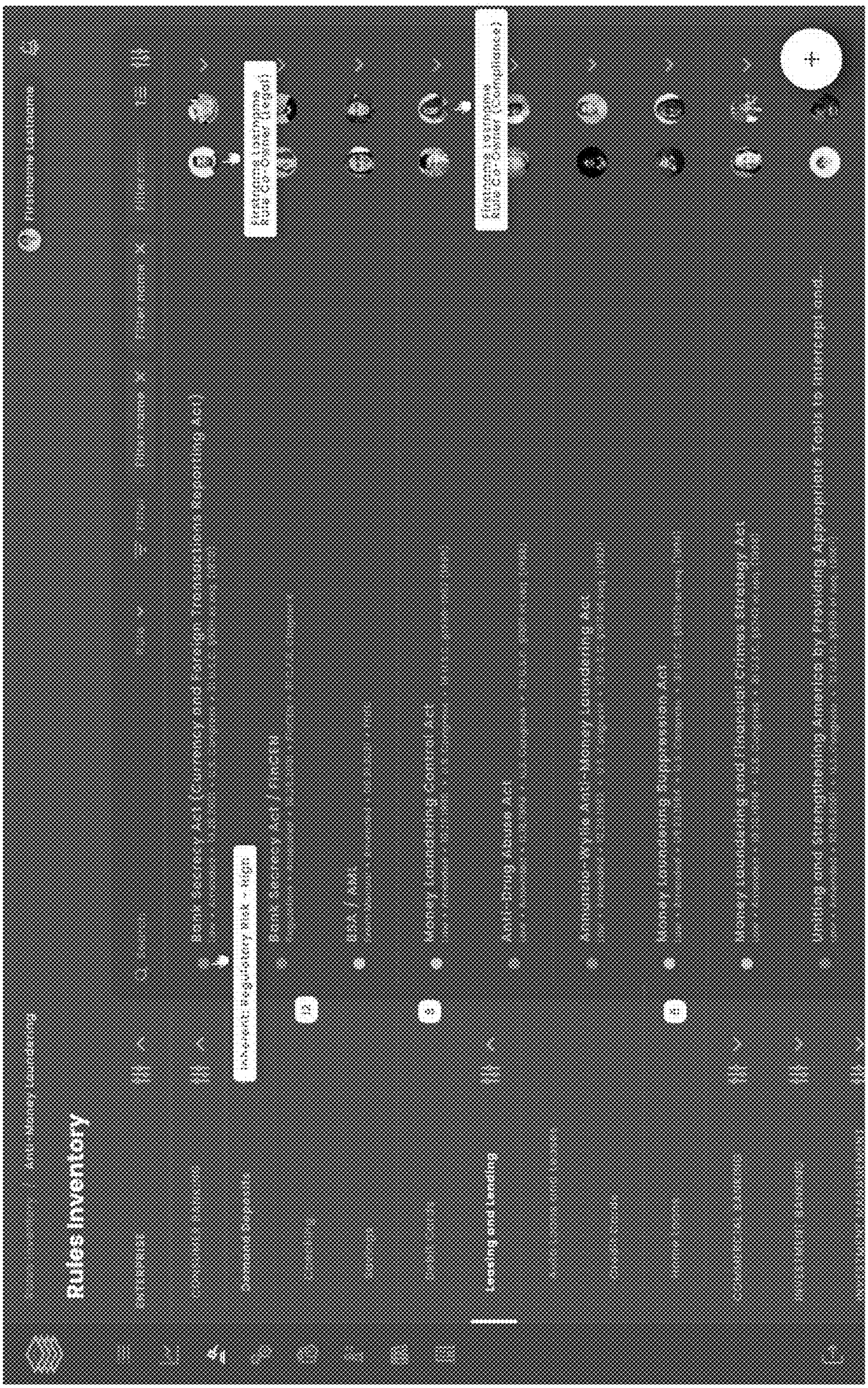
Figure 78:
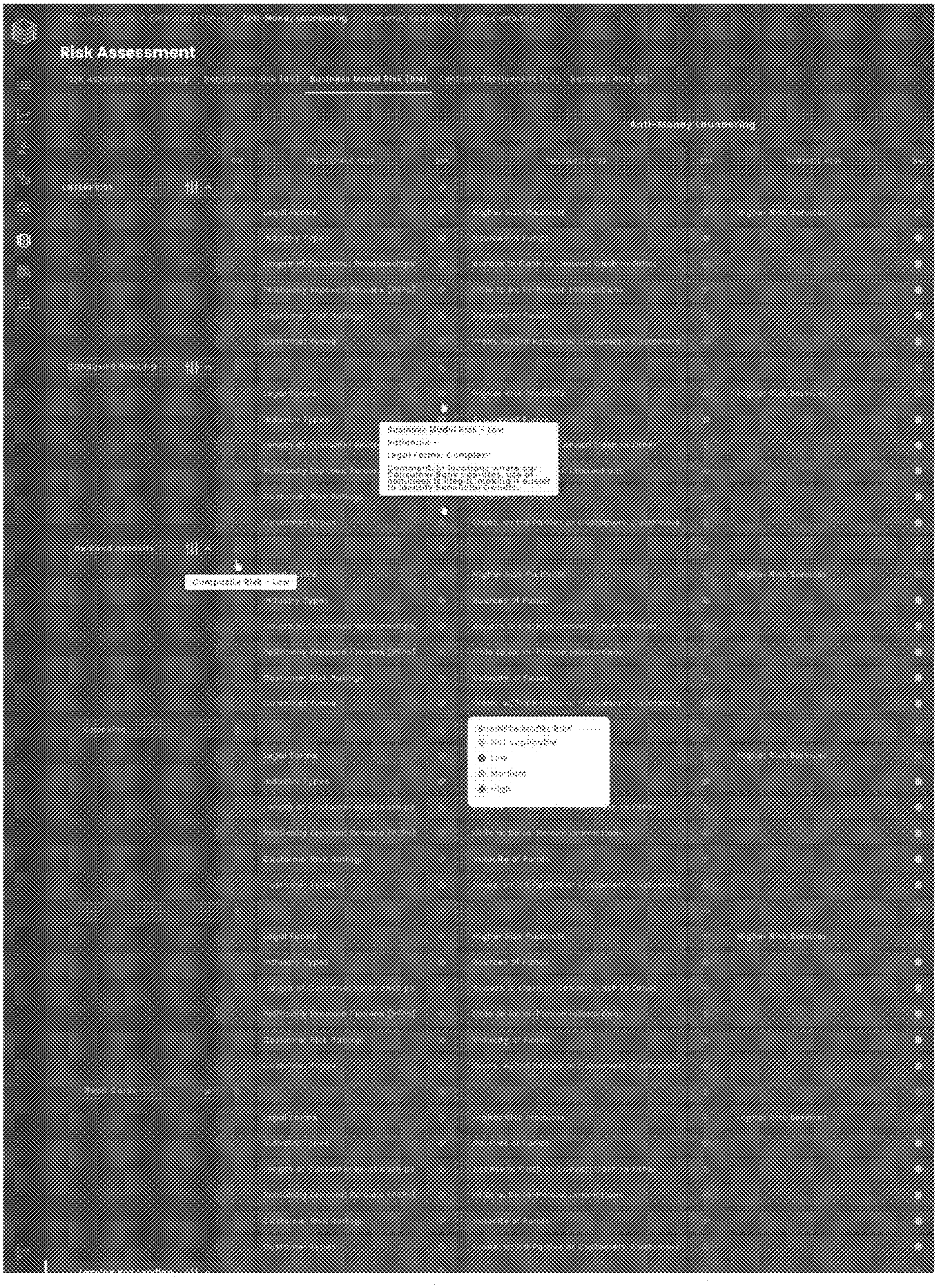
Figure 79:
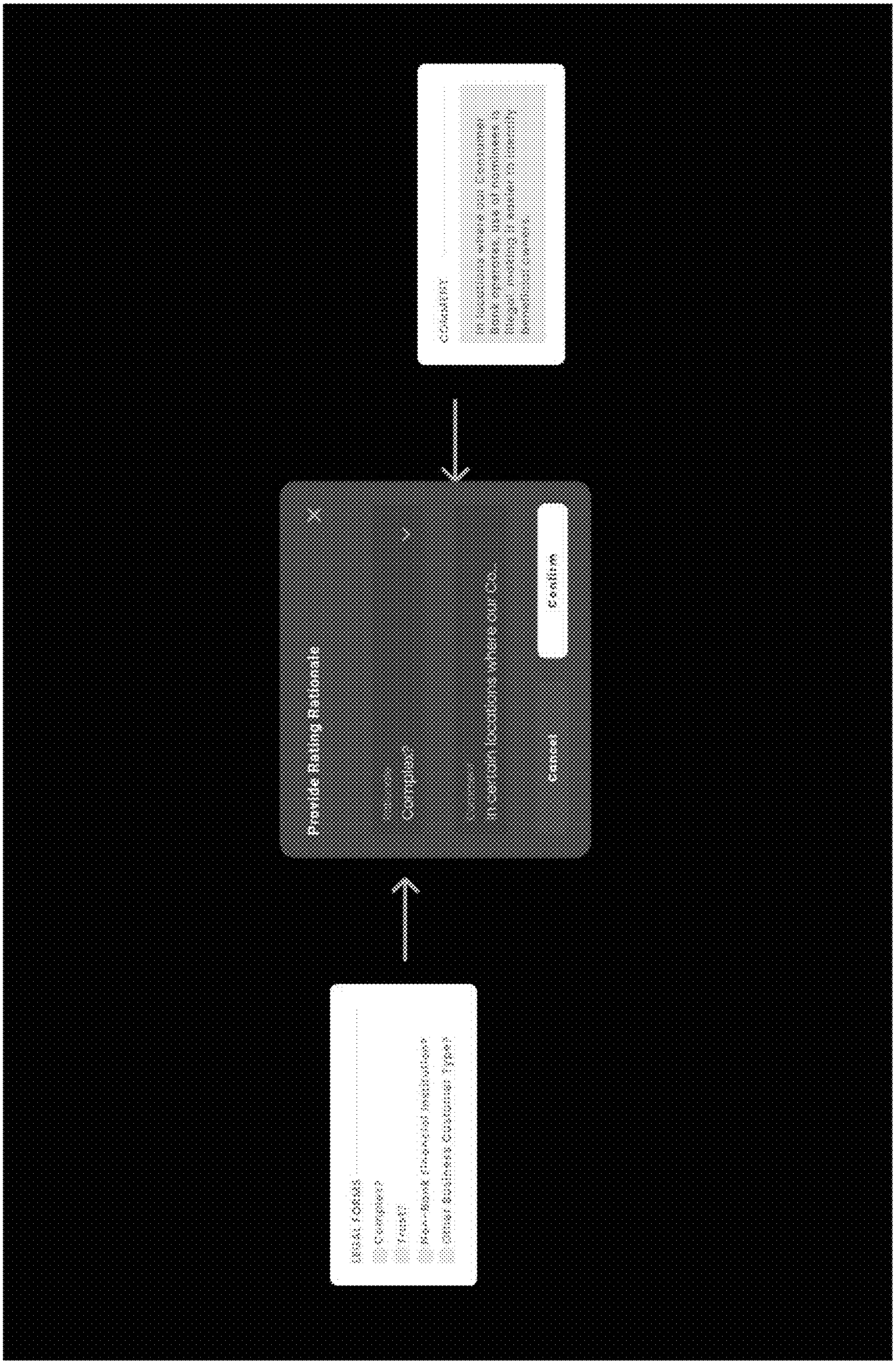
Figure 80:
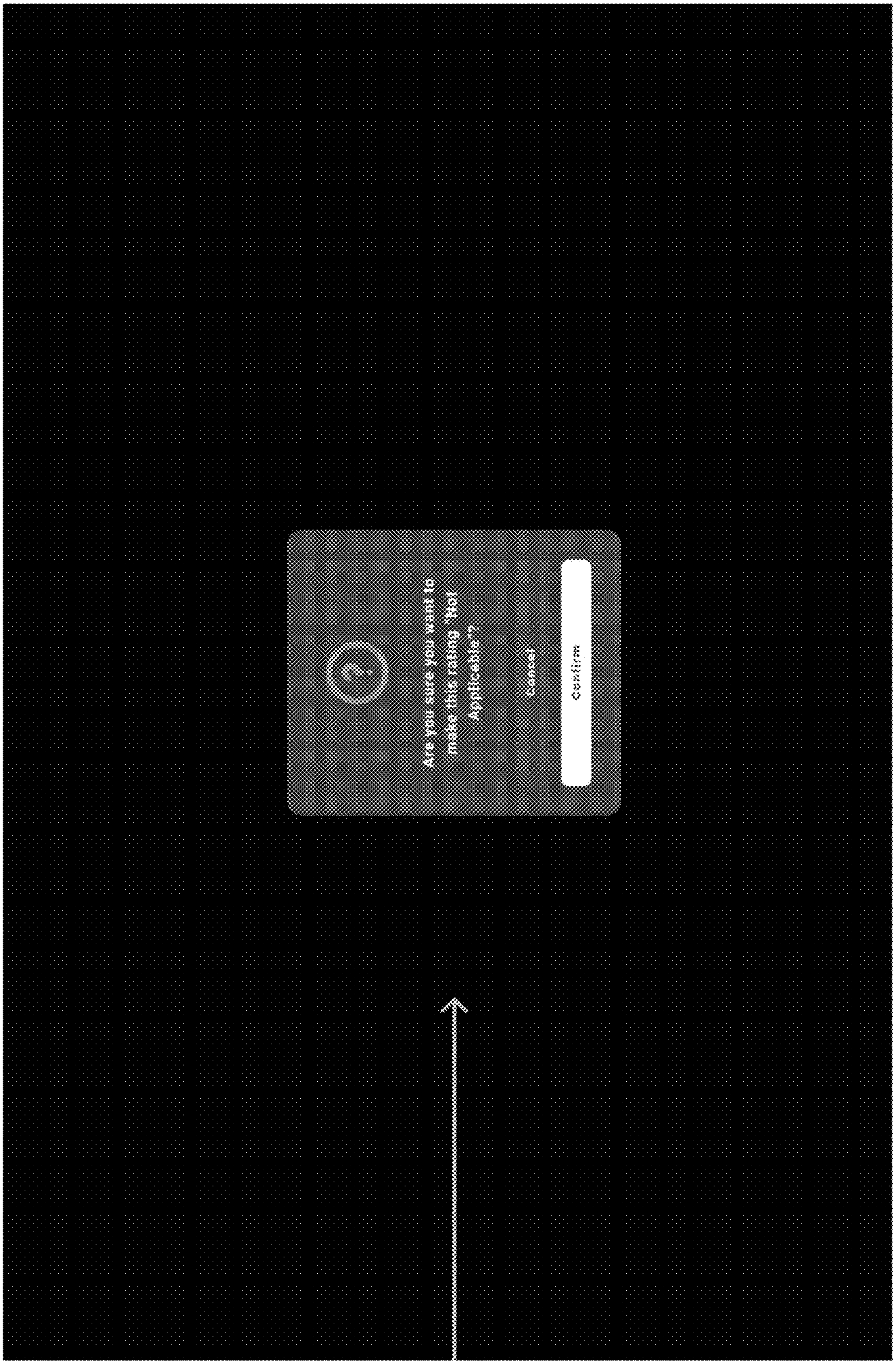
Figure 81:
Figure 82:
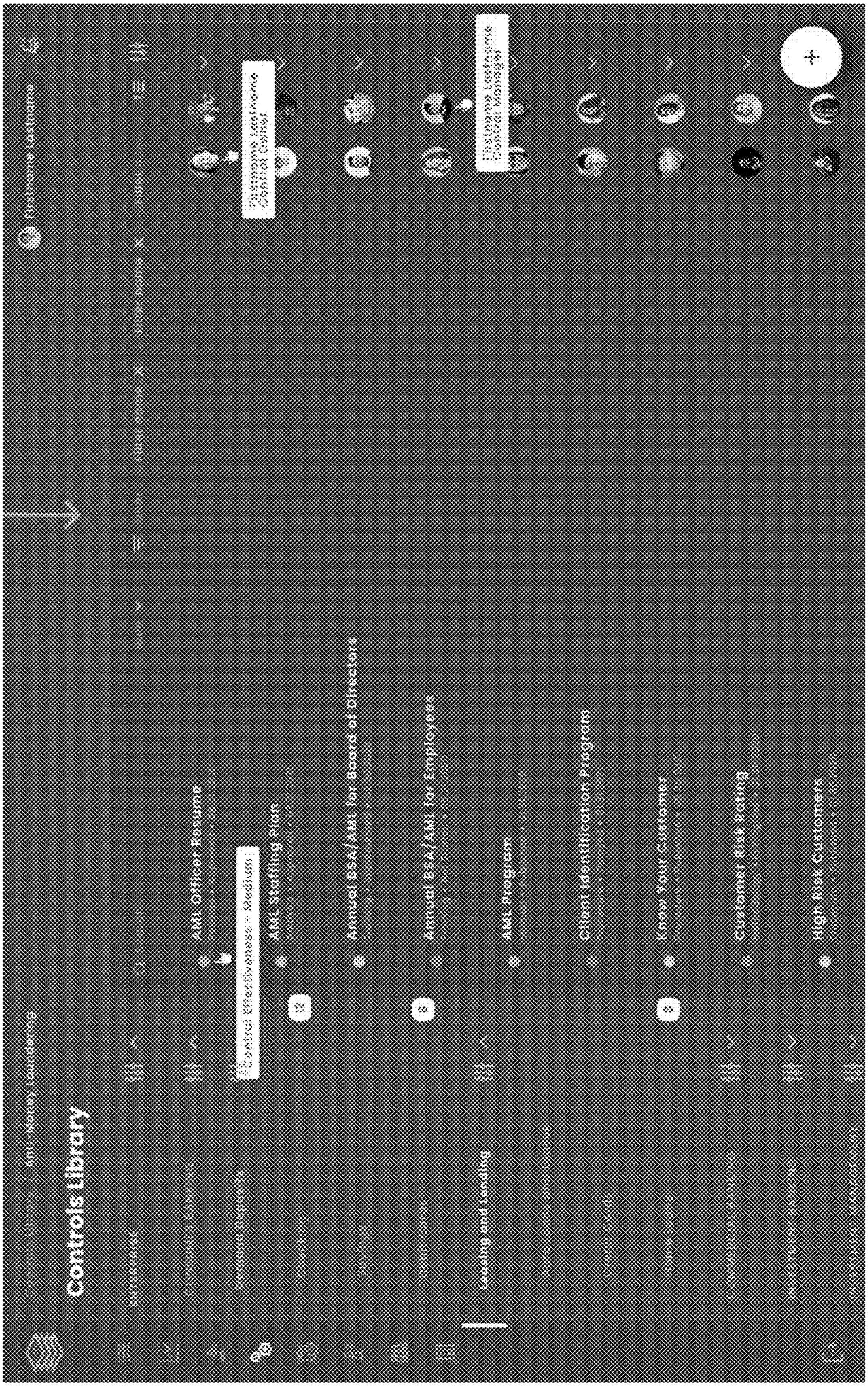

Now referring to step 234 of FIG. 2 in conjunction with FIG. 74, the compliance platform 105 can display a report summary. The compliance platform 105 can display numbers of identifiers of the issues. The compliance platform 105 can display issues associated with assessment. The compliance platform 105 can display issues that have assessments. The compliance platform 105 can display a request for a drill down within the report. Responsive to receiving the request, the compliance platform 105 can display the issues and management's action plans associated with addressing those issues. The compliance platform 105 can display the action plan that is individually numbered and aligned to the particular issue or issues. The compliance platform 105 can display the tag for the issues to enable additional drill down.

The compliance platform 105 can display a report and events. The report and events can be associated with issues present in the organization of the client and possible mitigating actions for the client 115. Whereas issues can be reactive from internal audits, compliance test, and regulatory exams, the events can be self-imposed proactive reviews. The compliance platform 105 can utilize both the issues and events to generate actions. Events can be reviews identified by the compliance platform 105 for the client 115 to take to proactively mitigate risks. For example, the issue can be that the client 115 engages in activities that can expose client to financial crimes compliance risk. In another example, during a regulatory investigation of organizations, similar organizations may want to proactively determine if they would be subject to a similar investigation. The events can be the proactive determination, which can also be known as a lessons learned exercise. The compliance platform 105 can generate issues for action based on the events such as the results of the lessons learned.

The report can include compliance related rules for the client 115. For example, reports can include rules associated with AML sanctions, anti-corruption, and the organizational structure of the client 115. The compliance platform 105 can cause the report to include composite assessments as a summary risk view. The report can include inherent assessments utilized for the assessments. The report can display inherent assessments and residual risk based on the rules inventory. The report can include business model assessments, control effectiveness, residual assessments, and other risk related assessments. The compliance platform 105 can advantageously provide the reports within an integrated system while reducing the use of externals tools. For example, the compliance platform 105 can be computationally efficient by reducing the need for the client 115 to log out of an existing system, obtain access to another system, compare the systems, and then attempt to calculate the assessments.

Now referring to step 236 of FIG. 2 in conjunction with FIGS. 75-84, the compliance platform 105 can display GUIs of assessments. The compliance platform 105 can display selectable options to modify the view. For example, within business model assessment, the compliance platform 105 can display selectable options to expand or collapse views by receiving selections of expansion and collapsing arrows. Responsive to the detecting the selections, the compliance platform 105 can display the expanded or collapsed views.

The compliance platform 105 can display assessments for activities of the client 115. In the example shown in FIGS. 75-84, the assessment is in regard to a potential financial crimes related to AML rules. The compliance platform 105 can display navigation among the organizational hierarchy. For example, the compliance platform 105 can display navigation among inherent assessment, regulatory assessment, business model assessment, which can include tabs for control effectiveness to see control environment or residual assessment in columns. As described herein, the compliance platform 105 may generate and provide real-time, continuous risk assessments conducted by rule and control owners; use standardized or custom methodologies that calculate residual risk to reflect changes to the rules inventory and controls library; link and track residual risk via machine learning models and proprietary reference data to commensurate controls so as control related work is completed, residual risk is continuously updated; and, provide customized GUIs to reflect desired information.

The compliance platform 105 can display an assessment for predefined rules or regulations included in each organization category of the client 115. For example, the compliance platform 105 can display assessment for enterprises, consumer banking, demand deposits, or checking. The compliance platform 105 can display the assessments on a scale. For example, different clients 115 might receive different inputs of assessments for different rules based on how those clients 115 approach their assessments.

The compliance platform 105 can provide an assessment. The assessment may be provided periodically (e.g., monthly, quarterly, etc.), on-demand based on a request from a client, and/or some combination thereof. Issue management can be a reactionary activity as a client 115 reacts to regulatory or auditory assessments. Assessments can be more proactive. For example, an assessment can identify compliance issues in advance and to enhance controls proactively.

The compliance platform 105 can generate a custom assessment plan for the client 115. For example, an initial assessment plan might be on a predefined value scale (e.g., three to five point scale). The compliance platform 105 can display any other scale received via the devices 120, such as, with reference to the example above, a four-point scale or a seven-point scale. The compliance platform 105 can display regulatory risk (RR), business model risk (BM), control effectiveness (CE), and residual risk (RE). The compliance platform 105 can display internal rules for reviewing the control environment as well as for regulators to provide assessments and methodologies.

The compliance platform 105 can display the derived tag data associated with the rule. Responsive to a selection of the derived tag, the compliance platform 105 can display rules associated with that tag. For example, if compliance platform 105 receives a selection via the devices 120 of an icon associated with a particular jurisdiction (e.g., Singapore), the compliance platform 105 can display the rules of that selected jurisdiction. In another example, if the compliance platform 105 receives a selection via the devices 120 of an icon associated with a particular category (e.g., consumer protection), the compliance platform 105 can display the rules for that category. The compliance platform 105 can advantageously display the derived tag to the user to enable browsing of identification of associated rules.

The compliance platform 105 can receive, via the devices 120, a selection of a line item to display the rules inventory. The rules inventory can include results of the rules and regulations that are underlying the rules or column along with a hierarchy. The compliance platform 105 can display selectable elements associated with the rules and regulations. The selectable elements can be linked to additional information about the rules and regulations. For example, the compliance platform 105 can receive, via the devices 120, a selection of the selectable element to drill down into, for example, savings. Responsive to selection of the selectable element, the compliance platform 105 can display the rules inventory page that indicates laws, regulations, or industry guidance underlying the selectable element. In another example, the compliance platform 105 can receive a selection for business model assessment. The compliance platform 105 can display regulations for regulatory assessment along with a breakdown. The compliance platform 105 can display the regulations based on and in context to the rules inventory.

The compliance platform 105 can display feedback associated with the client 115. In some implementations, the feedback is negative such as complaints. In another implementation, the feedback is positive. The compliance platform 105 can display the feedback received from users or customers of the client 115. The compliance platform 105 can display the pre-fabricated menu of choices associated with various types of ways for customers to complain in a consumer-banking context. For example, the compliance platform 105 can display icons that the users have been selecting to input their feedback. The compliance platform 105 can display customer complaints received via the APIs from internal systems or external systems For example, the feedback can be adverse actions such as those caused by the client 115 declining a loan or negative advertising, marketing, or reviews. For example, the compliance platform 105 can advantageously display generated and organized customer complaints of the client 115.

For example, the compliance platform 105 can display regulatory assessments of the client 115 to enable the client 115 to manage their assessments. The compliance platform 105 can display a selection to display a drill down of rules and regulations that define the assessments. For example, the compliance platform 105 can display a drill down view of business model assessments. Responsive to a selection of the business model for the assessments, the compliance platform 105 can display the rationale within a textbox, display a drop-down menu, or display a textbox to display the control effectiveness.

The compliance platform 105 can display the controls associated with the assessments. The compliance platform 105 can display the associated controls responsive to receiving a selection of the assessments via the devices 120. For example, the compliance platform 105 can display the associated controls in a popup. The compliance platform 105 can display, responsive to a selection, a drill down of the controls that define the assessments.

The compliance platform 105 can display the residual assessments, which are leftover assessments. The compliance platform 105 can displays the residual assessments by subtracting inherent assessments, which are regulatory plus business model assessments, from control effectiveness.

The compliance platform 105 can display changes in the rules inventory and identify the changes in the rules inventory. The compliance platform 105 can display regulatory actions associated with the rules inventory. Responsive to receiving selections of the rules inventory, the compliance platform 105 can display the rules inventory. For example, to display business model assessment, the compliance platform 105 can display various components of business model assessment. The compliance platform 105 can display subcategories in either regulation. The compliance platform 105 can advantageously display business model assessment throughout the compliance platform 105. The compliance platform 105 can display customization of the regulations for the client 115.

The compliance platform 105 can display the underlying subcategories that comprise the business model assessment that then in the composite assessment. The compliance platform 105 can display selections to change the assessments. For example, if the compliance platform 105 receives a modification of the assessment, then the compliance platform 105 can display the indicator of the assessment (e.g., rating would pop up).

The compliance platform 105 can display the control effectiveness. For example, responsive to receiving a selection of the control, the compliance platform 105 can display the controls library summary list. The compliance platform 105 can display the controls that are underlying a particular dot. For example, the administrator 125 or the members 130 (e.g., a designated AML officer) can input a staffing plan to show evidence of people in a department addressing compliance issues. The compliance platform 105 enables the AML officer to input their staffing plan via the compliance platform 105 as part of their duties as a chief compliance officer. The compliance platform 105 can display the controls library to work with the assessment and to be cross-referenced by the master data management that is static and derived.

The compliance platform 105 can display assessments integrated with the control library. The compliance platform 105 can display customized assessments. The compliance platform 105 can display issues or events, or events that are associated with a particular control. The compliance platform 105 can display a shareable risk assessment. The compliance platform 105 can display changes to the assessments. The compliance platform 105 can advantageously displays an all-in-one solution to reduce reliance on separate systems.

Figure 83:
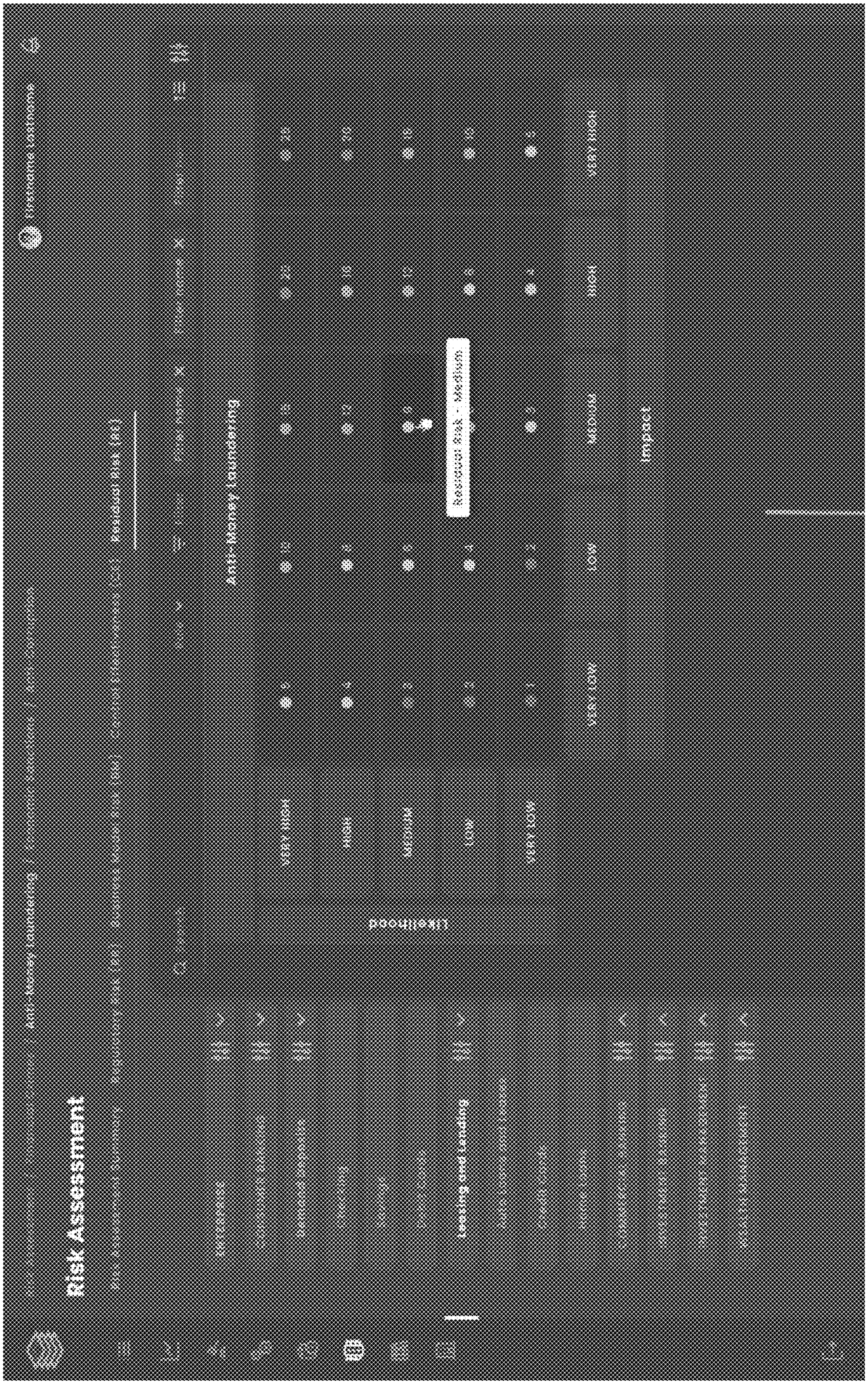
Figure 84:
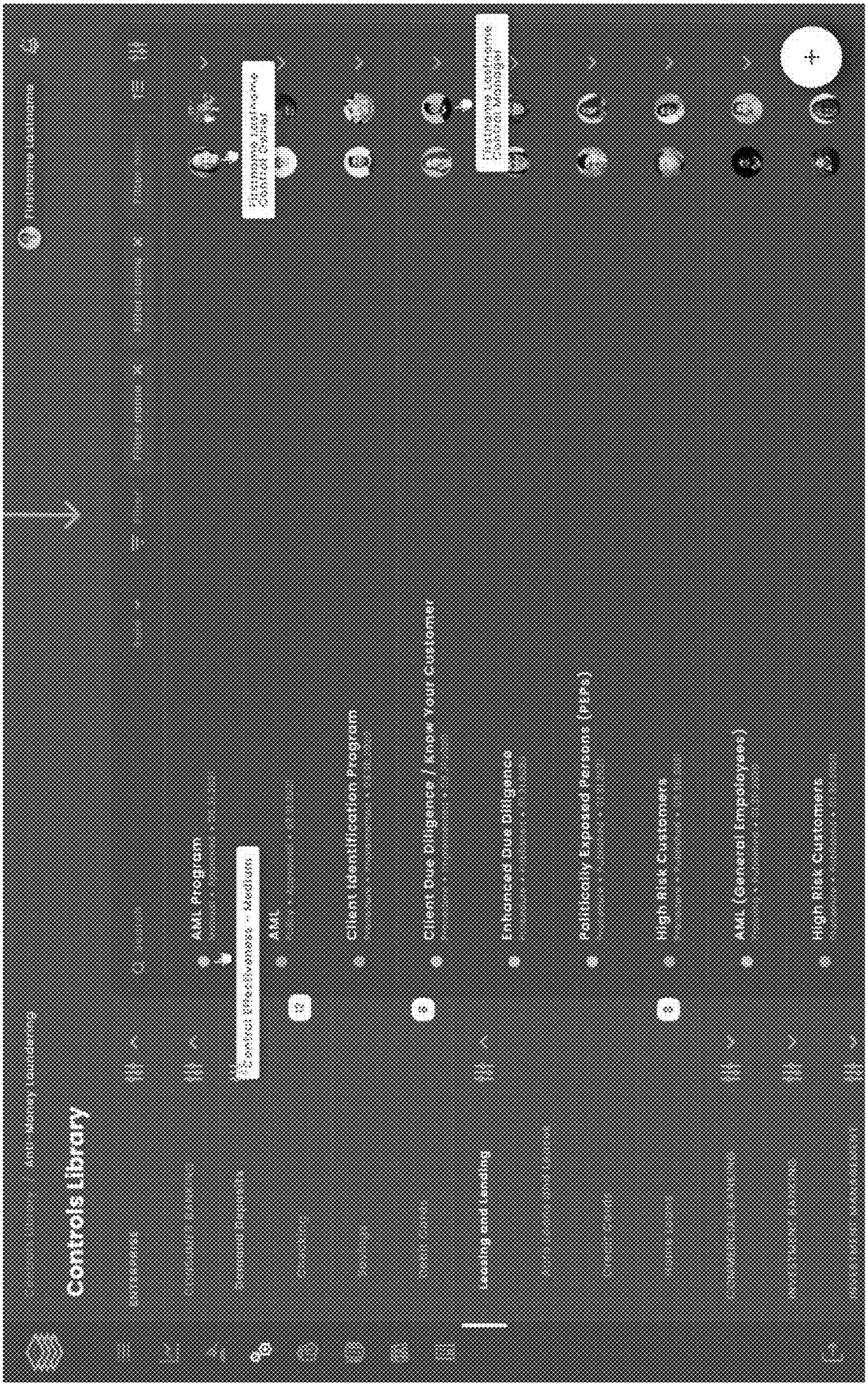

As shown in FIG. 83, the compliance platform 105 can display a GUI that includes residual assessment. The compliance platform 105 can display the interface that combines inherent assessment plus or minus control effectiveness. For example, if the controls are perfect, then the compliance platform 105 can display low inherent assessment. In another example, if the controls are not perfect or a client 115 has an ineffective control environment, then the compliance platform 105 can display that there is an increased assessment of noncompliance. The compliance platform 105 can analogize regulatory assessment and business model assessment and inherent assessment based on a business model of the client 115.

The compliance platform 105 can display calculations that, absent a controlled environment for assessment, are based on the products and services provided by the client 115 or the geography (e.g., Singapore EU or Columbia). The compliance platform 105 can display calculations associated with a business model assessment plus or minus control assessment that equals residual assessment. Responsive to receiving a selection, the compliance platform 105 can display a summary interface. Responsive to receiving a selection of a selectable element for residual assessment medium, the compliance platform 105 can display specific assessment units. For example, the compliance platform 105 can display a summary page that indicates the rules for a particular selectable element, the controls, and issues associated with that control. For example, the compliance platform 105 can receive, from the regulatory entity 112 associated with the assessment professional (e.g., an auditor, regulator, compliance officer, assessment officer, or a general counsel) a selection of the selectable element. Responsive to the selection, the compliance platform 105 can display underlying data associated with the selectable element.

The compliance platform 105 can receive, from the client 115, control types for assessment, management, approval authorities that denote governance, and the components of their assessments. The compliance platform 105 can receive, from the client 115, rules and inherent assessment based on the applicable rules, business model, and their control effectiveness. The compliance platform 105 can display residual risk leftover from the inherent risk and subtract control effectiveness and issue management structure. For example, when the client 115 has a problem and auditors or regulators investigate or do reviews, the results of those reviews can be issues. The compliance platform 105 can display such issues. The compliance platform 105 can display a taxonomy based on the internal review groups as well as the regulators that regulate the client 115.

The compliance platform 105 can display a lifecycle for compliance management in industries such as professional services. For example, the compliance platform 105 can display applicable requirements, laws, or regulations for the industries. The compliance platform 105 can display the applicable requirements, laws, or regulations in the rules inventory.

Instead of separately displaying display laws and regulations in one tab and unconnected controls or policies and procedures in a different document format, the compliance platform 105 can relate requirements to controls. The compliance platform 105 can display selections of the controls. For example, the compliance platform 105 can display a selection of an arrow. The arrow can get turned upside down in expanded versus the collapsed view. Responsive to the selections, the compliance platform 105 can display related controls.

The compliance platform 105 can display request for the client 115 to provide, via the devices 120, assessments of the controls. The compliance platform 105 can display the assessments from the summary list. For example, the compliance platform 105 can display, to users of the client 115 with access, the rules inventory via which to receive assessments for the rule. In another example, the compliance platform 105 can display, to users of the client 115 with access, a detailed interface with the controls and receive assessments for the rule.

The compliance platform 105 can display predefined assessments for the client 115 to select. For example, the compliance platform 105 can display a standardized 3.5-point scale. The compliance platform 105 can display the standardized scales so that client 115 can quickly setup their controls. For example, smaller players such as fin-techs, community banks, or smaller broker dealers can use the standardized scales for efficiently initializing the compliance platform 105.

The compliance platform 105 can display custom indicators for the client 115 to define the assessments. For example, the compliance platform 105 can display a selection for a three-point scale or a five-point scale. The compliance platform 105 can display selections of the colors for the assessments. For example, the compliance platform 105 can display selections of various color hues such as red, yellow, or green. The compliance platform 105 can display categories such as medium to moderate. The compliance platform 105 can display percentage ranges such as 5-25%.

The compliance platform 105 can display control owners appointed by the client 115. For example, the compliance platform 105 can display the control owners that are senior level officers of the client 115 or control managers delegated to those senior officers that are in charge of those controls on a day-to-day basis. The compliance platform 105 can display the identity of the owner and the manager of the rule. The compliance platform 105 can advantageously display the identity alongside the controls without requiring a lookup, separate interface, system, or platform.

Based on the received assessments and appointments, the compliance platform 105 can display control mappings for regulators and auditors. The compliance platform 105 can display the regulations associated with the controls. The compliance platform 105 can display the assessments and the ownership of the controls. The compliance platform 105 can display the rules and regulations that apply to the client 115 and the controls put in place by the client 115 to comply with those rules and regulations.

The compliance platform 105 can display the assessments based on rule changes identified via the web scraping. The compliance platform 105 can display a request from the client 115 to flag a rule for changes. For example, the compliance platform 105 can receive the flag for the rule from an administrator of the client 115. For example, the compliance platform 105 displayed a screen scraped view of the changed flagged rule or a new bill before Congress to change the flagged rule. Responsive to the identification, the compliance platform 105 can display a notification that the flagged rule changed or might change.

The compliance platform 105 can identify rules that can benefit from assessments or re-assessments. For example, the compliance platform 105 can display regulatory exam results. The compliance platform 105 can identify that the regulatory exams are focusing on a particular control. For example, the compliance platform 105 can identify that a number of regulatory exams focusing on the particular control exceeds a predetermined threshold. Based on the focus, the compliance platform 105 can display that the assessment of the control should be updated. For example, the compliance platform 105 can display a regression analysis of what forecasts of compliance will be like in the future. For example, if the last 10 audits were positive for the client 115, then the compliance platform 115 can display a forecast that the next audit will likely be positive.

The compliance platform 105 can display comparisons between assessments from the client 115 and assessments by other clients 115 in the same industry. For example, the compliance platform 105 can identify that the client 115 provided a low assessment of a rule. The compliance platform 105 can identify that other clients in the industry provided a high assessment. Based on the difference, the compliance platform 105 can display a request for confirmation of the low assessment from the client 115. For example, the compliance platform 105 can display that most recent audits have focused on the control that the client 115 rated as low. In another example, the compliance platform 105 can display a difference between previous assessments provided by the client 115 and the current assessment. For example, the compliance platform 105 can display that the client 115 previously only provided high assessments and has now provided a low assessment. Based on the difference, the compliance platform 105 can display a request for confirmation of the low assessment from the client 115. The compliance platform 105 can display a note explaining the assessment.

The compliance platform 105 can display information for the client 115 to make decisions about rules. The compliance platform 105 can display the reports, the issues, and the tasks for the client 115 to assess. The compliance platform 105 can display the controls or tasks assigned to the representative of the client 115. The compliance platform 105 can display notes or explanations previously received from the client 115. The compliance platform 105 can advantageously display this information to the client 115 as a compliance service.

The compliance platform 105 can display selectable toggles to select among related rules, controls, and reports. For example, the compliance platform 105 can receive a selection to display rules about safeguarding client 115 assets to comply with federal laws. The compliance platform 105 can display the selected rule and any associated or linked rules such as federal rules. The compliance platform 105 can receive a selection to display controls. Responsive to the selection, the compliance platform 105 can display controls related to safeguarding client 115 assets. The compliance platform 105 can display a drop-down menu to indicate controls that can be selected for display. The compliance platform 105 can display a drop-down of reports and events to indicate reports and events selectable for display.

Figure 85:
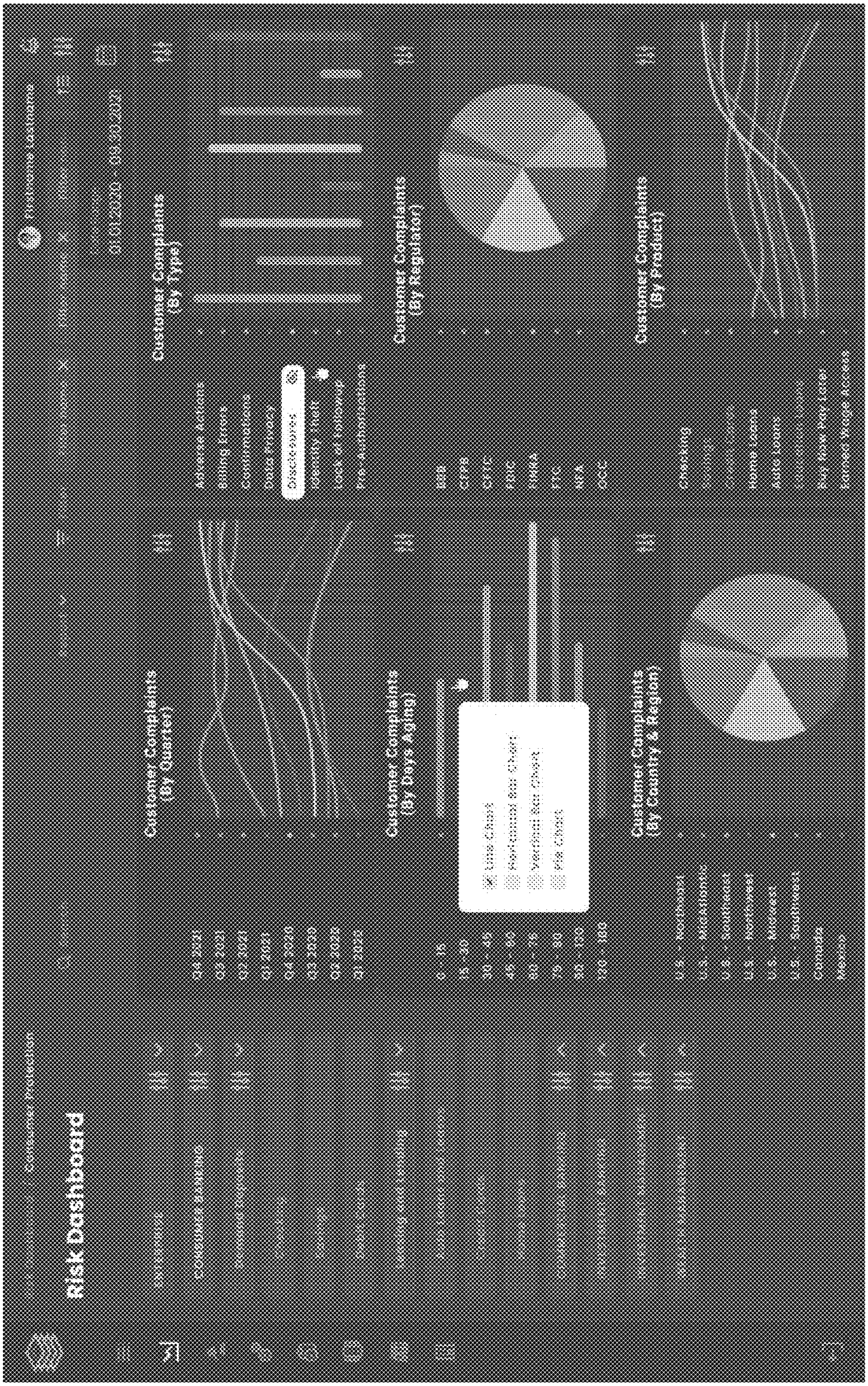
FIGS. 85-87 are GUIs of risk dashboards of events in the compliance platform, according to an example implementation.
Figure 86:
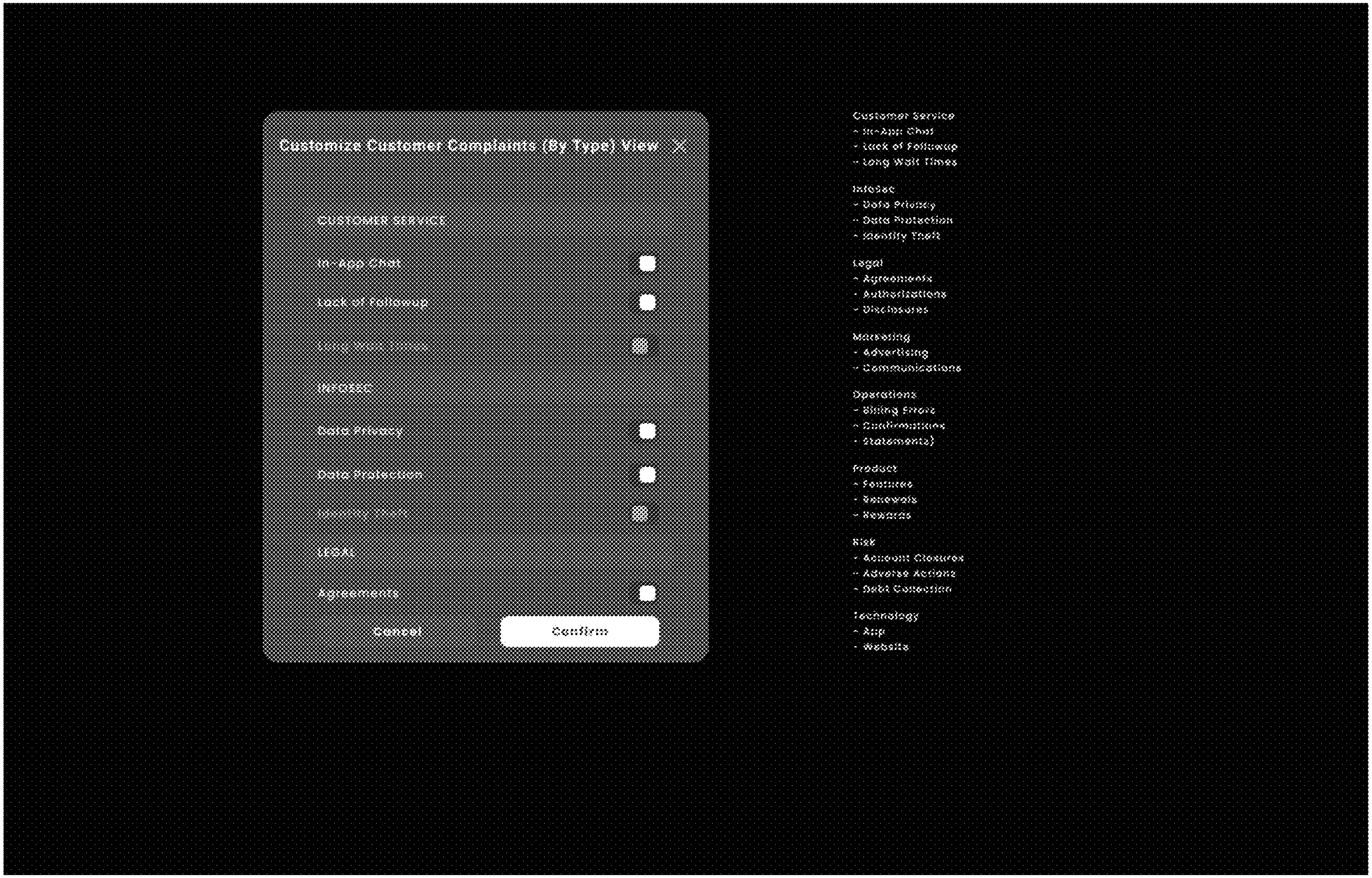
Figure 87:
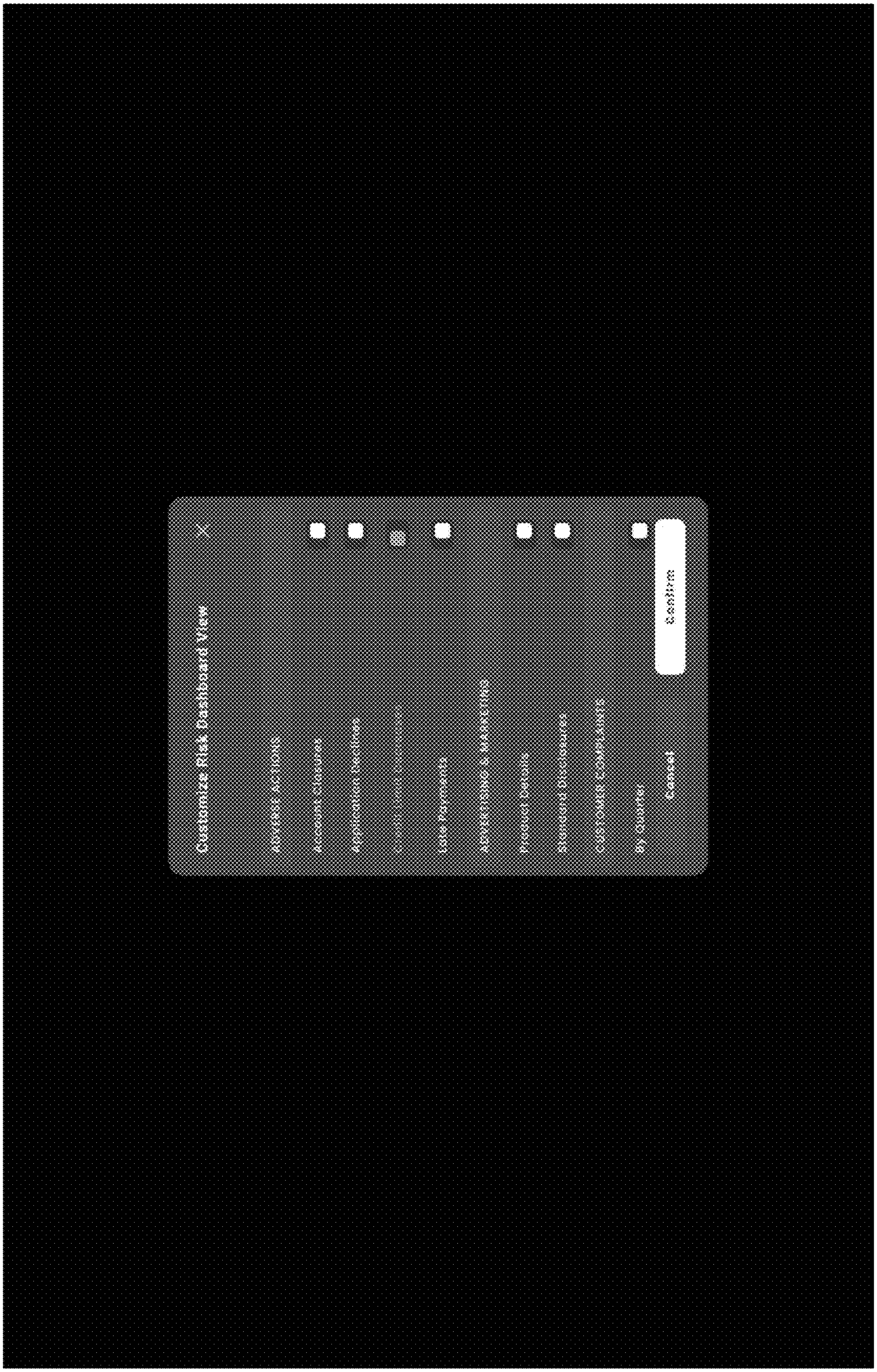

Now referring to step 238 of FIG. 2 in conjunction with FIGS. 85-87, the compliance platform 105 can display GUIs of assessment dashboards that provides a holistic via that is continuously updated in real-time or near real-time based on the acquisition of new data. The compliance platform 105 can display an assessment dashboard. The assessment dashboard can be a data visualization tool. The compliance platform 105 can display the assessment dashboard with compliance data, sales data, widgets, or operations. For example, a financial services company that caters towards wealthy individuals in a wealth management business can issue credit cards. By issuing the credit cards, the financial services company will service the cards and receive complaints. For example, the complaints can be about merchants or transactions. The compliance platform 105 can display performance indicators or assessment indicators for each complaint. For example, the compliance platform 105 can display time-based segmentation of the complaints into timeframes. The time segments can show a client 115 when to acknowledge receipt of the complaint, when to investigate and try to resolve the complaint, and when to provide notice to the customer as to the resolution of the complaint. The compliance platform 105 can display filtered complaints by region or relevant regulator. The compliance platform 105 can advantageously display visualized data for the client 115 to reduce reliance on internal analysis.

The compliance platform 105 display the assessments dashboard, which can be a visualization tool. The compliance platform 105 can display the indicators of assessments in the dashboard based on the information aggregated and received via the API. The compliance platform 105 can display the information to display in respective segments. For example, the compliance platform 105 can display curated laws and regulations in one segment and consumer protection in another segment. For example, the compliance platform 105 can display a segment directed to a consumer-banking unit of the client 115. The segment can include pre-populated assessments associated with consumer protection or compliance assessments.

The compliance platform 105 can display various user access rights defining access to the assessment dashboard. For example, the administrators can have wide access rights while individual users might not have access rights. The compliance platform 105 enables customization or filtration of consumer complaints or assessments to identify the relevant complaints and assessments.

Figure 88:
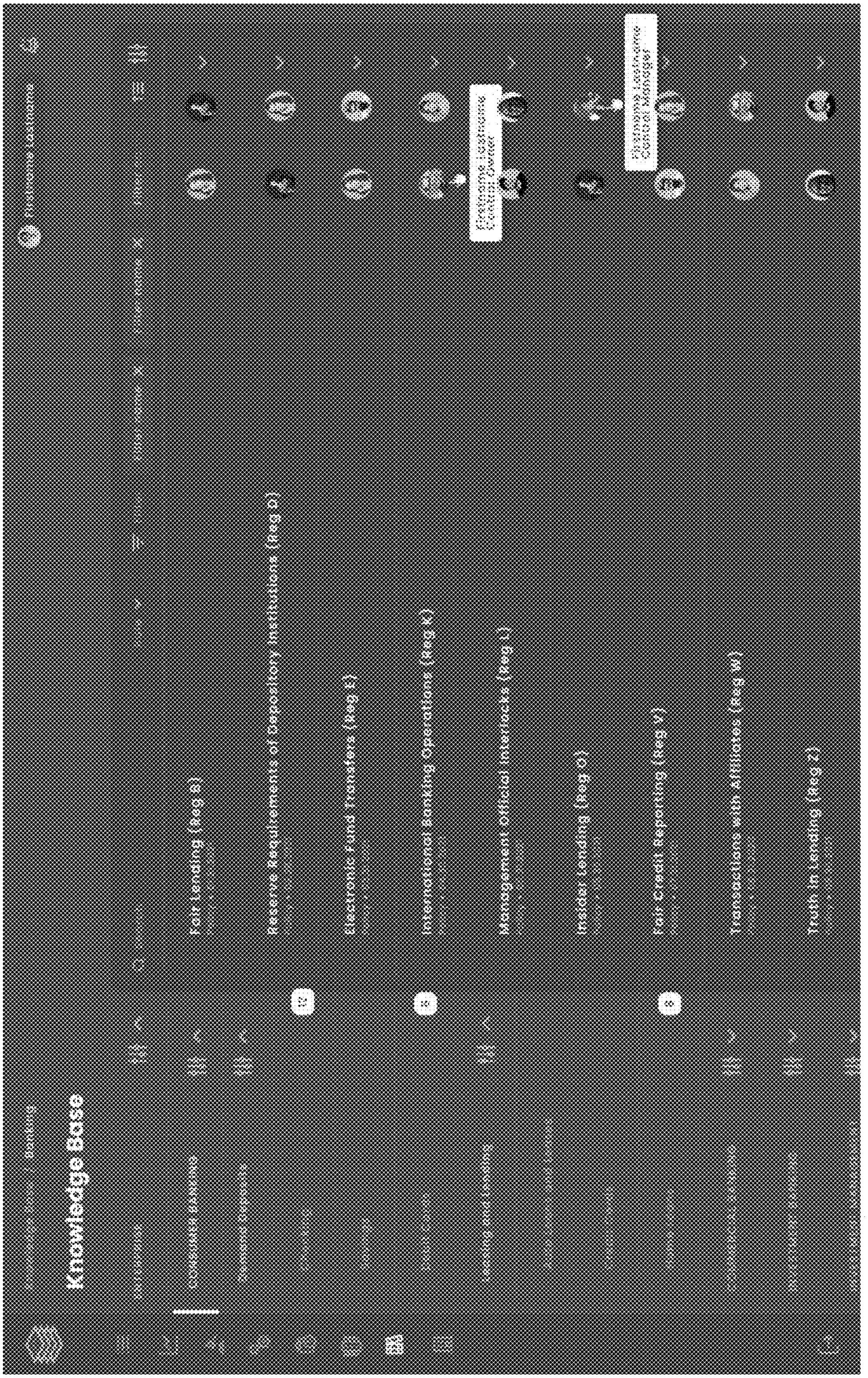
FIGS. 88-90 are GUIs of knowledge bases relating to information about products and divisions in the compliance platform, according to an example implementation.
Figure 89:
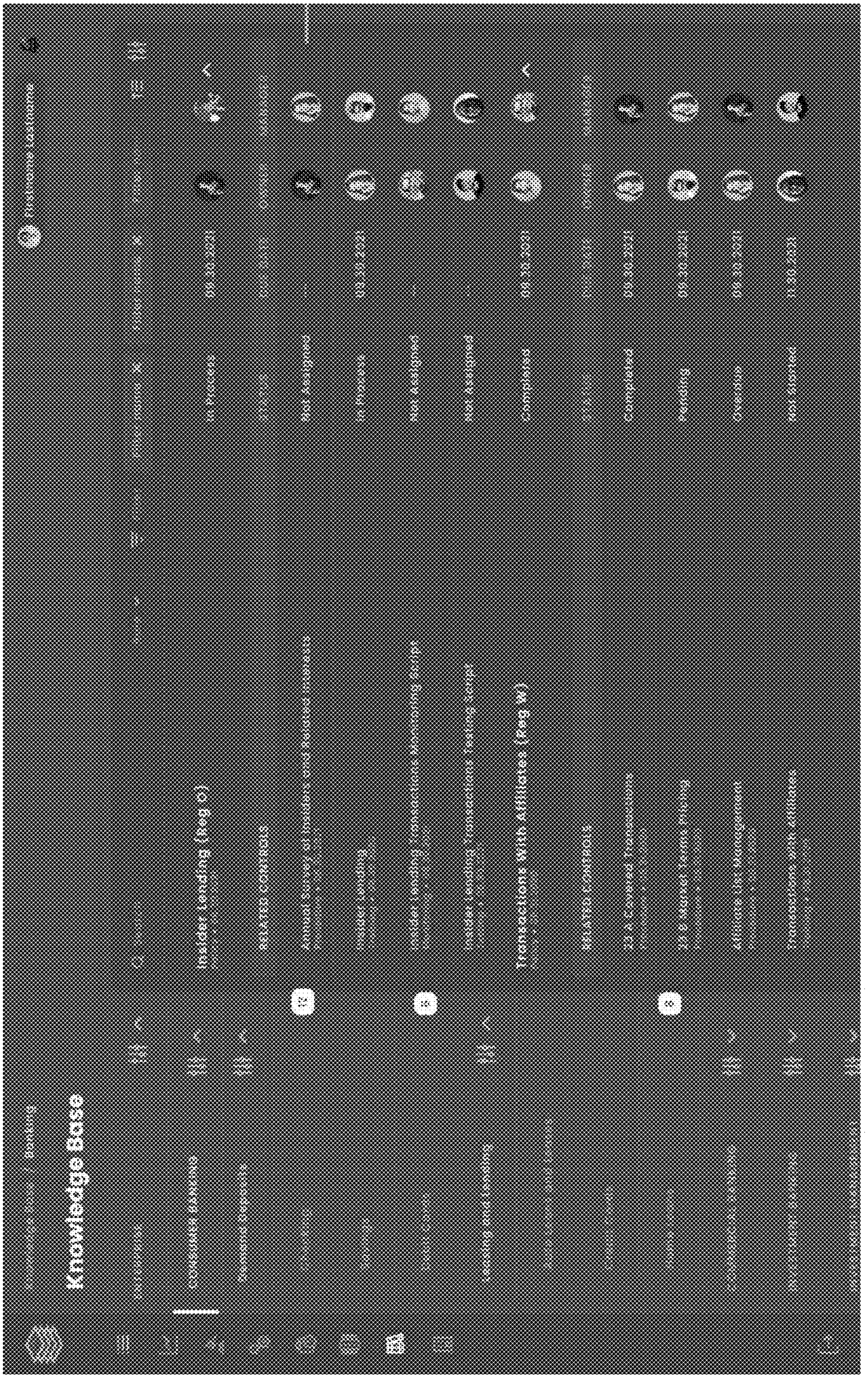
Figure 90:
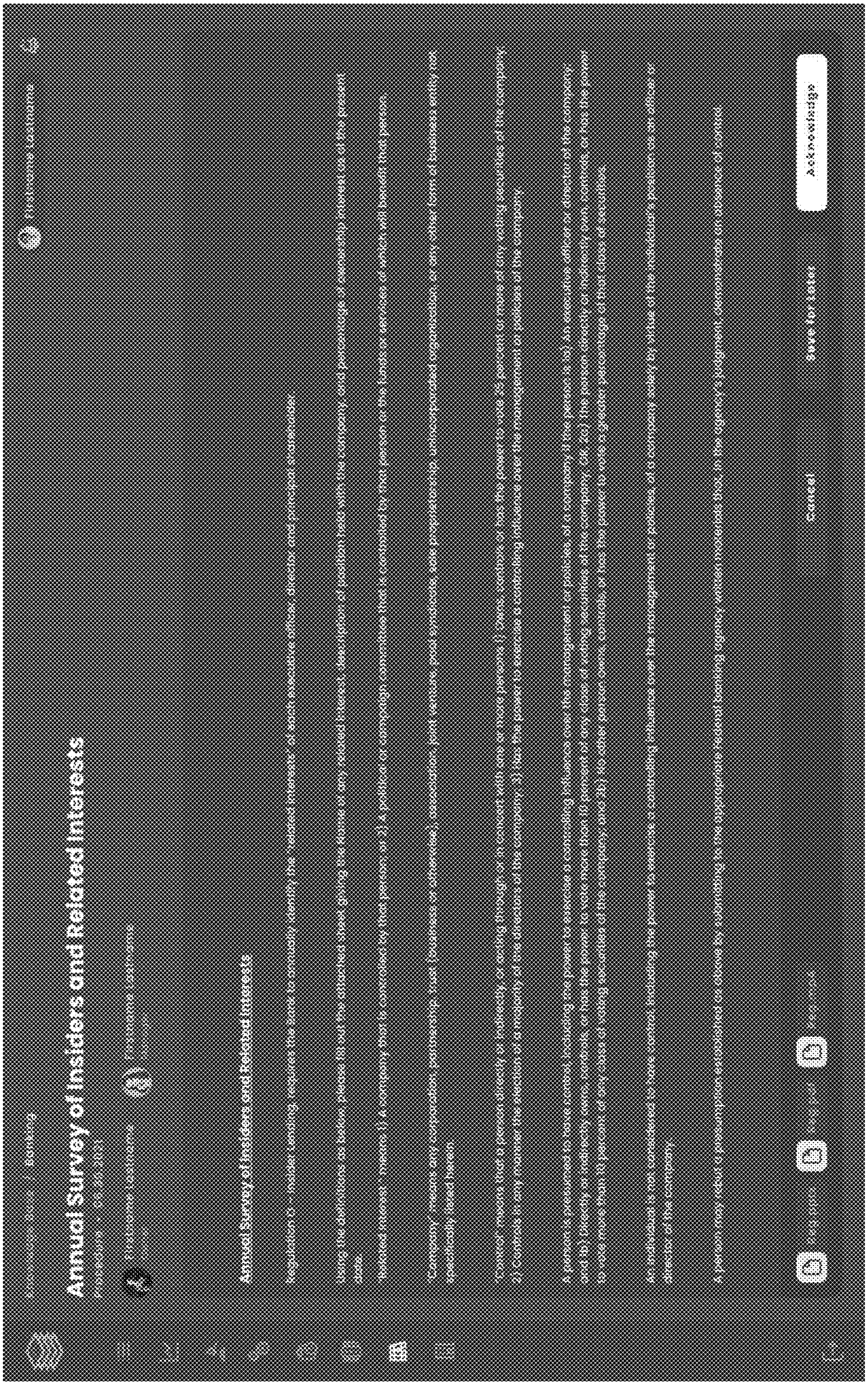
Figure 91:
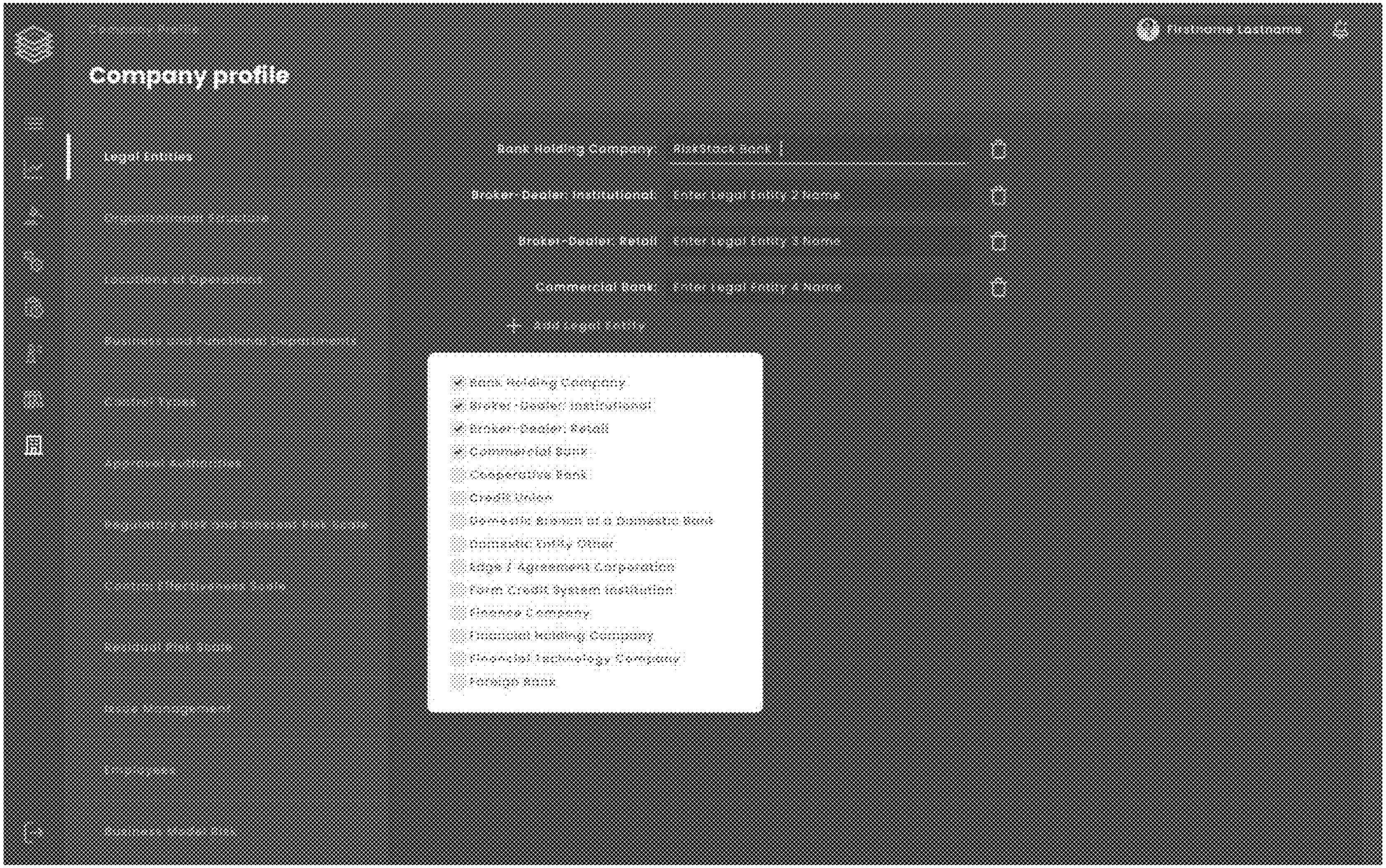
FIGS. 91-104 are GUIs of profiles of entities and organizations in the compliance platform, according to an example implementation.
Figure 92:
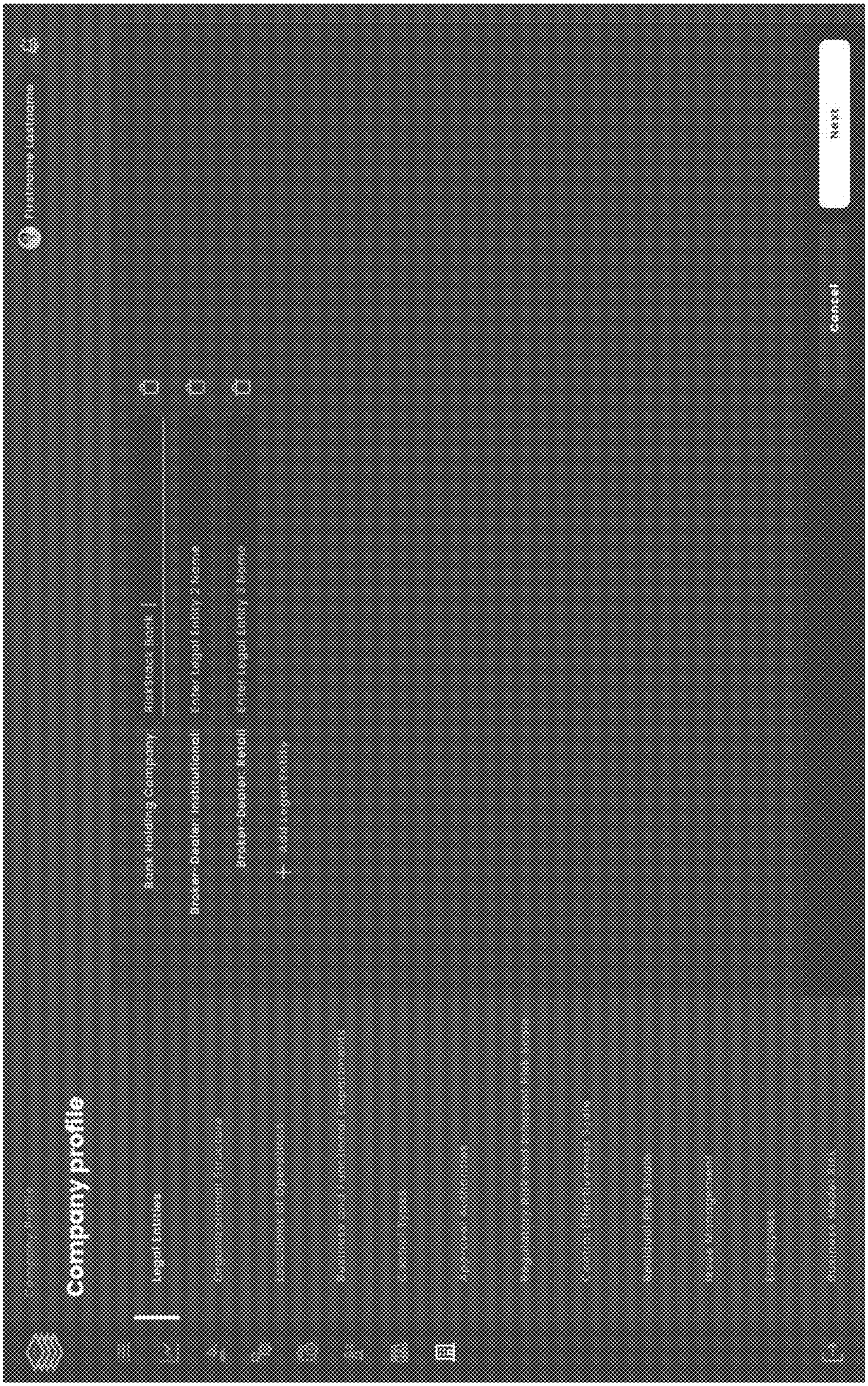
Figure 93:
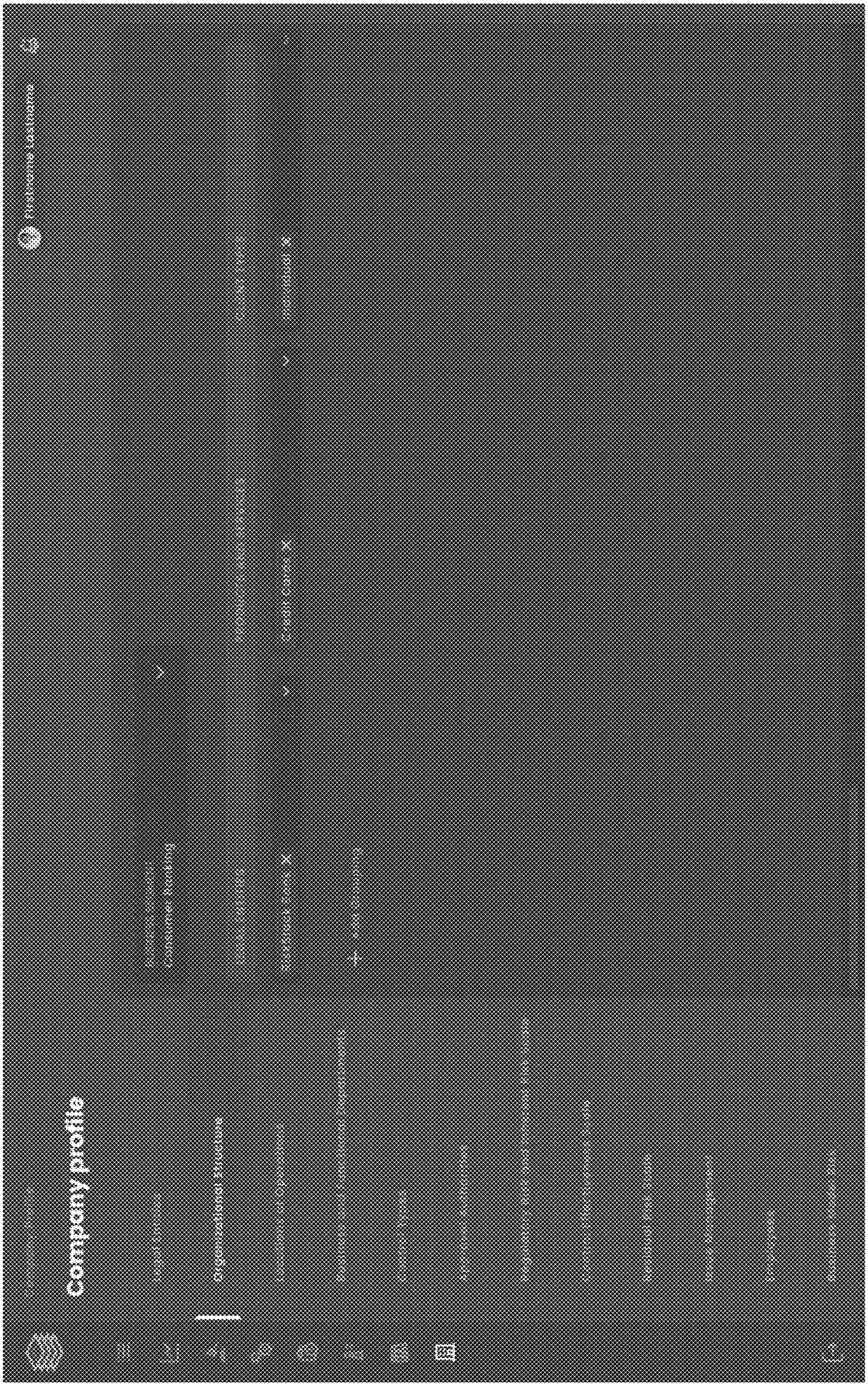
Figure 94:
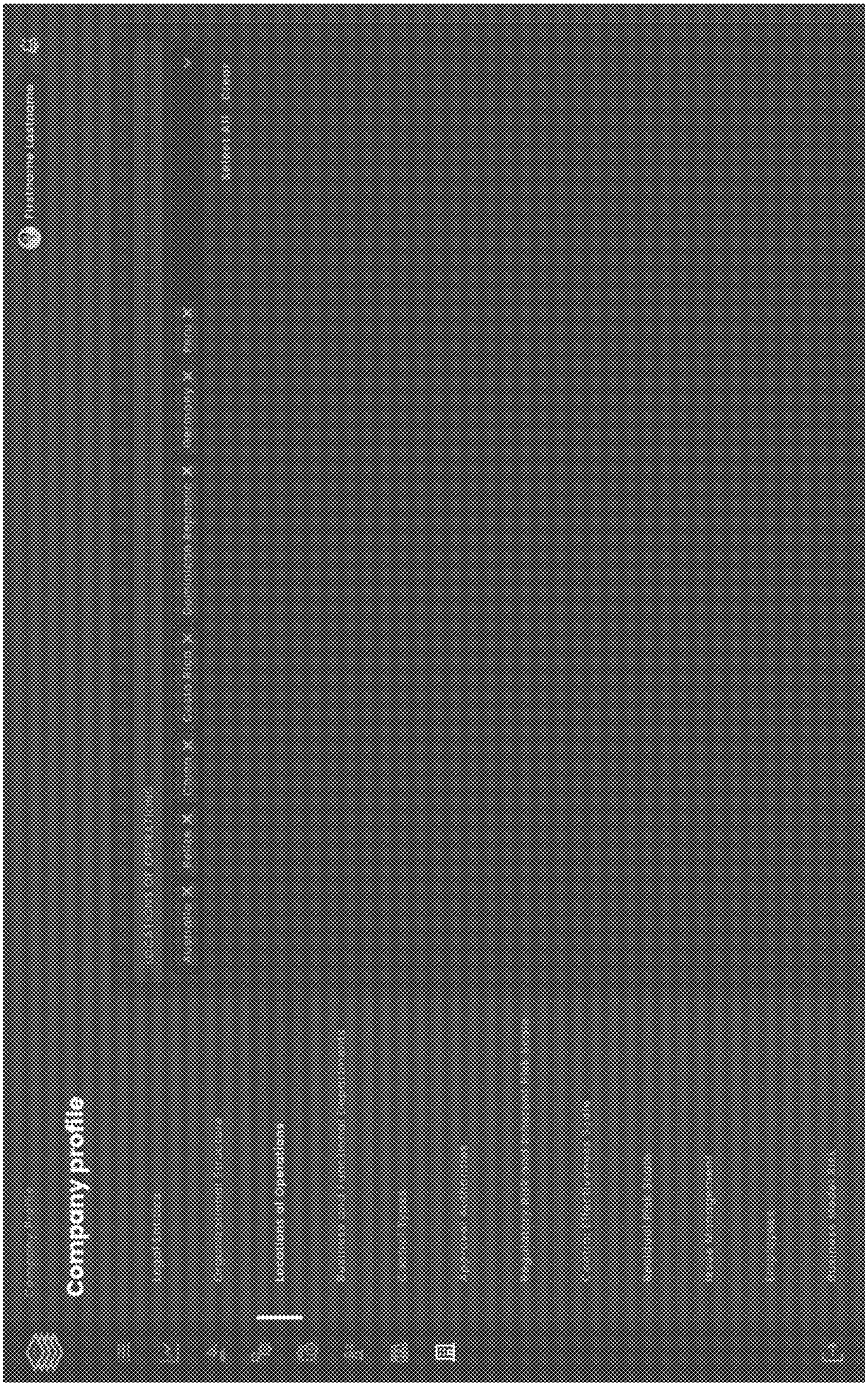
Figure 95:
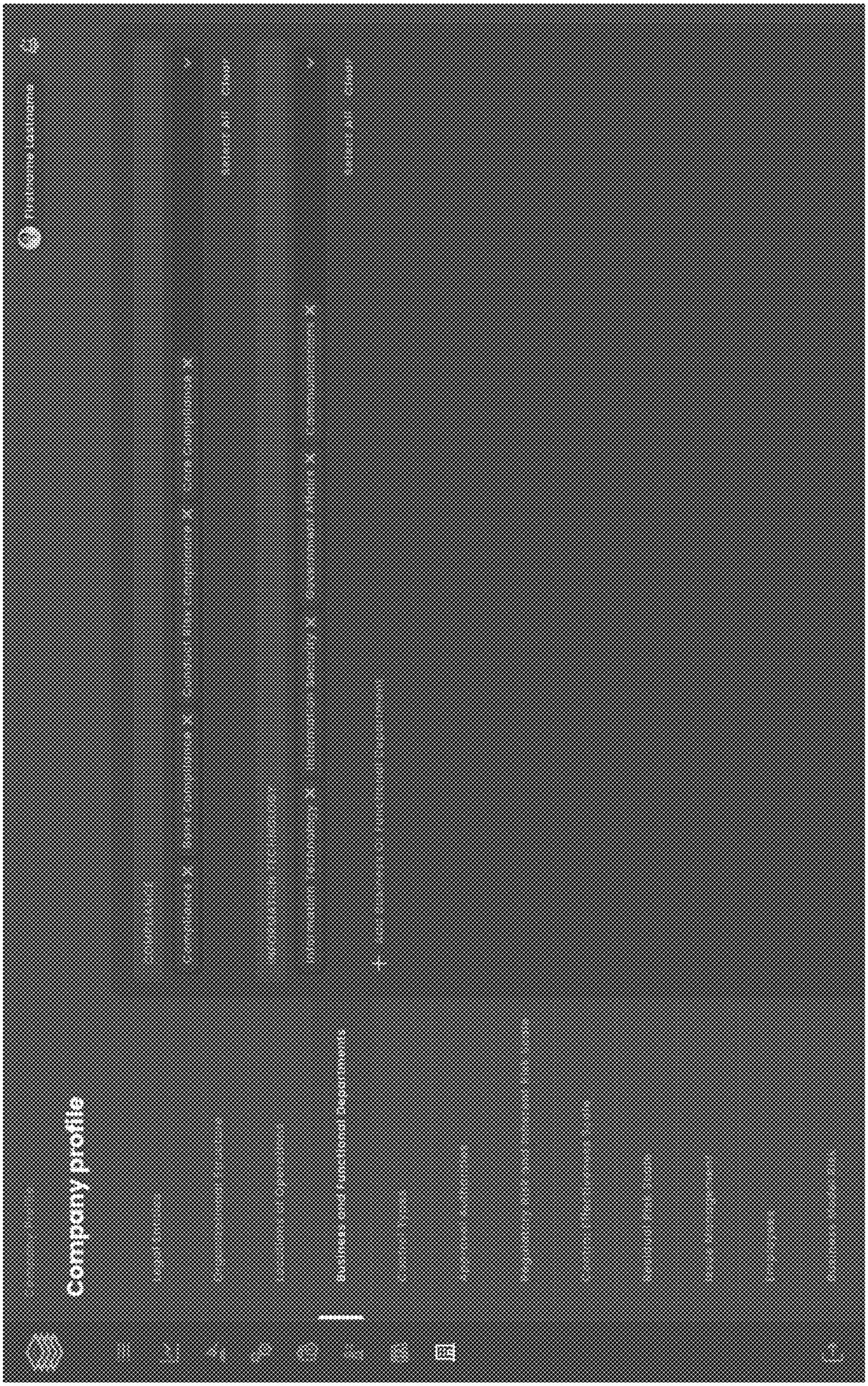
Figure 96:
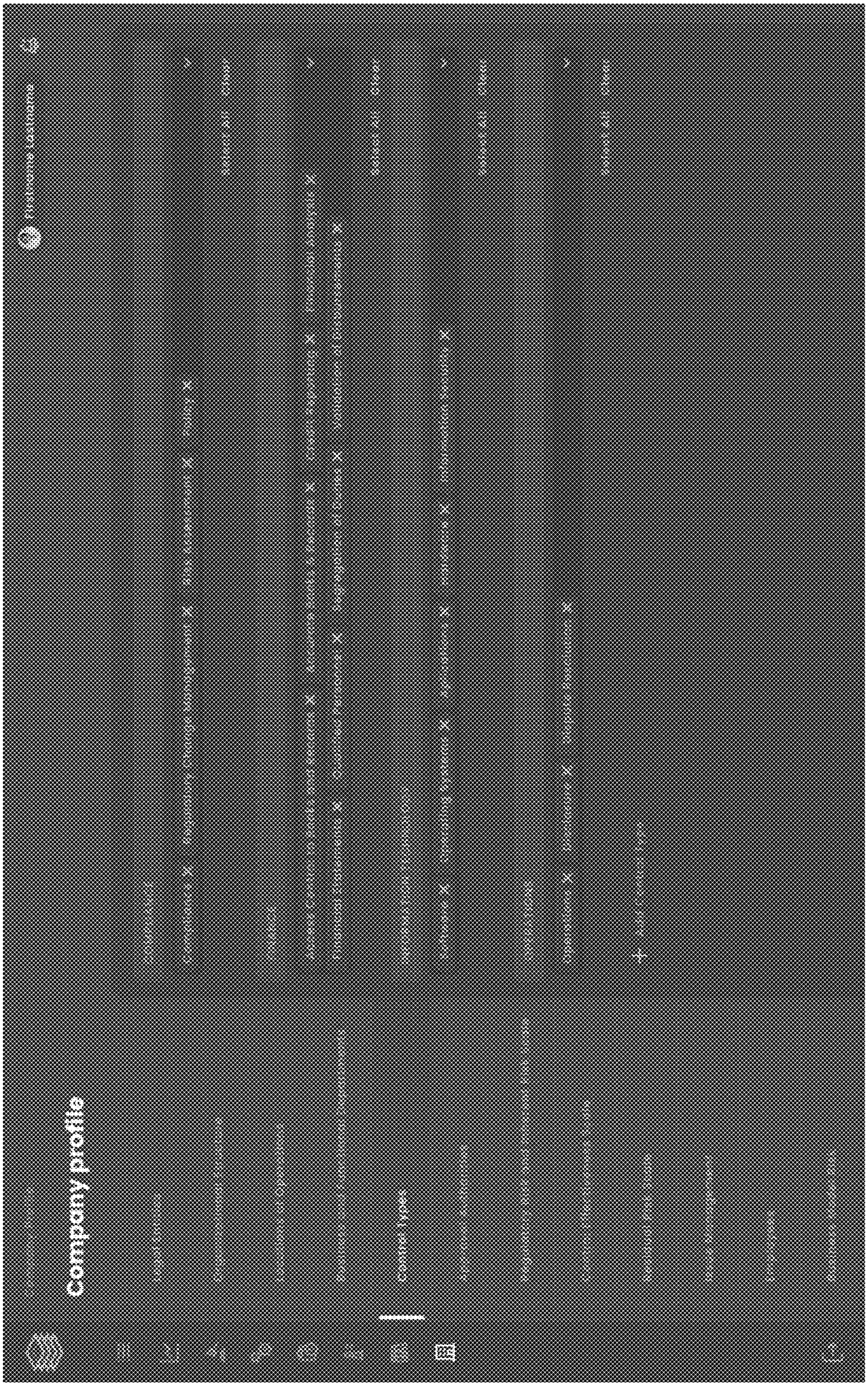
Figure 97:
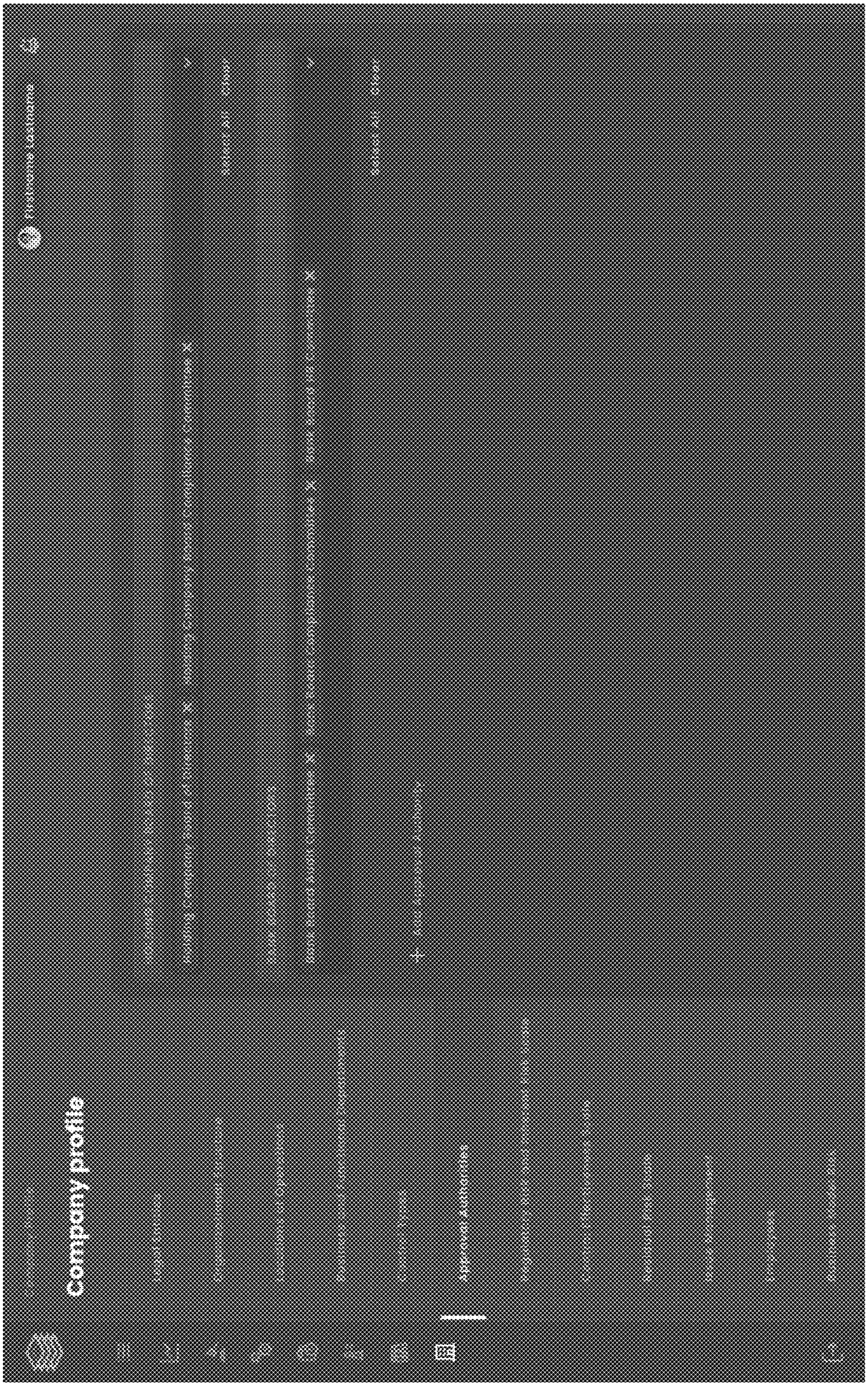
Figure 98:
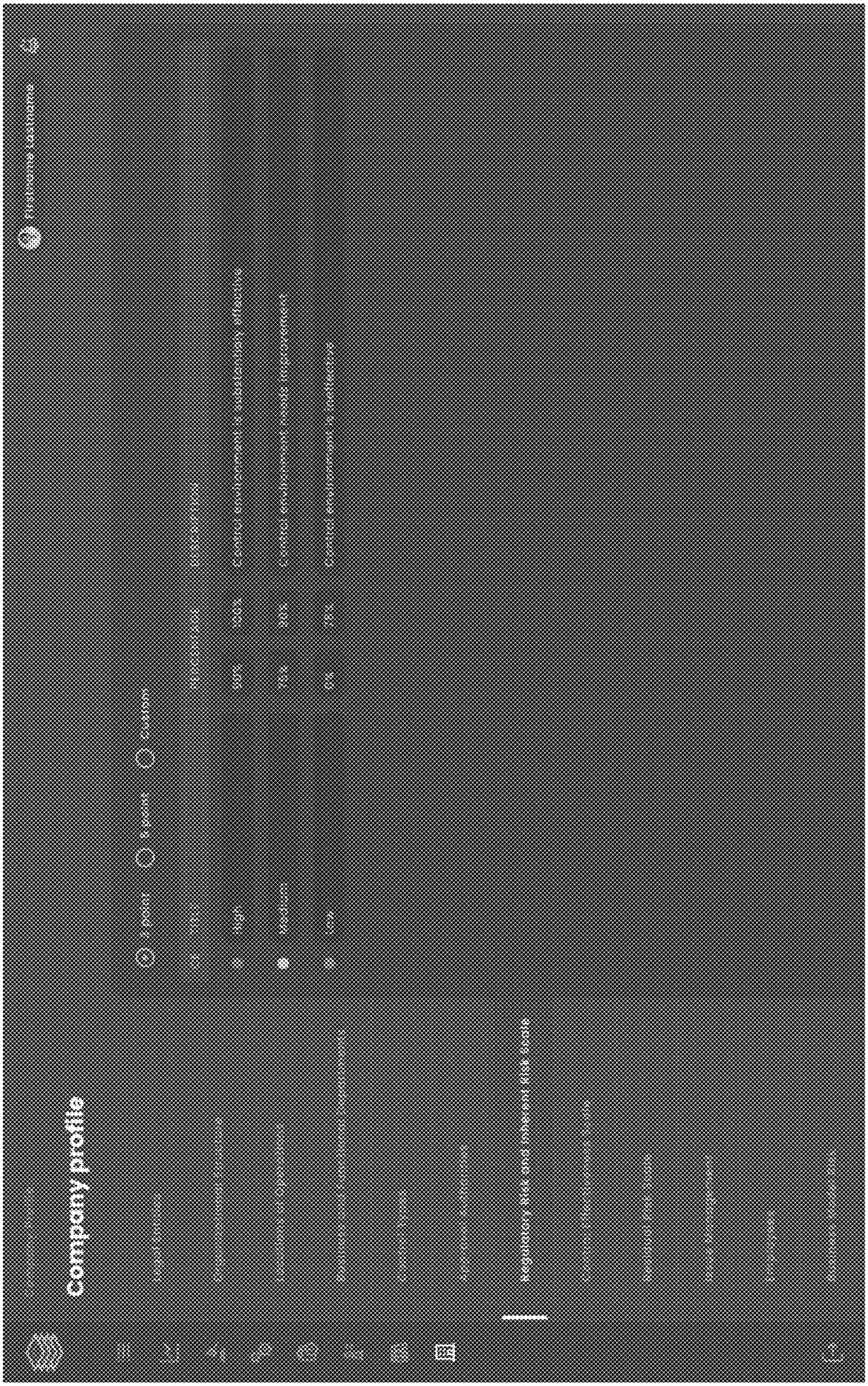
Figure 99:
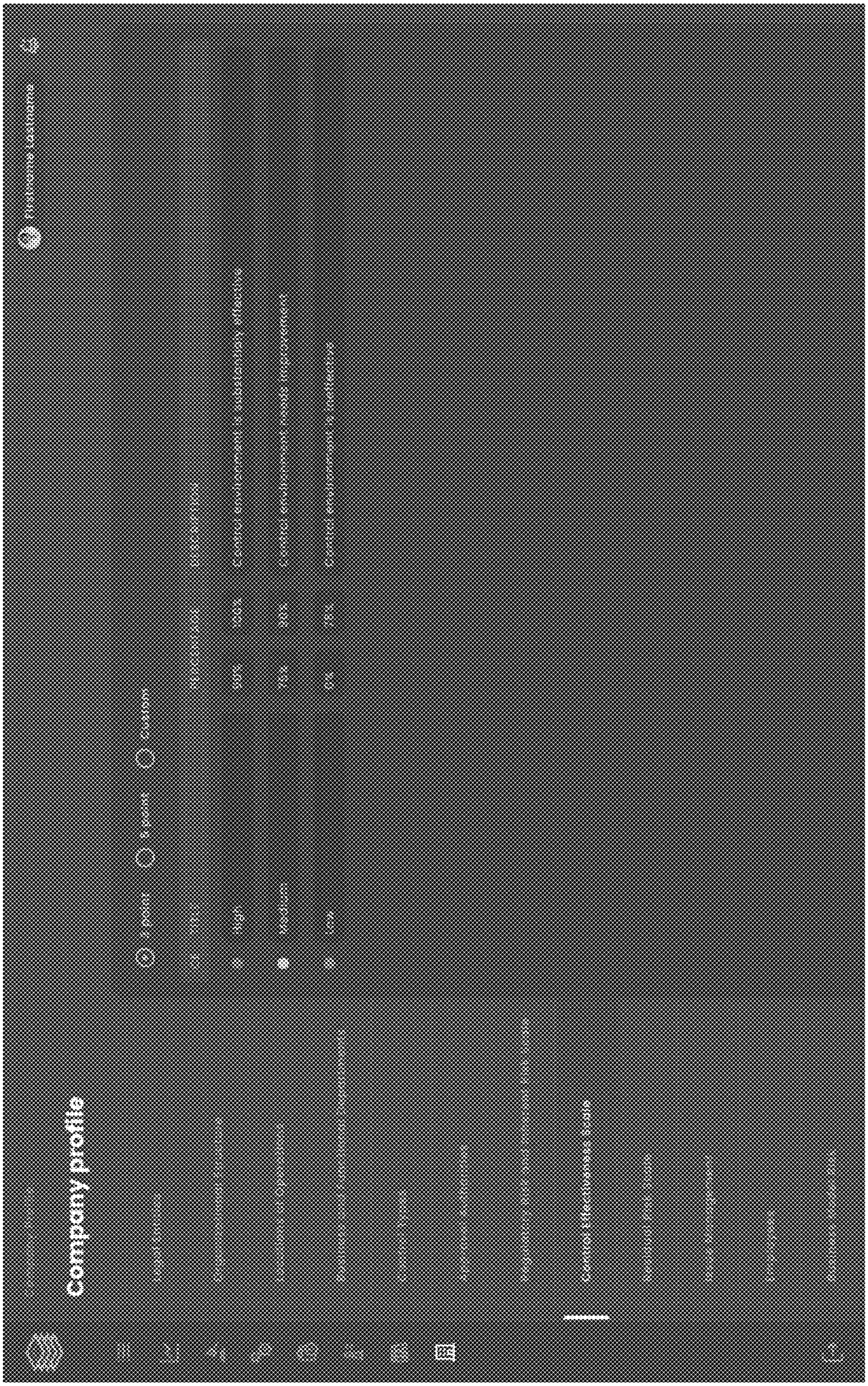
Figure 100:
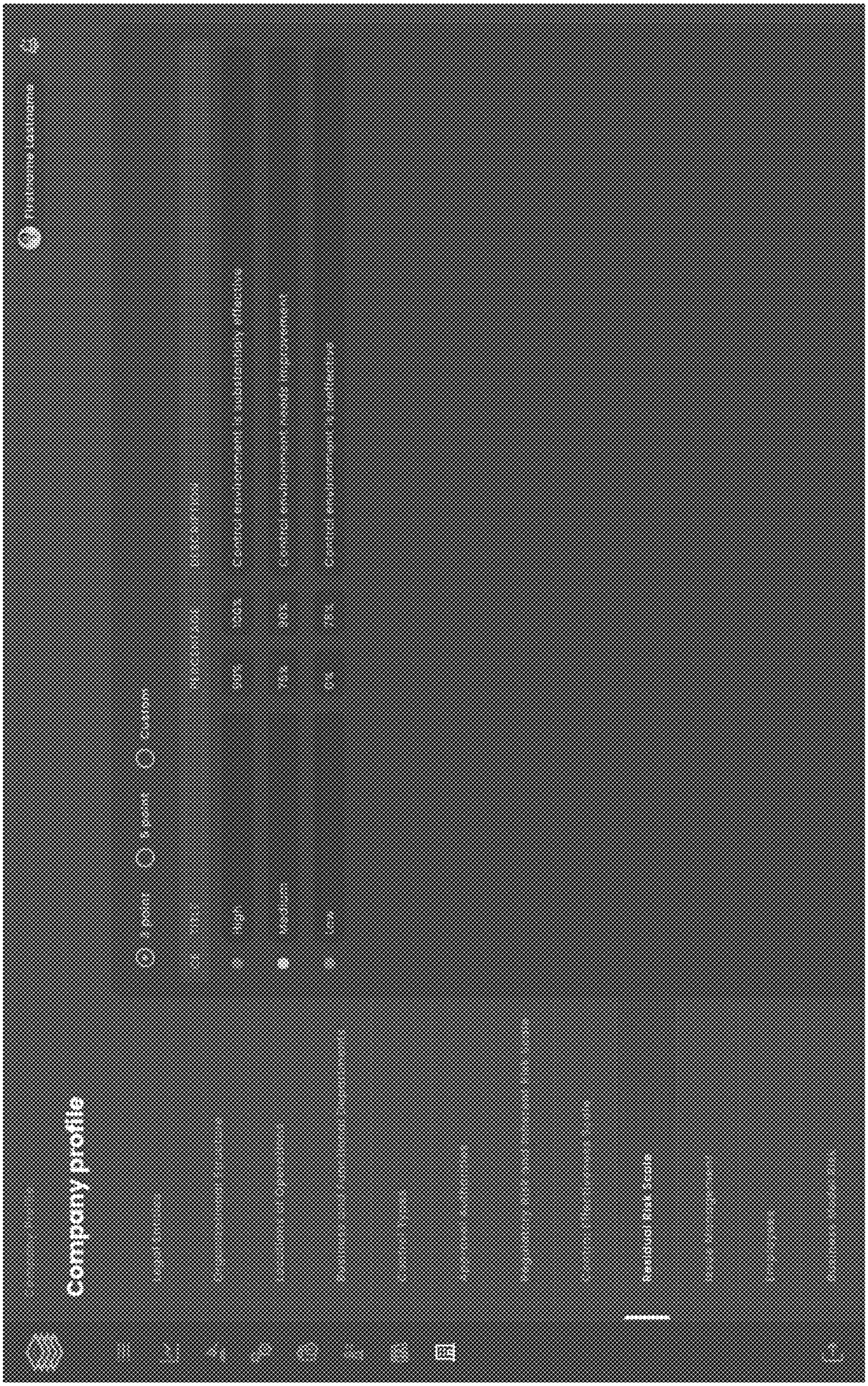
Figure 101:
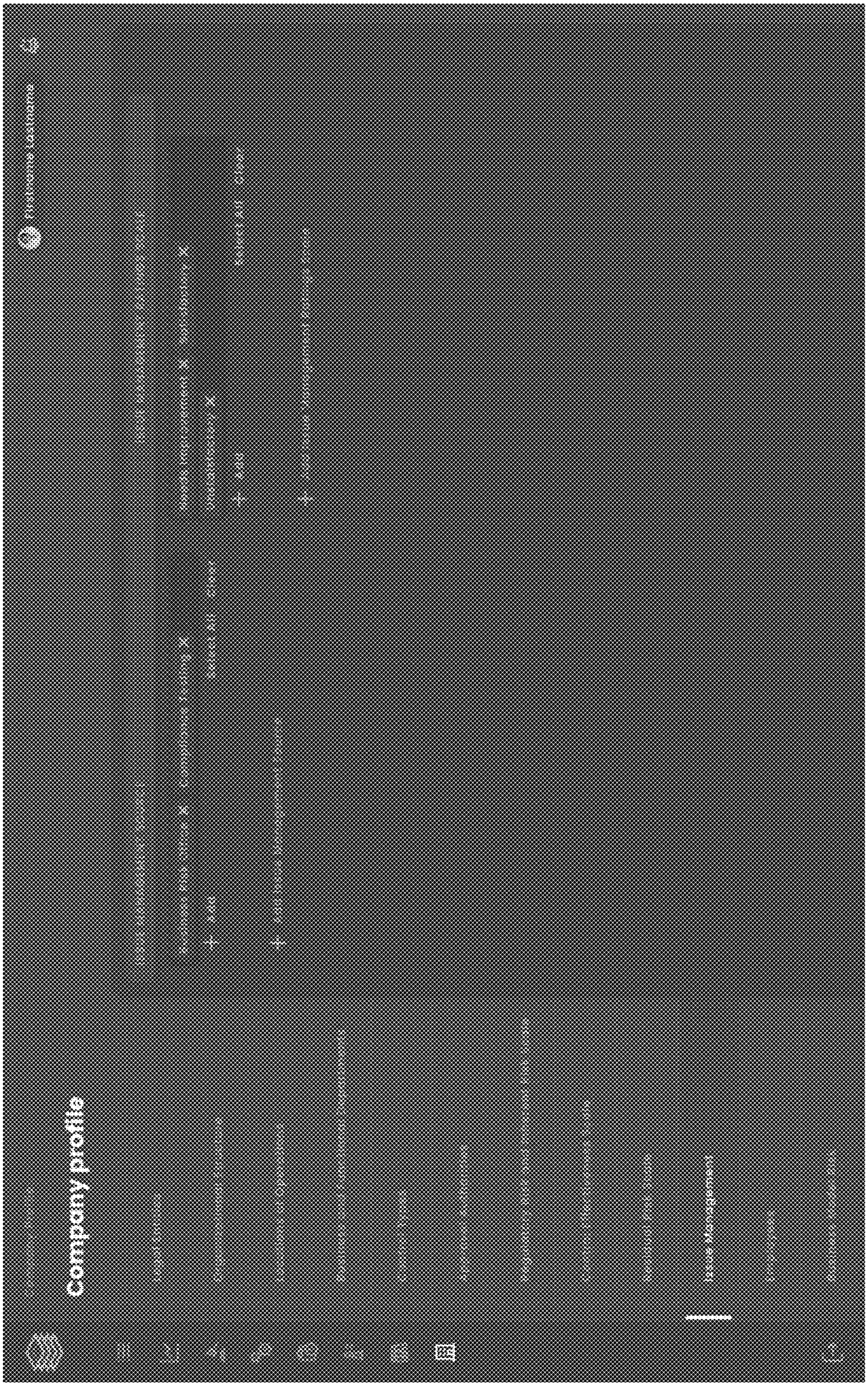
Figure 102:
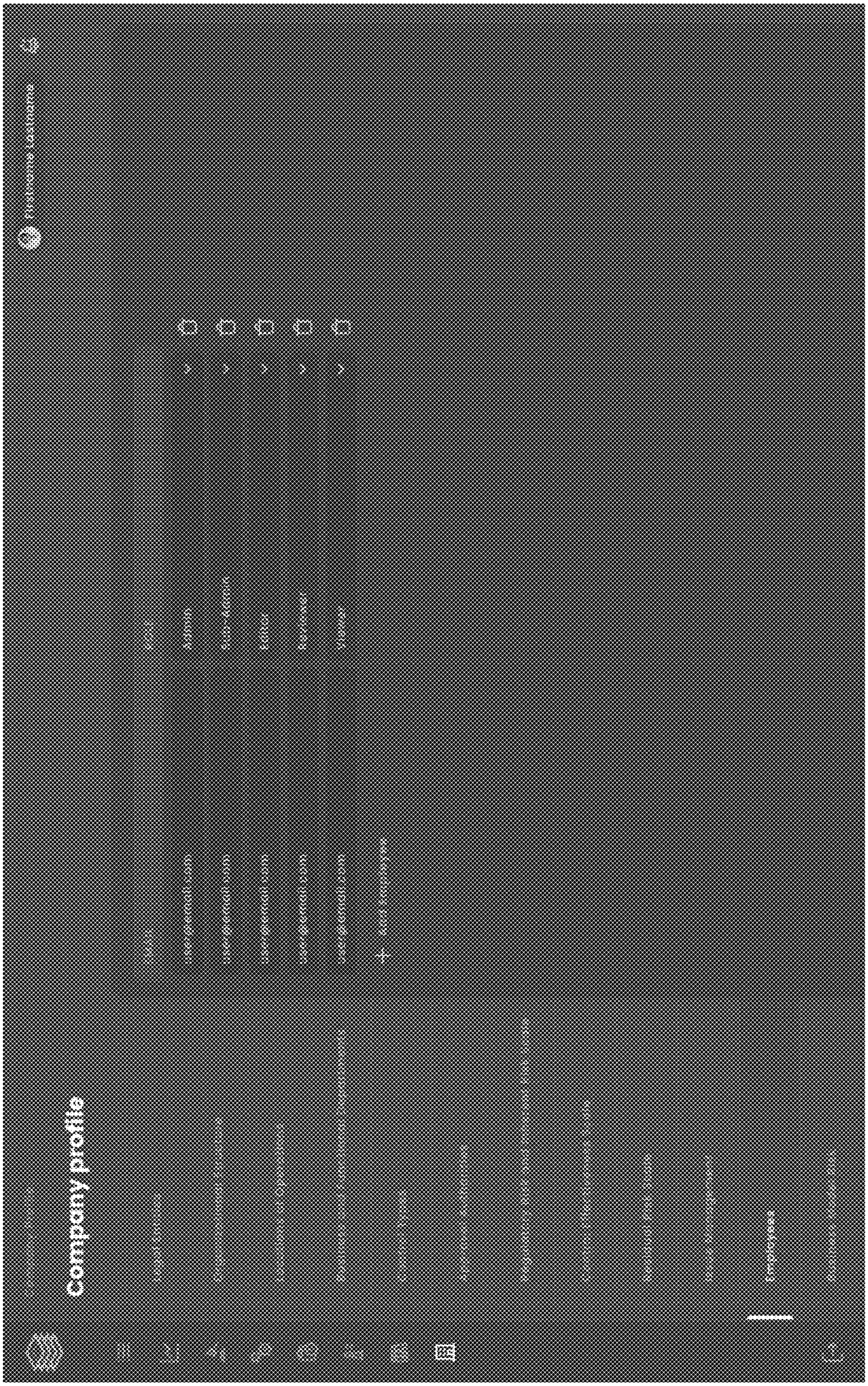
Figure 103:
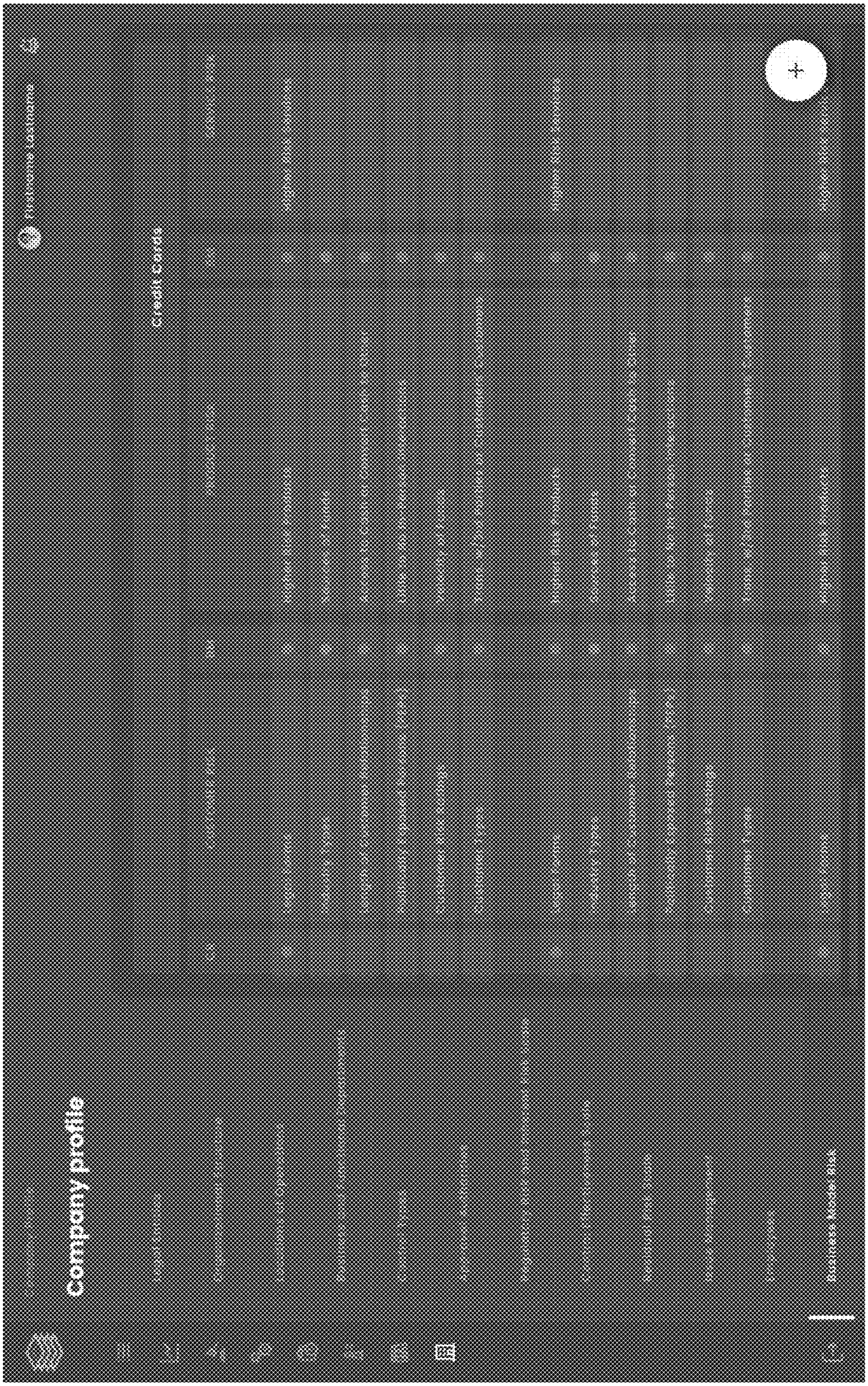
Figure 104:
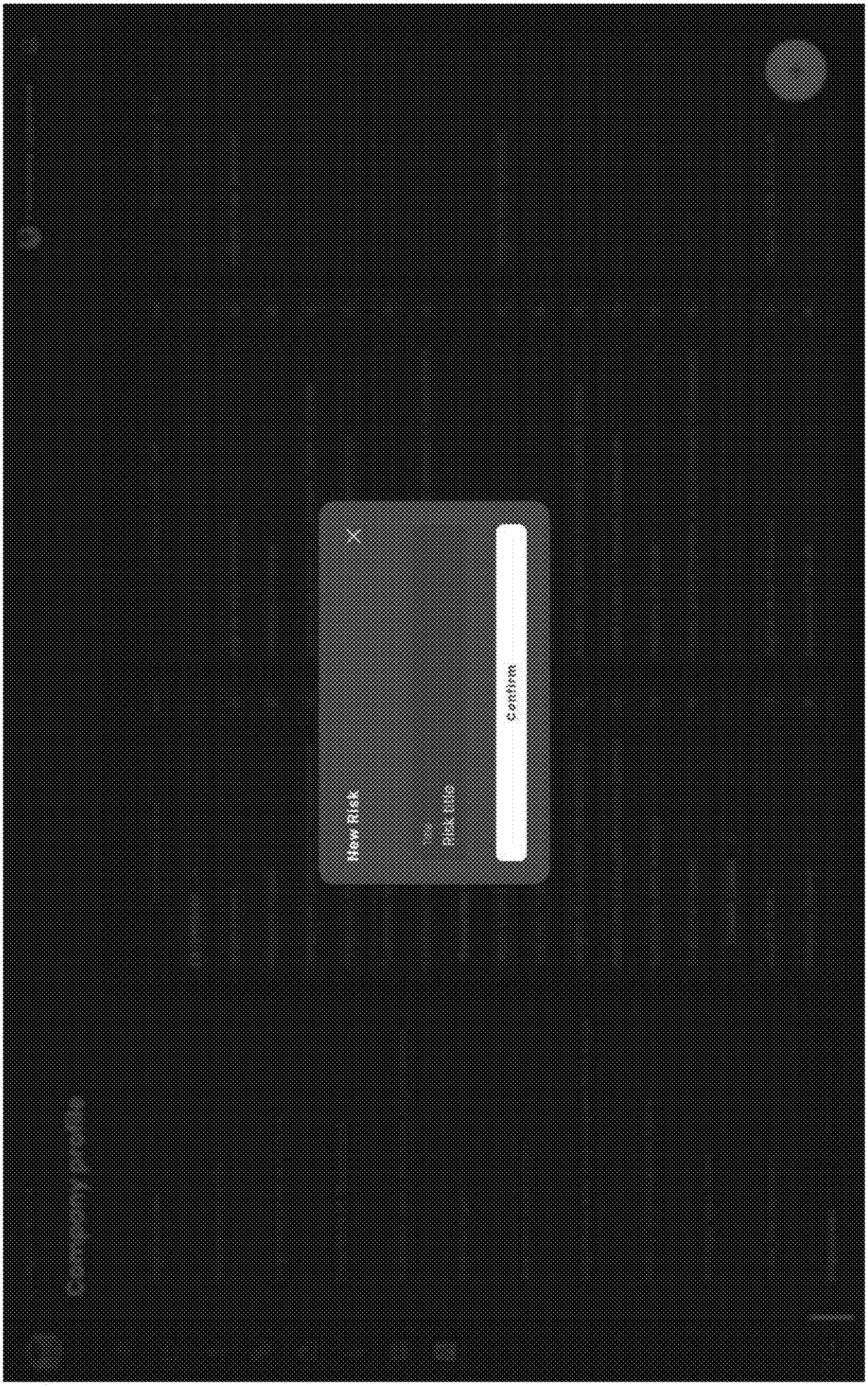

Now referring to step 240 of FIG. 2 in conjunction with FIGS. 88-90, the compliance platform 105 can display GUIs of knowledge bases. The compliance platform 105 can include a knowledge base for clients 115 to use to proactively review of materials relevant to the client 115. The compliance platform 105 can organize the materials, such as by job function or roles and responsibilities. The compliance platform 105 can display tasks, such as for policy governance and learning management system tools. For example, boards of directors and corporate secretaries can access the knowledge base for legal and compliance functions used to manage policies.

The compliance platform 105 can display a knowledge base. For example, the knowledge base can include the controls for a client 115. The compliance platform 105 can manage access rights to display portions of the knowledge base accessible to members 130 with the access rights. The compliance platform 105 can display the knowledge base without the assessments because the assessments can be unnecessary when displaying a reference library. The compliance platform 105 can display at the policy level because policies are typically at the highest level of hierarchy within a control environment. The compliance platform 105 can receive a request for drill down into the policies. Responsive to receiving the request, the compliance platform 105 can display the related controls.

The compliance platform 105 can display information about industries such as AML. The compliance platform 105 can display the knowledge base with horizontal rows and assessments on another side with the controls. For example, the compliance platform 105 can display the organizational hierarchy of the client 115 while displaying the assessments of the client 115. In another example, the compliance platform 105 can display the metadata on one side of the interface and the hierarchy on the other side of the interface. The compliance platform 105 can display additional information such as the assessments and customization options.

The compliance platform 105 can display an intranet for members 130 of the organization to browse. The compliance platform 105 can display policies and procedures for the members 130. The compliance platform 105 can display the assessments from the members 130 based on access restrictions. The compliance platform 105 can display the controls. The compliance platform 105 can display policies and associated controls. For example, the compliance platform 105 can display the controls associated with policies for training purposes. In another example, the compliance platform 105 can display the policies to be reviewed and acknowledged by the members 130. The compliance platform 105 can display the policies as pictures, slides, or embedded videos. The compliance platform 105 can advantageously enable the client 115 to use the compliance platform 105 to provide training to its members 130.

The compliance platform 105 can display policies and procedures for the training or governance. The compliance platform 105 can enable the client 115 to draft and finalize training and policies. The compliance platform 105 can advantageously integrate governance with policies and training. The compliance platform 105 can identify, receive, or track acknowledgments from the members 130.

The compliance platform 105 can integrate the tasks and the knowledge base. For example, clients 115 can provide training to their members 130 or gather acknowledgments to identify participation percentage rates. The compliance platform 105 can advantageously generate tests for the members 130 of the client 115 to confirm that the members 130 have retained and learned the content in the training.

Now referring to step 242 of FIG. 2 in conjunction with FIGS. 91-104, the compliance platform 105 can display GUIs of profiles. The compliance platform 105 can enable browsing of the organization hierarchy of the client 115. For example, the compliance platform 105 can display an organization hierarchy for an enterprise is a holding company of consumer banking, commercial banking, investment banking, or investment management. The compliance platform 105 can enable browsing of the hierarchy.

The compliance platform 105 can enable browsing of the within the organization hierarchy. For example, the compliance platform 105 can display selections of consumer banking. The compliance platform 105 can display details about consumer banking such as demand deposits, leasing, and lending. The compliance platform 105 can display associated products such as checking, savings debit cards, auto loans, credit cards, and home loans.

The compliance platform 105 can receive selections to filter the organizational hierarchy. For example, the compliance platform 105 can receive a selection to display laws and regulations that apply in the United States for leasing and lending. Responsive to the selection, the compliance platform 105 can display the rules and their respective assessments. By displaying the assessment, the compliance platform 105 enables the display of real time assessments.

The compliance platform 105 can display metadata, master data, or hierarchical associations. For example, the compliance platform 105 can display a policy for the client 115 or for a subsidiary of the client 115. In another example, the compliance platform 105 can display leasing and lending policies for a client 115. The compliance platform 105 can identify that the client 115 prefers extensions of credit.

The compliance platform 105 can display or receive hierarchical data for the client 115. For example, the compliance platform 105 can use the hierarchical data to generate or maintain organization structure for the parent-child relationship between a parent holding company and their legal entities or subsidiaries or business divisions.

The compliance platform 105 can advantageously enable the ability to customize the display of hierarchical associations. The compliance platform 105 can display compliance and legal associations in an integrated interface. The compliance platform 105 can display tags to interrelate and dynamically update the associations over time. The compliance platform 105 enables the client 115 to display their regulations in a user-friendly interface that simplifies the complexity associated with compliance.

Figure 105:
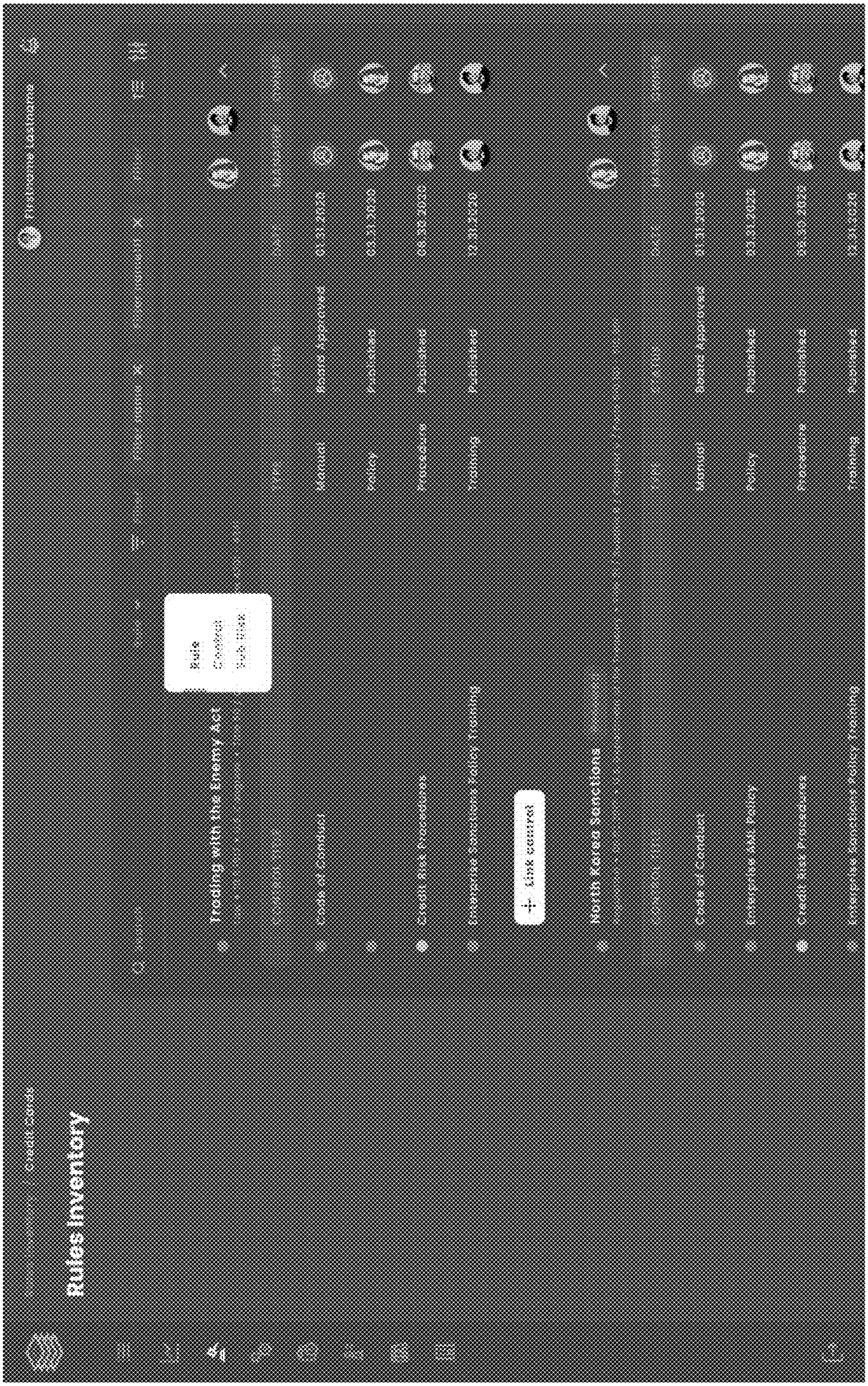
FIG. 105 is an example GUI for managing rules in the compliance platform, according to an example implementation.
Figure 106:
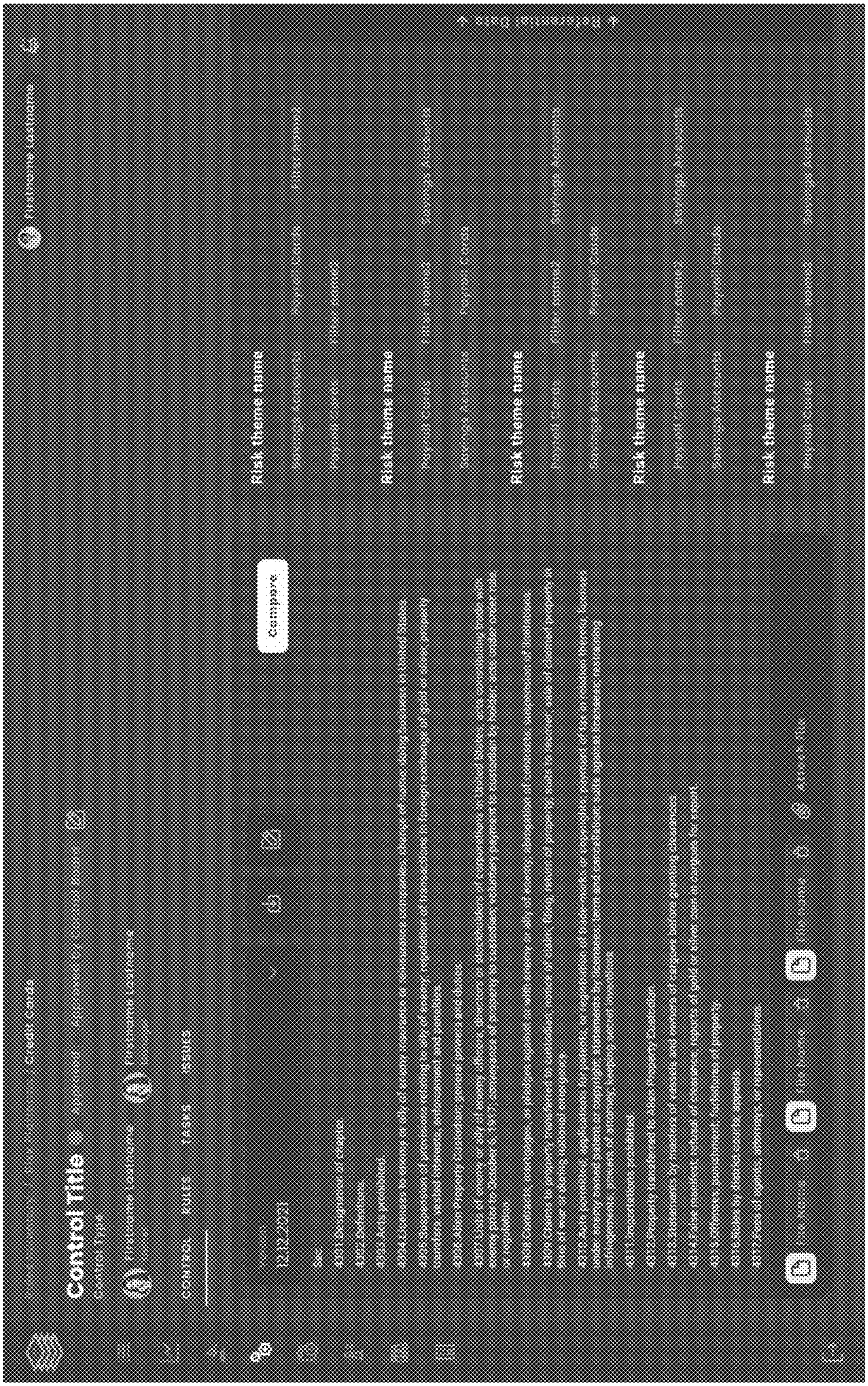
FIG. 106 is an example GUI for managing controls in the compliance platform, according to an example implementation.
Figure 107:
FIG. 107 is an example GUI for linking rules in the compliance platform, according to an example implementation.
Figure 108:
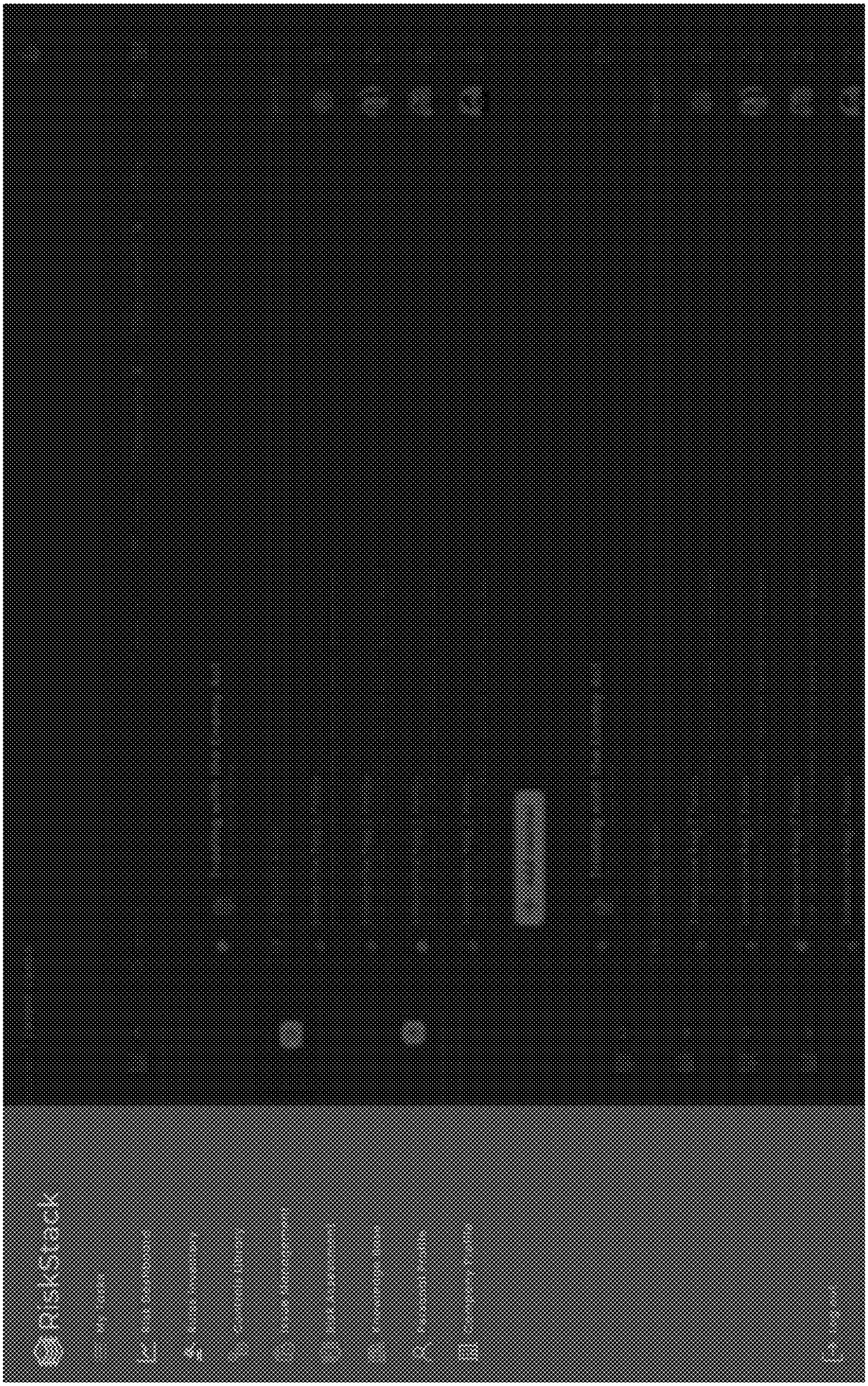
FIG. 108 is an example GUI for a menu for navigating in the compliance platform, according to an example implementation.
Figure 109:
FIG. 109 is an example GUI for managing users in the compliance platform, according to an example implementation.
Figure 110:
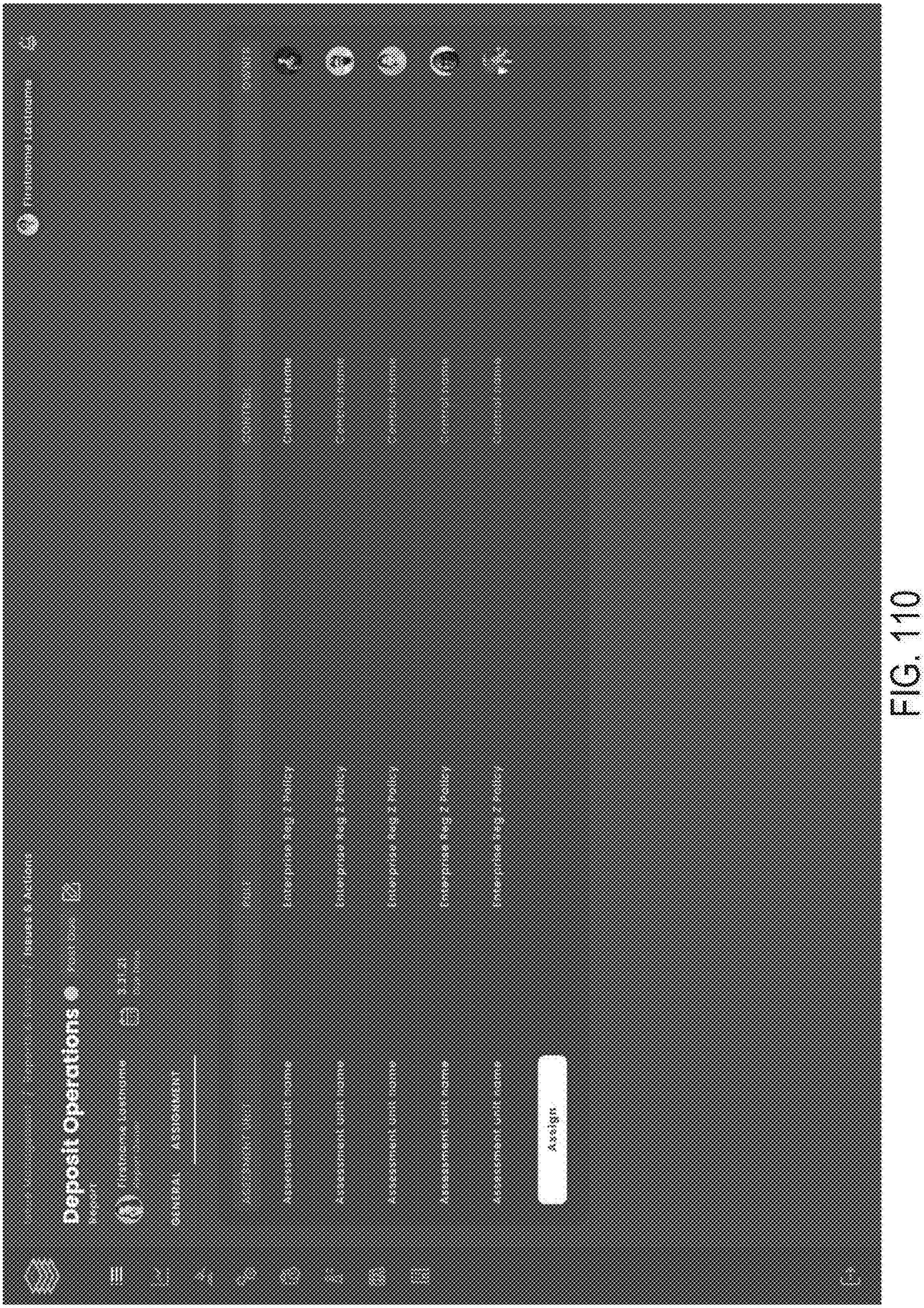
FIG. 110 is an example GUI for assigning rules and controls in the compliance platform, according to an example implementation.
Figure 111:
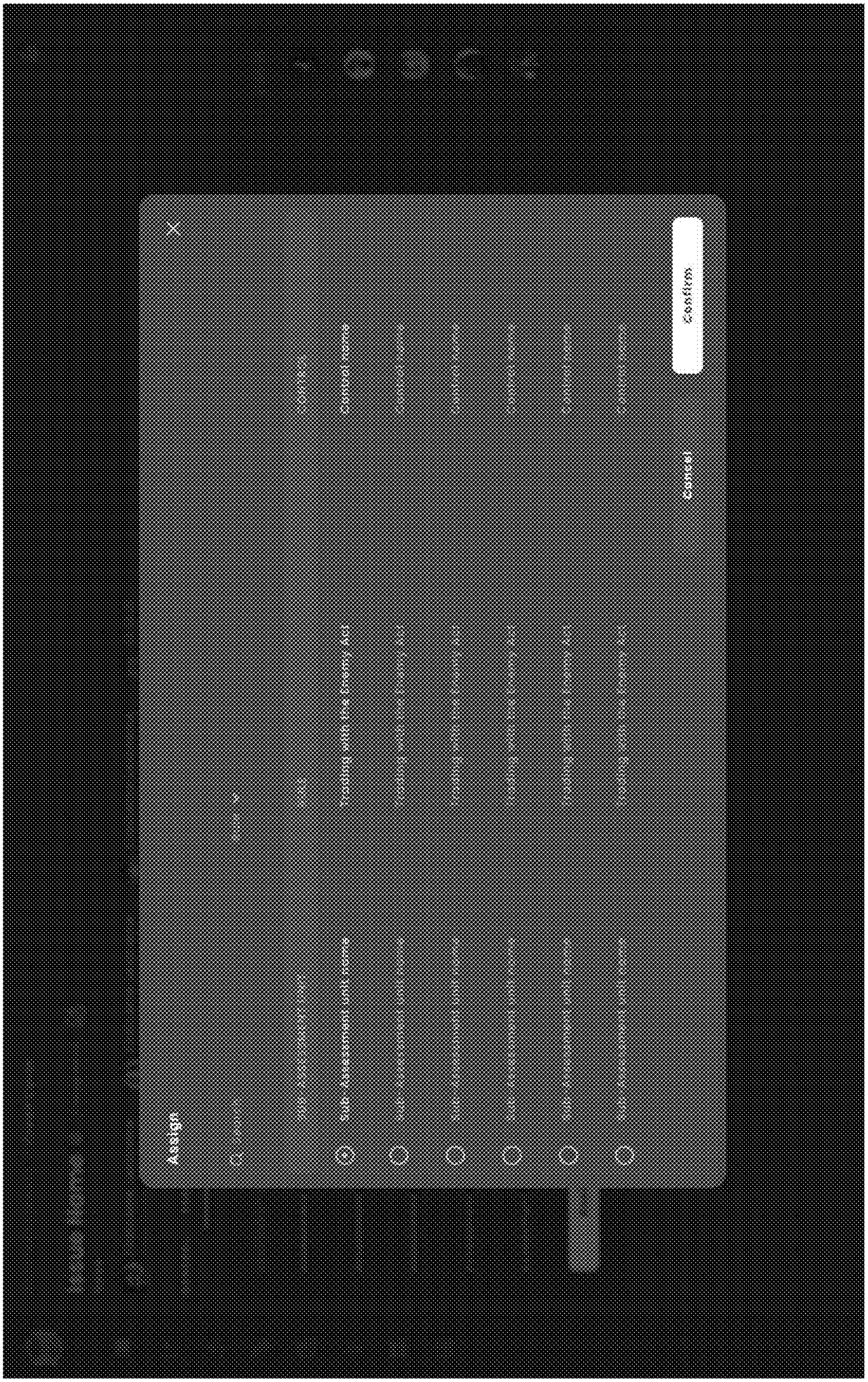
FIG. 111 is an example GUI for assigning rules and controls in the compliance platform, according to an example implementation.

Now referring to FIGS. 105-112, depicted are example GUIs useful for practicing the implementations described herein. FIGS. 105 and 109 are example implementations of the GUIs described with respect to FIGS. 24-29. FIG. 105 is an example GUI for managing rules in the compliance platform, according to an example implementation. FIG. 109 is an example GUI for managing users in the compliance platform, according to an example implementation. FIGS. 106-108 are example implementations of the GUIs described with respect to FIGS. 39-48. FIG. 106 is an example GUI for managing controls in the compliance platform, according to an example implementation. FIG. 107 is an example GUI for linking rules in the compliance platform, according to an example implementation. FIG. 108 is an example GUI for a menu for navigating in the compliance platform, according to an example implementation. FIGS. 110-112 are example implementations of the GUIs described with respect to FIGS. 65-74. FIG. 110 is an example GUI for assigning rules and controls in the compliance platform, according to an example implementation. FIG. 111 is an example GUI for assigning rules and controls in the compliance platform, according to an example implementation. FIG. 112 is an example GUI for linking tasks in the compliance platform, according to an example implementation.

The implementations described herein have been described with reference to drawings. The drawings illustrate certain details of specific implementations that implement the systems, methods and programs described herein. However, describing the implementations with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some implementations, each respective "circuit" can include machine-readable media for configuring the hardware to execute the functions described herein. The circuit can be embodied as one or more circuitry components including, but not limited to, processing circuitry, network interfaces, peripheral devices, input devices, output devices, sensors, etc. In some implementations, a circuit can take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" can include any type of component for accomplishing or facilitating achievement of the operations described herein. For example, a circuit as described herein can include one or more transistors, logic gates (e.g., NAND, AND, NOR, OR, XOR, NOT, XNOR), resistors, multiplexers, registers, capacitors, inductors, diodes, wiring, and so on.

The "circuit" can also include one or more processors communicatively coupled to one or more memory or memory devices. In this regard, the one or more processors can execute instructions stored in the memory or can execute instructions otherwise accessible to the one or more processors. In some implementations, the one or more processors can be embodied in various ways. The one or more processors can be constructed in a manner sufficient to perform at least the operations described herein. In some implementations, the one or more processors can be shared by multiple circuits (e.g., circuit A and circuit B can comprise or otherwise share the same processor which, in some example implementations, can execute instructions stored, or otherwise accessed, via different areas of memory). Alternatively or additionally, the one or more processors can be structured to perform or otherwise execute certain operations independent of one or more co-processors. In other example implementations, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, and quad core processor), microprocessor, etc. In some implementations, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system) or remotely (e.g., as part of a remote server such as a cloud based server). To that end, a "circuit" as described herein can include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some implementations, the non-volatile media can take the form of ROM, flash memory (e.g., flash memory such as NAND, 3D NAND, NOR, 3D NOR), EEPROM, MRAM, magnetic storage, hard discs, optical discs, etc. In other implementations, the volatile storage media can take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, can include any type of input device including, but not limited to, a keyboard, a keypad, a mouse, joystick or other input device performing a similar function. Comparatively, the term "output device," as described herein, can include any type of output device including, but not limited to, a computer monitor, printer, facsimile machine, or other output device performing a similar function.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or can be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions can be made in the design, operating conditions and implementation of the implementations without departing from the scope of the present disclosure as expressed in the appended claims.

The invention claimed is:

1. A compliance computing system comprising:

one or more processing circuits comprising one or more memory devices coupled to one or more processors, the one or more memory devices configured to store instructions thereon that, when executed by the one or more processors, cause the one or more processors to:

acquire regulatory information available through one or more databases of one or more regulatory entities;

acquire organization information regarding an organization associated with the compliance computing system, the organization information including (a) location of operations for the organization and (b) a type of industry associated with the organization or a type of product or service offered by the organization;

identify rules that are relevant to the organization by evaluating the regulatory information in view of the organization information;

determine a regulatory risk assessment associated with each of the rules for the organization;

generate a rules inventory graphical user interface for display on a user device of a user associated with the organization, the rules inventory graphical user interface providing a listing of the rules;

provide a visual indication on the rules inventory graphical user interface for each of the rules indicating the regulatory risk assessment associated with each of the rules for the organization;

generate one or more tags corresponding to one or more of the identified rules by:

maintaining a frequency threshold for terms;

based on one or more terms in the one or more of the identified rules exceeding the frequency threshold, generating the one or more tags for the one or more of the identified rules associated with the one or more terms; and assigning the one or more tags to the one or more of the identified rules; and dynamically update the listing of the rules in response to an addition of a new rule to the rules or a change to an existing rule of the rules by the one or more regulatory entities, wherein the listing of the rules is dynamically updated by:

identifying a tag associated with the new rule or the existing rule;

retrieving one or more other rules associated with at least one tag matching the identified tag; and updating the one or more other rules by modifying one or more stored attributes associated with the one or more other rules based on the new rule or the change to the existing rule.

2. The compliance computing system of claim 1, wherein the one or more memory devices are further configured to store instructions thereon that, when executed by the one or more processors, cause the one or more processors to generate a notification for the user indicating the new rule or the change to the existing rule.

3. The compliance computing system of claim 1, wherein the one or more memory devices are further configured to store instructions thereon that, when executed by the one or more processors, cause the one or more processors to assign compliance controls to the rules, the compliance controls configured to attempt to ensure compliance with the rules by the organization.

4. The compliance computing system of claim 3, wherein the one or more memory devices are further configured to store instructions thereon that, when executed by the one or more processors, cause the one or more processors to:

facilitate generation of task assignments by the user to members of the organization to implement the compliance controls; and notify the members of the task assignments.

5. The compliance computing system of claim 4, wherein the one or more memory devices are further configured to store instructions thereon that, when executed by the one or more processors, cause the one or more processors to generate a control library graphical user interface for display on the user device, the control library graphical user interface providing a library of the compliance controls with an indication of which of the members of the organization are assigned to each of the compliance controls.

6. The compliance computing system of claim 3, wherein the rules inventory graphical user interface provides an option to manually link a respective compliance control to a respective rule.

7. The compliance computing system of claim 1, wherein the one or more memory devices are further configured to store instructions thereon that, when executed by the one or more processors, cause the one or more processors to:

generate a relative risk indicator associated with each of the rules for the organization based on the regulatory risk assessment, wherein the relative risk indicator is assigned a different indicator based on the relative risk associated with each of the rules; and provide a visual indication on the rules inventory graphical user interface of the relative risk indicator.

8. The compliance computing system of claim 7, wherein the relative risk indicator is assigned a color based on the relative risk associated with each of the rules, wherein the relative risk indicator associated with less than a first level of regulatory risk is assigned a first color, wherein the relative risk indicator associated with greater than the first level of regulatory risk but less than a second level of regulatory risk is assigned a second color different from the first color, and wherein the relative risk indicator associated with greater than the second level of regulatory risk is assigned a third color different from the first color and the second color.

9. A method comprising:

acquiring, by a processing circuit, regulatory information available through one or more databases of one or more regulatory entities;

acquiring, by the processing circuit, organization information regarding an organization associated with a compliance computing system, the organization information including (a) location of operations for the organization and (b) a type of industry associated with the organization or a type of product or service offered by the organization;

identifying, by the processing circuit, rules that are relevant to the organization by evaluating the regulatory information in view of the organization information;

determining, by the processing circuit, a regulatory risk assessment associated with each of the rules for the organization;

generating, by the processing circuit, a rules inventory graphical user interface for display on a user device of a user associated with the organization, the rules inventory graphical user interface providing a listing of the rules;

providing, by the processing circuit, a visual indication on the rules inventory graphical user interface for each of the rules indicating the regulatory risk assessment associated with each of the rules for the organization;

generating, by the processing circuit, one or more tags corresponding to one or more of the identified rules by:

maintaining a frequency threshold for terms;

based on one or more terms in the one or more of the identified rules exceeding the frequency threshold, generating the one or more tags for the one or more of the identified rules associated with the one or more terms; and assigning the one or more tags to the one or more of the identified rules; and dynamically updating, by the processing circuit, the listing of the rules in response to an addition of a new rule to the rules or a change to an existing rule of the rules by the one or more regulatory entities, wherein the listing of the rules is dynamically updated by:

identifying a tag associated with the new rule or the existing rule;

retrieving one or more other rules associated with at least one tag matching the identified tag; and updating the one or more other rules by modifying one or more stored attributes associated with the one or more other rules based on the new rule or the change to the existing rule.

10. The method of claim 9, further comprising generating, by the processing circuit, a notification indicating the new rule or the change to the existing rule.

11. The method of claim 9, further comprising assigning, by the processing circuit, compliance controls to the rules, the compliance controls configured to attempt to ensure compliance with the rules by the organization.

12. The method of claim 11, further comprising:

notifying, by the processing circuit, members of the organization to implement the compliance controls.

13. The method of claim 12, further comprising generating, by the processing circuit, a control library graphical user interface for display on the user device, the control library graphical user interface providing a library of the compliance controls with an indication of which of the members of the organization are assigned to each of the compliance controls.

14. The method of claim 11, wherein the rules inventory graphical user interface provides an option to link a respective compliance control to a respective rule.

15. A non-transitory computer-readable medium having computer-executable instructions included therein that, when executed by one or more processors, cause the one or more processors to perform operations comprising:

acquiring regulatory information available through one or more databases of one or more regulatory entities;

acquiring organization information regarding an organization associated with a compliance computing system, the organization information including (a) location of operations for the organization and (b) a type of industry associated with the organization or a type of product or service offered by the organization;

identifying rules that are relevant to the organization by evaluating the regulatory information in view of the organization information;

determining a regulatory risk assessment associated with each of the rules for the organization;

generating a rules inventory graphical user interface for display on a user device of a user associated with the organization, the rules inventory graphical user interface providing a listing of the rules;

providing a visual indication on the rules inventory graphical user interface for each of the rules indicating the regulatory risk assessment associated with each of the rules for the organization;

generating one or more tags corresponding to one or more of the identified rules by:

maintaining a frequency threshold for terms;

based on one or more terms in the one or more of the identified rules exceeding the frequency threshold, generating the one or more tags for the one or more of the identified rules associated with the one or more terms; and assigning the one or more tags to the one or more of the identified rules; and dynamically updating the listing of the rules in response to an addition of a new rule to the rules or a change to an existing rule of the rules by the one or more regulatory entities, wherein the listing of the rules is dynamically updated by:

identifying a tag associated with the new rule or the existing rule;

retrieving one or more other rules associated with at least one tag matching the identified tag; and updating the one or more other rules by modifying one or more stored attributes associated with the one or more other rules based on the new rule or the change to the existing rule.

16. The non-transitory computer-readable medium of claim 15, wherein the instructions when executed by the one or more processors further cause operations comprising generating a notification for the user indicating the new rule or the change to the existing rule.

17. The non-transitory computer-readable medium of claim 15, wherein the instructions when executed by the one or more processors further cause operations comprising assigning compliance controls to the rules, the compliance controls configured to attempt to ensure compliance with the rules by the organization.

18. The non-transitory computer-readable medium of claim 17, wherein the instructions when executed by the one or more processors further cause operations comprising:

notifying members of the organization of task assignments to implement the compliance controls; and generating a control library graphical user interface for display on the user device, the control library graphical user interface providing a library of the compliance controls with an indication of which of the members of the organization are assigned to each of the compliance controls.

* * * * *